(12) United States Patent
Radhakrishnan et al.

(10) Patent No.: US 11,899,749 B2
(45) Date of Patent: Feb. 13, 2024

(54) AUTOMATIC LABELING AND SEGMENTATION USING MACHINE LEARNING MODELS

(71) Applicant: NVIDIA Corporation, Santa Clara, CA (US)

(72) Inventors: Subhashree Radhakrishnan, San Jose, CA (US); Partha Sriram, Los Altos Hills, CA (US); Farzin Aghdasi, East Palo Alto, CA (US); Seunghwan Cha, Pittsburgh, PA (US); Zhiding Yu, Santa Clara, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 386 days.

(21) Appl. No.: 17/201,816

(22) Filed: Mar. 15, 2021

(65) Prior Publication Data

US 2022/0292306 A1 Sep. 15, 2022

(51) Int. Cl.
| | |
|---|---|
| *G06F 18/214* | (2023.01) |
| *G06T 7/12* | (2017.01) |
| *G06T 3/00* | (2006.01) |
| *G06V 10/22* | (2022.01) |
| *G06V 10/24* | (2022.01) |
| *G06V 20/40* | (2022.01) |

(52) U.S. Cl.
CPC .......... *G06F 18/214* (2023.01); *G06T 3/0006* (2013.01); *G06T 7/12* (2017.01); *G06V 10/22* (2022.01); *G06V 10/242* (2022.01); *G06V 20/40* (2022.01); *G06T 2207/20081* (2013.01); *G06T 2207/20084* (2013.01)

(58) Field of Classification Search
CPC ....... G06F 18/214; G06T 7/12; G06T 3/0006; G06T 2207/20081; G06T 2207/20084; G06V 20/40; G06V 10/22; G06V 10/242
USPC ......................................................... 382/103
See application file for complete search history.

(56) References Cited

U.S. PATENT DOCUMENTS

| | | | |
|---|---|---|---|
| 10,297,070 B1 * | 5/2019 | Zhu ..................... G06F 18/214 |
| 2019/0073560 A1* | 3/2019 | Matei ..................... G06N 3/08 |
| 2019/0295289 A1* | 9/2019 | Khan ..................... G06V 10/24 |
| 2020/0410668 A1* | 12/2020 | Tchou ............... G06F 18/23211 |
| 2022/0335726 A1* | 10/2022 | Paverman Kashani ..................... G06V 10/22 |

OTHER PUBLICATIONS

Acuna et al., "Efficient Interactive Annotation of Segmentation Datasets with Polygon-RNN++," Mar. 26, 2018, 21 pages.
Hu et al., "Learning to Segment Every Thing," Proceedings of the IEEE Conference on Computer Vision and Pattern Recognition. 2018, 9 pages.
IEEE, "IEEE Standard 754-2008 (Revision of IEEE Standard 754-1985): IEEE Standard for Floating-Point Arithmetic," Aug. 29, 2008, 70 pages.

(Continued)

*Primary Examiner* — Michael R Neff
(74) *Attorney, Agent, or Firm* — Davis Wright Tremaine LLP

(57) ABSTRACT

In various examples, training methods as described to generate a trained neural network that is robust to various environmental features. In an embodiment, training includes modifying images of a dataset and generating boundary boxes and/or other segmentation information for the modified images which is used to train a neural network.

33 Claims, 59 Drawing Sheets

(56) References Cited

OTHER PUBLICATIONS

NVIDIA, "Developer Blog: Detecting Rotated Objects Using the NVIDIA Object Detection Toolkit," retrieved from <https://news.developer.nvidia.com/developer-blog-detecting-rotated-objects-using-the-nvidia-object-detection-toolkit/ , Jul. 13, 2020, 2 pages.

Shao et al., "CrowdHuman: A Benchmark for Detecting Human in a Crowd," Apr. 30, 2018, 9 pages.

Society of Automotive Engineers On-Road Automated Vehicle Standards Committee, "Taxonomy and Definitions for Terms Related to Driving Automation Systems for On-Road Motor Vehicles," Standard No. J3016-201609, issued Jan. 2014, revised Sep. 2016, 30 pages.

Society of Automotive Engineers On-Road Automated Vehicle Standards Committee, "Taxonomy and Definitions for Terms Related to Driving Automation Systems for On-Road Motor Vehicles," Standard No. J3016-201806, issued Jan. 2014, revised Jun. 2018, 35 pages.

Zhang et al., "CityPersons: A Diverse Dataset for Pedestrian Detection," Proceedings of the IEEE Conference on Computer Vision and Pattern Recognition. 2017, 9 pages.

* cited by examiner

AUTOMATIC LABELING AND SEGMENTATION USING MACHINE LEARNING MODELS

BACKGROUND

Traditional methods for auto-labeling and segmentation tools rely on existing datasets that may not produce robust tools for a wide variety of applications due to a lack of data in different domains. For example, existing training datasets may not include particular environments, object orientations, or other characteristics of the deployment environment for particular auto-labeling or segmentation tools. In addition, obtaining annotations and masks for training datasets is time consuming and error prone. Furthermore, Convolutional Neural Networks (CNNs) used for object detection and other tasks often work best when divided into rectangular boxes, where these rectangular boxes have edges parallel with the boundaries of the images provided to the CNNs, which can create a domain gap in various real-world applications. Existing auto-labeling and segmentation tools are limited by existing training datasets that are costly and difficult to generate. In addition, these tools require human supervision during training.

BRIEF DESCRIPTION OF DRAWINGS

The present systems and methods for a rotationally robust auto-labeling tool for segmentation are described in detail below with reference to the attached drawing figures, wherein.

DETAILED DESCRIPTION

Figure 1:
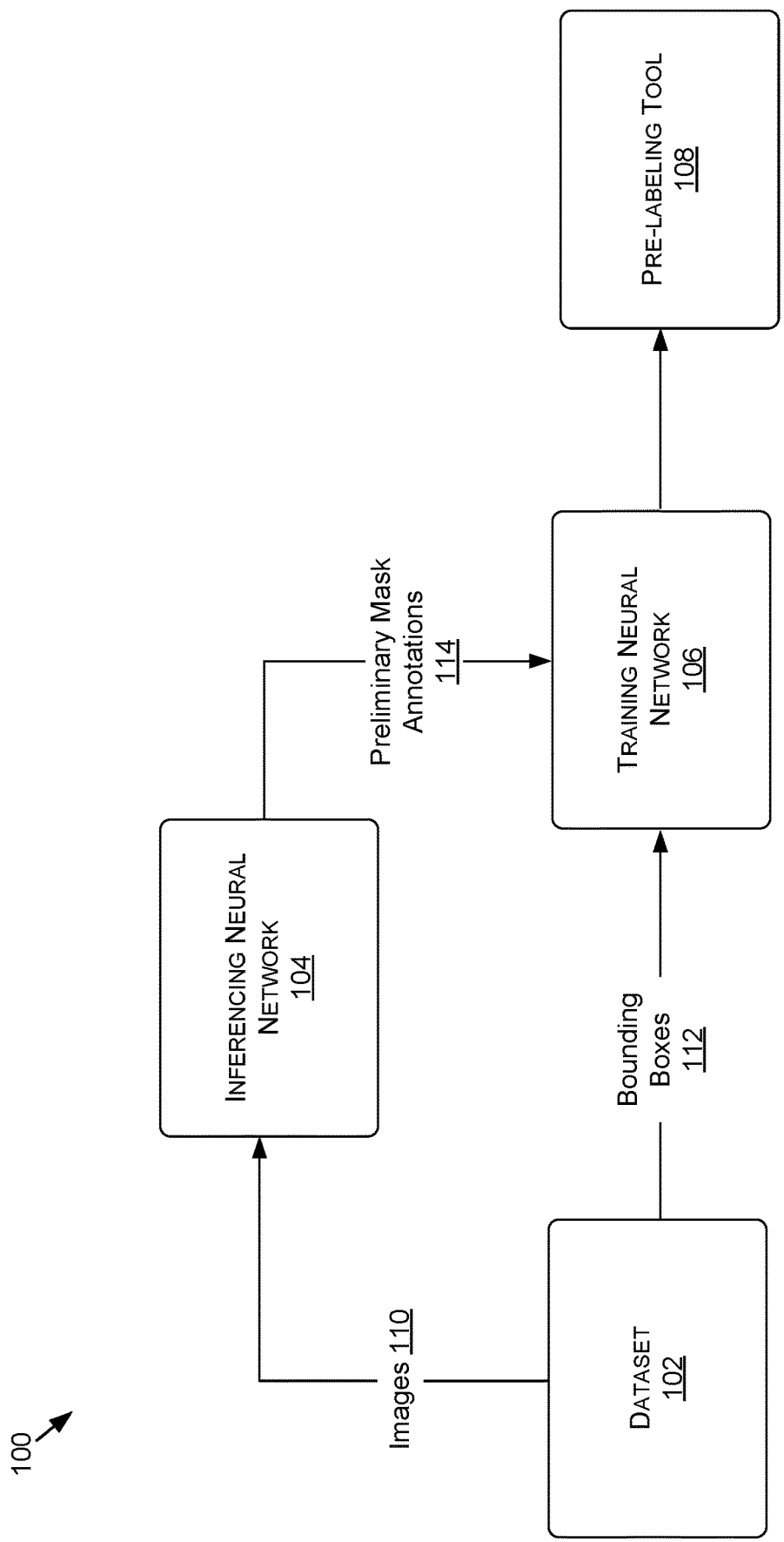
FIG. 1 is an illustration of a first training stage to generate a pre-labeling tool to perform image segmentation during a second training stage, in accordance with some embodiments of the present disclosure.

Embodiments of the present disclosure relate to a rotationally robust auto-labeling tool for segmentation. Systems and methods are disclosed that provide a self-training method to obtain segmentation masks (e.g., for pedestrian detection tasks) from bounding boxes generated by a first model. The obtained segmentation masks can then be used by a second model to generate tight(er) bounding boxes in rotated images that can be used as additional augmentation, generate a ground truth oriented bounding box (e.g., a non-axis aligned bounding box) for objects in an image, and/or generate segmentation labels for objects. Rotation is one example of modifications that, in various embodiments, can be applied to a training dataset (e.g., a curated and annotated set of images) to increase robustness of trained models and reduce a domain gap. The domain gap describes a difference between an environment captured in a training dataset and an environment in which a trained model (e.g., trained using the training dataset) is deployed. Additional examples of modification to the training dataset of use in the present disclosure include modifications to luminance, contrast, scale, rotation, orientation, or other modifications to the training dataset to emulate the environment in which the trained model generates inferences.

In contrast to conventional systems, such as those described above, the systems and methods described in the present disclosure do not require human interaction (e.g., self-training methods) and can be used with existing training datasets. In other words, the systems and methods described in the present disclosure eliminate the cost and errors created by the need for human intervention and can be performed using existing training datasets thereby obviating the need and costs of generating a training dataset. For example, models trained (e.g., Convolutional Neural Networks) using the systems and methods described in the present disclosure are robust to rotation, occlusion, truncation, or other forms of obstruction of objects in images or videos.

In an embodiment, a two-stage self-training auto labeling tool is used to obtain segmentation and/or annotations based at least in part on bounding boxes for a set of images. In this embodiment, during the first stage, a model is trained using a training dataset to generate preliminary mask annotations for the training dataset or another training dataset. In one example, a Mask Region-based Convolutional Neural Network (Mask R-CNN) is trained using a first dataset (e.g., the Common Objects in Context dataset), the Mask R-CNN is then used to generate preliminary mask annotations for a second training dataset. Furthermore, in this example, the Mask R-CNN is executed without a Region Proposal Network, as a result of the training dataset set including bounding boxes for objects in the images. In various embodiments, the preliminary mask annotations and the second training dataset are then used to train a new model or retrain the Mask R-CNN model described above, resulting in a pre-labeling tool used in stage two.

During stage two, in an embodiment, a new model (e.g., a new Mask R-CNN model) is trained using the second training dataset including bounding boxes and segmentations generated by the pre-labeling tool generated in stage 1. In addition, in various embodiments, modifications are made to the second training dataset. In one example, images from the training dataset are rotated (e.g., five degree clockwise), the pre-labeling tool is then used to generate coarse bounding boxes around objects in the images of the training dataset and new model (e.g., the model trained during stage two) is used to generate finer bounding boxes around objects in the images. In this manner, additional training data may be generated to expand the training dataset and reduce any domain gap.

With reference to FIG. 1, FIG. 1 is an example training method for training a pre-labeling tool 108 for use in training a rotationally robust neural network for segmentation, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

Figure 2:
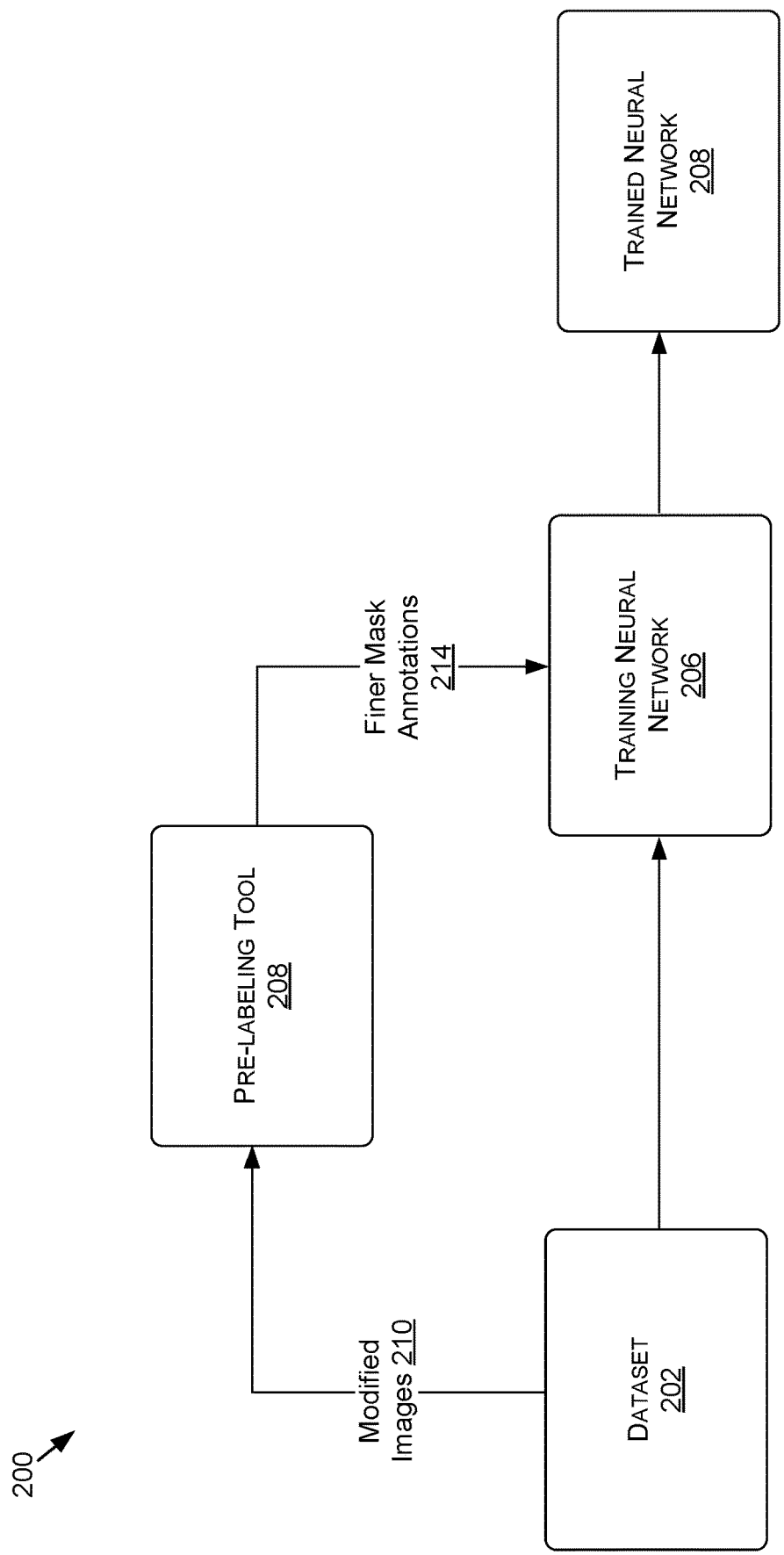
FIG. 2 is an illustration of a second training stage to generate a trained neural network to perform image segmentation, in accordance with some embodiments of the present disclosure.
Figure 5:
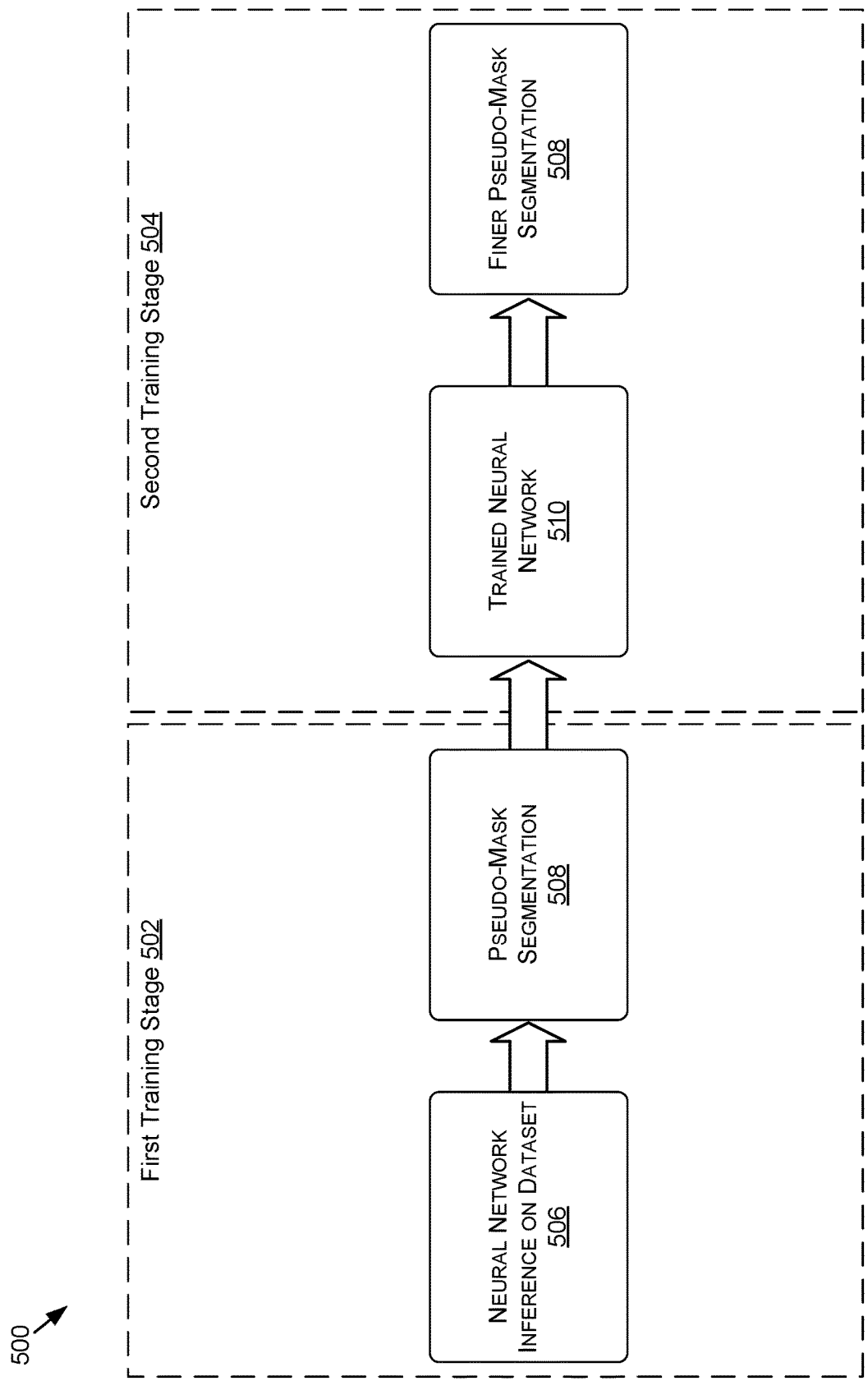
FIG. 5 is an illustration of a two-stage training process to generate a trained neural network to perform image segmentation, in accordance with some embodiments of the present disclosure.

Now referring to FIGS. 1, 2, and 5, each block of methods 100, 200, and 500, described herein comprises a computing process that may be performed using any combination of hardware, firmware, and/or software. The various functions and/or operations described in the present disclosure may be carried out by a processor executing instructions stored in memory. In one example, the dataset 102 includes a collection of annotated images stored in a storage device such as a hard disk drive (HDD). In another example, the inferencing neural network 104 includes source code stored in the memory of a computer system that, when executed by a processor of the computer system, causes the computer system to perform inferencing operations as described in greater detail below. The methods may also be embodied as computer-usable instructions stored on computer storage media. The methods may be provided by a standalone application, a service or hosted service (standalone or in combination with another hosted service), or a plug-in to another product, to name a few. In addition, the methods 100, 200, and 500 are described, by way of example, with respect to the computer system of FIG. 12. However, these methods may additionally or alternatively be executed by any one system, or any combination of systems, including, but not limited to, those described herein.

Returning to FIG. 1, FIG. 1 is a flow diagram showing a method 100 for generating the pre-labeling tool 108, in accordance with some embodiments of the present disclosure. The method 100, includes the dataset 102 which, in various embodiments, include images 110 depicting various objects and/or classes of object (e.g., people, cars, clothes, animals, etc.), and bounding boxes 112. In an embodiment, the bounding boxes 112 include metadata or other information associated with images 110 of the dataset 102 defining a rectangle or other geometric shape that encloses (e.g., creates a boundary around) a particular object included in an image of the dataset 102. For example, the bounding boxes 112 include the minimum (e.g., least area) or perimeter bounding box around an object in an image where all the pixels depicting the object are within a boundary created by the bounding box. The bounding boxes 112, in various embodiments, are of dimension N, where N is the total number of dimensions depicted in the images 110 of the dataset 102. For example, the dataset 102 may include three-dimensional images 110, images 110 comprising video, two dimensional images 110, or other images that are suitable for training a neural network or performing inferencing using a neural network.

In various embodiments, the dataset 102 comprises a curated dataset including segmentation and annotation information (e.g., bounding boxes 112) generated based at least in part on human operators. In one example, the dataset 102 comprises the Common Objects in Context (COCO) dataset. In yet other embodiments, the segmentation and annotation information (e.g., bounding boxes 112) is generated by a model such as a neural network.

Returning to FIG. 1, images 110 of the dataset 102 are provided to an inferencing neural network 104 to generate preliminary mask annotations 114. In an embodiment, the inferencing neural network 104 is a trained network to detect objects and/or a class of objects depicted in the images 110. In various embodiments, the inferencing neural network 104 includes any neural network trained to perform segmentation and annotation of images. In one example, the inferencing neural network 104 is trained using the dataset 102. In another example, the inferencing neural network 104 is trained using a separated dataset from the dataset 102.

In various embodiments, the inferencing neural network 104 comprises a Mask Region Based Convolutional Neural Networks (R-CNN) or other Convolutional Neural Networks suitable for generating coarse segmentation information for objects in the images 110 for use in training a training neural network 106. In various embodiments, the images 110 provided to the inferencing neural network 104 do not include segmentation and/or annotation information (e.g., the bounding boxes 112). In an embodiment, the preliminary mask annotations 114 include bounding boxes and/or masks for objects and/or a class of objects (e.g., people) depicted in the images 110. The preliminary mask annotations 114 are described in greater detail below in connection with FIG. 3.

In various embodiments, the training neural network 106 includes any neural network which is capable of being trained using segmentation and annotation information. In one example, the training neural network 106 is a Mask R-CNN without the Regional Proposal Network module. Furthermore, the training neural network 106, as illustrated in the embodiment depicted in FIG. 1, is trained using the dataset 102, including the bounding boxes 112, and the preliminary mask annotations 114 generated at least in part by the inferencing neural network 104. In various embodiments, a pre-labeling tool 108 is generated as a result of training the training neural network 106 as described above. The pre-labeling tool 108, in an embodiment, is a trained neural network that when performing inferencing on an input (e.g., an image) generates fine segmentation (e.g., masks) and annotation for images of a dataset (e.g., the dataset 102). In various embodiments, the pre-labeling tool 108 includes software, hardware, or a combination thereof that utilizes a neural network or other model to perform various operations, such as performing inferencing to generate a mask, generating bounding boxes, or other operations described in the present disclosure. As described in greater detail below, the pre-labeling tool 108 may be used to generate segmentation and annotation for modified datasets. In one example, images 110 of the dataset 102 are rotated or otherwise modified to generate an environmentally robust trained model.

FIG. 2 is a flow diagram showing a method 200 for generating a trained neural network 208 which is robust to rotation, occlusion, truncation, or other forms of obstruction or obscuring of objects in images or videos, in accordance with some embodiments of the present disclosure. In various embodiments, the method 200 for training the trained neural network 208, includes a dataset 202. For example, the dataset 202 includes a set of images depicting objects (e.g., a curated set of images including bounding boxes and annotations) described above in connection with FIG. 1. Furthermore, in various embodiments, the dataset 202 includes modification and/or alterations to the set of images included in the dataset 202. The modification and/or alterations to the set images, in such embodiments, augment the dataset 202 by at least generating modified images 210 to reduce a domain gap between the set of images in the dataset 202 and the target domain for the trained neural network 208, enabling the trained neural network 208 to produce better results during inferencing.

In an embodiment, the dataset 202 is augmented by at least rotating the set of images about an optical axis to generate the modified images 210. For example, the set of images are rotated five degrees clockwise to generate the modified images 210. In addition, the modified images 210, in various embodiments, are used during training of the neural network 206 described in greater detail below. In other another example, luminance values associated with the images 210 are modified to generate the modified images 210.

Furthermore, in various embodiments, multiple modification and/or alterations to the set of images are performed to generate the modified images 210 to augment the dataset 202. In an example, the set of images are rotated five degrees clockwise and ten degrees clockwise to generate the modified images 210 (e.g., the modified images 210 includes images of the set of images rotated five degrees and ten degrees). In an embodiment, multiple types of modification or alterations are applied to the set of images to generate the modified images 210. For example, the set of images are rotated and a scale associated with the set of images is modified. These modifications and/or alterations may be performed individually or in combination. Furthermore, the modification and/or alterations may be applied to the set of images in serial or in parallel.

As described above, the modification and/or alterations to the set of images may include a variety of different operations such as rotating, flipping, cropping, modifying exposure, modifying white balance, modifying color, modifying saturation, sharpening images, applying filters, modifying scale, or otherwise modifying, adjusting, or otherwise altering the set of images to represent an environment in which the trained neural network 208 performs inferencing.

Returning to FIG. 2, in various embodiments, the modified images 210 are provided to a pre-labeling tool 208 which generates finer mask annotations 214 for objects depicted in the modified images 210. The pre-labeling tool 208, in an embodiment, is a neural network or other model trained using the method 100 as described above in connection with FIG. 1. For example, the pre-labeling tool 208 is a Mask R-CNN trained using a dataset including bounding boxes and annotations (e.g., the dataset 102). In an embodiment, the pre-labeling tool 208 generates finer mask annotations 214 for a particular class of object and/or objects in the modified images 214 as described in greater detail below in connection with FIG. 4. The finer mask annotations 214, in various embodiments, include additional data and/or metadata identifying pixels of the modified images 210 that depict a particular object and/or class of objects. In one example, the modified images 210 include a set of images depicting people in context (e.g., pedestrians) rotated by a set of values about an optical axis, the pre-labeling tool 208 then generates finer mask annotations 214 that identify the pixels of the set of images that include people and labels identifying the pixels as being associated with people. As noted above, rotation of the image about the optical axis, in some examples, causes bounding boxes and other segmentation information associated with the dataset 202 to be inaccurate and/or incorrect. In such examples, the pre-labeling tool 208 generates finer mask annotations 214 that provide accurate segmentation information used to train a training neural network 206.

In various embodiments, the training neural network 206 includes any neural network that is capable of being trained using segmentation and annotation information such as the finer mask annotations 214. In one example, the training neural network 206 is a Mask R-CNN trained using the dataset 202 including the modified images 210 and finer mask annotations 214. Furthermore, the training neural network 206, as illustrated in the embodiment depicted FIG. 2, when trained using the dataset 202 (which includes the bounding boxes, modified images 210, and the finer mask annotations 214) results in a trained neural network 208. In various embodiments, the trained neural network 208 is an environmentally robust trained model capable of identifying objects or classes of objects depicted in images. For example, as a result of rotating images of the dataset to generate modified images 210, the trained neural network 208 can be capable of detecting objects in images regardless of an optical angle (e.g., camera angle) of the images. In another example, as a result of reducing luminance values associated with images in the dataset, the trained neural network 208 can be capable of detecting objects in low light images.

Figure 3:
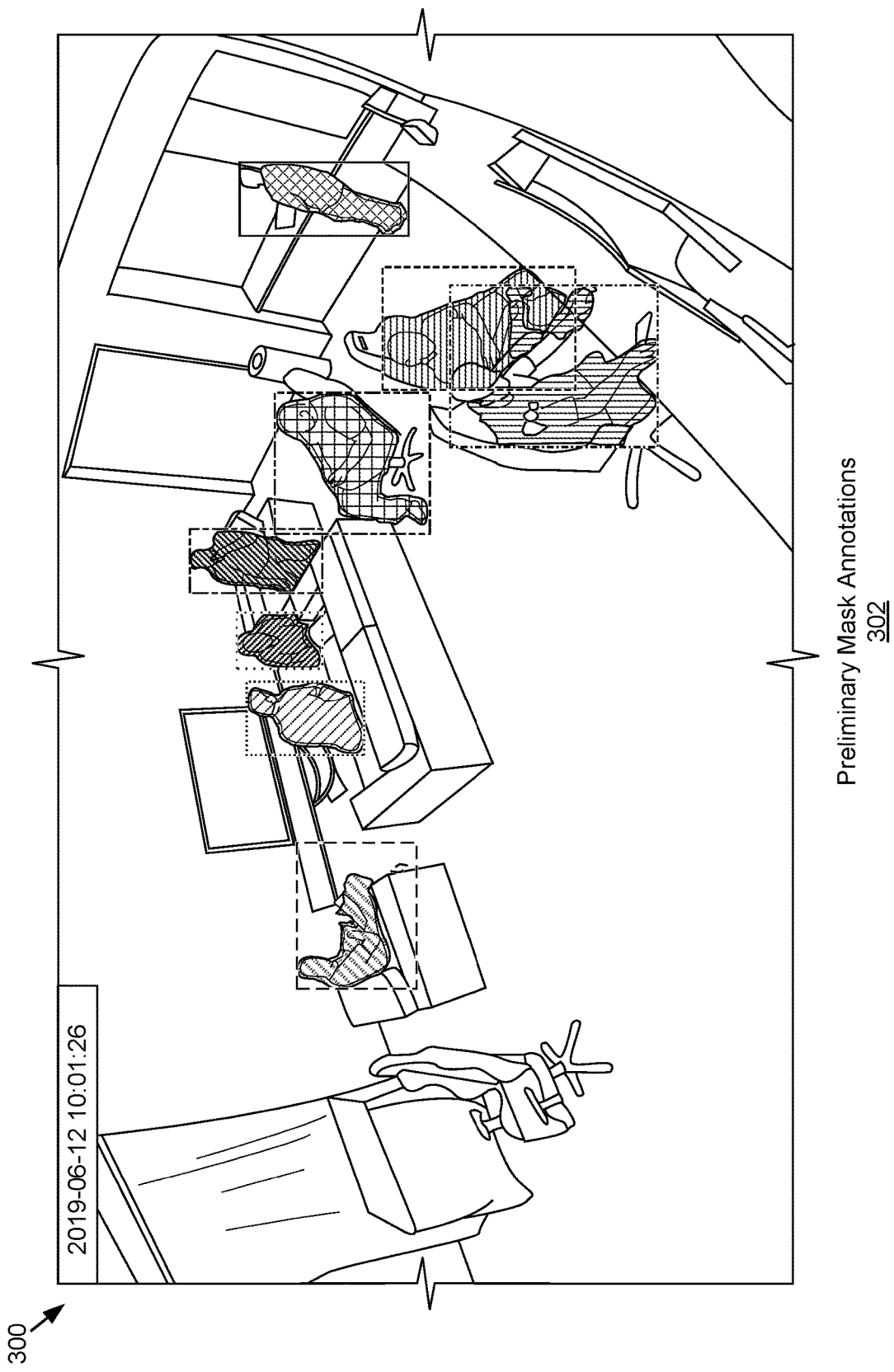
FIG. 3 is an illustration of image segmentation generated by a neural network, in accordance with some embodiments of the present disclosure.

FIG. 3 is an illustration of an image 300 including preliminary mask annotations 302 in accordance with at least one embodiment described in the present disclosure. In various embodiments, the preliminary mask annotations 302 are generated by a trained model, such as the inferencing neural network 104 described above in connection with FIG. 1.

As illustrated in FIG. 3, the image 300 includes the preliminary mask annotations 302 for people depicted in the image 300. Although the image 300 and the preliminary mask annotations 302 include people, the inferencing neural network may be trained to generate the preliminary mask annotations 302 for any object or classes of objects. Furthermore, in various embodiments, the preliminary mask annotations 302 include various types of segmentation information such as bounding boxes, masks, labels, annotations, or other information suitable for identifying objects in images. In addition, while the image 300 is depicted in FIG. 3, the preliminary mask annotations 302 may be generated for three-dimensional representations, four-dimensional representations, videos, or other mediums capable of depicting objects.

The preliminary mask annotations 302, in some examples, are included as additional data within the image 300. In yet other examples, the preliminary mask annotations 302 are additional data provided along with the images (e.g., provided as annotations to an image provided to a neural network). Furthermore, as described above, the preliminary mask annotation 302 may include coarse annotations generated by a neural network trained using a curated dataset. In various embodiments, the preliminary mask annotations 302 are used to train a neural network, such as the pre-labeling tool 208 described above.

Figure 4:
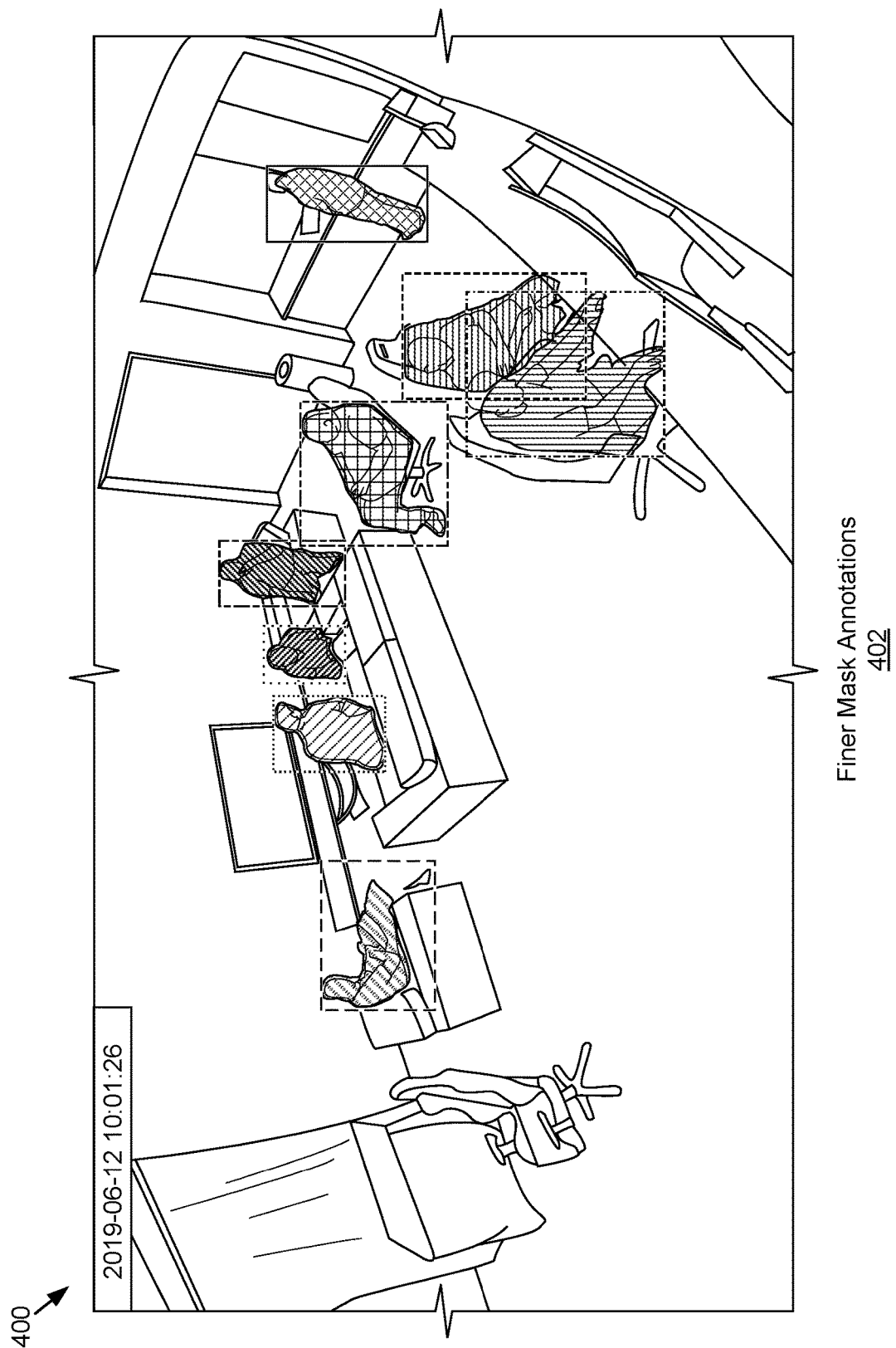
FIG. 4 is an illustration of image segmentation generated by a neural network, in accordance with some embodiments of the present disclosure.

FIG. 4 is an illustration of an image 400 including finer mask annotations 402 in accordance with at least one embodiment described in the present disclosure. In various embodiments, the finer mask annotations 402 are generated by a trained model, such as the pre-labeling tool 108 described above in connection with FIG. 1. As illustrated in FIG. 3, the image 400 includes the finer mask annotations 402 for people depicted in the image 400. In various embodiments, the finer mask annotations 402 are generated by the pre-labeling tool for images of a dataset used to train the pre-labeling tool. Furthermore, as described above in connection with FIG. 2, the images of the dataset may be modified and the finer mask annotations 402 may be generated based at least in part on the modified images. Although the image 400 and the finer mask annotations 402 include people, the inferencing neural network may be trained to generate the finer mask annotations 402 for any object or class of objects. Furthermore, in various embodiments, the finer mask annotations 402 include various types of segmentation information such as bounding boxes, masks, labels, annotations, or other information suitable for identifying objects in images. In addition, while the image 400 is depicted in FIG. 4, the finer mask annotations 402 may be generated for three-dimensional images, four-dimensional images, videos, or other mediums capable of depicting objects.

The finer mask annotations 402, in some examples, are included as additional data within the image 400. In yet other examples, the finer mask annotations 402 are additional data provided along with the images (e.g., provided as annotations to an image provided to a neural network). In various embodiments, the finer mask annotations 402 are used to train neural networks, such as the trained neural network 208 described above.

FIG. 5 is a flow diagram showing a method 500 for generating a trained neural network that is robust to rotation, occlusion, truncation, other forms of obstruction, or other environmental factors in images or videos, in accordance with some embodiments of the present disclosure. In various embodiments, the method 500 for training the neural network, includes two training stages, a first training stage 502 and a second training stage 504. Furthermore, in one example, the first training stage 502 includes the method 100 as described above and the second training stage includes the method 200 as described above. During the first training stage 502, in block 506, the system performing the method 500 utilizes a neural network to perform inferencing on a dataset. As described above, the neural network may include a Mask R-CNN trained based at least in part on a curated dataset (which may be different from the dataset used to perform inferencing). Furthermore, in various embodiments, in block 508, pseudo-mask segmentation is generated as a result of performing inferencing on the dataset by the neural network. For example, the pseudo-mask segmentation generated by the neural network may include preliminary mask annotations as described above.

In various embodiments, in the second training stage 504 at block 510, a second neural network is trained based at least in part on the pseudo-mask segmentation and the dataset. As described above, the dataset, in various embodiments, is augmented or otherwise expanded by modifying the dataset (e.g., images or videos included in the dataset). For example, images of the dataset are modified and segmentation data (e.g., a mask) is generated for the modified dataset, which is then used to train the neural network. At block 508, the trained neural network is used to generate finer pseudo-mask segmentation. In an embodiment, the finer pseudo-mask segmentation includes the finer mask annotations described above in connection with FIG. 4. Furthermore, the finer pseudo-mask segmentation, in various embodiments, is used to train additional models that are robust to various environmental factors captured by at least modifying the dataset as described above.

Figure 6:
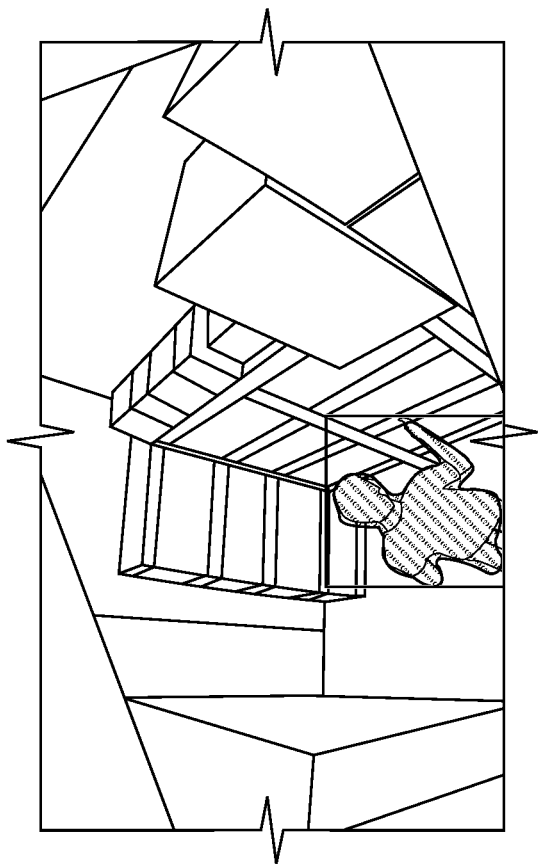
FIG. 6 is an illustration of image segmentation generated by a pre-labeling tool and a trained neural network, in accordance with some embodiments of the present disclosure.
Figure 6:
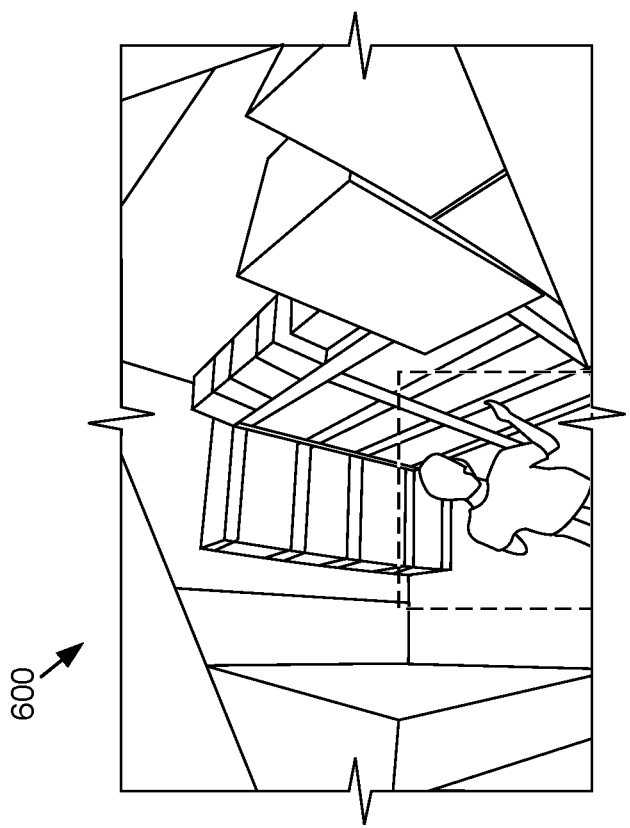

FIG. 6 is an illustration of a modified image 600 including coarse and fine annotations in accordance with at least one embodiment described in the present disclosure. In various embodiments as described above, images, videos, or other information included in a dataset are modified and used to train environmentally robust models. As illustrated in FIG. 6, the modified image 600 includes an image rotated about an axis. Although FIG. 6 illustrates a rotated modified image, any number of additional and/or alternative modifications can be applied to an image to generate a modified image as described in greater detail above.

In various embodiments as described above, a first trained neural network generates a coarse bounding box 602 for an object in the modified image. The coarse bounding box 602, in one example, includes the preliminary mask annotations as described above. In another example, the coarse bounding box is generated as a result of a neural network that has not been trained in the manner described above to generate a rotational robust neural network. In such examples, the coarse bounding box 602, as illustrated in FIG. 6, includes additional pixels that do not correspond to the person depicted in the modified image 600. In various embodiments, the fine bounding box 604 for the modified image 600 is generated by a pre-labeling tool as described above. In addition, the fine bounding box 604, in an embodiment, is used to train a neural network that is rotational robust.

Figure 7:
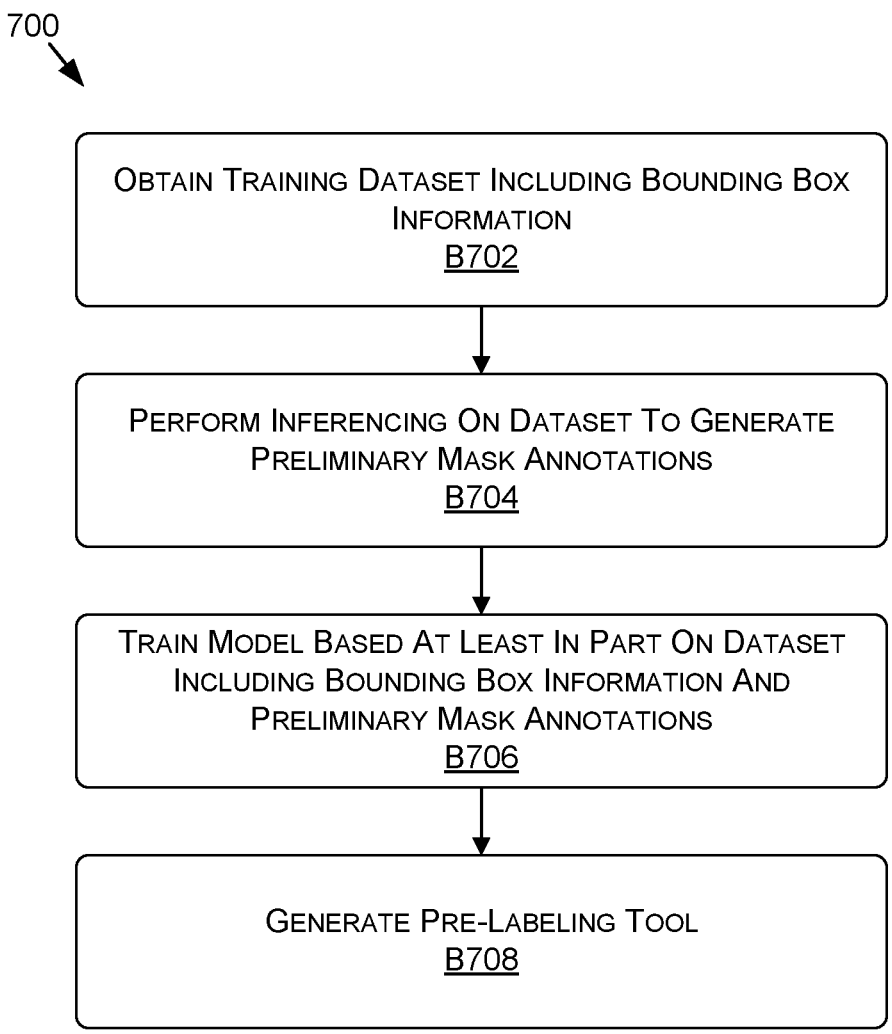
FIG. 7 is a flow diagram illustrating a first training stage to generate a pre-labeling tool to perform image segmentation during a second training stage, in accordance with some embodiments of the present disclosure.

With reference to FIG. 7, FIG. 7 is an example flow diagram for generating a pre-labeling tool, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

Figure 8:
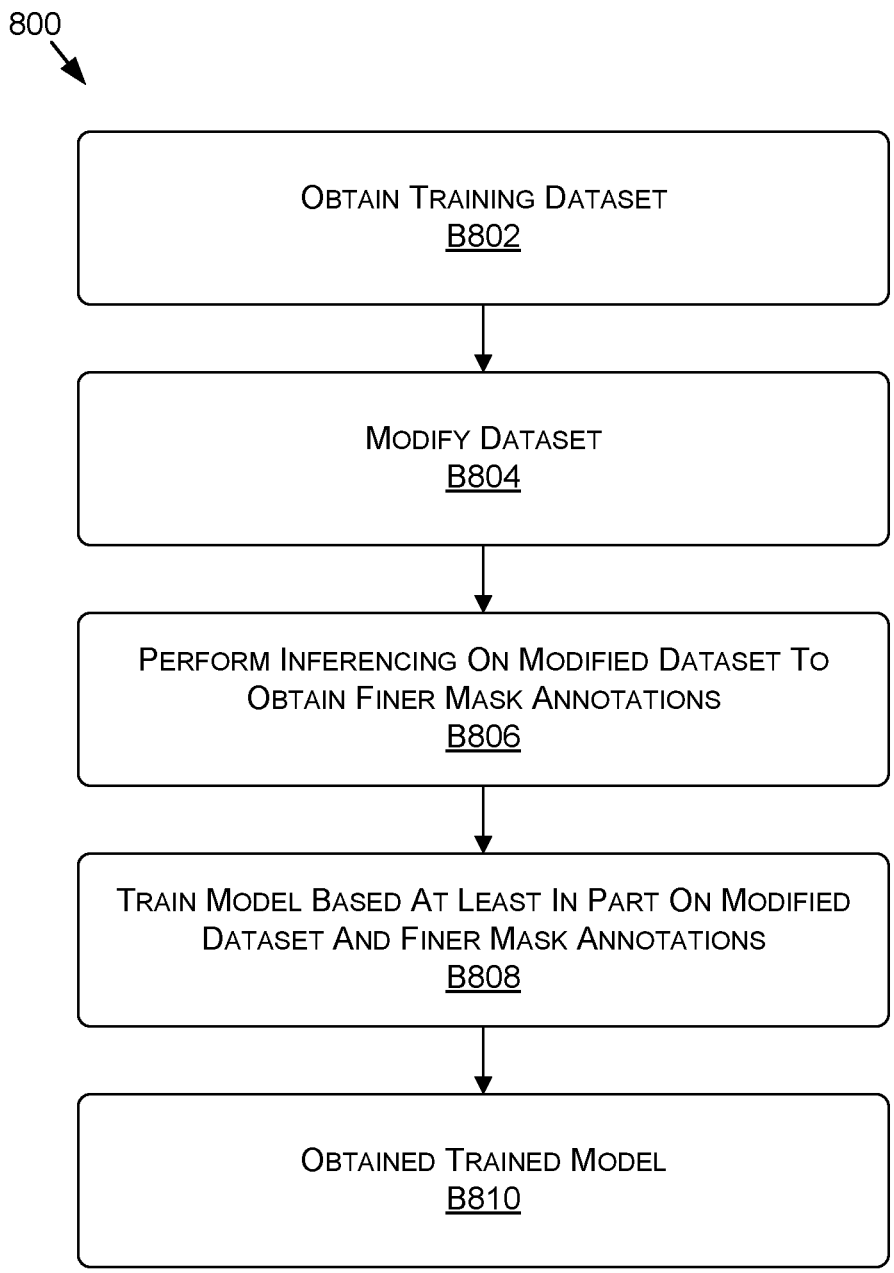
FIG. 8 is a flow diagram illustrating a second training stage to generate a trained neural network to perform image segmentation, in accordance with some embodiments of the present disclosure.
Figure 9:
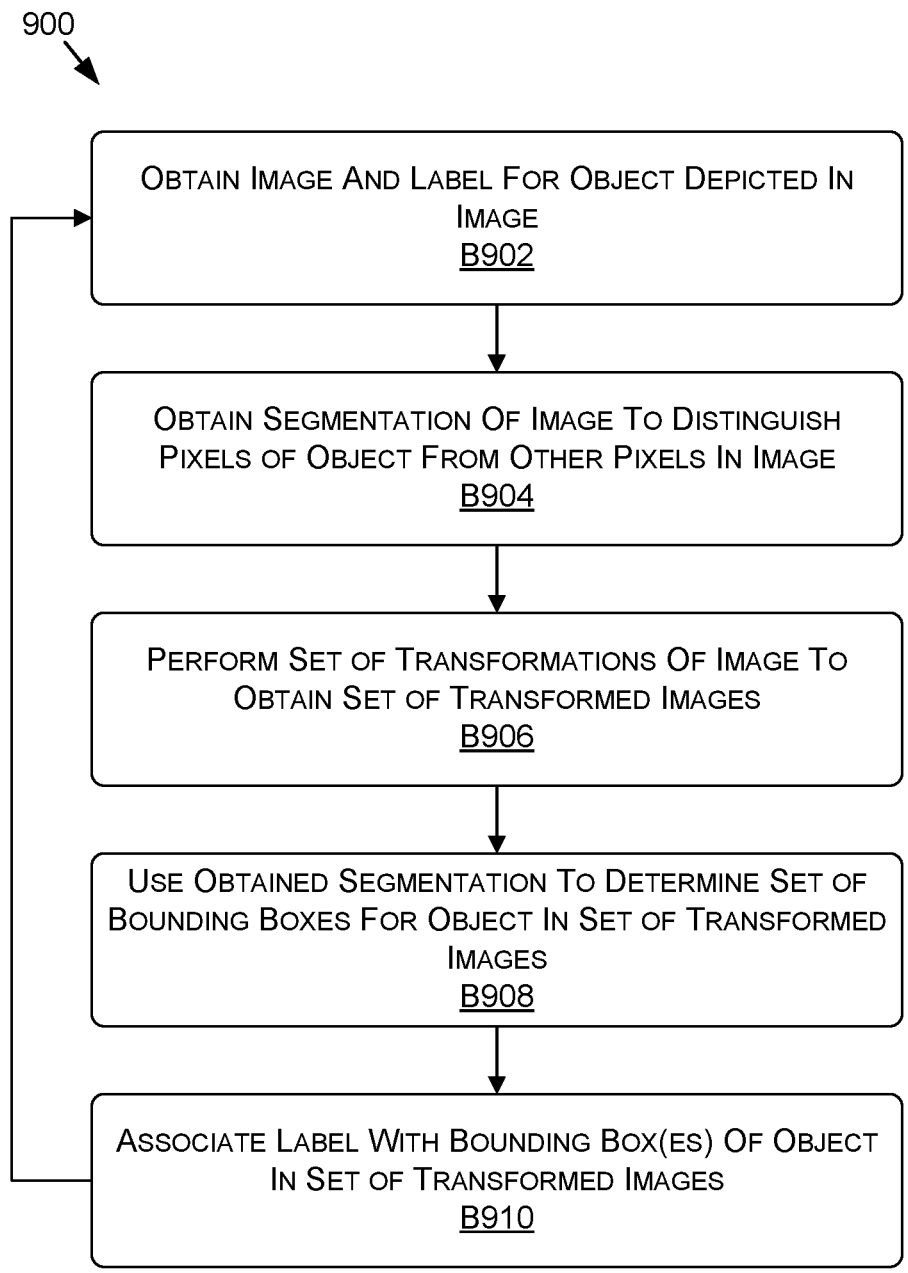
FIG. 9 is a flow diagram illustrating a set of transformation applied to images of a dataset, in accordance with some embodiments of the present disclosure.

Now referring to FIGS. 7, 8, and 9, each block of method 700, 800, and 900, described herein, comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few. In addition, methods 700, 800, and 900 are described, by way of example, with respect to the training methods described above. However, these methods may additionally or alternatively be executed by any one system, or any combination of systems, including, but not limited to, those described herein.

FIG. 7 is a flow diagram showing a method 700 for generating a pre-labeling tool, in accordance with some embodiments of the present disclosure. The method 700, at block B702, includes obtaining a dataset including bounding box information. In various embodiments, the dataset includes images depicting various objects and/or classes of object (e.g., people, cars, clothes, animals, etc.), and bounding boxes corresponding to the objects. For example, the dataset comprises the Common Objects in Context (COCO) dataset including bounding boxes. In an embodiment, the bounding boxes include metadata or other information associated with images of the dataset defining a rectangle or other geometric shape that encloses a particular object included in an image of the dataset. For example, the bounding boxes include the minimum perimeter bounding box around an object in an image where all the pixels depicting the object are within the bounding box. The bounding box information, in various embodiments, further includes segmentation information, annotations, or other information suitable for training models to perform object detection, labeling, or similar tasks. In an embodiment, the bounding box information is generated by a trained model performing inferencing on the images included in the dataset.

Returning to FIG. 7, the system executing the method 700, at block B704, performs inferencing on the dataset to generate preliminary mask annotations. For example, a trained neural network performs the inferencing to detect objects and/or a class of objects depicted in the images. The neural network, in an embodiment, is trained on a second dataset distinct from the dataset described above. In various embodiments, the inferencing neural network includes any neural network trained to perform segmentation and annotation of images. In one example, the inferencing neural network is trained using the dataset and bounding box information. For example, the inferencing neural network comprises a Mask Region Based Convolutional Neural Networks (R-CNN) or other Convolutional Neural Networks suitable for generating coarse segmentation information for objects in the images. In various embodiments, the images provided to the inferencing neural network do not include segmentation and/or annotation information (e.g., the bounding box information). In an embodiment, the preliminary mask annotations include bounding boxes and/or masks for objects and/or a class of objects (e.g., people) depicted in the images included in the dataset. The preliminary mask annotations, in an embodiment, include the preliminary mask annotations described in greater detail above in connection with FIG. 3.

In various embodiments, the system executing the method 700, at block B706, trains a model (e.g., a previously untrained neural network) based at least in part on the dataset and the preliminary mask annotations. In various embodiments, the training neural network includes any neural network which is capable of being trained using segmentation and annotation information. In one example, the training neural network is a Mask R-CNN without a Regional Proposal Network module. Furthermore, training the neural network is performed using the dataset, including the bounding boxes, and the preliminary mask annotations generated at least in part by the inferencing neural network at block B704. In various embodiments, the system executing the method 700, at block B708, generates a pre-labeling tool as a result of training the neural network. The pre-labeling tool, in an embodiment, is a trained neural network that, when performing inferencing on an input (e.g., an image), generates fine segmentation (e.g., masks) and annotation for images of a dataset (e.g., the dataset). As described in the present disclosure, the pre-labeling tool, in an embodiment, is used to generate segmentation and annotation for modified datasets (e.g., rotated images of a dataset).

FIG. 8 is a flow diagram showing a method 800 for generating a trained neural network, in accordance with some embodiments of the present disclosure. In various embodiments, the method 800, at block B802, includes obtaining a training dataset. For example, the training dataset includes a set of images depicting objects with or without additional information such as segmentation information, bounding box information, labeling information, or other information as described above. Furthermore, the method 800, at block B804, in various embodiments, includes modifying and/or altering the set of images included in the dataset. The modification and/or alterations to the set of images, in an embodiment, augments the dataset by at least generating modified images to reduce a domain gap between the set of images in the dataset and the target domain for the trained neural network, enabling the trained neural network to produce better results during inferencing. In one example, images of the training dataset are rotated about an optical axis at various degrees (e.g., 5 degrees, −5 degrees, 8 degrees, etc.). In another example, images are augmented by at least modifying a scale of the images. In yet another example, luminance values associated with the images are modified in block B804.

In an embodiment, multiple types of modification or alterations are applied to the set of images to generate the modified images. For example, the images are rotated and a scale associated with the images is modified. These modifications and/or alterations may be performed individually or in combination. Furthermore, the modification and/or alterations may be applied to the images in serial or in parallel.

As described above, the modification and/or alterations to the set of images may include a variety of different operations such as rotating, flipping, cropping, modifying exposure, modifying white balance, modifying color, modifying saturation, sharpening images, applying filters, modifying scale, or otherwise modifying, adjusting, or otherwise altering the set of images to represent an environment in which the trained model (e.g., the model obtained as a result of executing the method 800) performs inferencing.

Returning to FIG. 8, in various embodiments, the method 800, at block B806, includes performing inferencing on the modified dataset by at least providing the modified dataset to a pre-labeling tool. In various embodiments, the pre-labeling tool includes a trained model as described in greater detail above. For example, the pre-labeling tool 208 is a Mask R-CNN trained using a dataset including bounding boxes and annotations (e.g., the dataset 102). In an embodiment, the pre-labeling tool generates finer mask annotations for objects depicted in the modified images. For example, the pre-labeling tool generates finer mask annotations for a particular class of object and/or objects in the modified dataset as described in greater detail above in connection with FIG. 4. The finer mask annotations, in various embodiments, includes additional data and/or metadata identifying pixels (e.g., segmentation information) of modified images that depict a particular object and/or class of objects. In one example, the modified images include a set of images depicting people (e.g., pedestrians) rotated by a set of values about an optical axis, the pre-labeling tool then generates finer mask annotations that identify the pixels of the set of images that include people and labels identifying the pixels as being associated with people. As noted above, rotation of the image about the optical axis, in some examples, causes bounding boxes and other segmentation information associated with the dataset to be inaccurate and/or incorrect. In such examples, the pre-labeling tool generates finer mask annotations that provide accurate segmentation information used to train a training neural network as described in the present disclosure.

In various embodiments, the method 800, at block B808, includes training a neural network based at least in part on the modified dataset and finer mask annotations. In various embodiments, the modified dataset includes the dataset in order to augment the dataset and reduce a domain gap associated with an environment in which the trained neural network will perform inferencing as described above. In an embodiment, the neural network includes any neural network which is capable of being trained using segmentation and/or annotation information such as the finer mask annotations. For example, the neural network is a Mask R-CNN trained using the dataset and/or modified dataset including the modified images and finer mask annotations generated for the modified dataset. Furthermore, the method 800, at block B810, training the neural network results in a trained neural network. In various embodiments, the trained neural network is an environmentally robust trained model capable of identifying objects or classes of objects depicted in images. For example, the trained neural network, as a result of rotating images of the dataset to generate modified images, is capable of detecting objects in images regardless of an optical angle (e.g., camera angle) of the images. In another example, the trained neural network, as a result of reducing luminance values associated with images in the dataset, is capable of detecting objects in low light images.

FIG. 9 is a flow diagram showing a method 900 for modifying a dataset, in accordance with some embodiments of the present disclosure. In various embodiments, the method 900, at block B902, includes obtaining an image and a label for an object depicted in an image. For example, the image is obtained from a dataset, such as the dataset 102 as described above in connection with FIG. 1. In various embodiments, the label is included in the dataset. In yet other embodiments, the label is obtained from a neural network or other model. In various embodiments, the method 900, at block B904, includes obtaining segmentation of the image to distinguish pixels of the object from other pixels in the image. For example, segmentation of the image is obtained using a Mask R-CNN trained on a curated dataset to perform segmentation (e.g., the pre-labeling tool 108 as described above in connection with FIG. 1). In yet other embodiments, the segmentation is obtained manually or semi-manually. For example, a neural network or other model generates segmentation information for the image and a user validates and/or adjusts the output.

In various embodiments, the method 900, at block B906, includes performing a set of transformations of the image to obtain a set of transformed images. For example, as described above, the image is rotated about an axis at various values to generate a set of rotated images. Other examples of transformations include stretching, translations, scaling, color correcting, cropping, clipping, otherwise modifying the image, or a combination of transformations performed in parallel or serial.

In various embodiments, the method 900, at block B908, includes using the obtained segmentation to determine a set of bounding boxes for the objects depicted in the set of transformed images. For example, the transformation applied to the image to obtain the set of transformed images is applied to the segmentation to determine a location of the object in the transformed image. In various embodiments, calculating the bounding boxes includes calculating a box with corners having the following corners: (Xmin, Ymax), (Xmin, Ymin), (Xmax, Ymax), (Xmax, Ymin) where Xmin is the x-coordinate of the left most pixel of the segmentation, Xmax is the x-coordinate of the right most pixel of the segmentation, Ymin is the y-coordinate of the bottom most pixel in the segmentation, and Ymax is the y-coordinate of the upper most pixel in the segmentation. In yet other embodiments, the bounding box is calculated by two sets of coordinates (e.g., (Xmin, Ymax) and (Xmax, Ymin)) and at least one length value (e.g., the length of one side in a square or a base and height in a rectangle). Other methods of determining a bounding box for an object can be used in connection with the present disclosure. For example, in embodiments where an object includes a long tail or similar component that makes generating a bounding box that includes only the depicted object difficult, a histogram or other statistical technique is used to select the smallest perimeter box that encompasses a threshold value (e.g., 95%) of the pixels or other values to prevent the bounding box from including at least a portion of the pixels of the image that do no depict the object.

In various embodiments, the method 900, at block B910, includes associating the label with the bounding boxes of the object in the set of transformed images. For example, the set of transformed images are added to the dataset including the labeling and bounding box information generated as described above. In various embodiments, the set of transformed images are stored in the dataset according to the format of the dataset. In addition, the dataset including the set of transformed images, in various embodiments, is used to train a neural network that is robust to the transformation performed. For example, as a result of rotating the images during transformation, the resulting neural network trained with the dataset including the transformed images and bounding box information is rotationally robust when performing inferencing. As illustrated in FIG. 9, the method 900, in various embodiments, is repeated to augment the dataset. For example, as described above, the transformations are applied in serial to further reduce a domain gap. In various embodiments, the method 900 is performed in order to generate a set of rotated images and bounding box information used to augment the dataset and then repeated to generate a set of stretched images and bounding box information used to augment the dataset.

Inference and Training Logic

Figure 10A:
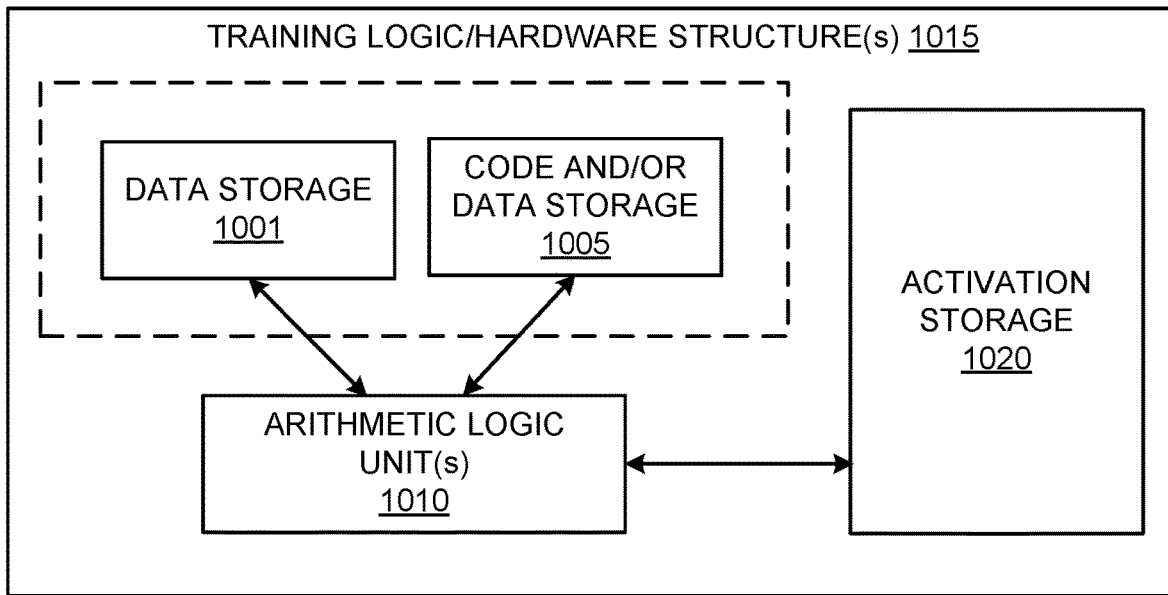
FIG. 10A illustrates inference and/or training logic, according to at least one embodiment.

FIG. 10A illustrates inference and/or training logic 1015 used to perform inferencing and/or training operations associated with one or more embodiments. Details regarding inference and/or training logic 1015 are provided below in conjunction with FIGS. 10A and/or 10B.

In at least one embodiment, inference and/or training logic 1015 may include, without limitation, code and/or data storage 1001 to store forward and/or output weight and/or input/output data, and/or other parameters to configure neurons or layers of a neural network trained and/or used for inferencing in aspects of one or more embodiments. In at least one embodiment, training logic 1015 may include, or be coupled to code and/or data storage 1001 to store graph code or other software to control timing and/or order, in which weight and/or other parameter information is to be loaded to configure, logic, including integer and/or floating point units (collectively, arithmetic logic units (ALUs)). In at least one embodiment, code, such as graph code, loads weight or other parameter information into processor ALUs based on an architecture of a neural network to which such code corresponds. In at least one embodiment, code and/or data storage 1001 stores weight parameters and/or input/output data of each layer of a neural network trained or used in conjunction with one or more embodiments during forward propagation of input/output data and/or weight parameters during training and/or inferencing using aspects of one or more embodiments. In at least one embodiment, any portion of code and/or data storage 1001 may be included with other on-chip or off-chip data storage, including a processor's L1, L2, or L3 cache or system memory.

In at least one embodiment, any portion of code and/or data storage 1001 may be internal or external to one or more processors or other hardware logic devices or circuits. In at least one embodiment, code and/or code and/or data storage 1001 may be cache memory, dynamic randomly addressable memory ("DRAM"), static randomly addressable memory ("SRAM"), non-volatile memory (e.g., flash memory), or other storage. In at least one embodiment, a choice of whether code and/or code and/or data storage 1001 is internal or external to a processor, for example, or comprising DRAM, SRAM, flash or some other storage type may depend on available storage on-chip versus off-chip, latency requirements of training and/or inferencing functions being performed, batch size of data used in inferencing and/or training of a neural network, or some combination of these factors.

In at least one embodiment, inference and/or training logic 1015 may include, without limitation, a code and/or data storage 1005 to store backward and/or output weight and/or input/output data corresponding to neurons or layers of a neural network trained and/or used for inferencing in aspects of one or more embodiments. In at least one embodiment, code and/or data storage 1005 stores weight parameters and/or input/output data of each layer of a neural network trained or used in conjunction with one or more embodiments during backward propagation of input/output data and/or weight parameters during training and/or inferencing using aspects of one or more embodiments. In at least one embodiment, training logic 1015 may include, or be coupled to code and/or data storage 1005 to store graph code or other software to control timing and/or order, in which weight and/or other parameter information is to be loaded to configure, logic, including integer and/or floating point units (collectively, arithmetic logic units (ALUs)).

In at least one embodiment, code, such as graph code, causes the loading of weight or other parameter information into processor ALUs based on an architecture of a neural network to which such code corresponds. In at least one embodiment, any portion of code and/or data storage 1005 may be included with other on-chip or off-chip data storage, including a processor's L1, L2, or L3 cache or system memory. In at least one embodiment, any portion of code and/or data storage 1005 may be internal or external to one or more processors or other hardware logic devices or circuits. In at least one embodiment, code and/or data storage 1005 may be cache memory, DRAM, SRAM, non-volatile memory (e.g., flash memory), or other storage. In at least one embodiment, a choice of whether code and/or data storage 1005 is internal or external to a processor, for example, or comprising DRAM, SRAM, flash memory or some other storage type may depend on available storage on-chip versus off-chip, latency requirements of training and/or inferencing functions being performed, batch size of data used in inferencing and/or training of a neural network, or some combination of these factors.

In at least one embodiment, code and/or data storage 1001 and code and/or data storage 1005 may be separate storage structures. In at least one embodiment, code and/or data storage 1001 and code and/or data storage 1005 may be a combined storage structure. In at least one embodiment, code and/or data storage 1001 and code and/or data storage 1005 may be partially combined and partially separate. In at least one embodiment, any portion of code and/or data storage 1001 and code and/or data storage 1005 may be included with other on-chip or off-chip data storage, including a processor's L1, L2, or L3 cache or system memory.

In at least one embodiment, inference and/or training logic 1015 may include, without limitation, one or more arithmetic logic unit(s) ("ALU(s)") 1010, including integer and/or floating point units, to perform logical and/or mathematical operations based, at least in part on, or indicated by, training and/or inference code (e.g., graph code), a result of which may produce activations (e.g., output values from layers or neurons within a neural network) stored in an activation storage 1020 that are functions of input/output and/or weight parameter data stored in code and/or data storage 1001 and/or code and/or data storage 1005. In at least one embodiment, activations stored in activation storage 1020 are generated according to linear algebraic and or matrix-based mathematics performed by ALU(s) 1010 in response to performing instructions or other code, wherein weight values stored in code and/or data storage 1005 and/or data storage 1001 are used as operands along with other values, such as bias values, gradient information, momentum values, or other parameters or hyperparameters, any or all of which may be stored in code and/or data storage 1005 or code and/or data storage 1001 or another storage on or off-chip.

In at least one embodiment, ALU(s) 1010 are included within one or more processors or other hardware logic devices or circuits, whereas in another embodiment, ALU(s) 1010 may be external to a processor or other hardware logic device or circuit that uses them (e.g., a co-processor). In at least one embodiment, ALUs 1010 may be included within a processor's execution units or otherwise within a bank of ALUs accessible by a processor's execution units either within same processor or distributed between different processors of different types (e.g., central processing units, graphics processing units, fixed function units, etc.). In at least one embodiment, code and/or data storage 1001, code and/or data storage 1005, and activation storage 1020 may share a processor or other hardware logic device or circuit, whereas in another embodiment, they may be in different processors or other hardware logic devices or circuits, or some combination of same and different processors or other hardware logic devices or circuits. In at least one embodiment, any portion of activation storage 1020 may be included with other on-chip or off-chip data storage, including a processor's L1, L2, or L3 cache or system memory. Furthermore, inferencing and/or training code may be stored with other code accessible to a processor or other hardware logic or circuit and fetched and/or processed using a processor's fetch, decode, scheduling, execution, retirement and/or other logical circuits.

In at least one embodiment, activation storage 1020 may be cache memory, DRAM, SRAM, non-volatile memory (e.g., flash memory), or other storage. In at least one embodiment, activation storage 1020 may be completely or partially within or external to one or more processors or other logical circuits. In at least one embodiment, a choice of whether activation storage 1020 is internal or external to a processor, for example, or comprising DRAM, SRAM, flash memory or some other storage type may depend on available storage on-chip versus off-chip, latency requirements of training and/or inferencing functions being performed, batch size of data used in inferencing and/or training of a neural network, or some combination of these factors.

In at least one embodiment, inference and/or training logic 1015 illustrated in FIG. 10A may be used in conjunction with an application-specific integrated circuit ("ASIC"), such as a TensorFlow® Processing Unit from Google, an inference processing unit (IPU) from Graphcore™, or a Nervana® (e.g., "Lake Crest") processor from Intel Corp. In at least one embodiment, inference and/or training logic 1015 illustrated in FIG. 10A may be used in conjunction with central processing unit ("CPU") hardware, graphics processing unit ("GPU") hardware or other hardware, such as field programmable gate arrays ("FPGAs").

Figure 10B:
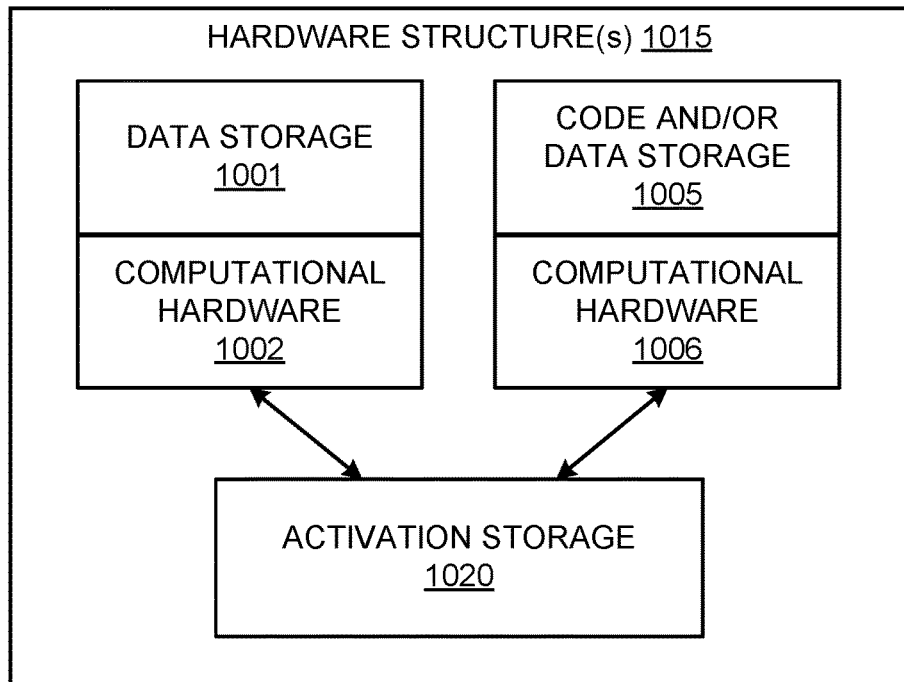
FIG. 10B illustrates inference and/or training logic, according to at least one embodiment.

FIG. 10B illustrates inference and/or training logic 1015, according to at least one embodiment. In at least one embodiment, inference and/or training logic 1015 may include, without limitation, hardware logic in which computational resources are dedicated or otherwise exclusively used in conjunction with weight values or other information corresponding to one or more layers of neurons within a neural network. In at least one embodiment, inference and/or training logic 1015 illustrated in FIG. 10B may be used in conjunction with an application-specific integrated circuit (ASIC), such as TensorFlow® Processing Unit from Google, an inference processing unit (IPU) from Graphcore™, or a Nervana® (e.g., "Lake Crest") processor from Intel Corp. In at least one embodiment, inference and/or training logic 1015 illustrated in FIG. 10B may be used in conjunction with central processing unit (CPU) hardware, graphics processing unit (GPU) hardware or other hardware, such as field programmable gate arrays (FPGAs). In at least one embodiment, inference and/or training logic 1015 includes, without limitation, code and/or data storage 1001 and code and/or data storage 1005, which may be used to store code (e.g., graph code), weight values and/or other information, including bias values, gradient information, momentum values, and/or other parameter or hyperparameter information. In at least one embodiment illustrated in FIG. 10B, each of code and/or data storage 1001 and code and/or data storage 1005 is associated with a dedicated computational resource, such as computational hardware 1002 and computational hardware 1006, respectively. In at least one embodiment, each of computational hardware 1002 and computational hardware 1006 comprises one or more ALUs that perform mathematical functions, such as linear algebraic functions, only on information stored in code and/or data storage 1001 and code and/or data storage 1005, respectively, result of which is stored in activation storage 1020.

In at least one embodiment, each of code and/or data storage 1001 and 1005 and corresponding computational hardware 1002 and 1006, respectively, correspond to different layers of a neural network, such that resulting activation from one storage/computational pair 1001/1002 of code and/or data storage 1001 and computational hardware 1002 is provided as an input to a next storage/computational pair 1005/1006 of code and/or data storage 1005 and computational hardware 1006, in order to mirror a conceptual organization of a neural network. In at least one embodiment, each of storage/computational pairs 1001/1002 and 1005/1006 may correspond to more than one neural network layer. In at least one embodiment, additional storage/computation pairs (not shown) subsequent to or in parallel with storage/computation pairs 1001/1002 and 1005/1006 may be included in inference and/or training logic 1015.

Neural Network Training and Deployment

Figure 11:
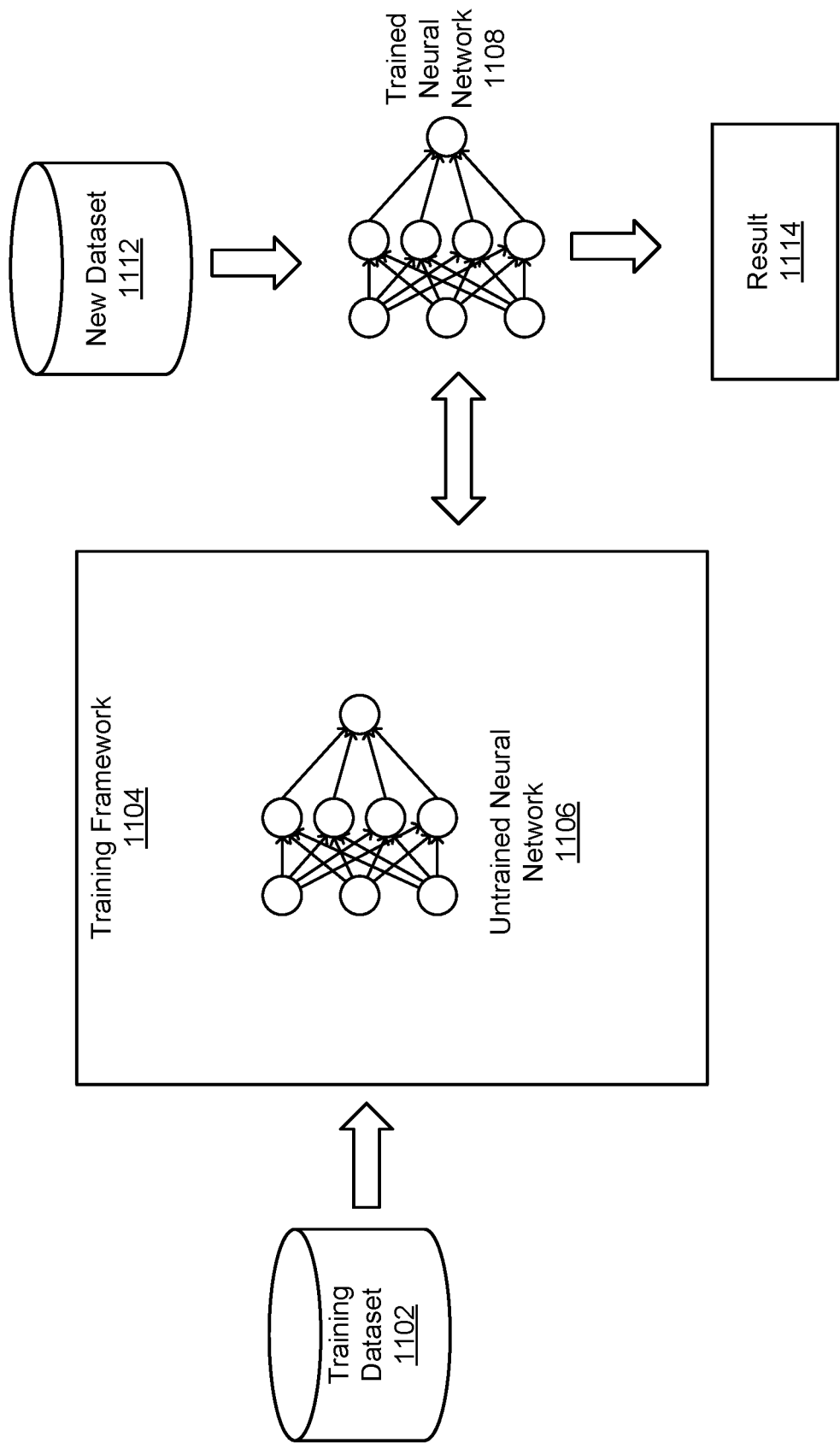
FIG. 11 illustrates training and deployment of a neural network, according to at least one embodiment.

FIG. 11 illustrates training and deployment of a deep neural network, according to at least one embodiment. In at least one embodiment, untrained neural network 1106 is trained using a training dataset 1102. In at least one embodiment, training framework 1104 is a PyTorch framework, whereas in other embodiments, training framework 1104 is a TensorFlow, Boost, Caffe, Microsoft Cognitive Toolkit/CNTK, MXNet, Chainer, Keras, Deeplearning4j, or other training framework. In at least one embodiment, training framework 1104 trains an untrained neural network 1106 and enables it to be trained using processing resources described herein to generate a trained neural network 1108. In at least one embodiment, weights may be chosen randomly or by pre-training using a deep belief network. In at least one embodiment, training may be performed in either a supervised, partially supervised, or unsupervised manner.

In at least one embodiment, untrained neural network 1106 is trained using supervised learning, wherein training dataset 1102 includes an input paired with a desired output for an input, or where training dataset 1102 includes input having a known output and an output of neural network 1106 is manually graded. In at least one embodiment, untrained neural network 1106 is trained in a supervised manner and processes inputs from training dataset 1102 and compares resulting outputs against a set of expected or desired outputs. In at least one embodiment, errors are then propagated back through untrained neural network 1106. In at least one embodiment, training framework 1104 adjusts weights that control untrained neural network 1106. In at least one embodiment, training framework 1104 includes tools to monitor how well untrained neural network 1106 is converging towards a model, such as trained neural network 1108, suitable to generating correct answers, such as in result 1114, based on input data such as a new dataset 1112. In at least one embodiment, training framework 1104 trains untrained neural network 1106 repeatedly while adjust weights to refine an output of untrained neural network 1106 using a loss function and adjustment algorithm, such as stochastic gradient descent. In at least one embodiment, training framework 1104 trains untrained neural network 1106 until untrained neural network 1106 achieves a desired accuracy. In at least one embodiment, trained neural network 1108 can then be deployed to implement any number of machine learning operations.

In at least one embodiment, untrained neural network 1106 is trained using unsupervised learning, wherein untrained neural network 1106 attempts to train itself using unlabeled data. In at least one embodiment, unsupervised learning training dataset 1102 will include input data without any associated output data or "ground truth" data. In at least one embodiment, untrained neural network 1106 can learn groupings within training dataset 1102 and can determine how individual inputs are related to untrained dataset 1102. In at least one embodiment, unsupervised training can be used to generate a self-organizing map in trained neural network 1108 capable of performing operations useful in reducing dimensionality of new dataset 1112. In at least one embodiment, unsupervised training can also be used to perform anomaly detection, which allows identification of data points in new dataset 1112 that deviate from normal patterns of new dataset 1112.

In at least one embodiment, semi-supervised learning may be used, which is a technique in which in training dataset 1102 includes a mix of labeled and unlabeled data. In at least one embodiment, training framework 1104 may be used to perform incremental learning, such as through transferred learning techniques. In at least one embodiment, incremental learning enables trained neural network 1108 to adapt to new dataset 1112 without forgetting knowledge instilled within trained neural network 1108 during initial training.

Data Center

Figure 12:
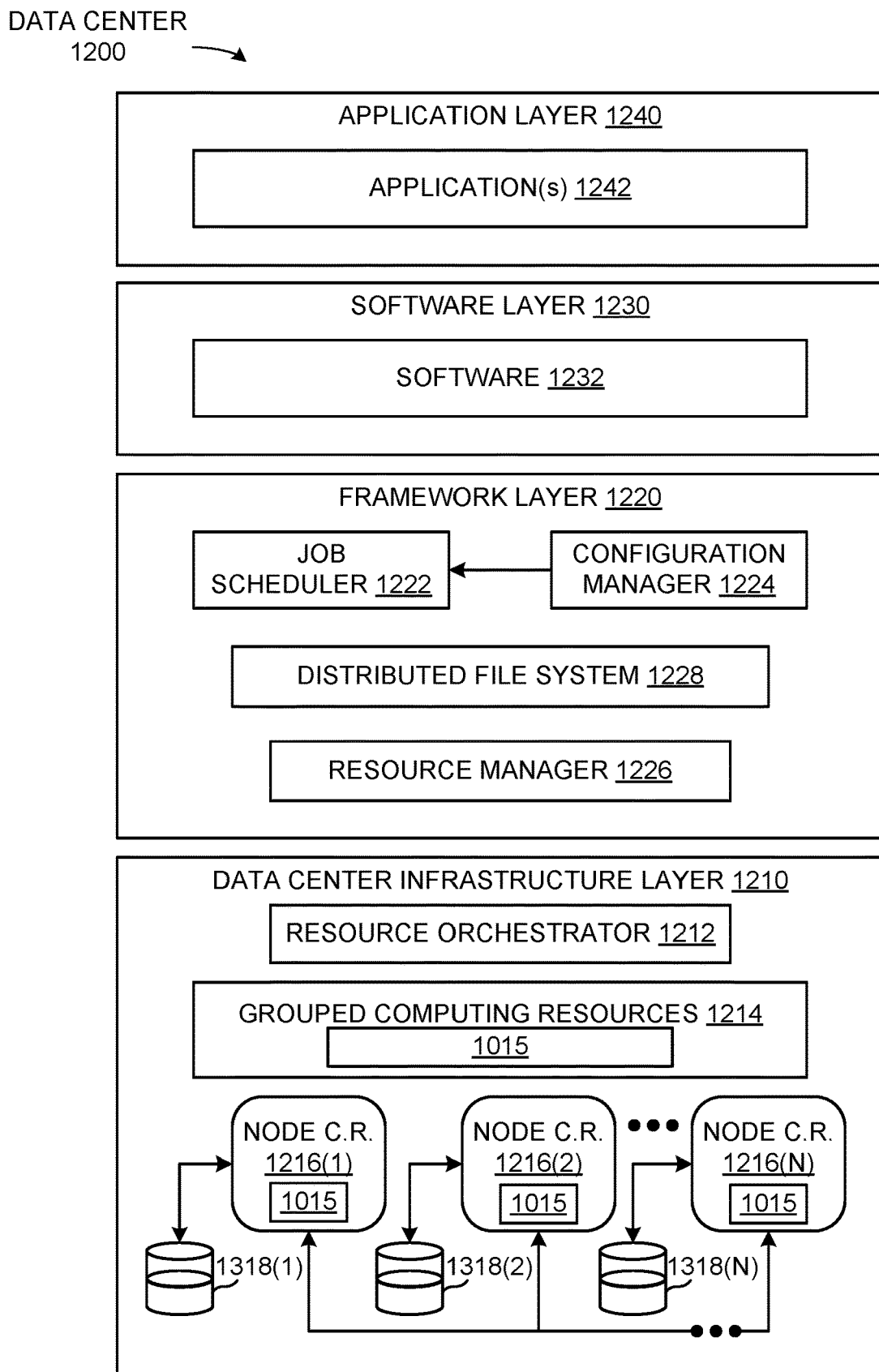
FIG. 12 illustrates an example data center system, according to at least one embodiment.

FIG. 12 illustrates an example data center 1200, in which at least one embodiment may be used. In at least one embodiment, data center 1200 includes a data center infrastructure layer 1210, a framework layer 1220, a software layer 1230 and an application layer 1240.

In at least one embodiment, as shown in FIG. 12, data center infrastructure layer 1210 may include a resource orchestrator 1212, grouped computing resources 1214, and node computing resources ("node C.R.s") 1216(1)-1216(N), where "N" represents a positive integer (which may be a different integer "N" than used in other figures). In at least one embodiment, node C.R.s 1216(1)-1216(N) may include, but are not limited to, any number of central processing units ("CPUs") or other processors (including accelerators, field programmable gate arrays (FPGAs), graphics processors, etc.), memory storage devices 1218(1)-1218(N) (e.g., dynamic read-only memory, solid state storage or disk drives), network input/output ("NW I/O") devices, network switches, virtual machines ("VMs"), power modules, and cooling modules, etc. In at least one embodiment, one or more node C.R.s from among node C.R.s 1216(1)-1216(N) may be a server having one or more of above-mentioned computing resources.

In at least one embodiment, grouped computing resources 1214 may include separate groupings of node C.R.s housed within one or more racks (not shown), or many racks housed in data centers at various geographical locations (also not shown). In at least one embodiment, separate groupings of node C.R.s within grouped computing resources 1214 may include grouped compute, network, memory or storage resources that may be configured or allocated to support one or more workloads. In at least one embodiment, several node C.R.s including CPUs or processors may grouped within one or more racks to provide compute resources to support one or more workloads. In at least one embodiment, one or more racks may also include any number of power modules, cooling modules, and network switches, in any combination.

In at least one embodiment, resource orchestrator 1212 may configure or otherwise control one or more node C.R.s 1216(1)-1216(N) and/or grouped computing resources 1214. In at least one embodiment, resource orchestrator 1212 may include a software design infrastructure ("SDI") management entity for data center 1200. In at least one embodiment, resource orchestrator 1012 may include hardware, software or some combination thereof.

In at least one embodiment, as shown in FIG. 12, framework layer 1220 includes a job scheduler 1222, a configuration manager 1224, a resource manager 1226 and a distributed file system 1228. In at least one embodiment, framework layer 1220 may include a framework to support software 1232 of software layer 1230 and/or one or more application(s) 1242 of application layer 1240. In at least one embodiment, software 1232 or application(s) 1242 may respectively include web-based service software or applications, such as those provided by Amazon Web Services, Google Cloud and Microsoft Azure. In at least one embodiment, framework layer 1220 may be, but is not limited to, a type of free and open-source software web application framework such as Apache Spark™ (hereinafter "Spark") that may utilize distributed file system 1228 for large-scale data processing (e.g., "big data"). In at least one embodiment, job scheduler 1222 may include a Spark driver to facilitate scheduling of workloads supported by various layers of data center 1200. In at least one embodiment, configuration manager 1224 may be capable of configuring different layers such as software layer 1230 and framework layer 1220 including Spark and distributed file system 1228 for supporting large-scale data processing. In at least one embodiment, resource manager 1226 may be capable of managing clustered or grouped computing resources mapped to or allocated for support of distributed file system 1228 and job scheduler 1222. In at least one embodiment, clustered or grouped computing resources may include grouped computing resources 1214 at data center infrastructure layer 1210. In at least one embodiment, resource manager 1226 may coordinate with resource orchestrator 1212 to manage these mapped or allocated computing resources.

In at least one embodiment, software 1232 included in software layer 1230 may include software used by at least portions of node C.R.s 1216(1)-1216(N), grouped computing resources 1214, and/or distributed file system 1228 of framework layer 1220. In at least one embodiment, one or more types of software may include, but are not limited to, Internet web page search software, e-mail virus scan software, database software, and streaming video content software.

In at least one embodiment, application(s) 1242 included in application layer 1240 may include one or more types of applications used by at least portions of node C.R.s 1216(1)-1216(N), grouped computing resources 1214, and/or distributed file system 1228 of framework layer 1220. In at least one embodiment, one or more types of applications may include, but are not limited to, any number of a genomics application, a cognitive compute, application and a machine learning application, including training or inferencing software, machine learning framework software (e.g., PyTorch, TensorFlow, Caffe, etc.) or other machine learning applications used in conjunction with one or more embodiments.

In at least one embodiment, any of configuration manager 1224, resource manager 1226, and resource orchestrator 1212 may implement any number and type of self-modifying actions based on any amount and type of data acquired in any technically feasible fashion. In at least one embodiment, self-modifying actions may relieve a data center operator of data center 1200 from making possibly bad configuration decisions and possibly avoiding underutilized and/or poor performing portions of a data center.

In at least one embodiment, data center 1200 may include tools, services, software or other resources to train one or more machine learning models or predict or infer information using one or more machine learning models according to one or more embodiments described herein. For example, in at least one embodiment, a machine learning model may be trained by calculating weight parameters according to a neural network architecture using software and computing resources described above with respect to data center 1200. In at least one embodiment, trained machine learning models corresponding to one or more neural networks may be used to infer or predict information using resources described above with respect to data center 1200 by using weight parameters calculated through one or more training techniques described herein.

In at least one embodiment, data center may use CPUs, application-specific integrated circuits (ASICs), GPUs, FPGAs, or other hardware to perform training and/or inferencing using above-described resources. Moreover, one or more software and/or hardware resources described above may be configured as a service to allow users to train or performing inferencing of information, such as image recognition, speech recognition, or other artificial intelligence services.

Inference and/or training logic 1015 are used to perform inferencing and/or training operations associated with one or more embodiments. Details regarding inference and/or training logic 1015 are provided herein in conjunction with FIGS. 10A and/or 10B. In at least one embodiment, inference and/or training logic 1015 may be used in system FIG. 12 for inferencing or predicting operations based, at least in part, on weight parameters calculated using neural network training operations, neural network functions and/or architectures, or neural network use cases described herein.

In various embodiments, the data center 12 provides computing resources to execute the training methods described above. For example, data center 12 provides the inference and/or training logic 1015 to generate the pre-labeling tool as described above.

Autonomous Vehicle

Figure 13A:
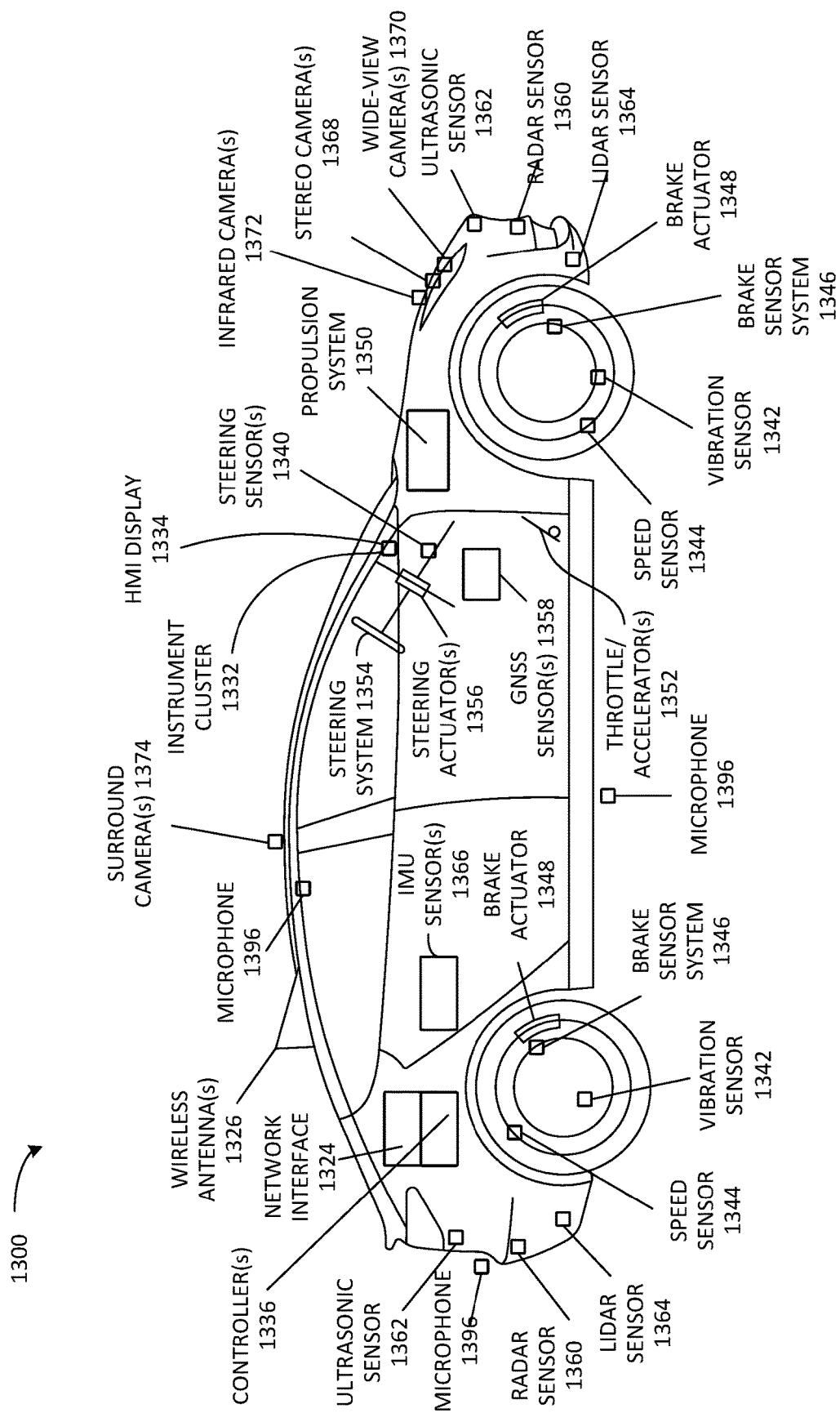
FIG. 13A illustrates an example of an autonomous vehicle, according to at least one embodiment.

FIG. 13A illustrates an example of an autonomous vehicle 1300, according to at least one embodiment. In at least one embodiment, autonomous vehicle 1300 (alternatively referred to herein as "vehicle 1300") may be, without limitation, a passenger vehicle, such as a car, a truck, a bus, and/or another type of vehicle that accommodates one or more passengers. In at least one embodiment, vehicle 1300 may be a semi-tractor-trailer truck used for hauling cargo. In at least one embodiment, vehicle 1300 may be an airplane, robotic vehicle, or other kind of vehicle.

Autonomous vehicles may be described in terms of automation levels, defined by National Highway Traffic Safety Administration ("NHTSA"), a division of US Department of Transportation, and Society of Automotive Engineers ("SAE") "Taxonomy and Definitions for Terms Related to Driving Automation Systems for On-Road Motor Vehicles" (e.g., Standard No. J3016-201806, published on Jun. 15, 2018, Standard No. J3016-201609, published on Sep. 30, 2016, and previous and future versions of this standard). In at least one embodiment, vehicle 1300 may be capable of functionality in accordance with one or more of Level 1 through Level 5 of autonomous driving levels. For example, in at least one embodiment, vehicle 1300 may be capable of conditional automation (Level 3), high automation (Level 4), and/or full automation (Level 5), depending on embodiment.

In at least one embodiment, vehicle 1300 may include, without limitation, components such as a chassis, a vehicle body, wheels (e.g., 2, 4, 6, 8, 18, etc.), tires, axles, and other components of a vehicle. In at least one embodiment, vehicle 1300 may include, without limitation, a propulsion system 1350, such as an internal combustion engine, hybrid electric power plant, an all-electric engine, and/or another propulsion system type. In at least one embodiment, propulsion system 1350 may be connected to a drive train of vehicle 1300, which may include, without limitation, a transmission, to enable propulsion of vehicle 1300. In at least one embodiment, propulsion system 1350 may be controlled in response to receiving signals from a throttle/accelerator(s) 1352.

In at least one embodiment, a steering system 1354, which may include, without limitation, a steering wheel, is used to steer vehicle 1300 (e.g., along a desired path or route) when propulsion system 1350 is operating (e.g., when vehicle 1300 is in motion). In at least one embodiment, steering system 1354 may receive signals from steering actuator(s) 1356. In at least one embodiment, a steering wheel may be optional for full automation (Level 5) functionality. In at least one embodiment, a brake sensor system 1346 may be used to operate vehicle brakes in response to receiving signals from brake actuator(s) 1348 and/or brake sensors.

In at least one embodiment, controller(s) 1336, which may include, without limitation, one or more system on chips ("SoCs") (not shown in FIG. 13A) and/or graphics processing unit(s) ("GPU(s)"), provide signals (e.g., representative of commands) to one or more components and/or systems of vehicle 1300. For instance, in at least one embodiment, controller(s) 1336 may send signals to operate vehicle brakes via brake actuator(s) 1348, to operate steering system 1354 via steering actuator(s) 1356, to operate propulsion system 1350 via throttle/accelerator(s) 1352. In at least one embodiment, controller(s) 1336 may include one or more onboard (e.g., integrated) computing devices that process sensor signals, and output operation commands (e.g., signals representing commands) to enable autonomous driving and/or to assist a human driver in driving vehicle 1300. In at least one embodiment, controller(s) 1336 may include a first controller for autonomous driving functions, a second controller for functional safety functions, a third controller for artificial intelligence functionality (e.g., computer vision), a fourth controller for infotainment functionality, a fifth controller for redundancy in emergency conditions, and/or other controllers. In at least one embodiment, a single controller may handle two or more of above functionalities, two or more controllers may handle a single functionality, and/or any combination thereof.

In at least one embodiment, controller(s) 1336 provide signals for controlling one or more components and/or systems of vehicle 1300 in response to sensor data received from one or more sensors (e.g., sensor inputs). In at least one embodiment, sensor data may be received from, for example and without limitation, global navigation satellite systems ("GNSS") sensor(s) 1358 (e.g., Global Positioning System sensor(s)), RADAR sensor(s) 1360, ultrasonic sensor(s) 1362, LIDAR sensor(s) 1364, inertial measurement unit ("IMU") sensor(s) 1366 (e.g., accelerometer(s), gyroscope(s), a magnetic compass or magnetic compasses, magnetometer(s), etc.), microphone(s) 1396, stereo camera(s) 1368, wide-view camera(s) 1370 (e.g., fisheye cameras), infrared camera(s) 1372, surround camera(s) 1374 (e.g., 360 degree cameras), long-range cameras (not shown in FIG. 13A), mid-range camera(s) (not shown in FIG. 13A), speed sensor(s) 1344 (e.g., for measuring speed of vehicle 1300), vibration sensor(s) 1342, steering sensor(s) 1340, brake sensor(s) (e.g., as part of brake sensor system 1346), and/or other sensor types.

In at least one embodiment, one or more of controller(s) 1336 may receive inputs (e.g., represented by input data) from an instrument cluster 1332 of vehicle 1300 and provide outputs (e.g., represented by output data, display data, etc.) via a human-machine interface ("HMI") display 1334, an audible annunciator, a loudspeaker, and/or via other components of vehicle 1300. In at least one embodiment, outputs may include information such as vehicle velocity, speed, time, map data (e.g., a High Definition map (not shown in FIG. 13A)), location data (e.g., vehicle's 1300 location, such as on a map), direction, location of other vehicles (e.g., an occupancy grid), information about objects and status of objects as perceived by controller(s) 1336, etc. For example, in at least one embodiment, HMI display 1334 may display information about presence of one or more objects (e.g., a street sign, caution sign, traffic light changing, etc.), and/or information about driving maneuvers vehicle has made, is making, or will make (e.g., changing lanes now, taking exit 34B in two miles, etc.).

In at least one embodiment, vehicle 1300 further includes a network interface 1324 which may use wireless antenna(s) 1326 and/or modem(s) to communicate over one or more networks. For example, in at least one embodiment, network interface 1324 may be capable of communication over Long-Term Evolution ("LTE"), Wideband Code Division Multiple Access ("WCDMA"), Universal Mobile Telecommunications System ("UMTS"), Global System for Mobile communication ("GSM"), IMT-CDMA Multi-Carrier ("CDMA2000") networks, etc. In at least one embodiment, wireless antenna(s) 1326 may also enable communication between objects in environment (e.g., vehicles, mobile devices, etc.), using local area network(s), such as Bluetooth, Bluetooth Low Energy ("LE"), Z-Wave, ZigBee, etc., and/or low power wide-area network(s) ("LPWANs"), such as LoRaWAN, SigFox, etc. protocols.

Inference and/or training logic 1015 are used to perform inferencing and/or training operations associated with one or more embodiments. Details regarding inference and/or training logic 1015 are provided herein in conjunction with FIGS. 10A and/or 10B. In at least one embodiment, inference and/or training logic 1015 may be used in system FIG. 13A for inferencing or predicting operations based, at least in part, on weight parameters calculated using neural network training operations, neural network functions and/or architectures, or neural network use cases described herein.

In various embodiments, the autonomous vehicle 1300 utilizes the inference and/or training logic 1015 to execute a neural network or other model, trained using the training method described above, to perform pedestrian and/or object detection using a environmentally robust neural network or other model.

Figure 13B:
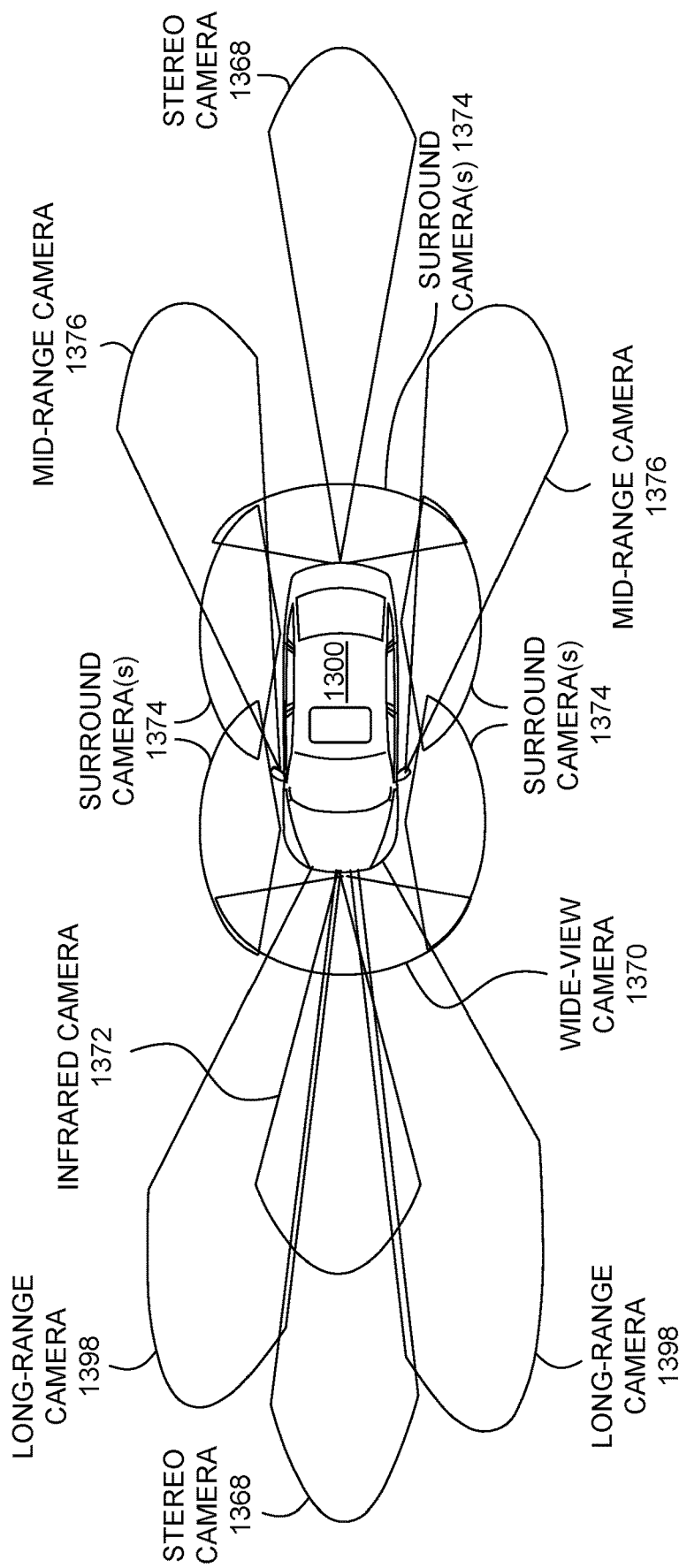
FIG. 13B illustrates an example of camera locations and fields of view for the autonomous vehicle of FIG. 13A, according to at least one embodiment.

FIG. 13B illustrates an example of camera locations and fields of view for autonomous vehicle 1300 of FIG. 13A, according to at least one embodiment. In at least one embodiment, cameras and respective fields of view are one example embodiment and are not intended to be limiting. For instance, in at least one embodiment, additional and/or alternative cameras may be included and/or cameras may be located at different locations on vehicle 1300.

In at least one embodiment, camera types for cameras may include, but are not limited to, digital cameras that may be adapted for use with components and/or systems of vehicle 1300. In at least one embodiment, camera(s) may operate at automotive safety integrity level ("ASIL") B and/or at another ASIL. In at least one embodiment, camera types may be capable of any image capture rate, such as 60 frames per second (fps), 1220 fps, 240 fps, etc., depending on embodiment. In at least one embodiment, cameras may be capable of using rolling shutters, global shutters, another type of shutter, or a combination thereof. In at least one embodiment, color filter array may include a red clear clear clear ("RCCC") color filter array, a red clear clear blue ("RCCB") color filter array, a red blue green clear ("RBGC") color filter array, a Foveon X3 color filter array, a Bayer sensors ("RGGB") color filter array, a monochrome sensor color filter array, and/or another type of color filter array. In at least one embodiment, clear pixel cameras, such as cameras with an RCCC, an RCCB, and/or an RBGC color filter array, may be used in an effort to increase light sensitivity.

In at least one embodiment, one or more of camera(s) may be used to perform advanced driver assistance systems ("ADAS") functions (e.g., as part of a redundant or fail-safe design). For example, in at least one embodiment, a Multi-Function Mono Camera may be installed to provide functions including lane departure warning, traffic sign assist and intelligent headlamp control. In at least one embodiment, one or more of camera(s) (e.g., all cameras) may record and provide image data (e.g., video) simultaneously.

In at least one embodiment, one or more camera may be mounted in a mounting assembly, such as a custom designed (three-dimensional ("3D") printed) assembly, in order to cut out stray light and reflections from within vehicle 1300 (e.g., reflections from dashboard reflected in windshield mirrors) which may interfere with camera image data capture abilities. With reference to wing-mirror mounting assemblies, in at least one embodiment, wing-mirror assemblies may be custom 3D printed so that a camera mounting plate matches a shape of a wing-mirror. In at least one embodiment, camera(s) may be integrated into wing-mirrors. In at least one embodiment, for side-view cameras, camera(s) may also be integrated within four pillars at each corner of a cabin.

In at least one embodiment, cameras with a field of view that include portions of an environment in front of vehicle 1300 (e.g., front-facing cameras) may be used for surround view, to help identify forward facing paths and obstacles, as well as aid in, with help of one or more of controller(s) 1336 and/or control SoCs, providing information critical to generating an occupancy grid and/or determining preferred vehicle paths. In at least one embodiment, front-facing cameras may be used to perform many similar ADAS functions as LIDAR, including, without limitation, emergency braking, pedestrian detection, and collision avoidance. In at least one embodiment, front-facing cameras may also be used for ADAS functions and systems including, without limitation, Lane Departure Warnings ("LDW"), Autonomous Cruise Control ("ACC"), and/or other functions such as traffic sign recognition.

In at least one embodiment, a variety of cameras may be used in a front-facing configuration, including, for example, a monocular camera platform that includes a CMOS ("complementary metal oxide semiconductor") color imager. In at least one embodiment, a wide-view camera 1370 may be used to perceive objects coming into view from a periphery (e.g., pedestrians, crossing traffic or bicycles). Although only one wide-view camera 1370 is illustrated in FIG. 13B, in other embodiments, there may be any number (including zero) wide-view cameras on vehicle 1300. In at least one embodiment, any number of long-range camera(s) 1398 (e.g., a long-view stereo camera pair) may be used for depth-based object detection, especially for objects for which a neural network has not yet been trained. In at least one embodiment, long-range camera(s) 1398 may also be used for object detection and classification, as well as basic object tracking.

In at least one embodiment, any number of stereo camera(s) 1368 may also be included in a front-facing configuration. In at least one embodiment, one or more of stereo camera(s) 1368 may include an integrated control unit comprising a scalable processing unit, which may provide a programmable logic ("FPGA") and a multi-core microprocessor with an integrated Controller Area Network ("CAN") or Ethernet interface on a single chip. In at least one embodiment, such a unit may be used to generate a 3D map of an environment of vehicle 1300, including a distance estimate for all points in an image. In at least one embodiment, one or more of stereo camera(s) 1368 may include, without limitation, compact stereo vision sensor(s) that may include, without limitation, two camera lenses (one each on left and right) and an image processing chip that may measure distance from vehicle 1300 to target object and use generated information (e.g., metadata) to activate autonomous emergency braking and lane departure warning functions. In at least one embodiment, other types of stereo camera(s) 1368 may be used in addition to, or alternatively from, those described herein.

In at least one embodiment, cameras with a field of view that include portions of environment to sides of vehicle 1300 (e.g., side-view cameras) may be used for surround view, providing information used to create and update an occupancy grid, as well as to generate side impact collision warnings. For example, in at least one embodiment, surround camera(s) 1374 (e.g., four surround cameras as illustrated in FIG. 13B) could be positioned on vehicle 1300. In at least one embodiment, surround camera(s) 1374 may include, without limitation, any number and combination of wide-view cameras, fisheye camera(s), 360 degree camera(s), and/or similar cameras. For instance, in at least one embodiment, four fisheye cameras may be positioned on a front, a rear, and sides of vehicle 1300. In at least one embodiment, vehicle 1300 may use three surround camera(s) 1374 (e.g., left, right, and rear), and may leverage one or more other camera(s) (e.g., a forward-facing camera) as a fourth surround-view camera.

In at least one embodiment, cameras with a field of view that include portions of an environment behind vehicle 1300 (e.g., rear-view cameras) may be used for parking assistance, surround view, rear collision warnings, and creating and updating an occupancy grid. In at least one embodiment, a wide variety of cameras may be used including, but not limited to, cameras that are also suitable as a front-facing camera(s) (e.g., long-range cameras 1398 and/or mid-range camera(s) 1376, stereo camera(s) 1368), infrared camera(s) 1372, etc., as described herein.

Inference and/or training logic 1015 are used to perform inferencing and/or training operations associated with one or more embodiments. Details regarding inference and/or training logic 1015 are provided herein in conjunction with FIGS. 10A and/or 10B. In at least one embodiment, inference and/or training logic 1015 may be used in system FIG. 13B for inferencing or predicting operations based, at least in part, on weight parameters calculated using neural network training operations, neural network functions and/or architectures, or neural network use cases described herein.

Figure 13C:
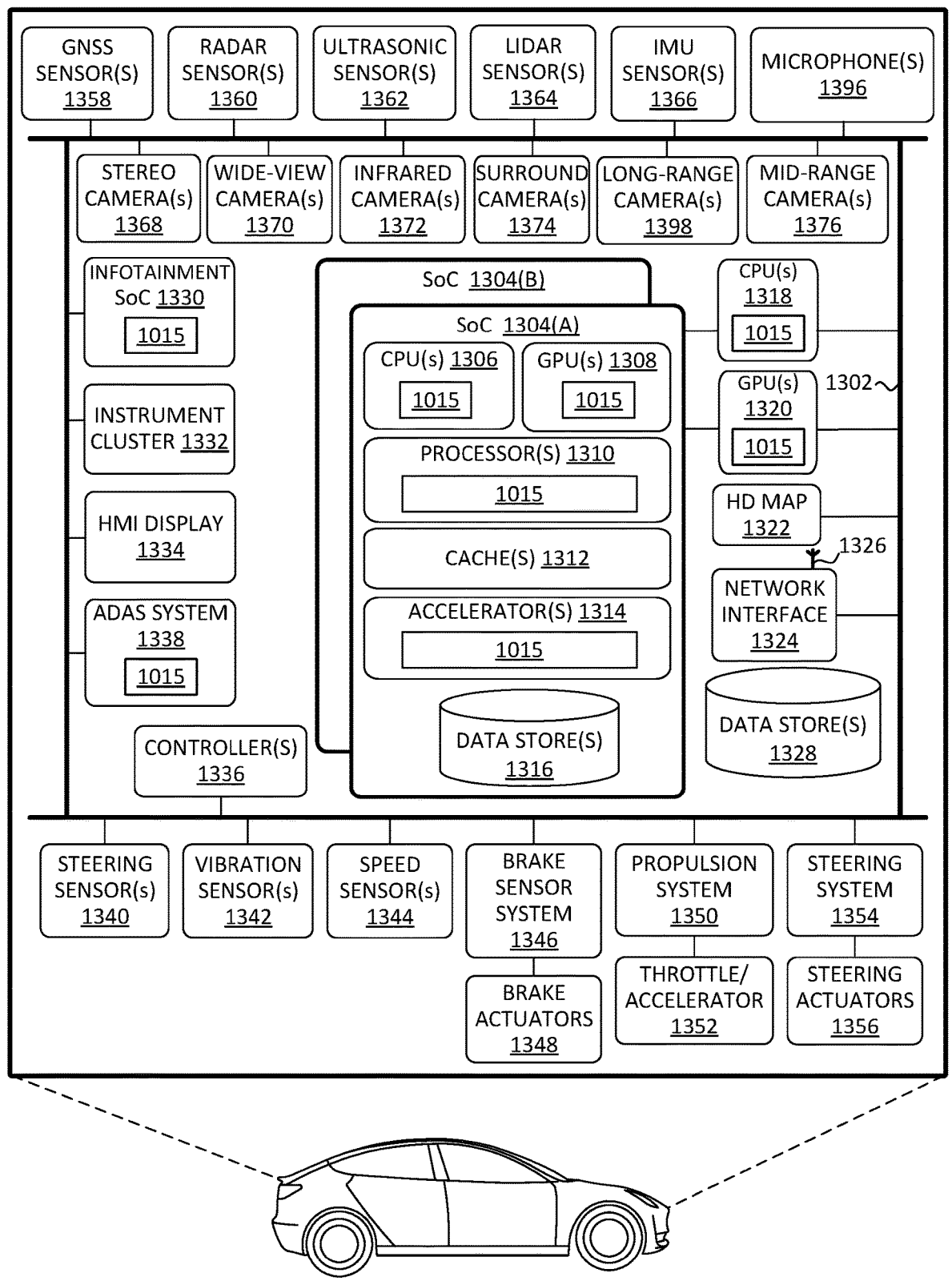
FIG. 13C is a block diagram illustrating an example system architecture for the autonomous vehicle of FIG. 13A, according to at least one embodiment.

FIG. 13C is a block diagram illustrating an example system architecture for autonomous vehicle 1300 of FIG. 13A, according to at least one embodiment. In at least one embodiment, each of components, features, and systems of vehicle 1300 in FIG. 13C is illustrated as being connected via a bus 1302. In at least one embodiment, bus 1302 may include, without limitation, a CAN data interface (alternatively referred to herein as a "CAN bus"). In at least one embodiment, a CAN may be a network inside vehicle 1300 used to aid in control of various features and functionality of vehicle 1300, such as actuation of brakes, acceleration, braking, steering, windshield wipers, etc. In at least one embodiment, bus 1302 may be configured to have dozens or even hundreds of nodes, each with its own unique identifier (e.g., a CAN ID). In at least one embodiment, bus 1302 may be read to find steering wheel angle, ground speed, engine revolutions per minute ("RPMs"), button positions, and/or other vehicle status indicators. In at least one embodiment, bus 1302 may be a CAN bus that is ASIL B compliant.

In at least one embodiment, in addition to, or alternatively from CAN, FlexRay and/or Ethernet protocols may be used. In at least one embodiment, there may be any number of busses forming bus 1302, which may include, without limitation, zero or more CAN busses, zero or more FlexRay busses, zero or more Ethernet busses, and/or zero or more other types of busses using different protocols. In at least one embodiment, two or more busses may be used to perform different functions, and/or may be used for redundancy. For example, a first bus may be used for collision avoidance functionality and a second bus may be used for actuation control. In at least one embodiment, each bus of bus 1302 may communicate with any of components of vehicle 1300, and two or more busses of bus 1302 may communicate with corresponding components. In at least one embodiment, each of any number of system(s) on chip(s) ("SoC(s)") 1304 (such as SoC 1304(A) and SoC 1304(B)), each of controller(s) 1336, and/or each computer within vehicle may have access to same input data (e.g., inputs from sensors of vehicle 1300), and may be connected to a common bus, such CAN bus.

In at least one embodiment, vehicle 1300 may include one or more controller(s) 1336, such as those described herein with respect to FIG. 13A. In at least one embodiment, controller(s) 1336 may be used for a variety of functions. In at least one embodiment, controller(s) 1336 may be coupled to any of various other components and systems of vehicle 1300, and may be used for control of vehicle 1300, artificial intelligence of vehicle 1300, infotainment for vehicle 1300, and/or other functions.

In at least one embodiment, vehicle 1300 may include any number of SoCs 1304. In at least one embodiment, each of SoCs 1304 may include, without limitation, central processing units ("CPU(s)") 1306, graphics processing units ("GPU(s)") 1308, processor(s) 1310, cache(s) 1312, accelerator(s) 1314, data store(s) 1316, and/or other components and features not illustrated. In at least one embodiment, SoC(s) 1304 may be used to control vehicle 1300 in a variety of platforms and systems. For example, in at least one embodiment, SoC(s) 1304 may be combined in a system (e.g., system of vehicle 1300) with a High Definition ("HD") map 1322 which may obtain map refreshes and/or updates via network interface 1324 from one or more servers (not shown in FIG. 13C).

In at least one embodiment, CPU(s) 1306 may include a CPU cluster or CPU complex (alternatively referred to herein as a "CCPLEX"). In at least one embodiment, CPU(s) 1306 may include multiple cores and/or level two ("L2") caches. For instance, in at least one embodiment, CPU(s) 1306 may include eight cores in a coherent multi-processor configuration. In at least one embodiment, CPU(s) 1306 may include four dual-core clusters where each cluster has a dedicated L2 cache (e.g., a 2 megabyte (MB) L2 cache). In at least one embodiment, CPU(s) 1306 (e.g., CCPLEX) may be configured to support simultaneous cluster operations enabling any combination of clusters of CPU(s) 1306 to be active at any given time.

In at least one embodiment, one or more of CPU(s) 1306 may implement power management capabilities that include, without limitation, one or more of following features: individual hardware blocks may be clock-gated automatically when idle to save dynamic power; each core clock may be gated when such core is not actively executing instructions due to execution of Wait for Interrupt ("WFI")/ Wait for Event ("WFE") instructions; each core may be independently power-gated; each core cluster may be independently clock-gated when all cores are clock-gated or power-gated; and/or each core cluster may be independently power-gated when all cores are power-gated. In at least one embodiment, CPU(s) 1306 may further implement an enhanced algorithm for managing power states, where allowed power states and expected wakeup times are specified, and hardware/microcode determines which best power state to enter for core, cluster, and CCPLEX. In at least one embodiment, processing cores may support simplified power state entry sequences in software with work offloaded to microcode.

In at least one embodiment, GPU(s) 1308 may include an integrated GPU (alternatively referred to herein as an "iGPU"). In at least one embodiment, GPU(s) 1308 may be programmable and may be efficient for parallel workloads. In at least one embodiment, GPU(s) 1308 may use an enhanced tensor instruction set. In at least one embodiment, GPU(s) 1308 may include one or more streaming microprocessors, where each streaming microprocessor may include a level one ("L1") cache (e.g., an L1 cache with at least 96 KB storage capacity), and two or more streaming microprocessors may share an L2 cache (e.g., an L2 cache with a 512 KB storage capacity). In at least one embodiment, GPU(s) 1308 may include at least eight streaming microprocessors. In at least one embodiment, GPU(s) 1308 may use compute application programming interface(s) (API(s)). In at least one embodiment, GPU(s) 1308 may use one or more parallel computing platforms and/or programming models (e.g., NVIDIA's CUDA model).

In at least one embodiment, one or more of GPU(s) 1308 may be power-optimized for best performance in automotive and embedded use cases. For example, in at least one embodiment, GPU(s) 1308 could be fabricated on Fin field-effect transistor ("FinFET") circuitry. In at least one embodiment, each streaming microprocessor may incorporate a number of mixed-precision processing cores partitioned into multiple blocks. For example, and without limitation, 64 PF32 cores and 32 PF64 cores could be partitioned into four processing blocks. In at least one embodiment, each processing block could be allocated 16 FP32 cores, 8 FP64 cores, 16 INT32 cores, two mixed-precision NVIDIA Tensor cores for deep learning matrix arithmetic, a level zero ("L0") instruction cache, a warp scheduler, a dispatch unit, and/or a 64 KB register file. In at least one embodiment, streaming microprocessors may include independent parallel integer and floating-point data paths to provide for efficient execution of workloads with a mix of computation and addressing calculations. In at least one embodiment, streaming microprocessors may include independent thread scheduling capability to enable finer-grain synchronization and cooperation between parallel threads. In at least one embodiment, streaming microprocessors may include a combined L1 data cache and shared memory unit in order to improve performance while simplifying programming.

In at least one embodiment, one or more of GPU(s) 1308 may include a high bandwidth memory ("HBM") and/or a 16 GB HBM2 memory subsystem to provide, in some examples, about 900 GB/second peak memory bandwidth. In at least one embodiment, in addition to, or alternatively from, HBM memory, a synchronous graphics random-access memory ("SGRAM") may be used, such as a graphics double data rate type five synchronous random-access memory ("GDDR5").

In at least one embodiment, GPU(s) 1308 may include unified memory technology. In at least one embodiment, address translation services ("ATS") support may be used to allow GPU(s) 1308 to access CPU(s) 1306 page tables directly. In at least one embodiment, embodiment, when a GPU of GPU(s) 1308 memory management unit ("MMU") experiences a miss, an address translation request may be transmitted to CPU(s) 1306. In response, 2 CPU of CPU(s) 1306 may look in its page tables for a virtual-to-physical mapping for an address and transmit translation back to GPU(s) 1308, in at least one embodiment. In at least one embodiment, unified memory technology may allow a single unified virtual address space for memory of both CPU(s) 1306 and GPU(s) 1308, thereby simplifying GPU(s) 1308 programming and porting of applications to GPU(s) 1308.

In at least one embodiment, GPU(s) 1308 may include any number of access counters that may keep track of frequency of access of GPU(s) 1308 to memory of other processors. In at least one embodiment, access counter(s) may help ensure that memory pages are moved to physical memory of a processor that is accessing pages most frequently, thereby improving efficiency for memory ranges shared between processors.

In at least one embodiment, one or more of SoC(s) 1304 may include any number of cache(s) 1312, including those described herein. For example, in at least one embodiment, cache(s) 1312 could include a level three ("L3") cache that is available to both CPU(s) 1306 and GPU(s) 1308 (e.g., that is connected to CPU(s) 1306 and GPU(s) 1308). In at least one embodiment, cache(s) 1312 may include a write-back cache that may keep track of states of lines, such as by using a cache coherence protocol (e.g., MEI, MESI, MSI, etc.). In at least one embodiment, a L3 cache may include 4 MB of memory or more, depending on embodiment, although smaller cache sizes may be used.

In at least one embodiment, one or more of SoC(s) 1304 may include one or more accelerator(s) 1314 (e.g., hardware accelerators, software accelerators, or a combination thereof). In at least one embodiment, SoC(s) 1304 may include a hardware acceleration cluster that may include optimized hardware accelerators and/or large on-chip memory. In at least one embodiment, large on-chip memory (e.g., 4 MB of SRAM), may enable a hardware acceleration cluster to accelerate neural networks and other calculations. In at least one embodiment, a hardware acceleration cluster may be used to complement GPU(s) 1308 and to off-load some of tasks of GPU(s) 1308 (e.g., to free up more cycles of GPU(s) 1308 for performing other tasks). In at least one embodiment, accelerator(s) 1314 could be used for targeted workloads (e.g., perception, convolutional neural networks ("CNNs"), recurrent neural networks ("RNNs"), etc.) that are stable enough to be amenable to acceleration. In at least one embodiment, a CNN may include a region-based or regional convolutional neural networks ("RCNNs") and Fast RCNNs (e.g., as used for object detection) or other type of CNN.

In at least one embodiment, accelerator(s) 1314 (e.g., hardware acceleration cluster) may include one or more deep learning accelerator ("DLA"). In at least one embodiment, DLA(s) may include, without limitation, one or more Tensor processing units ("TPUs") that may be configured to provide an additional ten trillion operations per second for deep learning applications and inferencing. In at least one embodiment, TPUs may be accelerators configured to, and optimized for, performing image processing functions (e.g., for CNNs, RCNNs, etc.). In at least one embodiment, DLA(s) may further be optimized for a specific set of neural network types and floating point operations, as well as inferencing. In at least one embodiment, design of DLA(s) may provide more performance per millimeter than a typical general-purpose GPU, and typically vastly exceeds performance of a CPU. In at least one embodiment, TPU(s) may perform several functions, including a single-instance convolution function, supporting, for example, INT8, INT16, and FP16 data types for both features and weights, as well as post-processor functions. In at least one embodiment, DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones; a CNN for facial recognition and vehicle owner identification using data from camera sensors; and/or a CNN for security and/or safety related events.

In at least one embodiment, DLA(s) may perform any function of GPU(s) 1308, and by using an inference accelerator, for example, a designer may target either DLA(s) or GPU(s) 1308 for any function. For example, in at least one embodiment, a designer may focus processing of CNNs and floating point operations on DLA(s) and leave other functions to GPU(s) 1308 and/or accelerator(s) 1314.

In at least one embodiment, accelerator(s) 1314 may include programmable vision accelerator ("PVA"), which may alternatively be referred to herein as a computer vision accelerator. In at least one embodiment, PVA may be designed and configured to accelerate computer vision algorithms for advanced driver assistance system ("ADAS") 1338, autonomous driving, augmented reality ("AR") applications, and/or virtual reality ("VR") applications. In at least one embodiment, PVA may provide a balance between performance and flexibility. For example, in at least one embodiment, each PVA may include, for example and without limitation, any number of reduced instruction set computer ("RISC") cores, direct memory access ("DMA"), and/or any number of vector processors.

In at least one embodiment, RISC cores may interact with image sensors (e.g., image sensors of any cameras described herein), image signal processor(s), etc. In at least one embodiment, each RISC core may include any amount of memory. In at least one embodiment, RISC cores may use any of a number of protocols, depending on embodiment. In at least one embodiment, RISC cores may execute a real-time operating system ("RTOS"). In at least one embodiment, RISC cores may be implemented using one or more integrated circuit devices, application specific integrated circuits ("ASICs"), and/or memory devices. For example, in at least one embodiment, RISC cores could include an instruction cache and/or a tightly coupled RAM.

In at least one embodiment, DMA may enable components of PVA to access system memory independently of CPU(s) 1306. In at least one embodiment, DMA may support any number of features used to provide optimization to a PVA including, but not limited to, supporting multi-dimensional addressing and/or circular addressing. In at least one embodiment, DMA may support up to six or more dimensions of addressing, which may include, without limitation, block width, block height, block depth, horizontal block stepping, vertical block stepping, and/or depth stepping.

In at least one embodiment, vector processors may be programmable processors that may be designed to efficiently and flexibly execute programming for computer vision algorithms and provide signal processing capabilities. In at least one embodiment, a PVA may include a PVA core and two vector processing subsystem partitions. In at least one embodiment, a PVA core may include a processor subsystem, DMA engine(s) (e.g., two DMA engines), and/or other peripherals. In at least one embodiment, a vector processing subsystem may operate as a primary processing engine of a PVA, and may include a vector processing unit ("VPU"), an instruction cache, and/or vector memory (e.g., "VMEM"). In at least one embodiment, VPU core may include a digital signal processor such as, for example, a single instruction, multiple data ("SIMD"), very long instruction word ("VLIW") digital signal processor. In at least one embodiment, a combination of SIMD and VLIW may enhance throughput and speed.

In at least one embodiment, each of vector processors may include an instruction cache and may be coupled to dedicated memory. As a result, in at least one embodiment, each of vector processors may be configured to execute independently of other vector processors. In at least one embodiment, vector processors that are included in a particular PVA may be configured to employ data parallelism. For instance, in at least one embodiment, plurality of vector processors included in a single PVA may execute a common computer vision algorithm, but on different regions of an image. In at least one embodiment, vector processors included in a particular PVA may simultaneously execute different computer vision algorithms, on one image, or even execute different algorithms on sequential images or portions of an image. In at least one embodiment, among other things, any number of PVAs may be included in hardware acceleration cluster and any number of vector processors may be included in each PVA. In at least one embodiment, PVA may include additional error correcting code ("ECC") memory, to enhance overall system safety.

In at least one embodiment, accelerator(s) 1314 may include a computer vision network on-chip and static random-access memory ("SRAM"), for providing a high-bandwidth, low latency SRAM for accelerator(s) 1314. In at least one embodiment, on-chip memory may include at least 4 MB SRAM, comprising, for example and without limitation, eight field-configurable memory blocks, that may be accessible by both a PVA and a DLA. In at least one embodiment, each pair of memory blocks may include an advanced peripheral bus ("APB") interface, configuration circuitry, a controller, and a multiplexer. In at least one embodiment, any type of memory may be used. In at least one embodiment, a PVA and a DLA may access memory via a backbone that provides a PVA and a DLA with high-speed access to memory. In at least one embodiment, a backbone may include a computer vision network on-chip that interconnects a PVA and a DLA to memory (e.g., using APB).

In at least one embodiment, a computer vision network on-chip may include an interface that determines, before transmission of any control signal/address/data, that both a PVA and a DLA provide ready and valid signals. In at least one embodiment, an interface may provide for separate phases and separate channels for transmitting control signals/addresses/data, as well as burst-type communications for continuous data transfer. In at least one embodiment, an interface may comply with International Organization for Standardization ("ISO") 26262 or International Electrotechnical Commission ("IEC") 61508 standards, although other standards and protocols may be used.

In at least one embodiment, one or more of SoC(s) 1304 may include a real-time ray-tracing hardware accelerator. In at least one embodiment, real-time ray-tracing hardware accelerator may be used to quickly and efficiently determine positions and extents of objects (e.g., within a world model), to generate real-time visualization simulations, for RADAR signal interpretation, for sound propagation synthesis and/or analysis, for simulation of SONAR systems, for general wave propagation simulation, for comparison to LIDAR data for purposes of localization and/or other functions, and/or for other uses.

In at least one embodiment, accelerator(s) 1314 can have a wide array of uses for autonomous driving. In at least one embodiment, a PVA may be used for key processing stages in ADAS and autonomous vehicles. In at least one embodiment, a PVA's capabilities are a good match for algorithmic domains needing predictable processing, at low power and low latency. In other words, a PVA performs well on semi-dense or dense regular computation, even on small datasets, which might require predictable run-times with low latency and low power. In at least one embodiment, such as in vehicle 1300, PVAs might be designed to run classic computer vision algorithms, as they can be efficient at object detection and operating on integer math.

For example, according to at least one embodiment of technology, a PVA is used to perform computer stereo vision. In at least one embodiment, a semi-global matching-based algorithm may be used in some examples, although this is not intended to be limiting. In at least one embodiment, applications for Level 3-5 autonomous driving use motion estimation/stereo matching on-the-fly (e.g., structure from motion, pedestrian recognition, lane detection, etc.). In at least one embodiment, a PVA may perform computer stereo vision functions on inputs from two monocular cameras.

In at least one embodiment, a PVA may be used to perform dense optical flow. For example, in at least one embodiment, a PVA could process raw RADAR data (e.g., using a 4D Fast Fourier Transform) to provide processed RADAR data. In at least one embodiment, a PVA is used for time of flight depth processing, by processing raw time of flight data to provide processed time of flight data, for example.

In at least one embodiment, a DLA may be used to run any type of network to enhance control and driving safety, including for example and without limitation, a neural network that outputs a measure of confidence for each object detection. In at least one embodiment, confidence may be represented or interpreted as a probability, or as providing a relative "weight" of each detection compared to other detections. In at least one embodiment, a confidence measure enables a system to make further decisions regarding which detections should be considered as true positive detections rather than false positive detections. In at least one embodiment, a system may set a threshold value for confidence and consider only detections exceeding threshold value as true positive detections. In an embodiment in which an automatic emergency braking ("AEB") system is used, false positive detections would cause vehicle to automatically perform emergency braking, which is obviously undesirable. In at least one embodiment, highly confident detections may be considered as triggers for AEB. In at least one embodiment, a DLA may run a neural network for regressing confidence value. In at least one embodiment, neural network may take as its input at least some subset of parameters, such as bounding box dimensions, ground plane estimate obtained (e.g., from another subsystem), output from IMU sensor(s) 1366 that correlates with vehicle 1300 orientation, distance, 3D location estimates of object obtained from neural network and/or other sensors (e.g., LIDAR sensor(s) 1364 or RADAR sensor(s) 1360), among others.

In at least one embodiment, one or more of SoC(s) 1304 may include data store(s) 1316 (e.g., memory). In at least one embodiment, data store(s) 1316 may be on-chip memory of SoC(s) 1304, which may store neural networks to be executed on GPU(s) 1308 and/or a DLA. In at least one embodiment, data store(s) 1316 may be large enough in capacity to store multiple instances of neural networks for redundancy and safety. In at least one embodiment, data store(s) 1316 may comprise L2 or L3 cache(s).

In at least one embodiment, one or more of SoC(s) 1304 may include any number of processor(s) 1310 (e.g., embedded processors). In at least one embodiment, processor(s) 1310 may include a boot and power management processor that may be a dedicated processor and subsystem to handle boot power and management functions and related security enforcement. In at least one embodiment, a boot and power management processor may be a part of a boot sequence of SoC(s) 1304 and may provide runtime power management services. In at least one embodiment, a boot power and management processor may provide clock and voltage programming, assistance in system low power state transitions, management of SoC(s) 1304 thermals and temperature sensors, and/or management of SoC(s) 1304 power states. In at least one embodiment, each temperature sensor may be implemented as a ring-oscillator whose output frequency is proportional to temperature, and SoC(s) 1304 may use ring-oscillators to detect temperatures of CPU(s) 1306, GPU(s) 1308, and/or accelerator(s) 1314. In at least one embodiment, if temperatures are determined to exceed a threshold, then a boot and power management processor may enter a temperature fault routine and put SoC(s) 1304 into a lower power state and/or put vehicle 1300 into a chauffeur to safe stop mode (e.g., bring vehicle 1300 to a safe stop).

In at least one embodiment, processor(s) 1310 may further include a set of embedded processors that may serve as an audio processing engine which may be an audio subsystem that enables full hardware support for multi-channel audio over multiple interfaces, and a broad and flexible range of audio I/O interfaces. In at least one embodiment, an audio processing engine is a dedicated processor core with a digital signal processor with dedicated RAM.

In at least one embodiment, processor(s) 1310 may further include an always-on processor engine that may provide necessary hardware features to support low power sensor management and wake use cases. In at least one embodiment, an always-on processor engine may include, without limitation, a processor core, a tightly coupled RAM, supporting peripherals (e.g., timers and interrupt controllers), various I/O controller peripherals, and routing logic.

In at least one embodiment, processor(s) 1310 may further include a safety cluster engine that includes, without limitation, a dedicated processor subsystem to handle safety management for automotive applications. In at least one embodiment, a safety cluster engine may include, without limitation, two or more processor cores, a tightly coupled RAM, support peripherals (e.g., timers, an interrupt controller, etc.), and/or routing logic. In a safety mode, two or more cores may operate, in at least one embodiment, in a lockstep mode and function as a single core with comparison logic to detect any differences between their operations. In at least one embodiment, processor(s) 1310 may further include a real-time camera engine that may include, without limitation, a dedicated processor subsystem for handling real-time camera management. In at least one embodiment, processor(s) 1310 may further include a high-dynamic range signal processor that may include, without limitation, an image signal processor that is a hardware engine that is part of a camera processing pipeline.

In at least one embodiment, processor(s) 1310 may include a video image compositor that may be a processing block (e.g., implemented on a microprocessor) that implements video post-processing functions needed by a video playback application to produce a final image for a player window. In at least one embodiment, a video image compositor may perform lens distortion correction on wide-view camera(s) 1370, surround camera(s) 1374, and/or on in-cabin monitoring camera sensor(s). In at least one embodiment, in-cabin monitoring camera sensor(s) are preferably monitored by a neural network running on another instance of SoC 1304, configured to identify in cabin events and respond accordingly. In at least one embodiment, an in-cabin system may perform, without limitation, lip reading to activate cellular service and place a phone call, dictate emails, change a vehicle's destination, activate or change a vehicle's infotainment system and settings, or provide voice-activated web surfing. In at least one embodiment, certain functions are available to a driver when a vehicle is operating in an autonomous mode and are disabled otherwise.

In at least one embodiment, a video image compositor may include enhanced temporal noise reduction for both spatial and temporal noise reduction. For example, in at least one embodiment, where motion occurs in a video, noise reduction weights spatial information appropriately, decreasing weights of information provided by adjacent frames. In at least one embodiment, where an image or portion of an image does not include motion, temporal noise reduction performed by video image compositor may use information from a previous image to reduce noise in a current image.

In at least one embodiment, a video image compositor may also be configured to perform stereo rectification on input stereo lens frames. In at least one embodiment, a video image compositor may further be used for user interface composition when an operating system desktop is in use, and GPU(s) 1308 are not required to continuously render new surfaces. In at least one embodiment, when GPU(s) 1308 are powered on and active doing 3D rendering, a video image compositor may be used to offload GPU(s) 1308 to improve performance and responsiveness.

In at least one embodiment, one or more SoC of SoC(s) 1304 may further include a mobile industry processor interface ("MIPI") camera serial interface for receiving video and input from cameras, a high-speed interface, and/or a video input block that may be used for a camera and related pixel input functions. In at least one embodiment, one or more of SoC(s) 1304 may further include an input/output controller(s) that may be controlled by software and may be used for receiving I/O signals that are uncommitted to a specific role.

In at least one embodiment, one or more Soc of SoC(s) 1304 may further include a broad range of peripheral interfaces to enable communication with peripherals, audio encoders/decoders ("codecs"), power management, and/or other devices. In at least one embodiment, SoC(s) 1304 may be used to process data from cameras (e.g., connected over Gigabit Multimedia Serial Link and Ethernet channels), sensors (e.g., LIDAR sensor(s) 1364, RADAR sensor(s) 1360, etc. that may be connected over Ethernet channels), data from bus 1302 (e.g., speed of vehicle 1300, steering wheel position, etc.), data from GNSS sensor(s) 1358 (e.g., connected over a Ethernet bus or a CAN bus), etc. In at least one embodiment, one or more SoC of SoC(s) 1304 may further include dedicated high-performance mass storage controllers that may include their own DMA engines, and that may be used to free CPU(s) 1306 from routine data management tasks.

In at least one embodiment, SoC(s) 1304 may be an end-to-end platform with a flexible architecture that spans automation Levels 3-5, thereby providing a comprehensive functional safety architecture that leverages and makes efficient use of computer vision and ADAS techniques for diversity and redundancy, and provides a platform for a flexible, reliable driving software stack, along with deep learning tools. In at least one embodiment, SoC(s) 1304 may be faster, more reliable, and even more energy-efficient and space-efficient than conventional systems. For example, in at least one embodiment, accelerator(s) 1314, when combined with CPU(s) 1306, GPU(s) 1308, and data store(s) 1316, may provide for a fast, efficient platform for Level 3-5 autonomous vehicles.

In at least one embodiment, computer vision algorithms may be executed on CPUs, which may be configured using a high-level programming language, such as C, to execute a wide variety of processing algorithms across a wide variety of visual data. However, in at least one embodiment, CPUs are oftentimes unable to meet performance requirements of many computer vision applications, such as those related to execution time and power consumption, for example. In at least one embodiment, many CPUs are unable to execute complex object detection algorithms in real-time, which is used in in-vehicle ADAS applications and in practical Level 3-5 autonomous vehicles.

Embodiments described herein allow for multiple neural networks to be performed simultaneously and/or sequentially, and for results to be combined together to enable Level 3-5 autonomous driving functionality. For example, in at least one embodiment, a CNN executing on a DLA or a discrete GPU (e.g., GPU(s) 1320) may include text and word recognition, allowing reading and understanding of traffic signs, including signs for which a neural network has not been specifically trained. In at least one embodiment, a DLA may further include a neural network that is able to identify, interpret, and provide semantic understanding of a sign, and to pass that semantic understanding to path planning modules running on a CPU Complex.

In at least one embodiment, multiple neural networks may be run simultaneously, as for Level 3, 4, or 5 driving. For example, in at least one embodiment, a warning sign stating "Caution: flashing lights indicate icy conditions," along with an electric light, may be independently or collectively interpreted by several neural networks. In at least one embodiment, such warning sign itself may be identified as a traffic sign by a first deployed neural network (e.g., a neural network that has been trained), text "flashing lights indicate icy conditions" may be interpreted by a second deployed neural network, which informs a vehicle's path planning software (preferably executing on a CPU Complex) that when flashing lights are detected, icy conditions exist. In at least one embodiment, a flashing light may be identified by operating a third deployed neural network over multiple frames, informing a vehicle's path-planning software of a presence (or an absence) of flashing lights. In at least one embodiment, all three neural networks may run simultaneously, such as within a DLA and/or on GPU(s) 1308.

In at least one embodiment, a CNN for facial recognition and vehicle owner identification may use data from camera sensors to identify presence of an authorized driver and/or owner of vehicle 1300. In at least one embodiment, an always-on sensor processing engine may be used to unlock a vehicle when an owner approaches a driver door and turns on lights, and, in a security mode, to disable such vehicle when an owner leaves such vehicle. In this way, SoC(s) 1304 provide for security against theft and/or carjacking.

In at least one embodiment, a CNN for emergency vehicle detection and identification may use data from microphones 1396 to detect and identify emergency vehicle sirens. In at least one embodiment, SoC(s) 1304 use a CNN for classifying environmental and urban sounds, as well as classifying visual data. In at least one embodiment, a CNN running on a DLA is trained to identify a relative closing speed of an emergency vehicle (e.g., by using a Doppler effect). In at least one embodiment, a CNN may also be trained to identify emergency vehicles specific to a local area in which a vehicle is operating, as identified by GNSS sensor(s) 1358. In at least one embodiment, when operating in Europe, a CNN will seek to detect European sirens, and when in North America, a CNN will seek to identify only North American sirens. In at least one embodiment, once an emergency vehicle is detected, a control program may be used to execute an emergency vehicle safety routine, slowing a vehicle, pulling over to a side of a road, parking a vehicle, and/or idling a vehicle, with assistance of ultrasonic sensor(s) 1362, until emergency vehicles pass.

In at least one embodiment, vehicle 1300 may include CPU(s) 1318 (e.g., discrete CPU(s), or dCPU(s)), that may be coupled to SoC(s) 1304 via a high-speed interconnect (e.g., PCIe). In at least one embodiment, CPU(s) 1318 may include an X86 processor, for example. CPU(s) 1318 may be used to perform any of a variety of functions, including arbitrating potentially inconsistent results between ADAS sensors and SoC(s) 1304, and/or monitoring status and health of controller(s) 1336 and/or an infotainment system on a chip ("infotainment SoC") 1330, for example.

In at least one embodiment, vehicle 1300 may include GPU(s) 1320 (e.g., discrete GPU(s), or dGPU(s)), that may be coupled to SoC(s) 1304 via a high-speed interconnect (e.g., NVIDIA's NVLINK channel). In at least one embodiment, GPU(s) 1320 may provide additional artificial intelligence functionality, such as by executing redundant and/or different neural networks, and may be used to train and/or update neural networks based at least in part on input (e.g., sensor data) from sensors of a vehicle 1300.

In at least one embodiment, vehicle 1300 may further include network interface 1324 which may include, without limitation, wireless antenna(s) 1326 (e.g., one or more wireless antennas for different communication protocols, such as a cellular antenna, a Bluetooth antenna, etc.). In at least one embodiment, network interface 1324 may be used to enable wireless connectivity to Internet cloud services (e.g., with server(s) and/or other network devices), with other vehicles, and/or with computing devices (e.g., client devices of passengers). In at least one embodiment, to communicate with other vehicles, a direct link may be established between vehicle 130 and another vehicle and/or an indirect link may be established (e.g., across networks and over the Internet). In at least one embodiment, direct links may be provided using a vehicle-to-vehicle communication link. In at least one embodiment, a vehicle-to-vehicle communication link may provide vehicle 1300 information about vehicles in proximity to vehicle 1300 (e.g., vehicles in front of, on a side of, and/or behind vehicle 1300). In at least one embodiment, such aforementioned functionality may be part of a cooperative adaptive cruise control functionality of vehicle 1300.

In at least one embodiment, network interface 1324 may include an SoC that provides modulation and demodulation functionality and enables controller(s) 1336 to communicate over wireless networks. In at least one embodiment, network interface 1324 may include a radio frequency front-end for up-conversion from baseband to radio frequency, and down conversion from radio frequency to baseband. In at least one embodiment, frequency conversions may be performed in any technically feasible fashion. For example, frequency conversions could be performed through well-known processes, and/or using super-heterodyne processes. In at least one embodiment, radio frequency front end functionality may be provided by a separate chip. In at least one embodiment, network interfaces may include wireless functionality for communicating over LTE, WCDMA, UMTS, GSM, CDMA2000, Bluetooth, Bluetooth LE, Wi-Fi, Z-Wave, Zig-Bee, LoRaWAN, and/or other wireless protocols.

In at least one embodiment, vehicle 1300 may further include data store(s) 1328 which may include, without limitation, off-chip (e.g., off SoC(s) 1304) storage. In at least one embodiment, data store(s) 1328 may include, without limitation, one or more storage elements including RAM, SRAM, dynamic random-access memory ("DRAM"), video random-access memory ("VRAM"), flash memory, hard disks, and/or other components and/or devices that may store at least one bit of data.

In at least one embodiment, vehicle 1300 may further include GNSS sensor(s) 1358 (e.g., GPS and/or assisted GPS sensors), to assist in mapping, perception, occupancy grid generation, and/or path planning functions. In at least one embodiment, any number of GNSS sensor(s) 1358 may be used, including, for example and without limitation, a GPS using a USB connector with an Ethernet-to-Serial (e.g., RS-232) bridge.

In at least one embodiment, vehicle 1300 may further include RADAR sensor(s) 1360. In at least one embodiment, RADAR sensor(s) 1360 may be used by vehicle 1300 for long-range vehicle detection, even in darkness and/or severe weather conditions. In at least one embodiment, RADAR functional safety levels may be ASIL B. In at least one embodiment, RADAR sensor(s) 1360 may use a CAN bus and/or bus 1302 (e.g., to transmit data generated by RADAR sensor(s) 1360) for control and to access object tracking data, with access to Ethernet channels to access raw data in some examples. In at least one embodiment, a wide variety of RADAR sensor types may be used. For example, and without limitation, RADAR sensor(s) 1360 may be suitable for front, rear, and side RADAR use. In at least one embodiment, one or more sensor of RADAR sensors(s) 1360 is a Pulse Doppler RADAR sensor.

In at least one embodiment, RADAR sensor(s) 1360 may include different configurations, such as long-range with narrow field of view, short-range with wide field of view, short-range side coverage, etc. In at least one embodiment, long-range RADAR may be used for adaptive cruise control functionality. In at least one embodiment, long-range RADAR systems may provide a broad field of view realized by two or more independent scans, such as within a 250 m (meter) range. In at least one embodiment, RADAR sensor(s) 1360 may help in distinguishing between static and moving objects, and may be used by ADAS system 1338 for emergency brake assist and forward collision warning. In at least one embodiment, sensors 1360(*s*) included in a long-range RADAR system may include, without limitation, monostatic multimodal RADAR with multiple (e.g., six or more) fixed RADAR antennae and a high-speed CAN and FlexRay interface. In at least one embodiment, with six antennae, a central four antennae may create a focused beam pattern, designed to record vehicle's 1300 surroundings at higher speeds with minimal interference from traffic in adjacent lanes. In at least one embodiment, another two antennae may expand field of view, making it possible to quickly detect vehicles entering or leaving a lane of vehicle 1300.

In at least one embodiment, mid-range RADAR systems may include, as an example, a range of up to 160 m (front) or 80 m (rear), and a field of view of up to 42 degrees (front) or 150 degrees (rear). In at least one embodiment, short-range RADAR systems may include, without limitation, any number of RADAR sensor(s) 1360 designed to be installed at both ends of a rear bumper. When installed at both ends of a rear bumper, in at least one embodiment, a RADAR sensor system may create two beams that constantly monitor blind spots in a rear direction and next to a vehicle. In at least one embodiment, short-range RADAR systems may be used in ADAS system 1338 for blind spot detection and/or lane change assist.

In at least one embodiment, vehicle 1300 may further include ultrasonic sensor(s) 1362. In at least one embodiment, ultrasonic sensor(s) 1362, which may be positioned at a front, a back, and/or side location of vehicle 1300, may be used for parking assist and/or to create and update an occupancy grid. In at least one embodiment, a wide variety of ultrasonic sensor(s) 1362 may be used, and different ultrasonic sensor(s) 1362 may be used for different ranges of detection (e.g., 2.5 m, 4 m). In at least one embodiment, ultrasonic sensor(s) 1362 may operate at functional safety levels of ASIL B.

In at least one embodiment, vehicle 1300 may include LIDAR sensor(s) 1364. In at least one embodiment, LIDAR sensor(s) 1364 may be used for object and pedestrian detection, emergency braking, collision avoidance, and/or other functions. In at least one embodiment, LIDAR sensor(s) 1364 may operate at functional safety level ASIL B. In at least one embodiment, vehicle 1300 may include multiple LIDAR sensors 1364 (e.g., two, four, six, etc.) that may use an Ethernet channel (e.g., to provide data to a Gigabit Ethernet switch).

In at least one embodiment, LIDAR sensor(s) 1364 may be capable of providing a list of objects and their distances for a 360-degree field of view. In at least one embodiment, commercially available LIDAR sensor(s) 1364 may have an advertised range of approximately 100 m, with an accuracy of 2 cm to 3 cm, and with support for a 100 Mbps Ethernet connection, for example. In at least one embodiment, one or more non-protruding LIDAR sensors may be used. In such an embodiment, LIDAR sensor(s) 1364 may include a small device that may be embedded into a front, a rear, a side, and/or a corner location of vehicle 1300. In at least one embodiment, LIDAR sensor(s) 1364, in such an embodiment, may provide up to a 120-degree horizontal and 35-degree vertical field-of-view, with a 200 m range even for low-reflectivity objects. In at least one embodiment, front-mounted LIDAR sensor(s) 1364 may be configured for a horizontal field of view between 45 degrees and 135 degrees.

In at least one embodiment, LIDAR technologies, such as 3D flash LIDAR, may also be used. In at least one embodiment, 3D flash LIDAR uses a flash of a laser as a transmission source, to illuminate surroundings of vehicle 1300 up to approximately 200 m. In at least one embodiment, a flash LIDAR unit includes, without limitation, a receptor, which records laser pulse transit time and reflected light on each pixel, which in turn corresponds to a range from vehicle 1300 to objects. In at least one embodiment, flash LIDAR may allow for highly accurate and distortion-free images of surroundings to be generated with every laser flash. In at least one embodiment, four flash LIDAR sensors may be deployed, one at each side of vehicle 1300. In at least one embodiment, 3D flash LIDAR systems include, without limitation, a solid-state 3D staring array LIDAR camera with no moving parts other than a fan (e.g., a non-scanning LIDAR device). In at least one embodiment, flash LIDAR device may use a 5 nanosecond class I (eye-safe) laser pulse per frame and may capture reflected laser light as a 3D range point cloud and co-registered intensity data.

In at least one embodiment, vehicle 1300 may further include IMU sensor(s) 1366. In at least one embodiment, IMU sensor(s) 1366 may be located at a center of a rear axle of vehicle 1300. In at least one embodiment, IMU sensor(s) 1366 may include, for example and without limitation, accelerometer(s), magnetometer(s), gyroscope(s), a magnetic compass, magnetic compasses, and/or other sensor types. In at least one embodiment, such as in six-axis applications, IMU sensor(s) 1366 may include, without limitation, accelerometers and gyroscopes. In at least one embodiment, such as in nine-axis applications, IMU sensor(s) 1366 may include, without limitation, accelerometers, gyroscopes, and magnetometers.

In at least one embodiment, IMU sensor(s) 1366 may be implemented as a miniature, high performance GPS-Aided Inertial Navigation System ("GPS/INS") that combines micro-electro-mechanical systems ("MEMS") inertial sensors, a high-sensitivity GPS receiver, and advanced Kalman filtering algorithms to provide estimates of position, velocity, and attitude. In at least one embodiment, IMU sensor(s) 1366 may enable vehicle 1300 to estimate its heading without requiring input from a magnetic sensor by directly observing and correlating changes in velocity from a GPS to IMU sensor(s) 1366. In at least one embodiment, IMU sensor(s) 1366 and GNSS sensor(s) 1358 may be combined in a single integrated unit.

In at least one embodiment, vehicle 1300 may include microphone(s) 1396 placed in and/or around vehicle 1300. In at least one embodiment, microphone(s) 1396 may be used for emergency vehicle detection and identification, among other things.

In at least one embodiment, vehicle 1300 may further include any number of camera types, including stereo camera(s) 1368, wide-view camera(s) 1370, infrared camera(s) 1372, surround camera(s) 1374, long-range camera(s) 1398, mid-range camera(s) 1376, and/or other camera types. In at least one embodiment, cameras may be used to capture image data around an entire periphery of vehicle 1300. In at least one embodiment, which types of cameras used depends on vehicle 1300. In at least one embodiment, any combination of camera types may be used to provide necessary coverage around vehicle 1300. In at least one embodiment, a number of cameras deployed may differ depending on embodiment. For example, in at least one embodiment, vehicle 1300 could include six cameras, seven cameras, ten cameras, twelve cameras, or another number of cameras. In at least one embodiment, cameras may support, as an example and without limitation, Gigabit Multimedia Serial Link ("GMSL") and/or Gigabit Ethernet communications. In at least one embodiment, each camera might be as described with more detail previously herein with respect to FIG. 13A and FIG. 13B.

In at least one embodiment, vehicle 1300 may further include vibration sensor(s) 1342. In at least one embodiment, vibration sensor(s) 1342 may measure vibrations of components of vehicle 1300, such as axle(s). For example, in at least one embodiment, changes in vibrations may indicate a change in road surfaces. In at least one embodiment, when two or more vibration sensors 1342 are used, differences between vibrations may be used to determine friction or slippage of road surface (e.g., when a difference in vibration is between a power-driven axle and a freely rotating axle).

In at least one embodiment, vehicle 1300 may include ADAS system 1338. In at least one embodiment, ADAS system 1338 may include, without limitation, an SoC, in some examples. In at least one embodiment, ADAS system 1338 may include, without limitation, any number and combination of an autonomous/adaptive/automatic cruise control ("ACC") system, a cooperative adaptive cruise control ("CACC") system, a forward crash warning ("FCW") system, an automatic emergency braking ("AEB") system, a lane departure warning ("LDW)" system, a lane keep assist ("LKA") system, a blind spot warning ("BSW") system, a rear cross-traffic warning ("RCTW") system, a collision warning ("CW") system, a lane centering ("LC") system, and/or other systems, features, and/or functionality.

In at least one embodiment, ACC system may use RADAR sensor(s) 1360, LIDAR sensor(s) 1364, and/or any number of camera(s). In at least one embodiment, ACC system may include a longitudinal ACC system and/or a lateral ACC system. In at least one embodiment, a longitudinal ACC system monitors and controls distance to another vehicle immediately ahead of vehicle 1300 and automatically adjusts speed of vehicle 1300 to maintain a safe distance from vehicles ahead. In at least one embodiment, a lateral ACC system performs distance keeping, and advises vehicle 1300 to change lanes when necessary. In at least one embodiment, a lateral ACC is related to other ADAS applications, such as LC and CW.

In at least one embodiment, a CACC system uses information from other vehicles that may be received via network interface 1324 and/or wireless antenna(s) 1326 from other vehicles via a wireless link, or indirectly, over a network connection (e.g., over the Internet). In at least one embodiment, direct links may be provided by a vehicle-to-vehicle ("V2V") communication link, while indirect links may be provided by an infrastructure-to-vehicle ("I2V") communication link. In general, V2V communication provides information about immediately preceding vehicles (e.g., vehicles immediately ahead of and in same lane as vehicle 1300), while I2V communication provides information about traffic further ahead. In at least one embodiment, a CACC system may include either or both I2V and V2V information sources. In at least one embodiment, given information of vehicles ahead of vehicle 1300, a CACC system may be more reliable and it has potential to improve traffic flow smoothness and reduce congestion on road.

In at least one embodiment, an FCW system is designed to alert a driver to a hazard, so that such driver may take corrective action. In at least one embodiment, an FCW system uses a front-facing camera and/or RADAR sensor(s) 1360, coupled to a dedicated processor, DSP, FPGA, and/or ASIC, that is electrically coupled to provide driver feedback, such as a display, speaker, and/or vibrating component. In at least one embodiment, an FCW system may provide a warning, such as in form of a sound, visual warning, vibration and/or a quick brake pulse.

In at least one embodiment, an AEB system detects an impending forward collision with another vehicle or other object, and may automatically apply brakes if a driver does not take corrective action within a specified time or distance parameter. In at least one embodiment, AEB system may use front-facing camera(s) and/or RADAR sensor(s) 1360, coupled to a dedicated processor, DSP, FPGA, and/or ASIC. In at least one embodiment, when an AEB system detects a hazard, it will typically first alert a driver to take corrective action to avoid collision and, if that driver does not take corrective action, that AEB system may automatically apply brakes in an effort to prevent, or at least mitigate, an impact of a predicted collision. In at least one embodiment, an AEB system may include techniques such as dynamic brake support and/or crash imminent braking.

In at least one embodiment, an LDW system provides visual, audible, and/or tactile warnings, such as steering wheel or seat vibrations, to alert driver when vehicle 1300 crosses lane markings. In at least one embodiment, an LDW system does not activate when a driver indicates an intentional lane departure, such as by activating a turn signal. In at least one embodiment, an LDW system may use front-side facing cameras, coupled to a dedicated processor, DSP, FPGA, and/or ASIC, that is electrically coupled to provide driver feedback, such as a display, speaker, and/or vibrating component. In at least one embodiment, an LKA system is a variation of an LDW system. In at least one embodiment, an LKA system provides steering input or braking to correct vehicle 1300 if vehicle 1300 starts to exit its lane.

In at least one embodiment, a BSW system detects and warns a driver of vehicles in an automobile's blind spot. In at least one embodiment, a BSW system may provide a visual, audible, and/or tactile alert to indicate that merging or changing lanes is unsafe. In at least one embodiment, a BSW system may provide an additional warning when a driver uses a turn signal. In at least one embodiment, a BSW system may use rear-side facing camera(s) and/or RADAR sensor(s) 1360, coupled to a dedicated processor, DSP, FPGA, and/or ASIC, that is electrically coupled to driver feedback, such as a display, speaker, and/or vibrating component.

In at least one embodiment, an RCTW system may provide visual, audible, and/or tactile notification when an object is detected outside a rear-camera range when vehicle 1300 is backing up. In at least one embodiment, an RCTW system includes an AEB system to ensure that vehicle brakes are applied to avoid a crash. In at least one embodiment, an RCTW system may use one or more rear-facing RADAR sensor(s) 1360, coupled to a dedicated processor, DSP, FPGA, and/or ASIC, that is electrically coupled to provide driver feedback, such as a display, speaker, and/or vibrating component.

In at least one embodiment, conventional ADAS systems may be prone to false positive results which may be annoying and distracting to a driver, but typically are not catastrophic, because conventional ADAS systems alert a driver and allow that driver to decide whether a safety condition truly exists and act accordingly. In at least one embodiment, vehicle 1300 itself decides, in case of conflicting results, whether to heed result from a primary computer or a secondary computer (e.g., a first controller or a second controller of controllers 1336). For example, in at least one embodiment, ADAS system 1338 may be a backup and/or secondary computer for providing perception information to a backup computer rationality module. In at least one embodiment, a backup computer rationality monitor may run redundant diverse software on hardware components to detect faults in perception and dynamic driving tasks. In at least one embodiment, outputs from ADAS system 1338 may be provided to a supervisory MCU. In at least one embodiment, if outputs from a primary computer and outputs from a secondary computer conflict, a supervisory MCU determines how to reconcile conflict to ensure safe operation.

In at least one embodiment, a primary computer may be configured to provide a supervisory MCU with a confidence score, indicating that primary computer's confidence in a chosen result. In at least one embodiment, if that confidence score exceeds a threshold, that supervisory MCU may follow that primary computer's direction, regardless of whether that secondary computer provides a conflicting or inconsistent result. In at least one embodiment, where a confidence score does not meet a threshold, and where primary and secondary computers indicate different results (e.g., a conflict), a supervisory MCU may arbitrate between computers to determine an appropriate outcome.

In at least one embodiment, a supervisory MCU may be configured to run a neural network(s) that is trained and configured to determine, based at least in part on outputs from a primary computer and outputs from a secondary computer, conditions under which that secondary computer provides false alarms. In at least one embodiment, neural network(s) in a supervisory MCU may learn when a secondary computer's output may be trusted, and when it cannot. For example, in at least one embodiment, when that secondary computer is a RADAR-based FCW system, a neural network(s) in that supervisory MCU may learn when an FCW system is identifying metallic objects that are not, in fact, hazards, such as a drainage grate or manhole cover that triggers an alarm. In at least one embodiment, when a secondary computer is a camera-based LDW system, a neural network in a supervisory MCU may learn to override LDW when bicyclists or pedestrians are present and a lane departure is, in fact, a safest maneuver. In at least one embodiment, a supervisory MCU may include at least one of a DLA or a GPU suitable for running neural network(s) with associated memory. In at least one embodiment, a supervisory MCU may comprise and/or be included as a component of SoC(s) 1304.

In at least one embodiment, ADAS system 1338 may include a secondary computer that performs ADAS functionality using traditional rules of computer vision. In at least one embodiment, that secondary computer may use classic computer vision rules (if-then), and presence of a neural network(s) in a supervisory MCU may improve reliability, safety and performance. For example, in at least one embodiment, diverse implementation and intentional non-identity makes an overall system more fault-tolerant, especially to faults caused by software (or software-hardware interface) functionality. For example, in at least one embodiment, if there is a software bug or error in software running on a primary computer, and non-identical software code running on a secondary computer provides a consistent overall result, then a supervisory MCU may have greater confidence that an overall result is correct, and a bug in software or hardware on that primary computer is not causing a material error.

In at least one embodiment, an output of ADAS system 1338 may be fed into a primary computer's perception block and/or a primary computer's dynamic driving task block. For example, in at least one embodiment, if ADAS system 1338 indicates a forward crash warning due to an object immediately ahead, a perception block may use this information when identifying objects. In at least one embodiment, a secondary computer may have its own neural network that is trained and thus reduces a risk of false positives, as described herein.

In at least one embodiment, vehicle 1300 may further include infotainment SoC 1330 (e.g., an in-vehicle infotainment system (IVI)). Although illustrated and described as an SoC, infotainment system SoC 1330, in at least one embodiment, may not be an SoC, and may include, without limitation, two or more discrete components. In at least one embodiment, infotainment SoC 1330 may include, without limitation, a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, WiFi, etc.), and/or information services (e.g., navigation systems, rear-parking assistance, a radio data system, vehicle related information such as fuel level, total distance covered, brake fuel level, oil level, door open/close, air filter information, etc.) to vehicle 1300. For example, infotainment SoC 1330 could include radios, disk players, navigation systems, video players, USB and Bluetooth connectivity, carputers, in-car entertainment, WiFi, steering wheel audio controls, hands free voice control, a heads-up display ("HUD"), HMI display 1334, a telematics device, a control panel (e.g., for controlling and/or interacting with various components, features, and/or systems), and/or other components. In at least one embodiment, infotainment SoC 1330 may further be used to provide information (e.g., visual and/or audible) to user(s) of vehicle 1300, such as information from ADAS system 1338, autonomous driving information such as planned vehicle maneuvers, trajectories, surrounding environment information (e.g., intersection information, vehicle information, road information, etc.), and/or other information.

In at least one embodiment, infotainment SoC 1330 may include any amount and type of GPU functionality. In at least one embodiment, infotainment SoC 1330 may communicate over bus 1302 with other devices, systems, and/or components of vehicle 1300. In at least one embodiment, infotainment SoC 1330 may be coupled to a supervisory MCU such that a GPU of an infotainment system may perform some self-driving functions in event that primary controller(s) 1336 (e.g., primary and/or backup computers of vehicle 1300) fail. In at least one embodiment, infotainment SoC 1330 may put vehicle 1300 into a chauffeur to safe stop mode, as described herein.

In at least one embodiment, vehicle 1300 may further include instrument cluster 1332 (e.g., a digital dash, an electronic instrument cluster, a digital instrument panel, etc.). In at least one embodiment, instrument cluster 1332 may include, without limitation, a controller and/or supercomputer (e.g., a discrete controller or supercomputer). In at least one embodiment, instrument cluster 1332 may include, without limitation, any number and combination of a set of instrumentation such as a speedometer, fuel level, oil pressure, tachometer, odometer, turn indicators, gearshift position indicator, seat belt warning light(s), parking-brake warning light(s), engine-malfunction light(s), supplemental restraint system (e.g., airbag) information, lighting controls, safety system controls, navigation information, etc. In some examples, information may be displayed and/or shared among infotainment SoC 1330 and instrument cluster 1332. In at least one embodiment, instrument cluster 1332 may be included as part of infotainment SoC 1330, or vice versa.

Inference and/or training logic 1015 are used to perform inferencing and/or training operations associated with one or more embodiments. Details regarding inference and/or training logic 1015 are provided herein in conjunction with FIGS. 10A and/or 10B. In at least one embodiment, inference and/or training logic 1015 may be used in system FIG. 13C for inferencing or predicting operations based, at least in part, on weight parameters calculated using neural network training operations, neural network functions and/or architectures, or neural network use cases described herein.

Figure 13D:
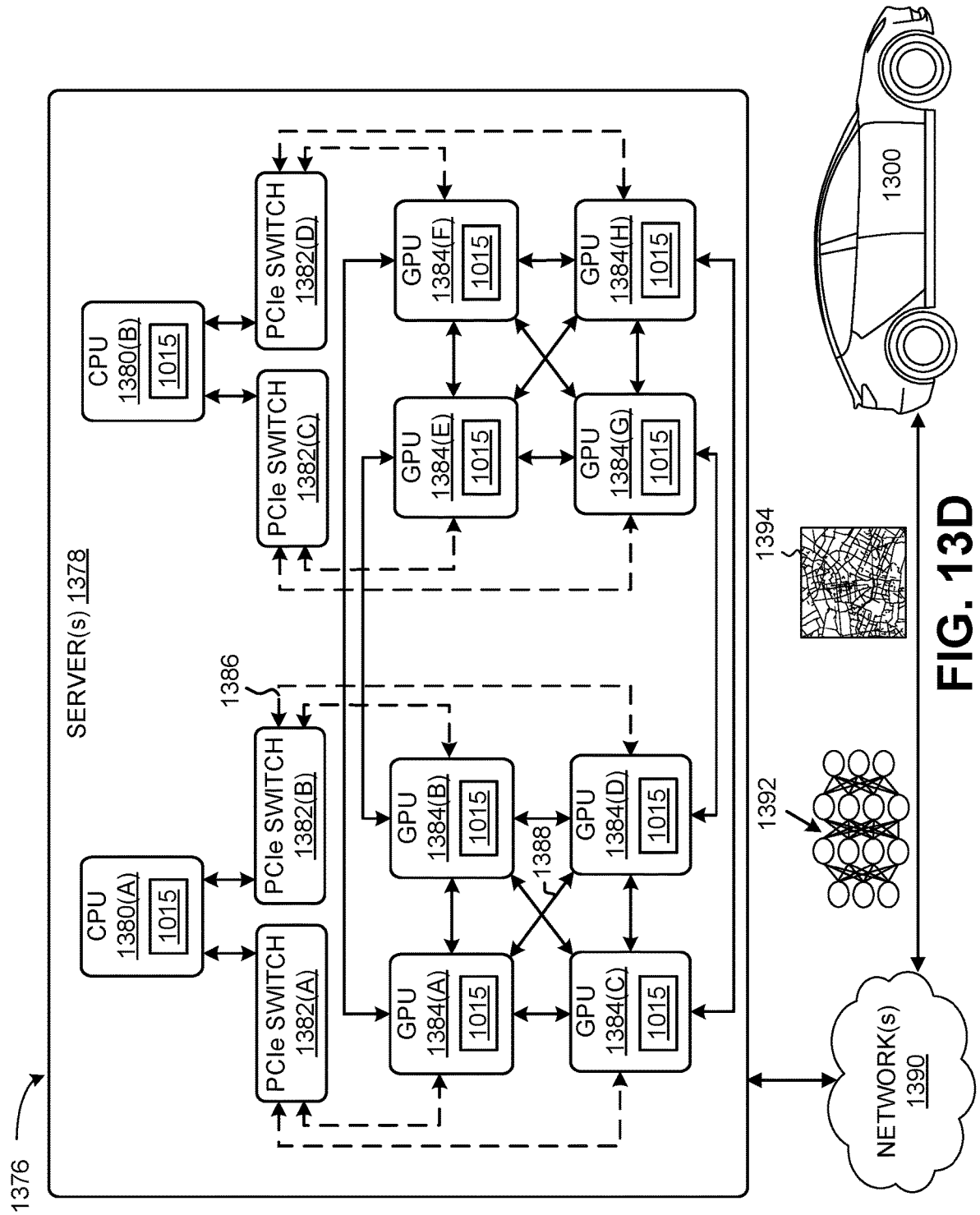
FIG. 13D is a diagram illustrating a system for communication between cloud-based server(s) and the autonomous vehicle of FIG. 13A, according to at least one embodiment.

FIG. 13D is a diagram of a system for communication between cloud-based server(s) and autonomous vehicle 1300 of FIG. 13A, according to at least one embodiment. In at least one embodiment, system may include, without limitation, server(s) 1378, network(s) 1390, and any number and type of vehicles, including vehicle 1300. In at least one embodiment, server(s) 1378 may include, without limitation, a plurality of GPUs 1384(A)-1384(H) (collectively referred to herein as GPUs 1384), PCIe switches 1382(A)-1382(D) (collectively referred to herein as PCIe switches 1382), and/or CPUs 1380(A)-1380(B) (collectively referred to herein as CPUs 1380). In at least one embodiment, GPUs 1384, CPUs 1380, and PCIe switches 1382 may be interconnected with high-speed interconnects such as, for example and without limitation, NVLink interfaces 1388 developed by NVIDIA and/or PCIe connections 1386. In at least one embodiment, GPUs 1384 are connected via an NVLink and/or NVSwitch SoC and GPUs 1384 and PCIe switches 1382 are connected via PCIe interconnects.

Although eight GPUs 1384, two CPUs 1380, and four PCIe switches 1382 are illustrated, this is not intended to be limiting. In at least one embodiment, each of server(s) 1378 may include, without limitation, any number of GPUs 1384, CPUs 1380, and/or PCIe switches 1382, in any combination. For example, in at least one embodiment, server(s) 1378 could each include eight, sixteen, thirty-two, and/or more GPUs 1384.

In at least one embodiment, server(s) 1378 may receive, over network(s) 1390 and from vehicles, image data representative of images showing unexpected or changed road conditions, such as recently commenced road-work. In at least one embodiment, server(s) 1378 may transmit, over network(s) 1390 and to vehicles, neural networks 1392, updated or otherwise, and/or map information 1394, including, without limitation, information regarding traffic and road conditions. In at least one embodiment, updates to map information 1394 may include, without limitation, updates for HD map 1322, such as information regarding construction sites, potholes, detours, flooding, and/or other obstructions. In at least one embodiment, neural networks 1392, and/or map information 1394 may have resulted from new training and/or experiences represented in data received from any number of vehicles in an environment, and/or based at least in part on training performed at a data center (e.g., using server(s) 1378 and/or other servers).

In at least one embodiment, server(s) 1378 may be used to train machine learning models (e.g., neural networks) based at least in part on training data. In at least one embodiment, training data may be generated by vehicles, and/or may be generated in a simulation (e.g., using a game engine). In at least one embodiment, any amount of training data is tagged (e.g., where associated neural network benefits from supervised learning) and/or undergoes other pre-processing. In at least one embodiment, any amount of training data is not tagged and/or pre-processed (e.g., where associated neural network does not require supervised learning). In at least one embodiment, once machine learning models are trained, machine learning models may be used by vehicles (e.g., transmitted to vehicles over network(s) 1390), and/or machine learning models may be used by server(s) 1378 to remotely monitor vehicles.

In at least one embodiment, server(s) 1378 may receive data from vehicles and apply data to up-to-date real-time neural networks for real-time intelligent inferencing. In at least one embodiment, server(s) 1378 may include deep-learning supercomputers and/or dedicated AI computers powered by GPU(s) 1384, such as a DGX and DGX Station machines developed by NVIDIA. However, in at least one embodiment, server(s) 1378 may include deep learning infrastructure that uses CPU-powered data centers.

In at least one embodiment, deep-learning infrastructure of server(s) 1378 may be capable of fast, real-time inferencing, and may use that capability to evaluate and verify health of processors, software, and/or associated hardware in vehicle 1300. For example, in at least one embodiment, deep-learning infrastructure may receive periodic updates from vehicle 1300, such as a sequence of images and/or objects that vehicle 1300 has located in that sequence of images (e.g., via computer vision and/or other machine learning object classification techniques). In at least one embodiment, deep-learning infrastructure may run its own neural network to identify objects and compare them with objects identified by vehicle 1300 and, if results do not match and deep-learning infrastructure concludes that AI in vehicle 1300 is malfunctioning, then server(s) 1378 may transmit a signal to vehicle 1300 instructing a fail-safe computer of vehicle 1300 to assume control, notify passengers, and complete a safe parking maneuver.

In at least one embodiment, server(s) 1378 may include GPU(s) 1384 and one or more programmable inference accelerators (e.g., NVIDIA's TensorRT 3 devices). In at least one embodiment, a combination of GPU-powered servers and inference acceleration may make real-time responsiveness possible. In at least one embodiment, such as where performance is less critical, servers powered by CPUs, FPGAs, and other processors may be used for inferencing. In at least one embodiment, hardware structure(s) 1015 are used to perform one or more embodiments. Details regarding hardware structure(x) 1015 are provided herein in conjunction with FIGS. 10A and/or 10B.

Computer Systems

Figure 14:
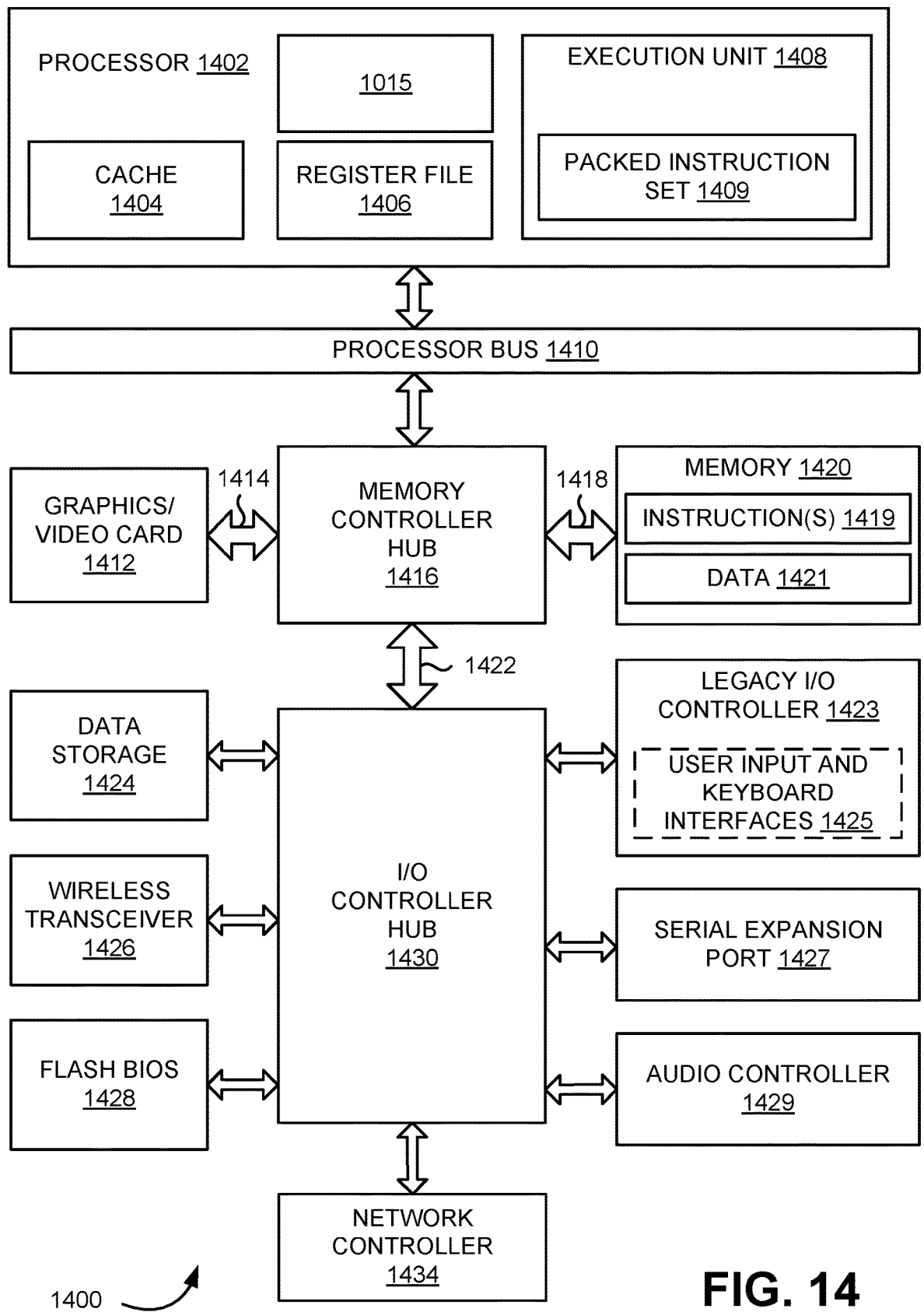
FIG. 14 is a block diagram illustrating a computer system, according to at least one embodiment.

FIG. 14 is a block diagram illustrating an exemplary computer system, which may be a system with interconnected devices and components, a system-on-a-chip (SOC) or some combination thereof formed with a processor that may include execution units to execute an instruction, according to at least one embodiment. In at least one embodiment, a computer system 1400 may include, without limitation, a component, such as a processor 1402 to employ execution units including logic to perform algorithms for process data, in accordance with present disclosure, such as in embodiment described herein. In at least one embodiment, computer system 1400 may include processors, such as PENTIUM® Processor family, Xeon™, Itanium®, XScale™ and/or StrongARM™, Intel® Core™, or Intel® Nervana™ microprocessors available from Intel Corporation of Santa Clara, California, although other systems (including PCs having other microprocessors, engineering workstations, set-top boxes and like) may also be used. In at least one embodiment, computer system 1400 may execute a version of WINDOWS operating system available from Microsoft Corporation of Redmond, Wash., although other operating systems (UNIX and Linux, for example), embedded software, and/or graphical user interfaces, may also be used.

Embodiments may be used in other devices such as handheld devices and embedded applications. Some examples of handheld devices include cellular phones, Internet Protocol devices, digital cameras, personal digital assistants ("PDAs"), and handheld PCs. In at least one embodiment, embedded applications may include a microcontroller, a digital signal processor ("DSP"), system on a chip, network computers ("NetPCs"), set-top boxes, network hubs, wide area network ("WAN") switches, or any other system that may perform one or more instructions in accordance with at least one embodiment.

In at least one embodiment, computer system 1400 may include, without limitation, processor 1402 that may include, without limitation, one or more execution units 1408 to perform machine learning model training and/or inferencing according to techniques described herein. In at least one embodiment, computer system 1400 is a single processor desktop or server system, but in another embodiment, computer system 1400 may be a multiprocessor system. In at least one embodiment, processor 1402 may include, without limitation, a complex instruction set computer ("CISC") microprocessor, a reduced instruction set computing ("RISC") microprocessor, a very long instruction word ("VLIW") microprocessor, a processor implementing a combination of instruction sets, or any other processor device, such as a digital signal processor, for example. In at least one embodiment, processor 1402 may be coupled to a processor bus 1410 that may transmit data signals between processor 1402 and other components in computer system 1400.

In at least one embodiment, processor 1402 may include, without limitation, a Level 1 ("L1") internal cache memory ("cache") 1404. In at least one embodiment, processor 1402 may have a single internal cache or multiple levels of internal cache. In at least one embodiment, cache memory may reside external to processor 1402. Other embodiments may also include a combination of both internal and external caches depending on particular implementation and needs. In at least one embodiment, a register file 1406 may store different types of data in various registers including, without limitation, integer registers, floating point registers, status registers, and an instruction pointer register.

In at least one embodiment, execution unit 1408, including, without limitation, logic to perform integer and floating point operations, also resides in processor 1402. In at least one embodiment, processor 1402 may also include a microcode ("ucode") read only memory ("ROM") that stores microcode for certain macro instructions. In at least one embodiment, execution unit 1408 may include logic to handle a packed instruction set 1409. In at least one embodiment, by including packed instruction set 1409 in an instruction set of a general-purpose processor, along with associated circuitry to execute instructions, operations used by many multimedia applications may be performed using packed data in processor 1402. In at least one embodiment, many multimedia applications may be accelerated and executed more efficiently by using a full width of a processor's data bus for performing operations on packed data, which may eliminate a need to transfer smaller units of data across that processor's data bus to perform one or more operations one data element at a time.

In at least one embodiment, execution unit 1408 may also be used in microcontrollers, embedded processors, graphics devices, DSPs, and other types of logic circuits. In at least one embodiment, computer system 1400 may include, without limitation, a memory 1420. In at least one embodiment, memory 1420 may be a Dynamic Random Access Memory ("DRAM") device, a Static Random Access Memory ("SRAM") device, a flash memory device, or another memory device. In at least one embodiment, memory 1420 may store instruction(s) 1419 and/or data 1421 represented by data signals that may be executed by processor 1402.

In at least one embodiment, a system logic chip may be coupled to processor bus 1410 and memory 1420. In at least one embodiment, a system logic chip may include, without limitation, a memory controller hub ("MCH") 1416, and processor 1402 may communicate with MCH 1416 via processor bus 1410. In at least one embodiment, MCH 1416 may provide a high bandwidth memory path 1418 to memory 1420 for instruction and data storage and for storage of graphics commands, data and textures. In at least one embodiment, MCH 1416 may direct data signals between processor 1402, memory 1420, and other components in computer system 1400 and to bridge data signals between processor bus 1410, memory 1420, and a system I/O interface 1422. In at least one embodiment, a system logic chip may provide a graphics port for coupling to a graphics controller. In at least one embodiment, MCH 1416 may be coupled to memory 1420 through high bandwidth memory path 1418 and a graphics/video card 1412 may be coupled to MCH 1416 through an Accelerated Graphics Port ("AGP") interconnect 1414.

In at least one embodiment, computer system 1400 may use system I/O interface 1422 as a proprietary hub interface bus to couple MCH 1416 to an I/O controller hub ("ICH") 1430. In at least one embodiment, ICH 1430 may provide direct connections to some I/O devices via a local I/O bus. In at least one embodiment, a local I/O bus may include, without limitation, a high-speed I/O bus for connecting peripherals to memory 1420, a chipset, and processor 1402. Examples may include, without limitation, an audio controller 1429, a firmware hub ("flash BIOS") 1428, a wireless transceiver 1426, a data storage 1424, a legacy I/O controller 1423 containing user input and keyboard interfaces 1425, a serial expansion port 1427, such as a Universal Serial Bus ("USB") port, and a network controller 1434. In at least one embodiment, data storage 1424 may comprise a hard disk drive, a floppy disk drive, a CD-ROM device, a flash memory device, or other mass storage device.

In at least one embodiment, FIG. 14 illustrates a system, which includes interconnected hardware devices or "chips", whereas in other embodiments, FIG. 14 may illustrate an exemplary SoC. In at least one embodiment, devices illustrated in FIG. 14 may be interconnected with proprietary interconnects, standardized interconnects (e.g., PCIe) or some combination thereof. In at least one embodiment, one or more components of computer system 1400 are interconnected using compute express link (CXL) interconnects.

Inference and/or training logic 1015 are used to perform inferencing and/or training operations associated with one or more embodiments. Details regarding inference and/or training logic 1015 are provided herein in conjunction with FIGS. 10A and/or 10B. In at least one embodiment, inference and/or training logic 1015 may be used in system FIG. 14 for inferencing or predicting operations based, at least in part, on weight parameters calculated using neural network training operations, neural network functions and/or architectures, or neural network use cases described herein.

Figure 15:
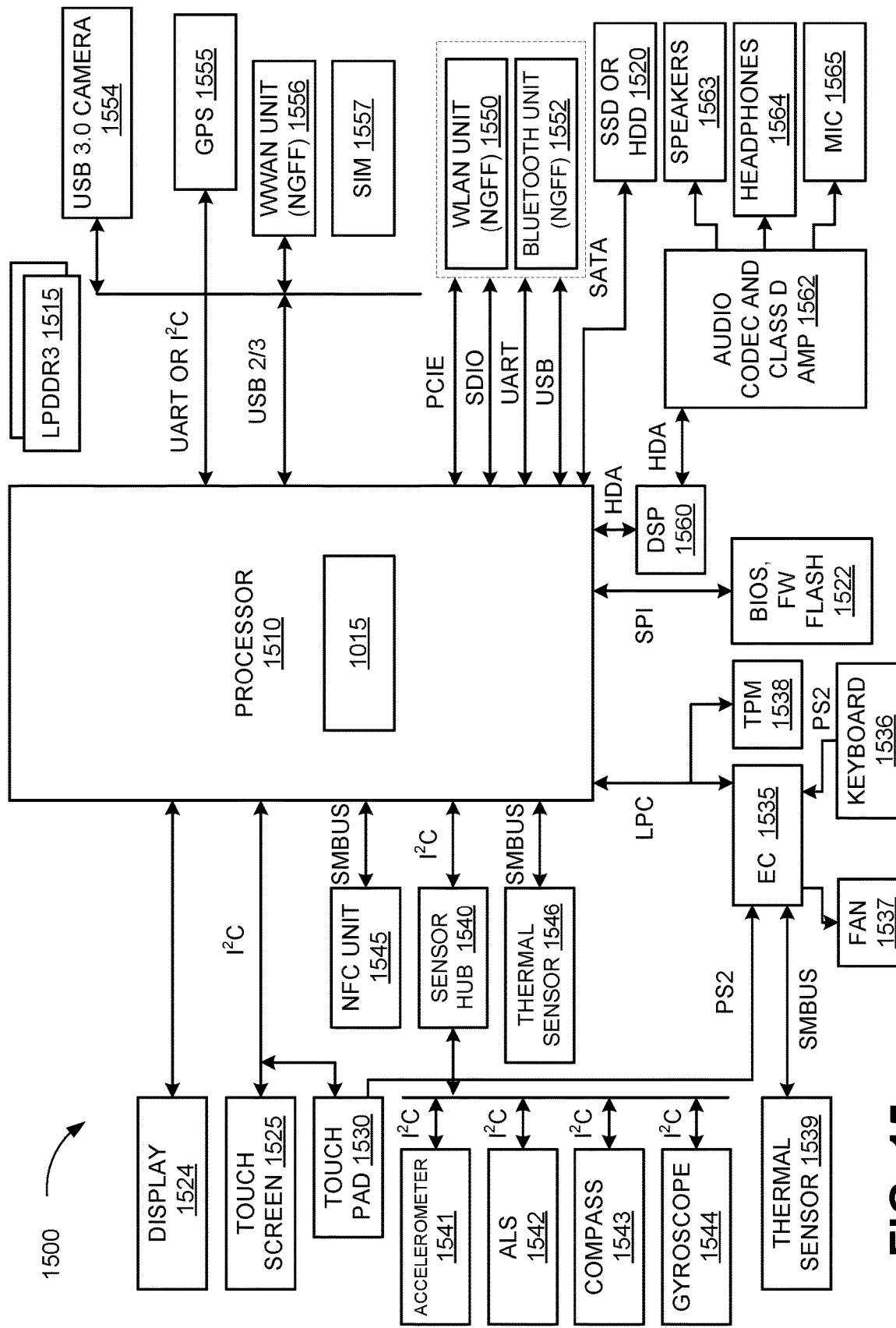
FIG. 15 is a block diagram illustrating a computer system, according to at least one embodiment.

FIG. 15 is a block diagram illustrating an electronic device 1500 for utilizing a processor 1510, according to at least one embodiment. In at least one embodiment, electronic device 1500 may be, for example and without limitation, a notebook, a tower server, a rack server, a blade server, a laptop, a desktop, a tablet, a mobile device, a phone, an embedded computer, or any other suitable electronic device.

In at least one embodiment, electronic device 1500 may include, without limitation, processor 1510 communicatively coupled to any suitable number or kind of components, peripherals, modules, or devices. In at least one embodiment, processor 1510 is coupled using a bus or interface, such as a VC bus, a System Management Bus ("SMBus"), a Low Pin Count (LPC) bus, a Serial Peripheral Interface ("SPI"), a High Definition Audio ("HDA") bus, a Serial Advance Technology Attachment ("SATA") bus, a Universal Serial Bus ("USB") (versions 1, 2, 3, etc.), or a Universal Asynchronous Receiver/Transmitter ("UART") bus. In at least one embodiment, FIG. 15 illustrates a system, which includes interconnected hardware devices or "chips", whereas in other embodiments, FIG. 15 may illustrate an exemplary SoC. In at least one embodiment, devices illustrated in FIG. 15 may be interconnected with proprietary interconnects, standardized interconnects (e.g., PCIe) or some combination thereof. In at least one embodiment, one or more components of FIG. 15 are interconnected using compute express link (CXL) interconnects.

In at least one embodiment, FIG. 15 may include a display 1524, a touch screen 1525, a touch pad 1530, a Near Field Communications unit ("NEC") 1545, a sensor hub 1540, a thermal sensor 1546, an Express Chipset ("EC") 1535, a Trusted Platform Module ("TPM") 1538, BIOS/firmware/flash memory ("BIOS, FW Flash") 1522, a DSP 1560, a drive 1520 such as a Solid State Disk ("SSD"), or a Hard Disk Drive ("HDD"), a wireless local area network unit ("WLAN") 1550, a Bluetooth unit 1552, a Wireless Wide Area Network unit ("WWAN") 1556, a Global Positioning System (GPS) unit 1555, a camera ("USB 3.0 camera") 1554 such as a USB 3.0 camera, and/or a Low Power Double Data Rate ("LPDDR") memory unit ("LPDDR3") 1515 implemented in, for example, an LPDDR3 standard. These components may each be implemented in any suitable manner.

In at least one embodiment, other components may be communicatively coupled to processor 1510 through components described herein. In at least one embodiment, an accelerometer 1541, an ambient light sensor ("ALS") 1542, a compass 1543, and a gyroscope 1544 may be communicatively coupled to sensor hub 1540. In at least one embodiment, a thermal sensor 1539, a fan 1537, a keyboard 1536, and touch pad 1530 may be communicatively coupled to EC 1535. In at least one embodiment, speakers 1563, headphones 1564, and a microphone ("mic") 1565 may be communicatively coupled to an audio unit ("audio codec and class D amp") 1562, which may in turn be communicatively coupled to DSP 1560. In at least one embodiment, audio unit 1562 may include, for example and without limitation, an audio coder/decoder ("codec") and a class D amplifier. In at least one embodiment, a SIM card ("SIM") 1557 may be communicatively coupled to WWAN unit 1556. In at least one embodiment, components such as WLAN unit 1550 and Bluetooth unit 1552, as well as WWAN unit 1556 may be implemented in a Next Generation Form Factor ("NGFF").

Inference and/or training logic 1015 are used to perform inferencing and/or training operations associated with one or more embodiments. Details regarding inference and/or training logic 1015 are provided herein in conjunction with FIGS. 10A and/or 10B. In at least one embodiment, inference and/or training logic 1015 may be used in system FIG. 15 for inferencing or predicting operations based, at least in part, on weight parameters calculated using neural network training operations, neural network functions and/or architectures, or neural network use cases described herein.

Figure 16:
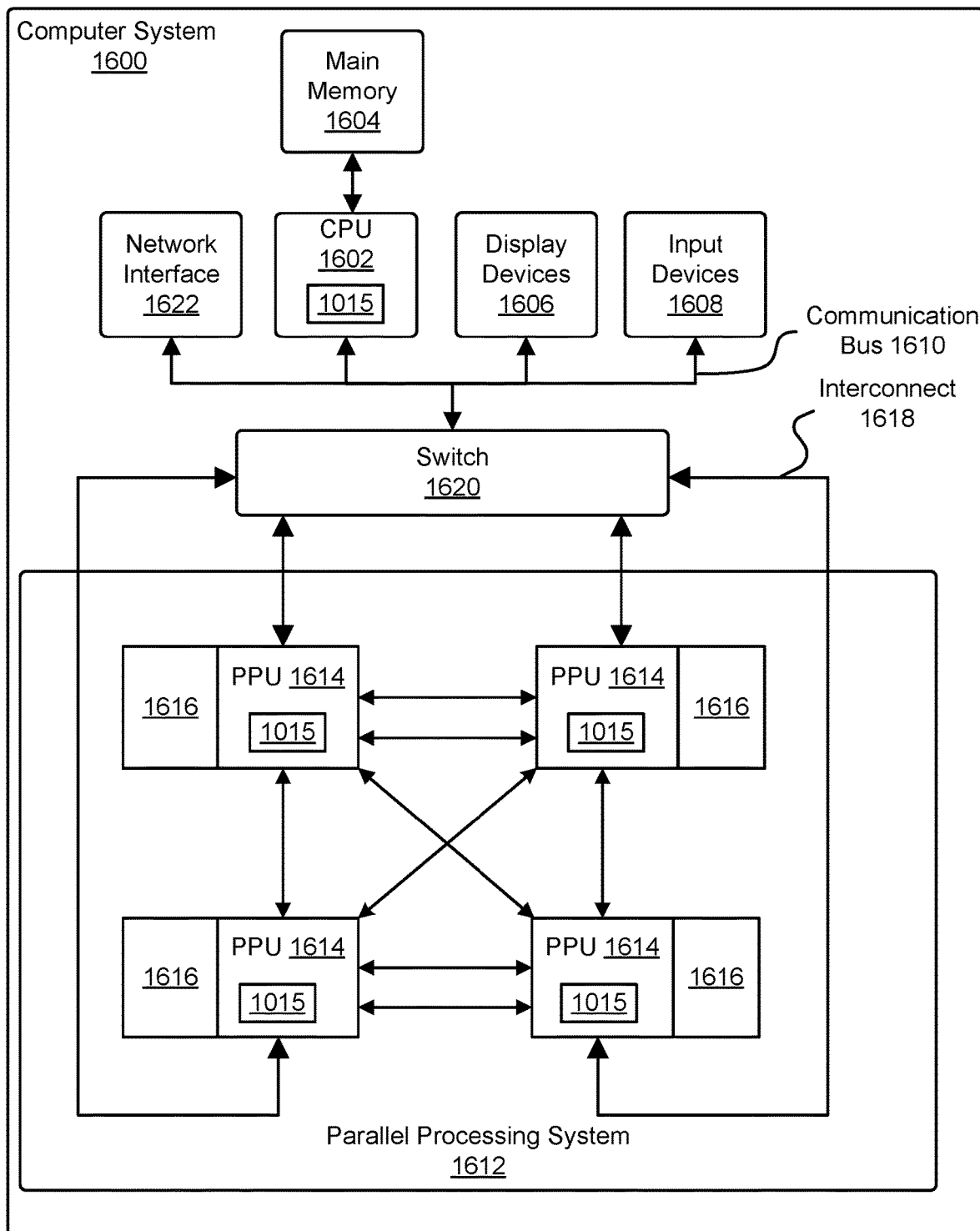
FIG. 16 illustrates a computer system, according to at least one embodiment.

FIG. 16 illustrates a computer system 1600, according to at least one embodiment. In at least one embodiment, computer system 1600 is configured to implement various processes and methods described throughout this disclosure.

In at least one embodiment, computer system 1600 comprises, without limitation, at least one central processing unit ("CPU") 1602 that is connected to a communication bus 1610 implemented using any suitable protocol, such as PCI ("Peripheral Component Interconnect"), peripheral component interconnect express ("PCI-Express"), AGP ("Accelerated Graphics Port"), HyperTransport, or any other bus or point-to-point communication protocol(s). In at least one embodiment, computer system 1600 includes, without limitation, a main memory 1604 and control logic (e.g., implemented as hardware, software, or a combination thereof) and data are stored in main memory 1604, which may take form of random access memory ("RAM"). In at least one embodiment, a network interface subsystem ("network interface") 1622 provides an interface to other computing devices and networks for receiving data from and transmitting data to other systems with computer system 1600.

In at least one embodiment, computer system 1600, in at least one embodiment, includes, without limitation, input devices 1608, a parallel processing system 1612, and display devices 1606 that can be implemented using a conventional cathode ray tube ("CRT"), a liquid crystal display ("LCD"), a light emitting diode ("LED") display, a plasma display, or other suitable display technologies. In at least one embodiment, user input is received from input devices 1608 such as keyboard, mouse, touchpad, microphone, etc. In at least one embodiment, each module described herein can be situated on a single semiconductor platform to form a processing system.

Inference and/or training logic 1015 are used to perform inferencing and/or training operations associated with one or more embodiments. Details regarding inference and/or training logic 1015 are provided herein in conjunction with FIGS. 10A and/or 10B. In at least one embodiment, inference and/or training logic 1015 may be used in system FIG. 16 for inferencing or predicting operations based, at least in part, on weight parameters calculated using neural network training operations, neural network functions and/or architectures, or neural network use cases described herein.

Figure 17:
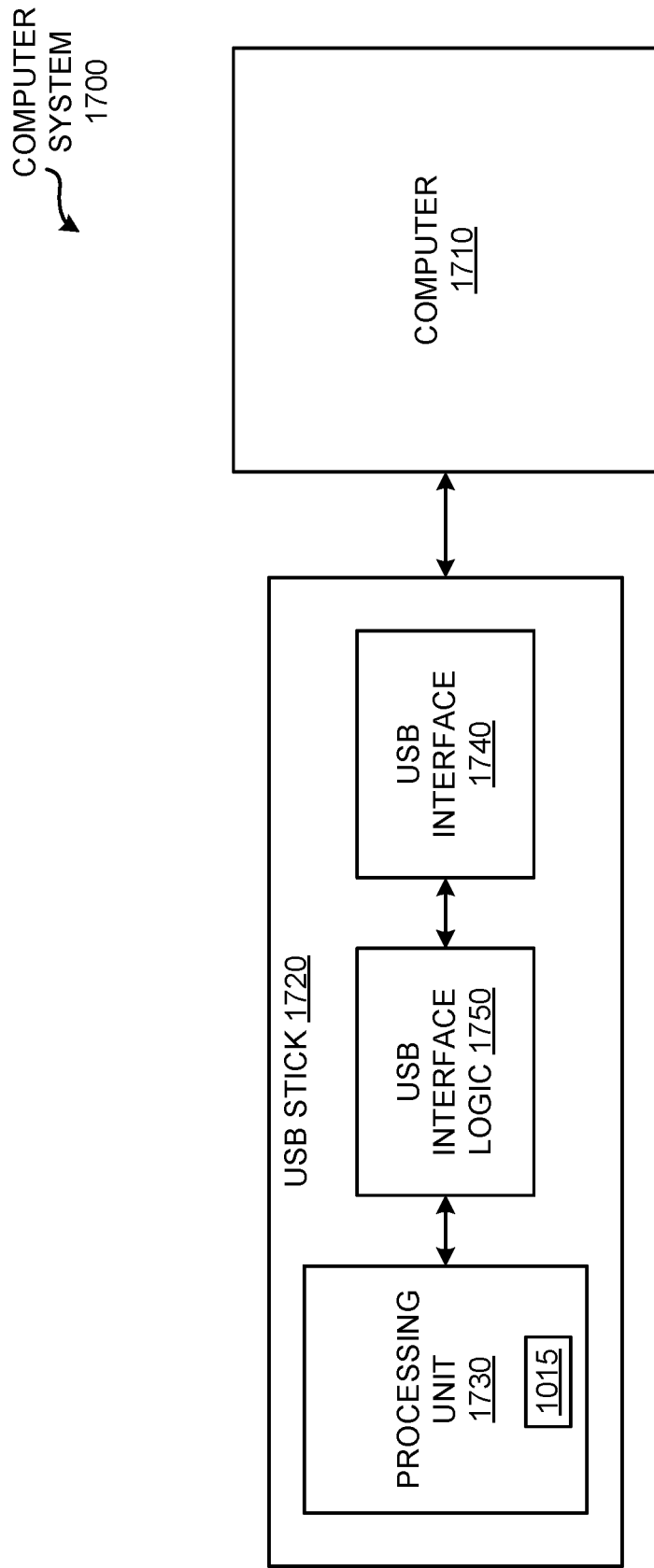
FIG. 17 illustrates a computer system, according to at least one embodiment.

FIG. 17 illustrates a computer system 1700, according to at least one embodiment. In at least one embodiment, computer system 1700 includes, without limitation, a computer 1710 and a USB stick 1720. In at least one embodiment, computer 1710 may include, without limitation, any number and type of processor(s) (not shown) and a memory (not shown). In at least one embodiment, computer 1710 includes, without limitation, a server, a cloud instance, a laptop, and a desktop computer.

In at least one embodiment, USB stick 1720 includes, without limitation, a processing unit 1730, a USB interface 1740, and USB interface logic 1750. In at least one embodiment, processing unit 1730 may be any instruction execution system, apparatus, or device capable of executing instructions. In at least one embodiment, processing unit 1730 may include, without limitation, any number and type of processing cores (not shown). In at least one embodiment, processing unit 1730 comprises an application specific integrated circuit ("ASIC") that is optimized to perform any amount and type of operations associated with machine learning. For instance, in at least one embodiment, processing unit 1730 is a tensor processing unit ("TPC") that is optimized to perform machine learning inference operations. In at least one embodiment, processing unit 1730 is a vision processing unit ("VPU") that is optimized to perform machine vision and machine learning inference operations.

In at least one embodiment, USB interface 1740 may be any type of USB connector or USB socket. For instance, in at least one embodiment, USB interface 1740 is a USB 3.0 Type-C socket for data and power. In at least one embodiment, USB interface 1740 is a USB 3.0 Type-A connector. In at least one embodiment, USB interface logic 1750 may include any amount and type of logic that enables processing unit 1730 to interface with devices (e.g., computer 1710) via USB connector 1740.

Inference and/or training logic 1015 are used to perform inferencing and/or training operations associated with one or more embodiments. Details regarding inference and/or training logic 1015 are provided herein in conjunction with FIGS. 10A and/or 10B. In at least one embodiment, inference and/or training logic 1015 may be used in system FIG. 17 for inferencing or predicting operations based, at least in part, on weight parameters calculated using neural network training operations, neural network functions and/or architectures, or neural network use cases described herein.

Figure 18A:
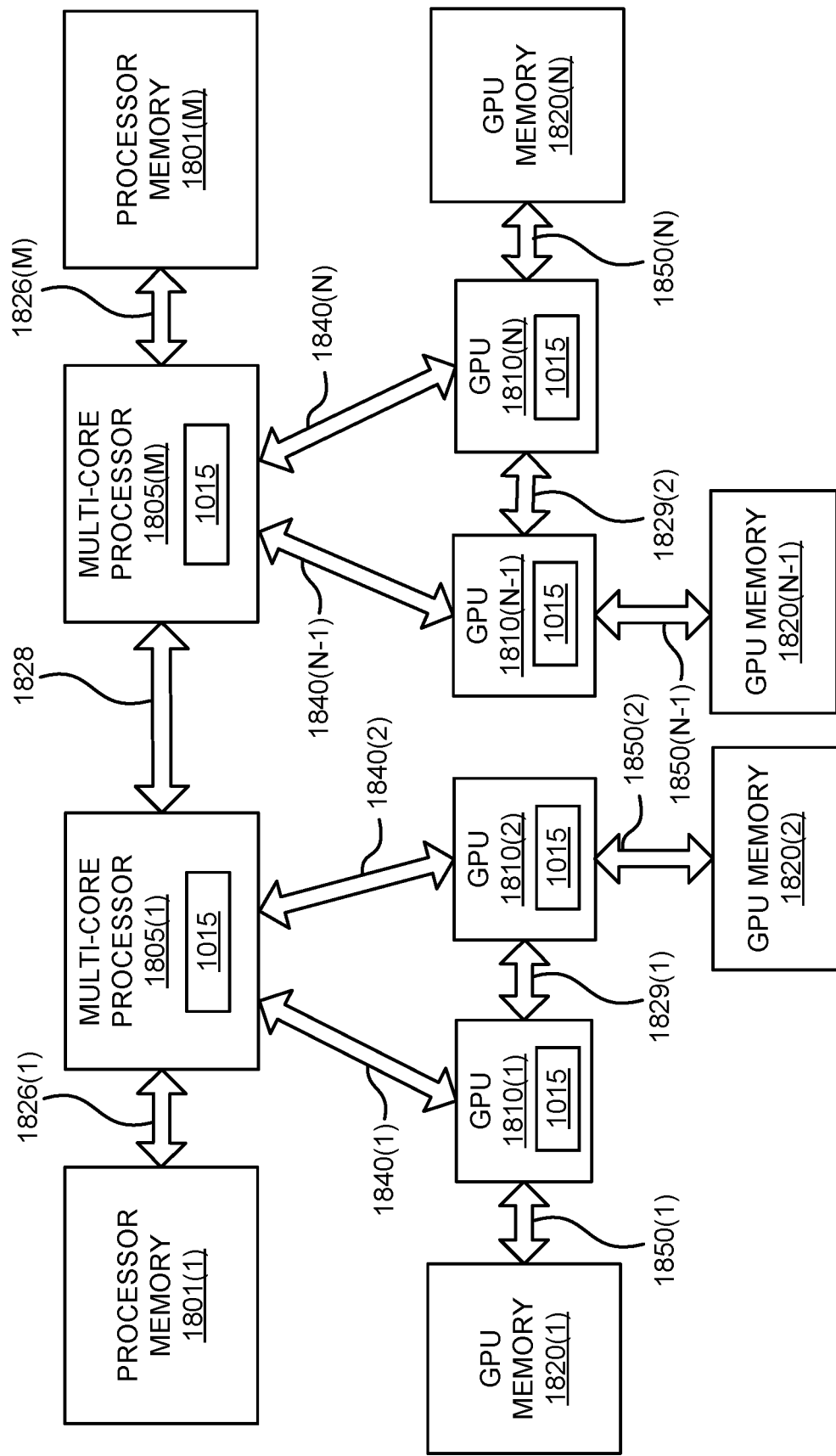
FIG. 18A illustrates a computer system, according to at least one embodiment.

FIG. 18A illustrates an exemplary architecture in which a plurality of GPUs 1810(1)-1810(N) is communicatively coupled to a plurality of multi-core processors 1805(1)-1805

(M) over high-speed links 1840(1)-1840(N) (e.g., buses, point-to-point interconnects, etc.). In at least one embodiment, high-speed links 1840(1)-1840(N) support a communication throughput of 4 GB/s, 30 GB/s, 80 GB/s or higher. In at least one embodiment, various interconnect protocols may be used including, but not limited to, PCIe 4.0 or 5.0 and NVLink 2.0. In various figures, "N" and "M" represent positive integers, values of which may be different from figure to figure.

In addition, and in at least one embodiment, two or more of GPUs 1810 are interconnected over high-speed links 1829(1)-1829(2), which may be implemented using similar or different protocols/links than those used for high-speed links 1840(1)-1840(N). Similarly, two or more of multi-core processors 1805 may be connected over a high-speed link 1828 which may be symmetric multi-processor (SMP) buses operating at 20 GB/s, 30 GB/s, 120 GB/s or higher. Alternatively, all communication between various system components shown in FIG. 18A may be accomplished using similar protocols/links (e.g., over a common interconnection fabric).

In at least one embodiment, each multi-core processor 1805 is communicatively coupled to a processor memory 1801(1)-1801(M), via memory interconnects 1826(1)-1826(M), respectively, and each GPU 1810(1)-1810(N) is communicatively coupled to GPU memory 1820(1)-1820(N) over GPU memory interconnects 1850(1)-1850(N), respectively. In at least one embodiment, memory interconnects 1826 and 1850 may utilize similar or different memory access technologies. By way of example, and not limitation, processor memories 1801(1)-1801(M) and GPU memories 1820 may be volatile memories such as dynamic random access memories (DRAMs) (including stacked DRAMs), Graphics DDR SDRAM (GDDR) (e.g., GDDR5, GDDR6), or High Bandwidth Memory (HBM) and/or may be non-volatile memories such as 3D XPoint or Nano-Ram. In at least one embodiment, some portion of processor memories 1801 may be volatile memory and another portion may be non-volatile memory (e.g., using a two-level memory (2LM) hierarchy).

As described herein, although various multi-core processors 1805 and GPUs 1810 may be physically coupled to a particular memory 1801, 1820, respectively, and/or a unified memory architecture may be implemented in which a virtual system address space (also referred to as "effective address" space) is distributed among various physical memories. For example, processor memories 1801(1)-1801(M) may each comprise 64 GB of system memory address space and GPU memories 1820(1)-1820(N) may each comprise 32 GB of system memory address space resulting in a total of 256 GB addressable memory when M=2 and N=4. Other values for N and M are possible.

Figure 18B:
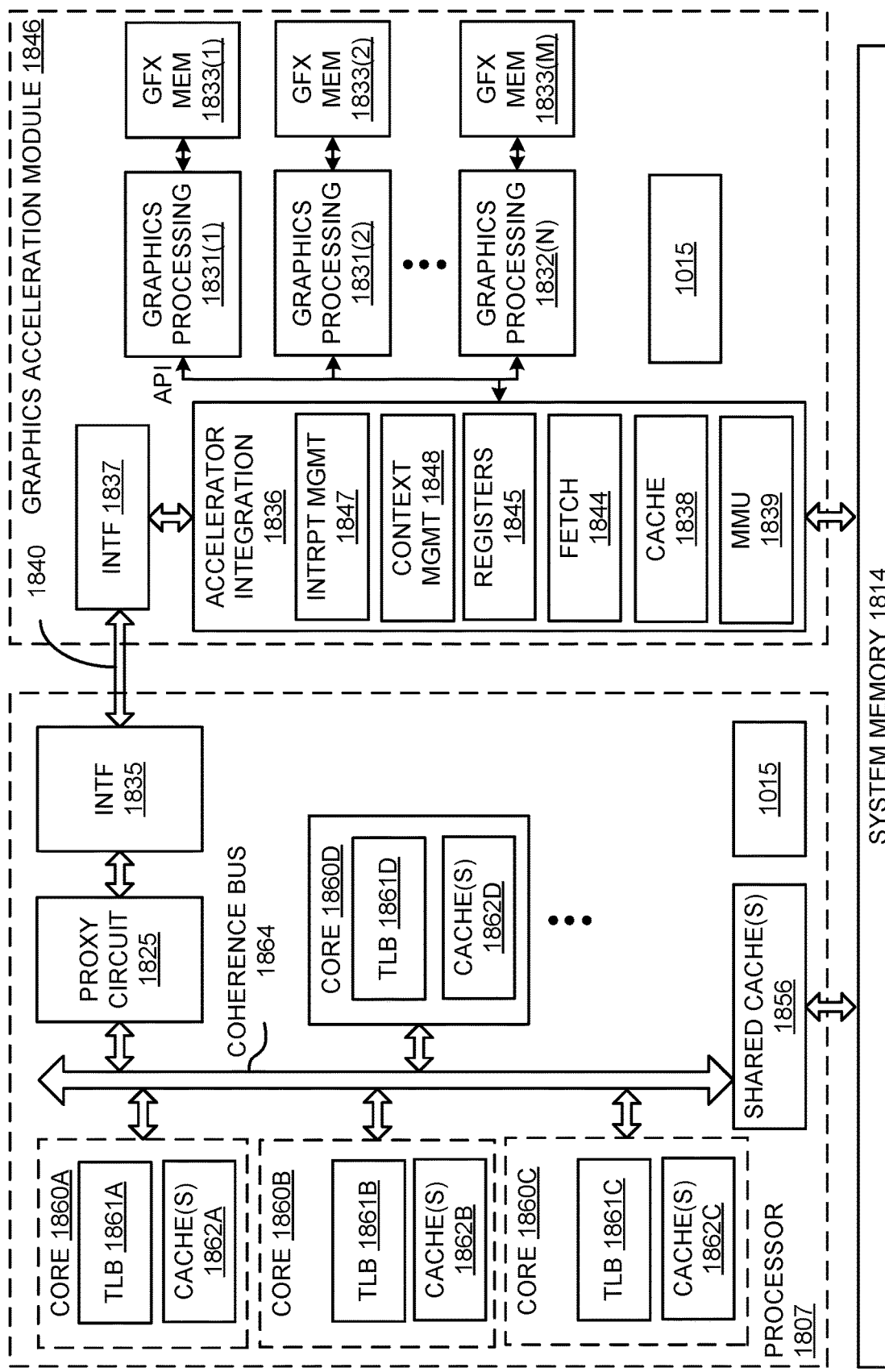
FIG. 18B illustrates a computer system, according to at least one embodiment.

FIG. 18B illustrates additional details for an interconnection between a multi-core processor 1807 and a graphics acceleration module 1846 in accordance with one exemplary embodiment. In at least one embodiment, graphics acceleration module 1846 may include one or more GPU chips integrated on a line card which is coupled to processor 1807 via high-speed link 1840 (e.g., a PCIe bus, NVLink, etc.). In at least one embodiment, graphics acceleration module 1846 may alternatively be integrated on a package or chip with processor 1807.

In at least one embodiment, processor 1807 includes a plurality of cores 1860A-1860D, each with a translation lookaside buffer ("TLB") 1861A-1861D and one or more caches 1862A-1862D. In at least one embodiment, cores 1860A-1860D may include various other components for executing instructions and processing data that are not illustrated. In at least one embodiment, caches 1862A-1862D may comprise Level 1 (L1) and Level 2 (L2) caches. In addition, one or more shared caches 1856 may be included in caches 1862A-1862D and shared by sets of cores 1860A-1860D. For example, one embodiment of processor 1807 includes 24 cores, each with its own L1 cache, twelve shared L2 caches, and twelve shared L3 caches. In this embodiment, one or more L2 and L3 caches are shared by two adjacent cores. In at least one embodiment, processor 1807 and graphics acceleration module 1846 connect with system memory 1814, which may include processor memories 1801(1)-1801(M) of FIG. 18A.

In at least one embodiment, coherency is maintained for data and instructions stored in various caches 1862A-1862D, 1856 and system memory 1814 via inter-core communication over a coherence bus 1864. In at least one embodiment, for example, each cache may have cache coherency logic/circuitry associated therewith to communicate to over coherence bus 1864 in response to detected reads or writes to particular cache lines. In at least one embodiment, a cache snooping protocol is implemented over coherence bus 1864 to snoop cache accesses.

In at least one embodiment, a proxy circuit 1825 communicatively couples graphics acceleration module 1846 to coherence bus 1864, allowing graphics acceleration module 1846 to participate in a cache coherence protocol as a peer of cores 1860A-1860D. In particular, in at least one embodiment, an interface 1835 provides connectivity to proxy circuit 1825 over high-speed link 1840 and an interface 1837 connects graphics acceleration module 1846 to high-speed link 1840.

In at least one embodiment, an accelerator integration circuit 1836 provides cache management, memory access, context management, and interrupt management services on behalf of a plurality of graphics processing engines 1831(1)-1831(N) of graphics acceleration module 1846. In at least one embodiment, graphics processing engines 1831(1)-1831(N) may each comprise a separate graphics processing unit (GPU). In at least one embodiment, graphics processing engines 1831(1)-1831(N) alternatively may comprise different types of graphics processing engines within a GPU, such as graphics execution units, media processing engines (e.g., video encoders/decoders), samplers, and blit engines. In at least one embodiment, graphics acceleration module 1846 may be a GPU with a plurality of graphics processing engines 1831(1)-1831(N) or graphics processing engines 1831(1)-1831(N) may be individual GPUs integrated on a common package, line card, or chip.

In at least one embodiment, accelerator integration circuit 1836 includes a memory management unit (MMU) 1839 for performing various memory management functions such as virtual-to-physical memory translations (also referred to as effective-to-real memory translations) and memory access protocols for accessing system memory 1814. In at least one embodiment, MMU 1839 may also include a translation lookaside buffer (TLB) (not shown) for caching virtual/effective to physical/real address translations. In at least one embodiment, a cache 1838 can store commands and data for efficient access by graphics processing engines 1831(1)-1831(N). In at least one embodiment, data stored in cache 1838 and graphics memories 1833(1)-1833(M) is kept coherent with core caches 1862A-1862D, 1856 and system memory 1814, possibly using a fetch unit 1844. As mentioned, this may be accomplished via proxy circuit 1825 on behalf of cache 1838 and memories 1833(1)-1833(M) (e.g., sending updates to cache 1838 related to modifications/ accesses of cache lines on processor caches 1862A-1862D, 1856 and receiving updates from cache 1838).

In at least one embodiment, a set of registers 1845 store context data for threads executed by graphics processing engines 1831(1)-1831(N) and a context management circuit 1848 manages thread contexts. For example, context management circuit 1848 may perform save and restore operations to save and restore contexts of various threads during contexts switches (e.g., where a first thread is saved and a second thread is stored so that a second thread can be execute by a graphics processing engine). For example, on a context switch, context management circuit 1848 may store current register values to a designated region in memory (e.g., identified by a context pointer). It may then restore register values when returning to a context. In at least one embodiment, an interrupt management circuit 1847 receives and processes interrupts received from system devices.

In at least one embodiment, virtual/effective addresses from a graphics processing engine 1831 are translated to real/physical addresses in system memory 1814 by MMU 1839. In at least one embodiment, accelerator integration circuit 1836 supports multiple (e.g., 4, 8, 16) graphics accelerator modules 1846 and/or other accelerator devices. In at least one embodiment, graphics accelerator module 1846 may be dedicated to a single application executed on processor 1807 or may be shared between multiple applications. In at least one embodiment, a virtualized graphics execution environment is presented in which resources of graphics processing engines 1831(1)-1831(N) are shared with multiple applications or virtual machines (VMs). In at least one embodiment, resources may be subdivided into "slices" which are allocated to different VMs and/or applications based on processing requirements and priorities associated with VMs and/or applications.

In at least one embodiment, accelerator integration circuit 1836 performs as a bridge to a system for graphics acceleration module 1846 and provides address translation and system memory cache services. In addition, in at least one embodiment, accelerator integration circuit 1836 may provide virtualization facilities for a host processor to manage virtualization of graphics processing engines 1831(1)-1831(N), interrupts, and memory management.

In at least one embodiment, because hardware resources of graphics processing engines 1831(1)-1831(N) are mapped explicitly to a real address space seen by host processor 1807, any host processor can address these resources directly using an effective address value. In at least one embodiment, one function of accelerator integration circuit 1836 is physical separation of graphics processing engines 1831(1)-1831(N) so that they appear to a system as independent units.

In at least one embodiment, one or more graphics memories 1833(1)-1833(M) are coupled to each of graphics processing engines 1831(1)-1831(N), respectively and N=M. In at least one embodiment, graphics memories 1833(1)-1833(M) store instructions and data being processed by each of graphics processing engines 1831(1)-1831(N). In at least one embodiment, graphics memories 1833(1)-1833(M) may be volatile memories such as DRAMs (including stacked DRAMs), GDDR memory (e.g., GDDR5, GDDR6), or HBM, and/or may be non-volatile memories such as 3D XPoint or Nano-Ram.

In at least one embodiment, to reduce data traffic over high-speed link 1840, biasing techniques can be used to ensure that data stored in graphics memories 1833(1)-1833(M) is data that will be used most frequently by graphics processing engines 1831(1)-1831(N) and preferably not used by cores 1860A-1860D (at least not frequently). Similarly, in at least one embodiment, a biasing mechanism attempts to keep data needed by cores (and preferably not graphics processing engines 1831(1)-1831(N)) within caches 1862A-1862D, 1856 and system memory 1814.

Figure 18C:
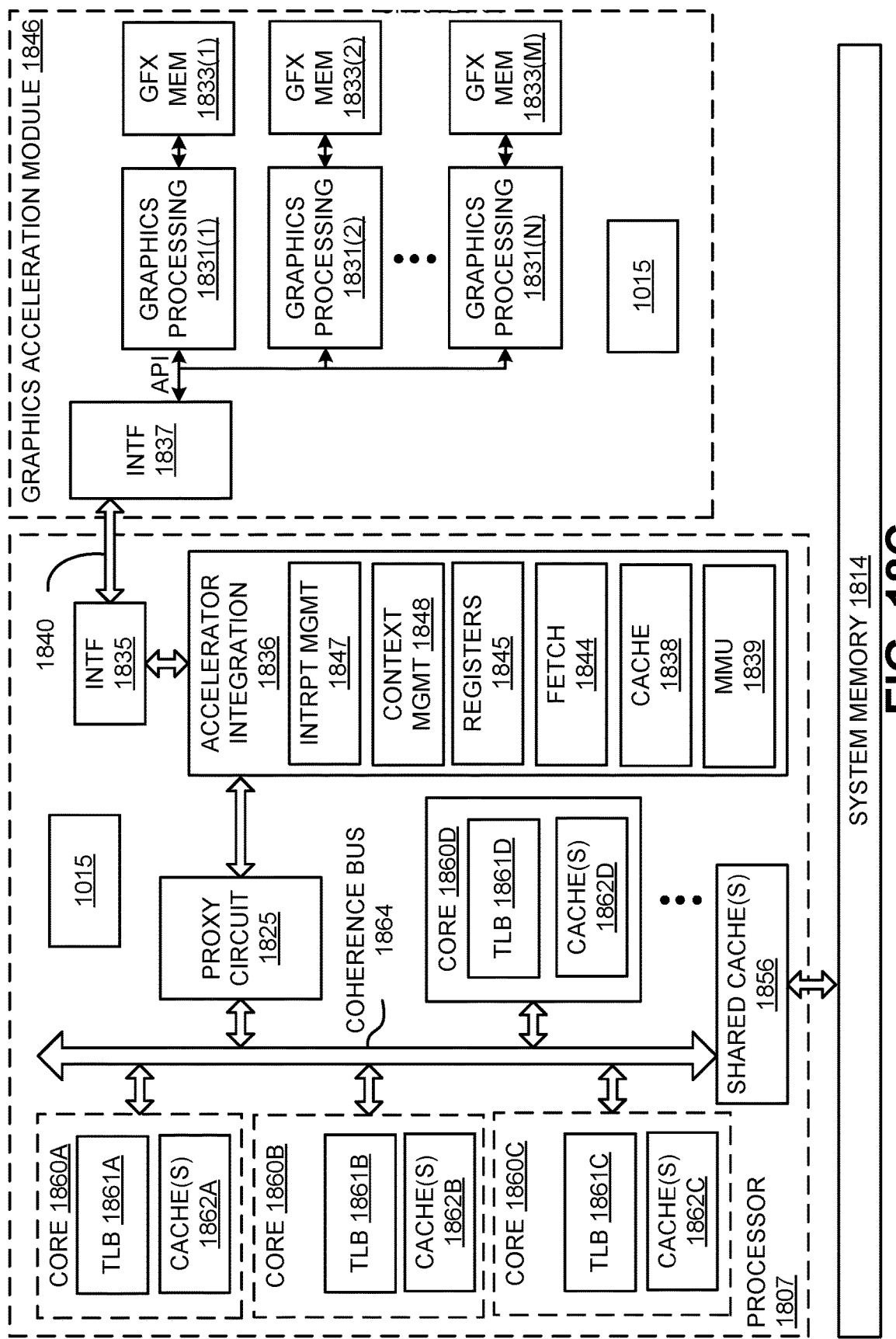
FIG. 18C illustrates a computer system, according to at least one embodiment.

FIG. 18C illustrates another exemplary embodiment in which accelerator integration circuit 1836 is integrated within processor 1807. In this embodiment, graphics processing engines 1831(1)-1831(N) communicate directly over high-speed link 1840 to accelerator integration circuit 1836 via interface 1837 and interface 1835 (which, again, may be any form of bus or interface protocol). In at least one embodiment, accelerator integration circuit 1836 may perform similar operations as those described with respect to FIG. 18B, but potentially at a higher throughput given its close proximity to coherence bus 1864 and caches 1862A-1862D, 1856. In at least one embodiment, an accelerator integration circuit supports different programming models including a dedicated-process programming model (no graphics acceleration module virtualization) and shared programming models (with virtualization), which may include programming models which are controlled by accelerator integration circuit 1836 and programming models which are controlled by graphics acceleration module 1846.

In at least one embodiment, graphics processing engines 1831(1)-1831(N) are dedicated to a single application or process under a single operating system. In at least one embodiment, a single application can funnel other application requests to graphics processing engines 1831(1)-1831(N), providing virtualization within a VM/partition.

In at least one embodiment, graphics processing engines 1831(1)-1831(N), may be shared by multiple VM/application partitions. In at least one embodiment, shared models may use a system hypervisor to virtualize graphics processing engines 1831(1)-1831(N) to allow access by each operating system. In at least one embodiment, for single-partition systems without a hypervisor, graphics processing engines 1831(1)-1831(N) are owned by an operating system. In at least one embodiment, an operating system can virtualize graphics processing engines 1831(1)-1831(N) to provide access to each process or application.

In at least one embodiment, graphics acceleration module 1846 or an individual graphics processing engine 1831(1)-1831(N) selects a process element using a process handle. In at least one embodiment, process elements are stored in system memory 1814 and are addressable using an effective address to real address translation technique described herein. In at least one embodiment, a process handle may be an implementation-specific value provided to a host process when registering its context with graphics processing engine 1831(1)-1831(N) (that is, calling system software to add a process element to a process element linked list). In at least one embodiment, a lower 16-bits of a process handle may be an offset of a process element within a process element linked list.

Figure 18D:
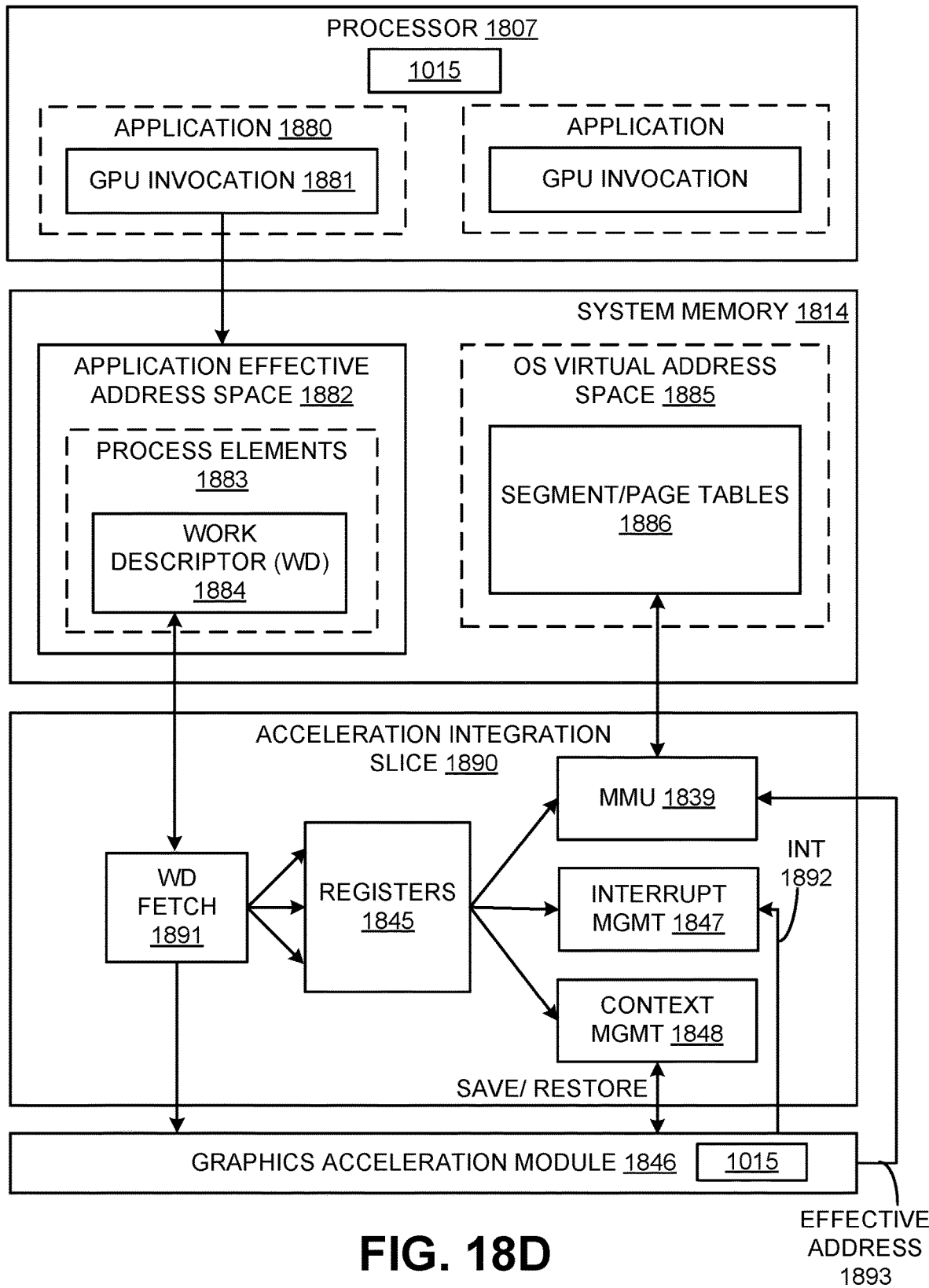
FIG. 18D illustrates a computer system, according to at least one embodiment.

FIG. 18D illustrates an exemplary accelerator integration slice 1890. In at least one embodiment, a "slice" comprises a specified portion of processing resources of accelerator integration circuit 1836. In at least one embodiment, an application is effective address space 1882 within system memory 1814 stores process elements 1883. In at least one embodiment, process elements 1883 are stored in response to GPU invocations 1881 from applications 1880 executed on processor 1807. In at least one embodiment, a process element 1883 contains process state for corresponding application 1880. In at least one embodiment, a work descriptor (WD) 1884 contained in process element 1883 can be a single job requested by an application or may contain a pointer to a queue of jobs. In at least one embodiment, WD 1884 is a pointer to a job request queue in an application's effective address space 1882.

In at least one embodiment, graphics acceleration module 1846 and/or individual graphics processing engines 1831(1)-1831(N) can be shared by all or a subset of processes in a system. In at least one embodiment, an infrastructure for setting up process states and sending a WD 1884 to a graphics acceleration module 1846 to start a job in a virtualized environment may be included.

In at least one embodiment, a dedicated-process programming model is implementation specific. In at least one embodiment, in this model, a single process owns graphics acceleration module 1846 or an individual graphics processing engine 1831. In at least one embodiment, when graphics acceleration module 1846 is owned by a single process, a hypervisor initializes accelerator integration circuit 1836 for an owning partition and an operating system initializes accelerator integration circuit 1836 for an owning process when graphics acceleration module 1846 is assigned.

In at least one embodiment, in operation, a WD fetch unit 1891 in accelerator integration slice 1890 fetches next WD 1884, which includes an indication of work to be done by one or more graphics processing engines of graphics acceleration module 1846. In at least one embodiment, data from WD 1884 may be stored in registers 1845 and used by MMU 1839, interrupt management circuit 1847 and/or context management circuit 1848 as illustrated. For example, one embodiment of MMU 1839 includes segment/page walk circuitry for accessing segment/page tables 1886 within an OS virtual address space 1885. In at least one embodiment, interrupt management circuit 1847 may process interrupt events 1892 received from graphics acceleration module 1846. In at least one embodiment, when performing graphics operations, an effective address 1893 generated by a graphics processing engine 1831(1)-1831(N) is translated to a real address by MMU 1839.

In at least one embodiment, registers 1845 are duplicated for each graphics processing engine 1831(1)-1831(N) and/or graphics acceleration module 1846 and may be initialized by a hypervisor or an operating system. In at least one embodiment, each of these duplicated registers may be included in an accelerator integration slice 1890. Exemplary registers that may be initialized by a hypervisor are shown in Table 1.

TABLE 1

Hypervisor Initialized Registers

| Register # | Description |
|---|---|
| 1 | Slice Control Register |
| 2 | Real Address (RA) Scheduled Processes Area Pointer |
| 3 | Authority Mask Override Register |
| 4 | Interrupt Vector Table Entry Offset |
| 5 | Interrupt Vector Table Entry Limit |
| 6 | State Register |
| 7 | Logical Partition ID |
| 8 | Real address (RA) Hypervisor Accelerator Utilization Record Pointer |
| 9 | Storage Description Register |

Exemplary registers that may be initialized by an operating system are shown in Table 2.

TABLE 2

Operating System Initialized Registers

| Register # | Description |
|---|---|
| 1 | Process and Thread Identification |
| 2 | Effective Address (EA) Context Save/Restore Pointer |
| 3 | Virtual Address (VA) Accelerator Utilization Record Pointer |
| 4 | Virtual Address (VA) Storage Segment Table Pointer |
| 5 | Authority Mask |
| 6 | Work descriptor |

In at least one embodiment, each WD 1884 is specific to a particular graphics acceleration module 1846 and/or graphics processing engines 1831(1)-1831(N). In at least one embodiment, it contains all information required by a graphics processing engine 1831(1)-1831(N) to do work, or it can be a pointer to a memory location where an application has set up a command queue of work to be completed.

Figure 18E:
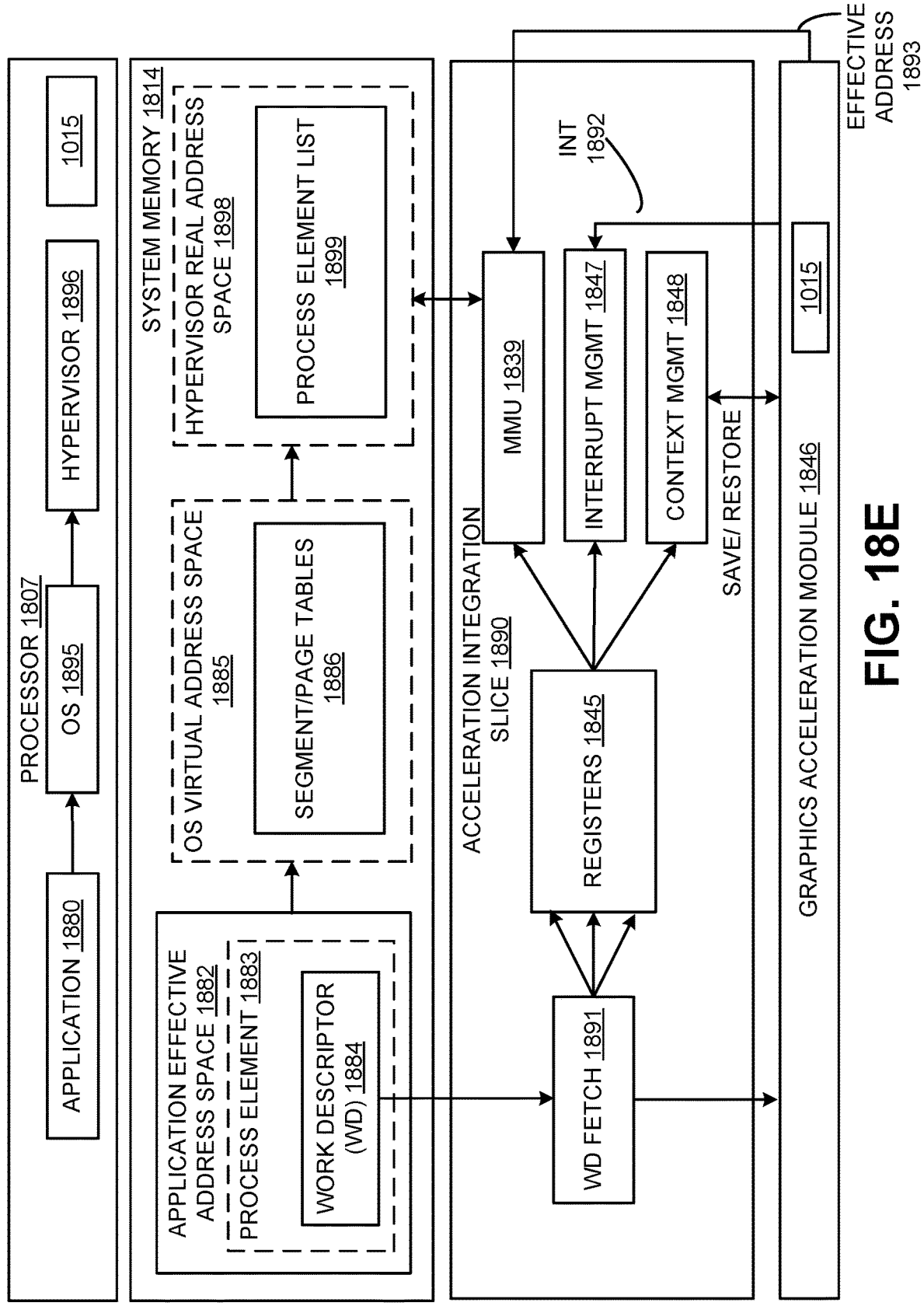
FIGS. 18E and 18F illustrate a shared programming model, according to at least one embodiment.

FIG. 18E illustrates additional details for one exemplary embodiment of a shared model. This embodiment includes a hypervisor real address space 1898 in which a process element list 1899 is stored. In at least one embodiment, hypervisor real address space 1898 is accessible via a hypervisor 1896 which virtualizes graphics acceleration module engines for operating system 1895.

In at least one embodiment, shared programming models allow for all or a subset of processes from all or a subset of partitions in a system to use a graphics acceleration module 1846. In at least one embodiment, there are two programming models where graphics acceleration module 1846 is shared by multiple processes and partitions, namely time-sliced shared and graphics directed shared.

In at least one embodiment, in this model, system hypervisor 1896 owns graphics acceleration module 1846 and makes its function available to all operating systems 1895. In at least one embodiment, for a graphics acceleration module 1846 to support virtualization by system hypervisor 1896, graphics acceleration module 1846 may adhere to certain requirements, such as (1) an application's job request must be autonomous (that is, state does not need to be maintained between jobs), or graphics acceleration module 1846 must provide a context save and restore mechanism, (2) an application's job request is guaranteed by graphics acceleration module 1846 to complete in a specified amount of time, including any translation faults, or graphics acceleration module 1846 provides an ability to preempt processing of a job, and (3) graphics acceleration module 1846 must be guaranteed fairness between processes when operating in a directed shared programming model.

In at least one embodiment, application 1880 is required to make an operating system 1895 system call with a graphics acceleration module type, a work descriptor (WD), an authority mask register (AMR) value, and a context save/restore area pointer (CSRP). In at least one embodiment, graphics acceleration module type describes a targeted acceleration function for a system call. In at least one embodiment, graphics acceleration module type may be a system-specific value. In at least one embodiment, WD is formatted specifically for graphics acceleration module 1846 and can be in a form of a graphics acceleration module 1846 command, an effective address pointer to a user-defined structure, an effective address pointer to a queue of commands, or any other data structure to describe work to be done by graphics acceleration module 1846.

In at least one embodiment, an AMR value is an AMR state to use for a current process. In at least one embodiment, a value passed to an operating system is similar to an application setting an AMR. In at least one embodiment, if accelerator integration circuit 1836 (not shown) and graphics acceleration module 1846 implementations do not support a User Authority Mask Override Register (UAMOR), an operating system may apply a current UAMOR value to an AMR value before passing an AMR in a hypervisor call. In at least one embodiment, hypervisor 1896 may optionally apply a current Authority Mask Override Register (AMOR) value before placing an AMR into process element 1883. In at least one embodiment, CSRP is one of registers 1845 containing an effective address of an area in an application's effective address space 1882 for graphics acceleration module 1846 to save and restore context state. In at least one embodiment, this pointer is optional if no state is required to be saved between jobs or when a job is preempted. In at least one embodiment, context save/restore area may be pinned system memory.

Upon receiving a system call, operating system 1895 may verify that application 1880 has registered and been given authority to use graphics acceleration module 1846. In at least one embodiment, operating system 1895 then calls hypervisor 1896 with information shown in Table 3.

TABLE 3

| OS to Hypervisor Call Parameters | |
| --- | --- |
| Parameter # | Description |
| 1 | A work descriptor (WD) |
| 2 | An Authority Mask Register (AMR) value (potentially masked) |
| 3 | An effective address (EA) Context Save/Restore Area Pointer (CSRP) |
| 4 | A process ID (PID) and optional thread ID (TID) |
| 5 | A virtual address (VA) accelerator utilization record pointer (AURP) |
| 6 | Virtual address of storage segment table pointer (SSTP) |
| 7 | A logical interrupt service number (LISN) |

In at least one embodiment, upon receiving a hypervisor call, hypervisor 1896 verifies that operating system 1895 has registered and been given authority to use graphics acceleration module 1846. In at least one embodiment, hypervisor 1896 then puts process element 1883 into a process element linked list for a corresponding graphics acceleration module 1846 type. In at least one embodiment, a process element may include information shown in Table 4.

TABLE 4

| Process Element Information | |
| --- | --- |
| Element # | Description |
| 1 | A work descriptor (WD) |
| 2 | An Authority Mask Register (AMR) value (potentially masked). |
| 3 | An effective address (EA) Context Save/Restore Area Pointer (CSRP) |
| 4 | A process ID (PID) and optional thread ID (TID) |
| 5 | A virtual address (VA) accelerator utilization record pointer (AURP) |
| 6 | Virtual address of storage segment table pointer (SSTP) |
| 7 | A logical interrupt service number (LISN) |
| 8 | Interrupt vector table, derived from hypervisor call parameters |
| 9 | A state register (SR) value |
| 10 | A logical partition ID (LPID) |

TABLE 4-continued

| Process Element Information | |
| --- | --- |
| Element # | Description |
| 11 | A real address (RA) hypervisor accelerator utilization record pointer |
| 12 | Storage Descriptor Register (SDR) |

In at least one embodiment, hypervisor initializes a plurality of accelerator integration 890 registers 1845.

Figure 18F:
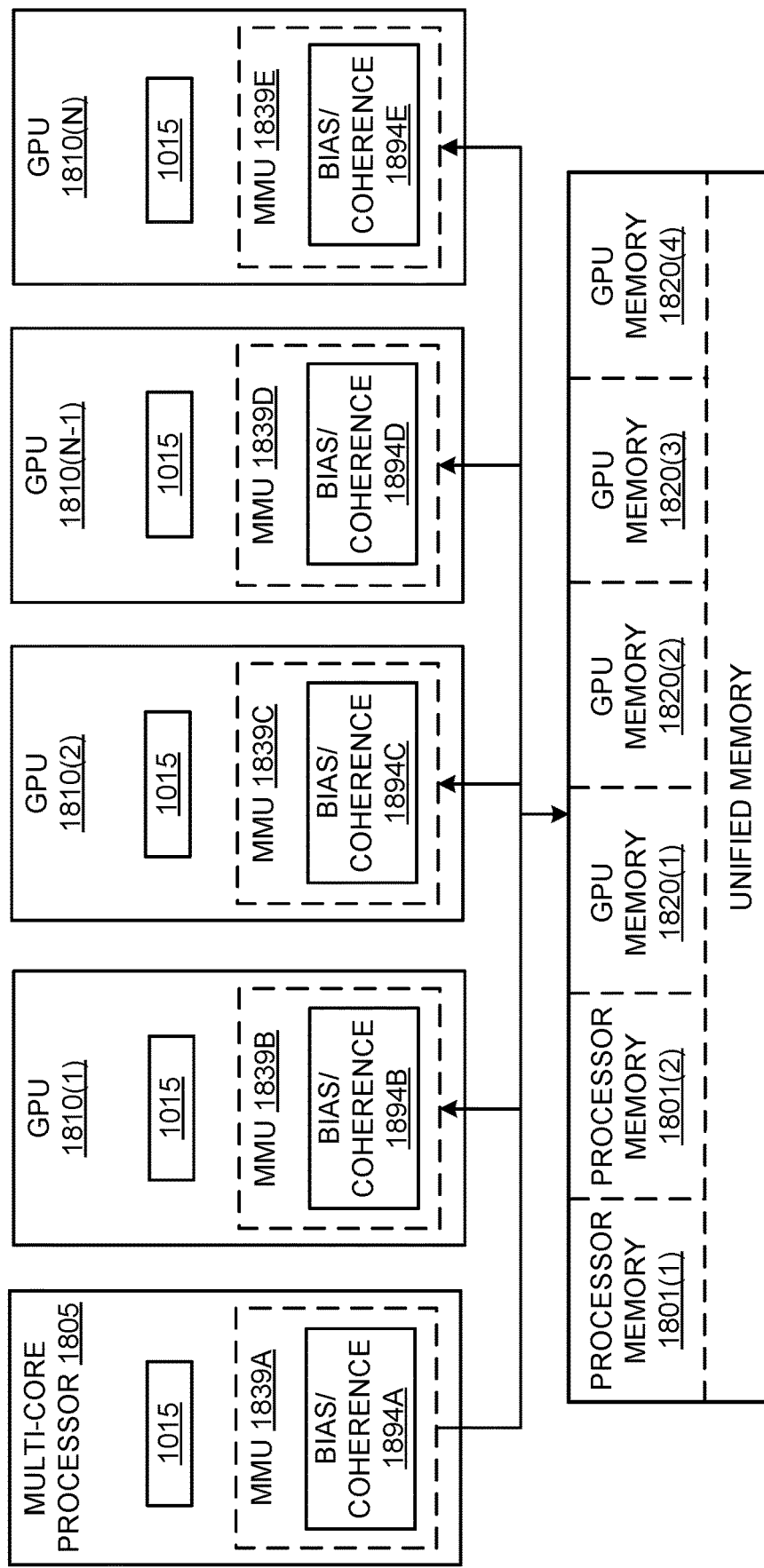

As illustrated in FIG. 18F, in at least one embodiment, a unified memory is used, addressable via a common virtual memory address space used to access physical processor memories 1801(1)-1801(N) and GPU memories 1820(1)-1820(N). In this implementation, operations executed on GPUs 1810(1)-1810(N) utilize a same virtual/effective memory address space to access processor memories 1801(1)-1801(M) and vice versa, thereby simplifying programmability. In at least one embodiment, a first portion of a virtual/effective address space is allocated to processor memory 1801(1), a second portion to second processor memory 1801(N), a third portion to GPU memory 1820(1), and so on. In at least one embodiment, an entire virtual/effective memory space (sometimes referred to as an effective address space) is thereby distributed across each of processor memories 1801 and GPU memories 1820, allowing any processor or GPU to access any physical memory with a virtual address mapped to that memory.

In at least one embodiment, bias/coherence management circuitry 1894A-1894E within one or more of MMUs 1839A-1839E ensures cache coherence between caches of one or more host processors (e.g., 1805) and GPUs 1810 and implements biasing techniques indicating physical memories in which certain types of data should be stored. In at least one embodiment, while multiple instances of bias/coherence management circuitry 1894A-1894E are illustrated in FIG. 18F, bias/coherence circuitry may be implemented within an MMU of one or more host processors 1805 and/or within accelerator integration circuit 1836.

One embodiment allows GPU memories 1820 to be mapped as part of system memory, and accessed using shared virtual memory (SVM) technology, but without suffering performance drawbacks associated with full system cache coherence. In at least one embodiment, an ability for GPU memories 1820 to be accessed as system memory without onerous cache coherence overhead provides a beneficial operating environment for GPU offload. In at least one embodiment, this arrangement allows software of host processor 1805 to setup operands and access computation results, without overhead of tradition I/O DMA data copies. In at least one embodiment, such traditional copies involve driver calls, interrupts and memory mapped I/O (MMIO) accesses that are all inefficient relative to simple memory accesses. In at least one embodiment, an ability to access GPU memories 1820 without cache coherence overheads can be critical to execution time of an offloaded computation. In at least one embodiment, in cases with substantial streaming write memory traffic, for example, cache coherence overhead can significantly reduce an effective write bandwidth seen by a GPU 1810. In at least one embodiment, efficiency of operand setup, efficiency of results access, and efficiency of GPU computation may play a role in determining effectiveness of a GPU offload.

In at least one embodiment, selection of GPU bias and host processor bias is driven by a bias tracker data structure. In at least one embodiment, a bias table may be used, for example, which may be a page-granular structure (e.g., controlled at a granularity of a memory page) that includes 1 or 2 bits per GPU-attached memory page. In at least one embodiment, a bias table may be implemented in a stolen memory range of one or more GPU memories 1820, with or without a bias cache in a GPU 1810 (e.g., to cache frequently/recently used entries of a bias table). Alternatively, in at least one embodiment, an entire bias table may be maintained within a GPU.

In at least one embodiment, a bias table entry associated with each access to a GPU attached memory 1820 is accessed prior to actual access to a GPU memory, causing following operations. In at least one embodiment, local requests from a GPU 1810 that find their page in GPU bias are forwarded directly to a corresponding GPU memory 1820. In at least one embodiment, local requests from a GPU that find their page in host bias are forwarded to processor 1805 (e.g., over a high-speed link as described herein). In at least one embodiment, requests from processor 1805 that find a requested page in host processor bias complete a request like a normal memory read. Alternatively, requests directed to a GPU-biased page may be forwarded to a GPU 1810. In at least one embodiment, a GPU may then transition a page to a host processor bias if it is not currently using a page. In at least one embodiment, a bias state of a page can be changed either by a software-based mechanism, a hardware-assisted software-based mechanism, or, for a limited set of cases, a purely hardware-based mechanism.

In at least one embodiment, one mechanism for changing bias state employs an API call (e.g., OpenCL), which, in turn, calls a GPU's device driver which, in turn, sends a message (or enqueues a command descriptor) to a GPU directing it to change a bias state and, for some transitions, perform a cache flushing operation in a host. In at least one embodiment, a cache flushing operation is used for a transition from host processor 1805 bias to GPU bias, but is not for an opposite transition.

In at least one embodiment, cache coherency is maintained by temporarily rendering GPU-biased pages uncacheable by host processor 1805. In at least one embodiment, to access these pages, processor 1805 may request access from GPU 1810, which may or may not grant access right away. In at least one embodiment, thus, to reduce communication between processor 1805 and GPU 1810 it is beneficial to ensure that GPU-biased pages are those which are required by a GPU but not host processor 1805 and vice versa.

Hardware structure(s) 1015 are used to perform one or more embodiments. Details regarding a hardware structure(s) 1015 may be provided herein in conjunction with FIGS. 10A and/or 10B.

Figure 19:
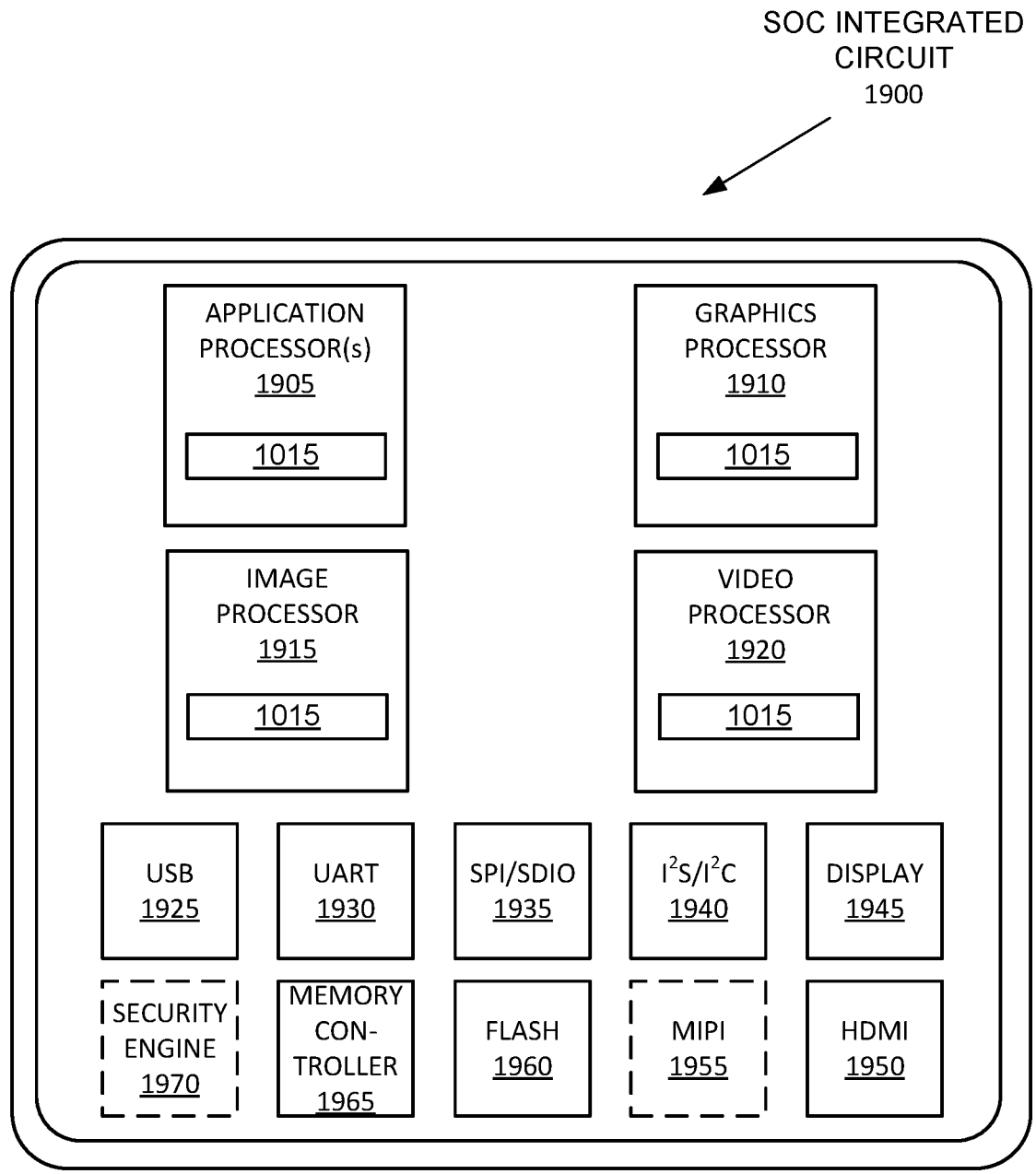
FIG. 19 illustrates exemplary integrated circuits and associated graphics processors, according to at least one embodiment.

FIG. 19 illustrates exemplary integrated circuits and associated graphics processors that may be fabricated using one or more IP cores, according to various embodiments described herein. In addition to what is illustrated, other logic and circuits may be included in at least one embodiment, including additional graphics processors/cores, peripheral interface controllers, or general-purpose processor cores.

FIG. 19 is a block diagram illustrating an exemplary system on a chip integrated circuit 1900 that may be fabricated using one or more IP cores, according to at least one embodiment. In at least one embodiment, integrated circuit 1900 includes one or more application processor(s) 1905 (e.g., CPUs), at least one graphics processor 1910, and may additionally include an image processor 1915 and/or a video processor 1920, any of which may be a modular IP core. In at least one embodiment, integrated circuit 1900 includes peripheral or bus logic including a USB controller 1925, a UART controller 1930, an SPI/SDIO controller 1935, and an I²S/I²C controller 1940. In at least one embodiment, integrated circuit 1900 can include a display device 1945 coupled to one or more of a high-definition multimedia interface (HDMI) controller 1950 and a mobile industry processor interface (MIPI) display interface 1955. In at least one embodiment, storage may be provided by a flash memory subsystem 1960 including flash memory and a flash memory controller. In at least one embodiment, a memory interface may be provided via a memory controller 1965 for access to SDRAM or SRAM memory devices. In at least one embodiment, some integrated circuits additionally include an embedded security engine 1970.

Inference and/or training logic 1015 are used to perform inferencing and/or training operations associated with one or more embodiments. Details regarding inference and/or training logic 1015 are provided herein in conjunction with FIGS. 10A and/or 10B. In at least one embodiment, inference and/or training logic 1015 may be used in integrated circuit 1900 for inferencing or predicting operations based, at least in part, on weight parameters calculated using neural network training operations, neural network functions and/or architectures, or neural network use cases described herein.

Figure 20A:
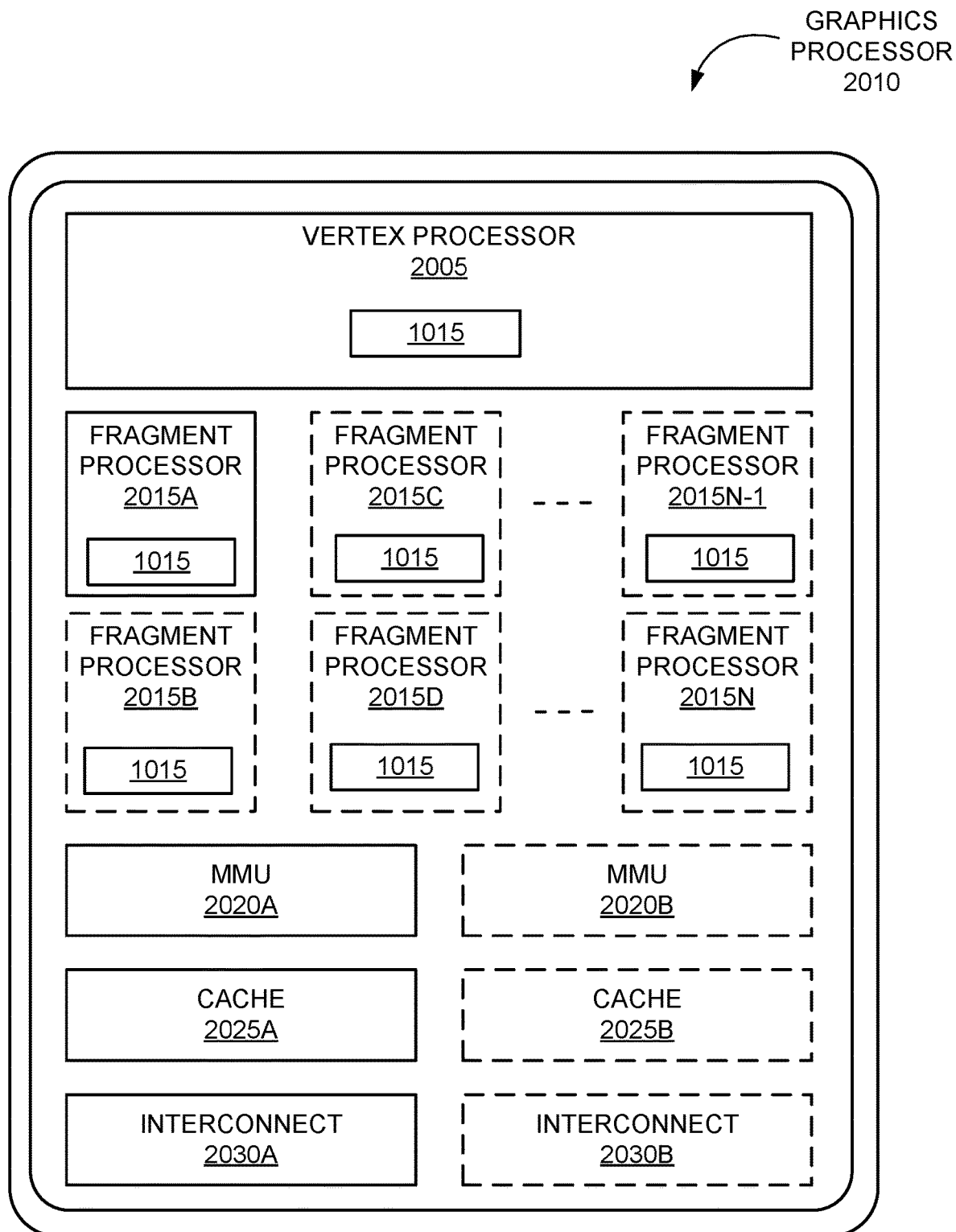
FIGS. 20A-20B illustrate exemplary integrated circuits and associated graphics processors, according to at least one embodiment.
Figure 20B:
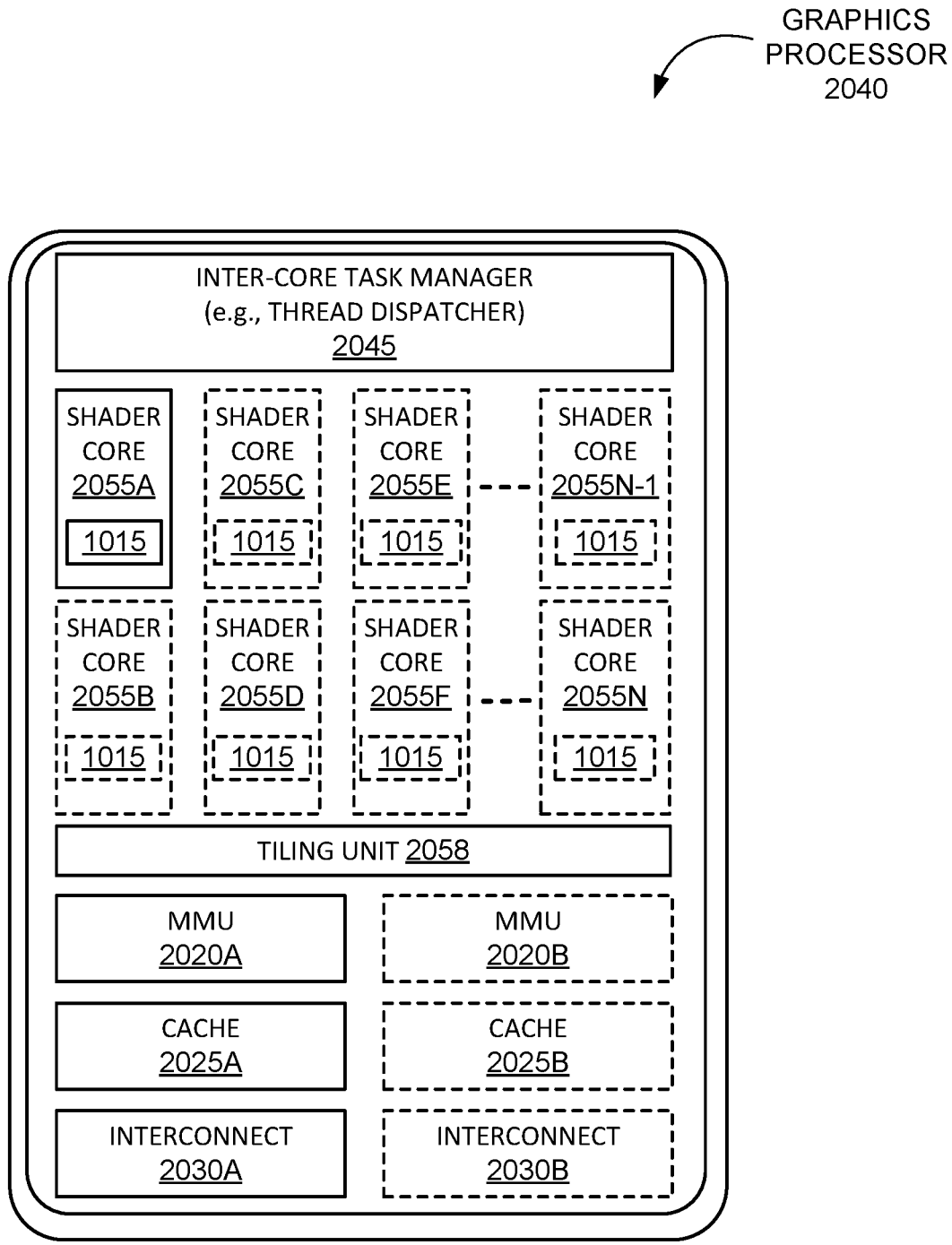

FIGS. 20A-20B illustrate exemplary integrated circuits and associated graphics processors that may be fabricated using one or more IP cores, according to various embodiments described herein. In addition to what is illustrated, other logic and circuits may be included in at least one embodiment, including additional graphics processors/cores, peripheral interface controllers, or general-purpose processor cores.

FIGS. 20A-20B are block diagrams illustrating exemplary graphics processors for use within an SoC, according to embodiments described herein. FIG. 20A illustrates an exemplary graphics processor 2010 of a system on a chip integrated circuit that may be fabricated using one or more IP cores, according to at least one embodiment. FIG. 20B illustrates an additional exemplary graphics processor 2040 of a system on a chip integrated circuit that may be fabricated using one or more IP cores, according to at least one embodiment. In at least one embodiment, graphics processor 2010 of FIG. 20A is a low power graphics processor core. In at least one embodiment, graphics processor 2040 of FIG. 20B is a higher performance graphics processor core. In at least one embodiment, each of graphics processors 2010, 2040 can be variants of graphics processor 1910 of FIG. 19.

In at least one embodiment, graphics processor 2010 includes a vertex processor 2005 and one or more fragment processor(s) 2015A-2015N (e.g., 2015A, 2015B, 2015C, 2015D, through 2015N-1, and 2015N). In at least one embodiment, graphics processor 2010 can execute different shader programs via separate logic, such that vertex processor 2005 is optimized to execute operations for vertex shader programs, while one or more fragment processor(s) 2015A-2015N execute fragment (e.g., pixel) shading operations for fragment or pixel shader programs. In at least one embodiment, vertex processor 2005 performs a vertex processing stage of a 3D graphics pipeline and generates primitives and vertex data. In at least one embodiment, fragment processor(s) 2015A-2015N use primitive and vertex data generated by vertex processor 2005 to produce a framebuffer that is displayed on a display device. In at least one embodiment, fragment processor(s) 2015A-2015N are optimized to execute fragment shader programs as provided for in an OpenGL API, which may be used to perform similar operations as a pixel shader program as provided for in a Direct 3D API.

In at least one embodiment, graphics processor 2010 additionally includes one or more memory management units (MMUs) 2020A-2020B, cache(s) 2025A-2025B, and circuit interconnect(s) 2030A-2030B. In at least one embodiment, one or more MMU(s) 2020A-2020B provide for virtual to physical address mapping for graphics processor 2010, including for vertex processor 2005 and/or fragment processor(s) 2015A-2015N, which may reference vertex or image/texture data stored in memory, in addition to vertex or image/texture data stored in one or more cache(s) 2025A-2025B. In at least one embodiment, one or more MMU(s) 2020A-2020B may be synchronized with other MMUs within a system, including one or more MMUs associated with one or more application processor(s) 1905, image processors 1915, and/or video processors 1920 of FIG. 19, such that each processor 1905-1920 can participate in a shared or unified virtual memory system. In at least one embodiment, one or more circuit interconnect(s) 2030A-2030B enable graphics processor 2010 to interface with other IP cores within SoC, either via an internal bus of SoC or via a direct connection.

In at least one embodiment, graphics processor 2040 includes one or more shader core(s) 2055A-2055N (e.g., 2055A, 2055B, 2055C, 2055D, 2055E, 2055F, through 2055N-1, and 2055N) as shown in FIG. 20B, which provides for a unified shader core architecture in which a single core or type or core can execute all types of programmable shader code, including shader program code to implement vertex shaders, fragment shaders, and/or compute shaders. In at least one embodiment, a number of shader cores can vary. In at least one embodiment, graphics processor 2040 includes an inter-core task manager 2045, which acts as a thread dispatcher to dispatch execution threads to one or more shader cores 2055A-2055N and a tiling unit 2058 to accelerate tiling operations for tile-based rendering, in which rendering operations for a scene are subdivided in image space, for example to exploit local spatial coherence within a scene or to optimize use of internal caches.

Inference and/or training logic 1015 are used to perform inferencing and/or training operations associated with one or more embodiments. Details regarding inference and/or training logic 1015 are provided herein in conjunction with FIGS. 10A and/or 10B. In at least one embodiment, inference and/or training logic 1015 may be used in integrated circuit 20A and/or 20B for inferencing or predicting operations based, at least in part, on weight parameters calculated using neural network training operations, neural network functions and/or architectures, or neural network use cases described herein.

Figure 21A:
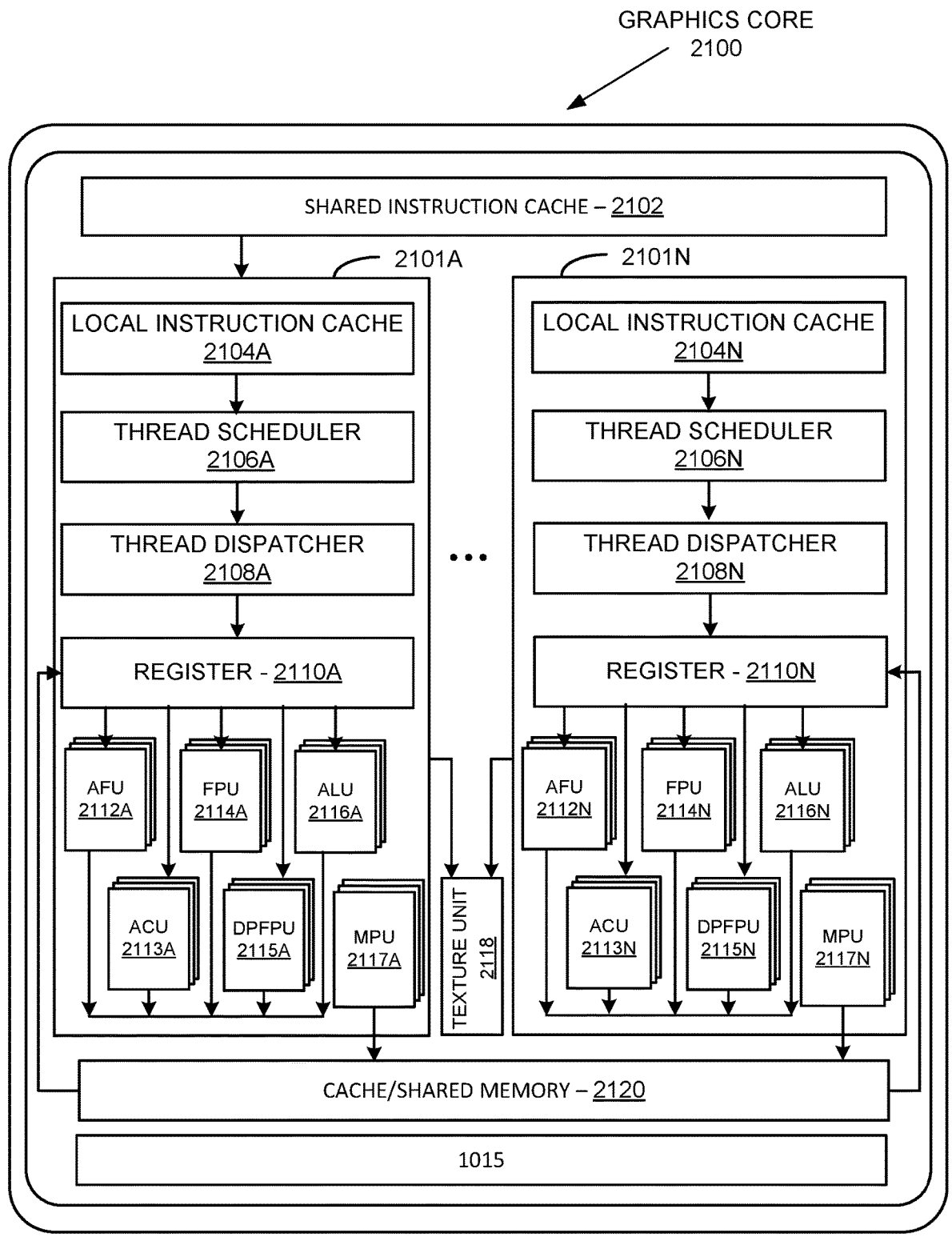
FIGS. 21A-21B illustrate additional exemplary graphics processor logic according to at least one embodiment.
Figure 21B:
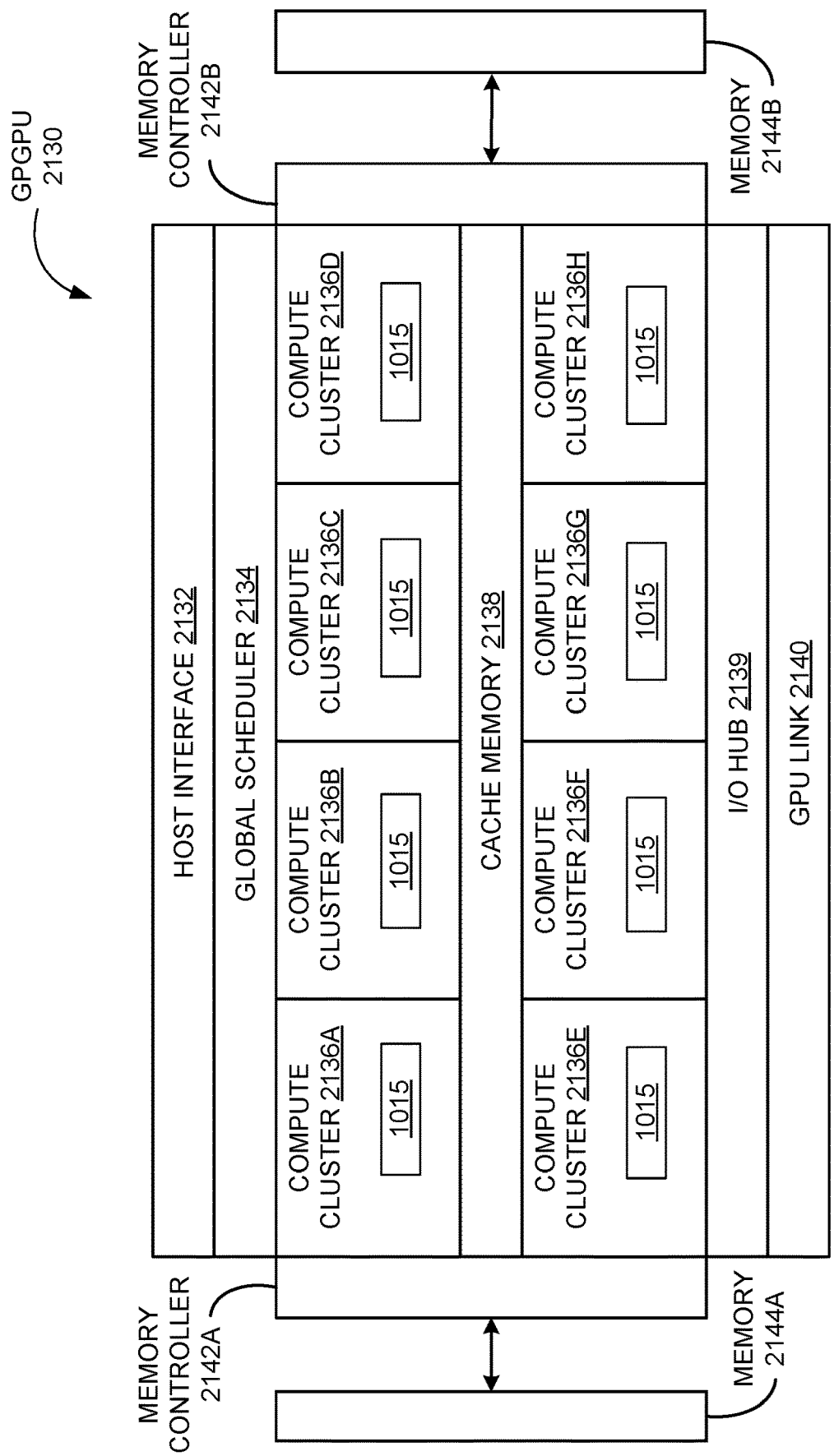

FIGS. 21A-21B illustrate additional exemplary graphics processor logic according to embodiments described herein. FIG. 21A illustrates a graphics core 2100 that may be included within graphics processor 1910 of FIG. 19, in at least one embodiment, and may be a unified shader core 2055A-2055N as in FIG. 20B in at least one embodiment. FIG. 21B illustrates a highly-parallel general-purpose graphics processing unit ("GPGPU") 2130 suitable for deployment on a multi-chip module in at least one embodiment.

In at least one embodiment, graphics core 2100 includes a shared instruction cache 2102, a texture unit 2118, and a cache/shared memory 2120 that are common to execution resources within graphics core 2100. In at least one embodiment, graphics core 2100 can include multiple slices 2101A-2101N or a partition for each core, and a graphics processor can include multiple instances of graphics core 2100. In at least one embodiment, slices 2101A-2101N can include support logic including a local instruction cache 2104A-2104N, a thread scheduler 2106A-2106N, a thread dispatcher 2108A-2108N, and a set of registers 2110A-2110N. In at least one embodiment, slices 2101A-2101N can include a set of additional function units (AFUs 2112A-2112N), floating-point units (FPUs 2114A-2114N), integer arithmetic logic units (ALUs 2116A-2116N), address computational units (ACUs 2113A-2113N), double-precision floating-point units (DPFPUs 2115A-2115N), and matrix processing units (MPUs 2117A-2117N).

In at least one embodiment, FPUs 2114A-2114N can perform single-precision (32-bit) and half-precision (16-bit) floating point operations, while DPFPUs 2115A-2115N perform double precision (64-bit) floating point operations. In at least one embodiment, ALUs 2116A-2116N can perform variable precision integer operations at 8-bit, 16-bit, and 32-bit precision, and can be configured for mixed precision operations. In at least one embodiment, MPUs 2117A-2117N can also be configured for mixed precision matrix operations, including half-precision floating point and 8-bit integer operations. In at least one embodiment, MPUs 2117-2117N can perform a variety of matrix operations to accelerate machine learning application frameworks, including enabling support for accelerated general matrix to matrix multiplication (GEMM). In at least one embodiment, AFUs 2112A-2112N can perform additional logic operations not supported by floating-point or integer units, including trigonometric operations (e.g., sine, cosine, etc.).

Inference and/or training logic 1015 are used to perform inferencing and/or training operations associated with one or more embodiments. Details regarding inference and/or training logic 1015 are provided herein in conjunction with FIGS. 10A and/or 10B. In at least one embodiment, inference and/or training logic 1015 may be used in graphics core 2100 for inferencing or predicting operations based, at least in part, on weight parameters calculated using neural network training operations, neural network functions and/or architectures, or neural network use cases described herein.

FIG. 21B illustrates a general-purpose processing unit (GPGPU) 2130 that can be configured to enable highly-parallel compute operations to be performed by an array of graphics processing units, in at least one embodiment. In at least one embodiment, GPGPU 2130 can be linked directly to other instances of GPGPU 2130 to create a multi-GPU cluster to improve training speed for deep neural networks. In at least one embodiment, GPGPU 2130 includes a host interface 2132 to enable a connection with a host processor. In at least one embodiment, host interface 2132 is a PCI Express interface. In at least one embodiment, host interface 2132 can be a vendor-specific communications interface or communications fabric. In at least one embodiment, GPGPU 2130 receives commands from a host processor and uses a global scheduler 2134 to distribute execution threads associated with those commands to a set of compute clusters 2136A-2136H. In at least one embodiment, compute clusters 2136A-2136H share a cache memory 2138. In at least one embodiment, cache memory 2138 can serve as a higher-level cache for cache memories within compute clusters 2136A-2136H.

In at least one embodiment, GPGPU 2130 includes memory 2144A-2144B coupled with compute clusters 2136A-2136H via a set of memory controllers 2142A-2142B. In at least one embodiment, memory 2144A-2144B can include various types of memory devices including dynamic random access memory (DRAM) or graphics random access memory, such as synchronous graphics random access memory (SGRAM), including graphics double data rate (GDDR) memory.

In at least one embodiment, compute clusters 2136A-2136H each include a set of graphics cores, such as graphics core 2100 of FIG. 21A, which can include multiple types of integer and floating point logic units that can perform computational operations at a range of precisions including suited for machine learning computations. For example, in at least one embodiment, at least a subset of floating point units in each of compute clusters 2136A-2136H can be configured to perform 16-bit or 32-bit floating point operations, while a different subset of floating point units can be configured to perform 64-bit floating point operations.

In at least one embodiment, multiple instances of GPGPU 2130 can be configured to operate as a compute cluster. In at least one embodiment, communication used by compute clusters 2136A-2136H for synchronization and data exchange varies across embodiments. In at least one embodiment, multiple instances of GPGPU 2130 communicate over host interface 2132. In at least one embodiment, GPGPU 2130 includes an I/O hub 2139 that couples GPGPU 2130 with a GPU link 2140 that enables a direct connection to other instances of GPGPU 2130. In at least one embodiment, GPU link 2140 is coupled to a dedicated GPU-to-GPU bridge that enables communication and synchronization between multiple instances of GPGPU 2130. In at least one embodiment, GPU link 2140 couples with a high-speed interconnect to transmit and receive data to other GPGPUs or parallel processors. In at least one embodiment, multiple instances of GPGPU 2130 are located in separate data processing systems and communicate via a network device that is accessible via host interface 2132. In at least one embodiment GPU link 2140 can be configured to enable a connection to a host processor in addition to or as an alternative to host interface 2132.

In at least one embodiment, GPGPU 2130 can be configured to train neural networks. In at least one embodiment, GPGPU 2130 can be used within an inferencing platform. In at least one embodiment, in which GPGPU 2130 is used for inferencing, GPGPU 2130 may include fewer compute clusters 2136A-2136H relative to when GPGPU 2130 is used for training a neural network. In at least one embodiment, memory technology associated with memory 2144A-2144B may differ between inferencing and training configurations, with higher bandwidth memory technologies devoted to training configurations. In at least one embodiment, an inferencing configuration of GPGPU 2130 can support inferencing specific instructions. For example, in at least one embodiment, an inferencing configuration can provide support for one or more 8-bit integer dot product instructions, which may be used during inferencing operations for deployed neural networks.

Inference and/or training logic 1015 are used to perform inferencing and/or training operations associated with one or more embodiments. Details regarding inference and/or training logic 1015 are provided herein in conjunction with FIGS. 10A and/or 10B. In at least one embodiment, inference and/or training logic 1015 may be used in GPGPU 2130 for inferencing or predicting operations based, at least in part, on weight parameters calculated using neural network training operations, neural network functions and/or architectures, or neural network use cases described herein.

Figure 22:
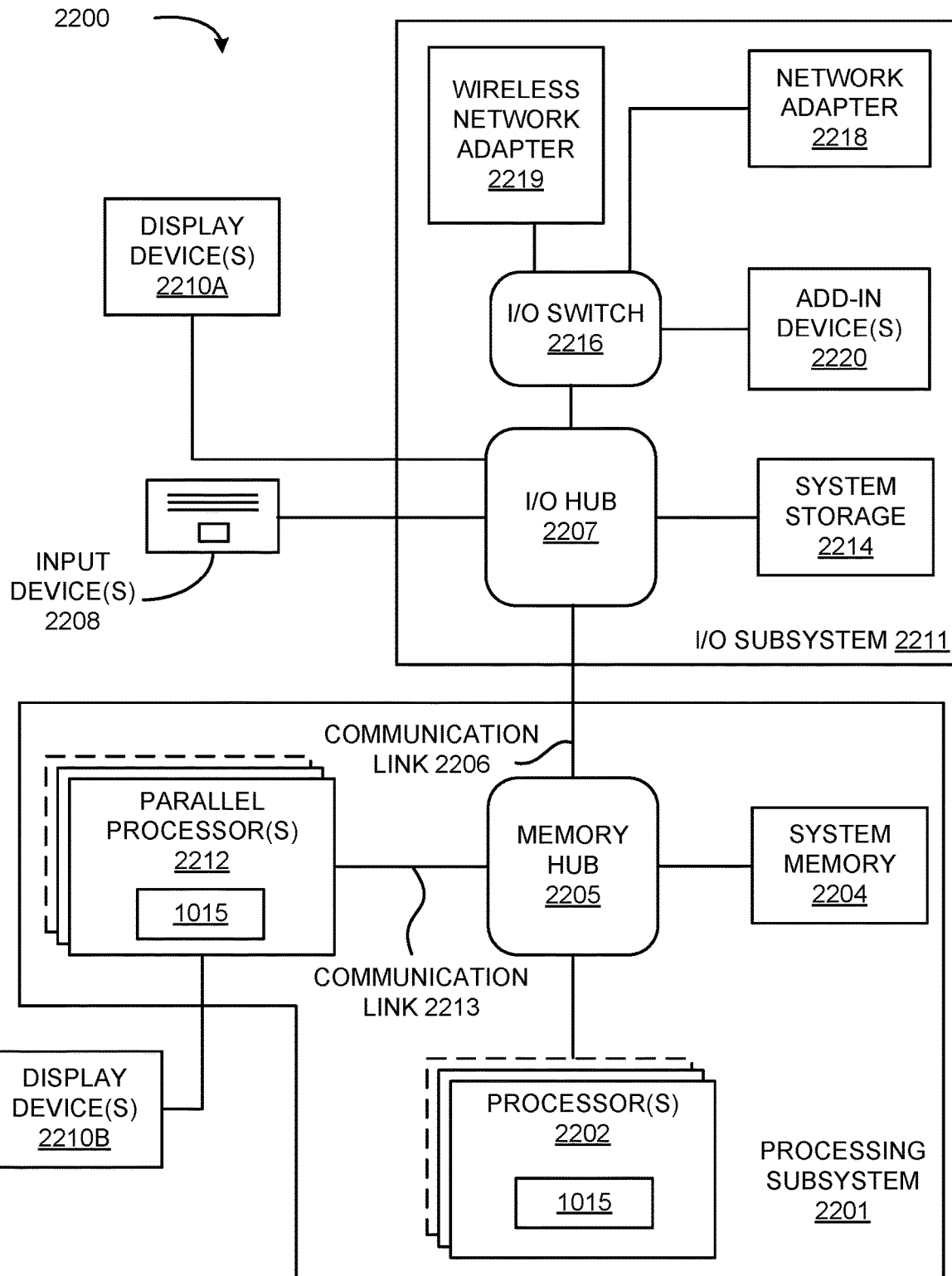
FIG. 22 illustrates a computer system, according to at least one embodiment.

FIG. 22 is a block diagram illustrating a computing system 2200 according to at least one embodiment. In at least one embodiment, computing system 2200 includes a processing subsystem 2201 having one or more processor(s) 2202 and a system memory 2204 communicating via an interconnection path that may include a memory hub 2205. In at least one embodiment, memory hub 2205 may be a separate component within a chipset component or may be integrated within one or more processor(s) 2202. In at least one embodiment, memory hub 2205 couples with an I/O subsystem 2211 via a communication link 2206. In at least one embodiment, I/O subsystem 2211 includes an I/O hub 2207 that can enable computing system 2200 to receive input from one or more input device(s) 2208. In at least one embodiment, I/O hub 2207 can enable a display controller, which may be included in one or more processor(s) 2202, to provide outputs to one or more display device(s) 2210A. In at least one embodiment, one or more display device(s) 2210A coupled with I/O hub 2207 can include a local, internal, or embedded display device.

In at least one embodiment, processing subsystem 2201 includes one or more parallel processor(s) 2212 coupled to memory hub 2205 via a bus or other communication link 2213. In at least one embodiment, communication link 2213 may use one of any number of standards based communication link technologies or protocols, such as, but not limited to PCI Express, or may be a vendor-specific communications interface or communications fabric. In at least one embodiment, one or more parallel processor(s) 2212 form a computationally focused parallel or vector processing system that can include a large number of processing cores and/or processing clusters, such as a many-integrated core (MIC) processor. In at least one embodiment, some or all of parallel processor(s) 2212 form a graphics processing subsystem that can output pixels to one of one or more display device(s) 2210A coupled via I/O Hub 2207. In at least one embodiment, parallel processor(s) 2212 can also include a display controller and display interface (not shown) to enable a direct connection to one or more display device(s) 2210B.

In at least one embodiment, a system storage unit 2214 can connect to I/O hub 2207 to provide a storage mechanism for computing system 2200. In at least one embodiment, an I/O switch 2216 can be used to provide an interface mechanism to enable connections between I/O hub 2207 and other components, such as a network adapter 2218 and/or a wireless network adapter 2219 that may be integrated into platform, and various other devices that can be added via one or more add-in device(s) 2220. In at least one embodiment, network adapter 2218 can be an Ethernet adapter or another wired network adapter. In at least one embodiment, wireless network adapter 2219 can include one or more of a Wi-Fi, Bluetooth, near field communication (NFC), or other network device that includes one or more wireless radios.

In at least one embodiment, computing system 2200 can include other components not explicitly shown, including USB or other port connections, optical storage drives, video capture devices, and like, may also be connected to I/O hub 2207. In at least one embodiment, communication paths interconnecting various components in FIG. 22 may be implemented using any suitable protocols, such as PCI (Peripheral Component Interconnect) based protocols (e.g., PCI-Express), or other bus or point-to-point communication interfaces and/or protocol(s), such as NV-Link high-speed interconnect, or interconnect protocols.

In at least one embodiment, parallel processor(s) 2212 incorporate circuitry optimized for graphics and video processing, including, for example, video output circuitry, and constitutes a graphics processing unit (GPU). In at least one embodiment, parallel processor(s) 2212 incorporate circuitry optimized for general purpose processing. In at least embodiment, components of computing system 2200 may be integrated with one or more other system elements on a single integrated circuit. For example, in at least one embodiment, parallel processor(s) 2212, memory hub 2205, processor(s) 2202, and I/O hub 2207 can be integrated into a system on chip (SoC) integrated circuit. In at least one embodiment, components of computing system 2200 can be integrated into a single package to form a system in package (SIP) configuration. In at least one embodiment, at least a portion of components of computing system 2200 can be integrated into a multi-chip module (MCM), which can be interconnected with other multi-chip modules into a modular computing system.

Inference and/or training logic 1015 are used to perform inferencing and/or training operations associated with one or more embodiments. Details regarding inference and/or training logic 1015 are provided herein in conjunction with FIGS. 10A and/or 10B. In at least one embodiment, inference and/or training logic 1015 may be used in system FIG. 2200 for inferencing or predicting operations based, at least in part, on weight parameters calculated using neural network training operations, neural network functions and/or architectures, or neural network use cases described herein.

Processors

Figure 23A:
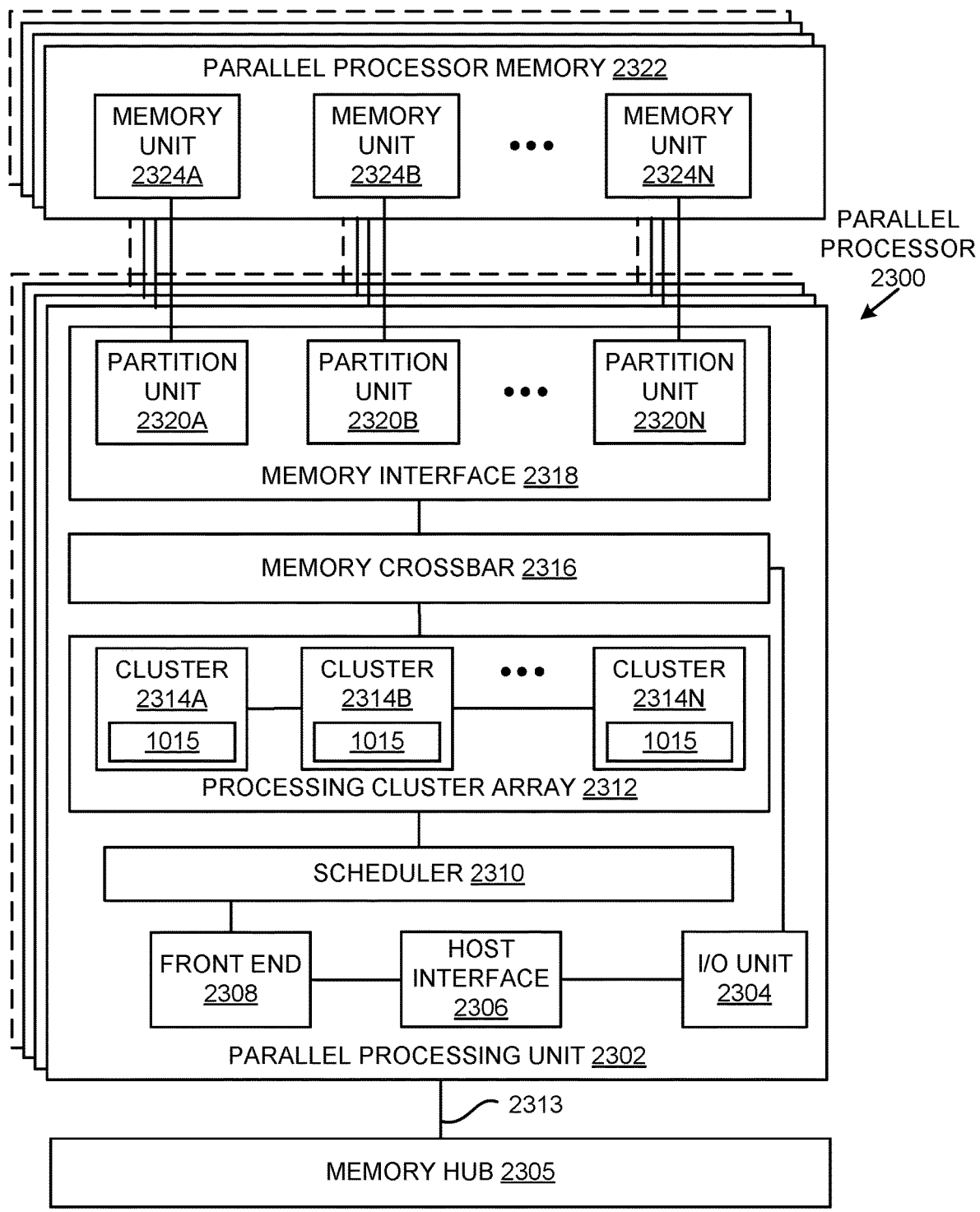
FIG. 23A illustrates a parallel processor, according to at least one embodiment.

FIG. 23A illustrates a parallel processor 2300 according to at least one embodiment. In at least one embodiment, various components of parallel processor 2300 may be implemented using one or more integrated circuit devices, such as programmable processors, application specific integrated circuits (ASICs), or field programmable gate arrays (FPGA). In at least one embodiment, illustrated parallel processor 2300 is a variant of one or more parallel processor(s) 2212 shown in FIG. 22 according to an exemplary embodiment.

In at least one embodiment, parallel processor 2300 includes a parallel processing unit 2302. In at least one embodiment, parallel processing unit 2302 includes an I/O unit 2304 that enables communication with other devices, including other instances of parallel processing unit 2302. In at least one embodiment, I/O unit 2304 may be directly connected to other devices. In at least one embodiment, I/O unit 2304 connects with other devices via use of a hub or switch interface, such as a memory hub 2305. In at least one embodiment, connections between memory hub 2305 and I/O unit 2304 form a communication link 2313. In at least one embodiment, I/O unit 2304 connects with a host interface 2306 and a memory crossbar 2316, where host interface 2306 receives commands directed to performing processing operations and memory crossbar 2316 receives commands directed to performing memory operations.

In at least one embodiment, when host interface 2306 receives a command buffer via I/O unit 2304, host interface 2306 can direct work operations to perform those commands to a front end 2308. In at least one embodiment, front end 2308 couples with a scheduler 2310, which is configured to distribute commands or other work items to a processing cluster array 2312. In at least one embodiment, scheduler 2310 ensures that processing cluster array 2312 is properly configured and in a valid state before tasks are distributed to a cluster of processing cluster array 2312. In at least one embodiment, scheduler 2310 is implemented via firmware logic executing on a microcontroller. In at least one embodiment, microcontroller implemented scheduler 2310 is configurable to perform complex scheduling and work distribution operations at coarse and fine granularity, enabling rapid preemption and context switching of threads executing on processing array 2312. In at least one embodiment, host software can prove workloads for scheduling on processing cluster array 2312 via one of multiple graphics processing paths. In at least one embodiment, workloads can then be automatically distributed across processing array cluster 2312 by scheduler 2310 logic within a microcontroller including scheduler 2310.

In at least one embodiment, processing cluster array 2312 can include up to "N" processing clusters (e.g., cluster 2314A, cluster 2314B, through cluster 2314N), where "N" represents a positive integer (which may be a different integer "N" than used in other figures). In at least one embodiment, each cluster 2314A-2314N of processing cluster array 2312 can execute a large number of concurrent threads. In at least one embodiment, scheduler 2310 can allocate work to clusters 2314A-2314N of processing cluster array 2312 using various scheduling and/or work distribution algorithms, which may vary depending on workload arising for each type of program or computation. In at least one embodiment, scheduling can be handled dynamically by scheduler 2310, or can be assisted in part by compiler logic during compilation of program logic configured for execution by processing cluster array 2312. In at least one embodiment, different clusters 2314A-2314N of processing cluster array 2312 can be allocated for processing different types of programs or for performing different types of computations.

In at least one embodiment, processing cluster array 2312 can be configured to perform various types of parallel processing operations. In at least one embodiment, processing cluster array 2312 is configured to perform general-purpose parallel compute operations. For example, in at least one embodiment, processing cluster array 2312 can include logic to execute processing tasks including filtering of video and/or audio data, performing modeling operations, including physics operations, and performing data transformations.

In at least one embodiment, processing cluster array 2312 is configured to perform parallel graphics processing operations. In at least one embodiment, processing cluster array 2312 can include additional logic to support execution of such graphics processing operations, including but not limited to, texture sampling logic to perform texture operations, as well as tessellation logic and other vertex processing logic. In at least one embodiment, processing cluster array 2312 can be configured to execute graphics processing related shader programs such as, but not limited to, vertex shaders, tessellation shaders, geometry shaders, and pixel shaders. In at least one embodiment, parallel processing unit 2302 can transfer data from system memory via I/O unit 2304 for processing. In at least one embodiment, during processing, transferred data can be stored to on-chip memory (e.g., parallel processor memory 2322) during processing, then written back to system memory.

In at least one embodiment, when parallel processing unit 2302 is used to perform graphics processing, scheduler 2310 can be configured to divide a processing workload into approximately equal sized tasks, to better enable distribution of graphics processing operations to multiple clusters 2314A-2314N of processing cluster array 2312. In at least one embodiment, portions of processing cluster array 2312 can be configured to perform different types of processing. For example, in at least one embodiment, a first portion may be configured to perform vertex shading and topology generation, a second portion may be configured to perform tessellation and geometry shading, and a third portion may be configured to perform pixel shading or other screen space operations, to produce a rendered image for display. In at least one embodiment, intermediate data produced by one or more of clusters 2314A-2314N may be stored in buffers to allow intermediate data to be transmitted between clusters 2314A-2314N for further processing.

In at least one embodiment, processing cluster array 2312 can receive processing tasks to be executed via scheduler 2310, which receives commands defining processing tasks from front end 2308. In at least one embodiment, processing tasks can include indices of data to be processed, e.g., surface (patch) data, primitive data, vertex data, and/or pixel data, as well as state parameters and commands defining how data is to be processed (e.g., what program is to be executed). In at least one embodiment, scheduler 2310 may be configured to fetch indices corresponding to tasks or may receive indices from front end 2308. In at least one embodiment, front end 2308 can be configured to ensure processing cluster array 2312 is configured to a valid state before a workload specified by incoming command buffers (e.g., batch-buffers, push buffers, etc.) is initiated.

In at least one embodiment, each of one or more instances of parallel processing unit 2302 can couple with a parallel processor memory 2322. In at least one embodiment, parallel processor memory 2322 can be accessed via memory crossbar 2316, which can receive memory requests from processing cluster array 2312 as well as I/O unit 2304. In at least one embodiment, memory crossbar 2316 can access parallel processor memory 2322 via a memory interface 2318. In at least one embodiment, memory interface 2318 can include multiple partition units (e.g., partition unit 2320A, partition unit 2320B, through partition unit 2320N) that can each couple to a portion (e.g., memory unit) of parallel processor memory 2322. In at least one embodiment, a number of partition units 2320A-2320N is configured to be equal to a number of memory units, such that a first partition unit 2320A has a corresponding first memory unit 2324A, a second partition unit 2320B has a corresponding memory unit 2324B, and an N-th partition unit 2320N has a corresponding N-th memory unit 2324N. In at least one embodiment, a number of partition units 2320A-2320N may not be equal to a number of memory units.

In at least one embodiment, memory units 2324A-2324N can include various types of memory devices, including dynamic random access memory (DRAM) or graphics random access memory, such as synchronous graphics random access memory (SGRAM), including graphics double data rate (GDDR) memory. In at least one embodiment, memory units 2324A-2324N may also include 3D stacked memory, including but not limited to high bandwidth memory (HBM). In at least one embodiment, render targets, such as frame buffers or texture maps may be stored across memory units 2324A-2324N, allowing partition units 2320A-2320N to write portions of each render target in parallel to efficiently use available bandwidth of parallel processor memory 2322. In at least one embodiment, a local instance of parallel processor memory 2322 may be excluded in favor of a unified memory design that utilizes system memory in conjunction with local cache memory.

In at least one embodiment, any one of clusters 2314A-2314N of processing cluster array 2312 can process data that will be written to any of memory units 2324A-2324N within parallel processor memory 2322. In at least one embodiment, memory crossbar 2316 can be configured to transfer an output of each cluster 2314A-2314N to any partition unit 2320A-2320N or to another cluster 2314A-2314N, which can perform additional processing operations on an output.

In at least one embodiment, each cluster 2314A-2314N can communicate with memory interface 2318 through memory crossbar 2316 to read from or write to various external memory devices. In at least one embodiment, memory crossbar 2316 has a connection to memory interface 2318 to communicate with I/O unit 2304, as well as a connection to a local instance of parallel processor memory 2322, enabling processing units within different processing clusters 2314A-2314N to communicate with system memory or other memory that is not local to parallel processing unit 2302. In at least one embodiment, memory crossbar 2316 can use virtual channels to separate traffic streams between clusters 2314A-2314N and partition units 2320A-2320N.

In at least one embodiment, multiple instances of parallel processing unit 2302 can be provided on a single add-in card, or multiple add-in cards can be interconnected. In at least one embodiment, different instances of parallel processing unit 2302 can be configured to interoperate even if different instances have different numbers of processing cores, different amounts of local parallel processor memory, and/or other configuration differences. For example, in at least one embodiment, some instances of parallel processing unit 2302 can include higher precision floating point units relative to other instances. In at least one embodiment, systems incorporating one or more instances of parallel processing unit 2302 or parallel processor 2300 can be implemented in a variety of configurations and form factors, including but not limited to desktop, laptop, or handheld personal computers, servers, workstations, game consoles, and/or embedded systems.

Figure 23B:
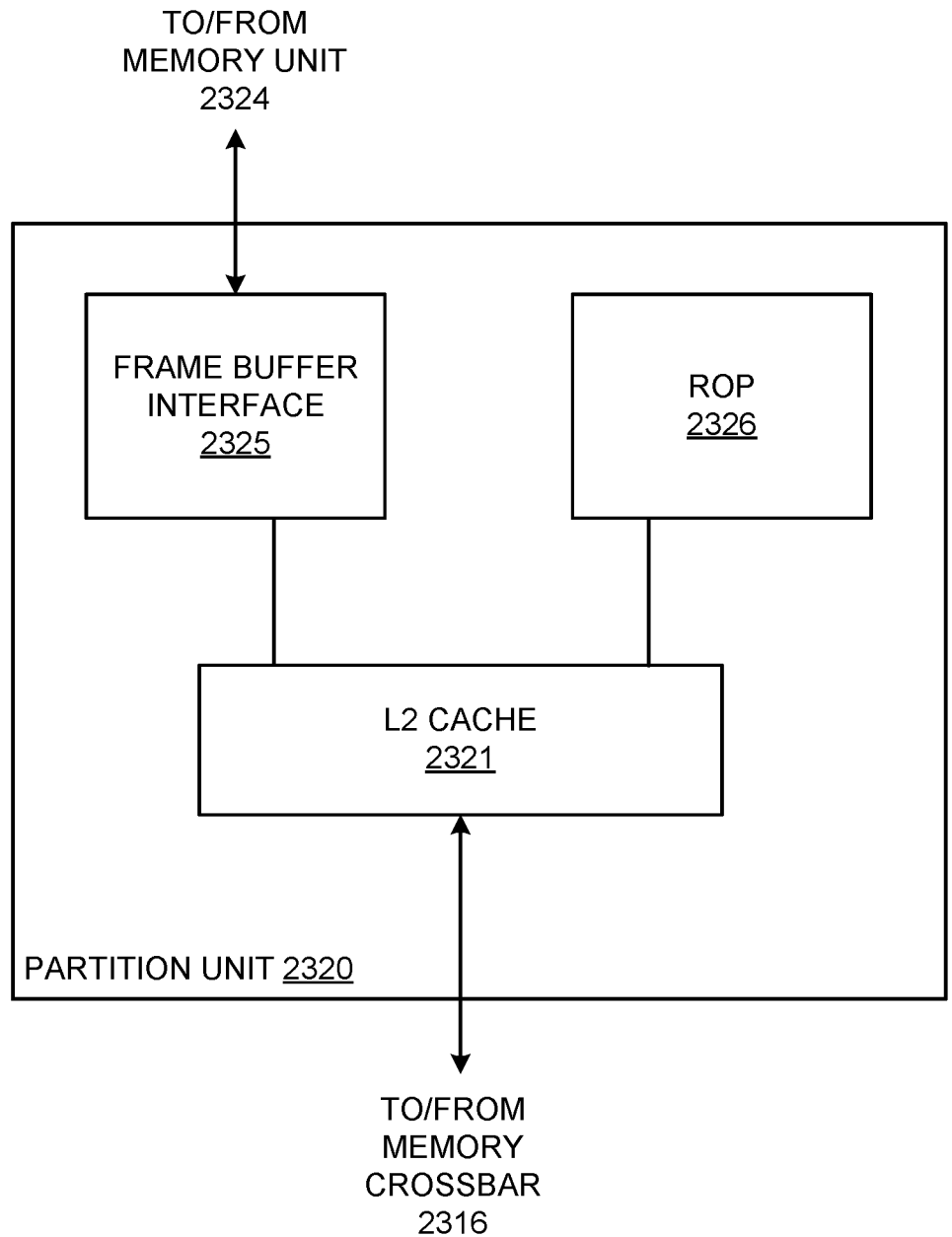
FIG. 23B illustrates a partition unit, according to at least one embodiment.

FIG. 23B is a block diagram of a partition unit 2320 according to at least one embodiment. In at least one embodiment, partition unit 2320 is an instance of one of partition units 2320A-2320N of FIG. 23A. In at least one embodiment, partition unit 2320 includes an L2 cache 2321, a frame buffer interface 2325, and a ROP 2326 (raster operations unit). In at least one embodiment, L2 cache 2321 is a read/write cache that is configured to perform load and store operations received from memory crossbar 2316 and ROP 2326. In at least one embodiment, read misses and urgent write-back requests are output by L2 cache 2321 to frame buffer interface 2325 for processing. In at least one embodiment, updates can also be sent to a frame buffer via frame buffer interface 2325 for processing. In at least one embodiment, frame buffer interface 2325 interfaces with one of memory units in parallel processor memory, such as memory units 2324A-2324N of FIG. 23 (e.g., within parallel processor memory 2322).

In at least one embodiment, ROP 2326 is a processing unit that performs raster operations such as stencil, z test, blending, etc. In at least one embodiment, ROP 2326 then outputs processed graphics data that is stored in graphics memory. In at least one embodiment, ROP 2326 includes compression logic to compress depth or color data that is written to memory and decompress depth or color data that is read from memory. In at least one embodiment, compression logic can be lossless compression logic that makes use of one or more of multiple compression algorithms. In at least one embodiment, a type of compression that is performed by ROP 2326 can vary based on statistical characteristics of data to be compressed. For example, in at least one embodiment, delta color compression is performed on depth and color data on a per-tile basis.

In at least one embodiment, ROP 2326 is included within each processing cluster (e.g., cluster 2314A-2314N of FIG. 23A) instead of within partition unit 2320. In at least one embodiment, read and write requests for pixel data are transmitted over memory crossbar 2316 instead of pixel fragment data. In at least one embodiment, processed graphics data may be displayed on a display device, such as one of one or more display device(s) 2210 of FIG. 22, routed for further processing by processor(s) 2202, or routed for further processing by one of processing entities within parallel processor 2300 of FIG. 23A.

Figure 23C:
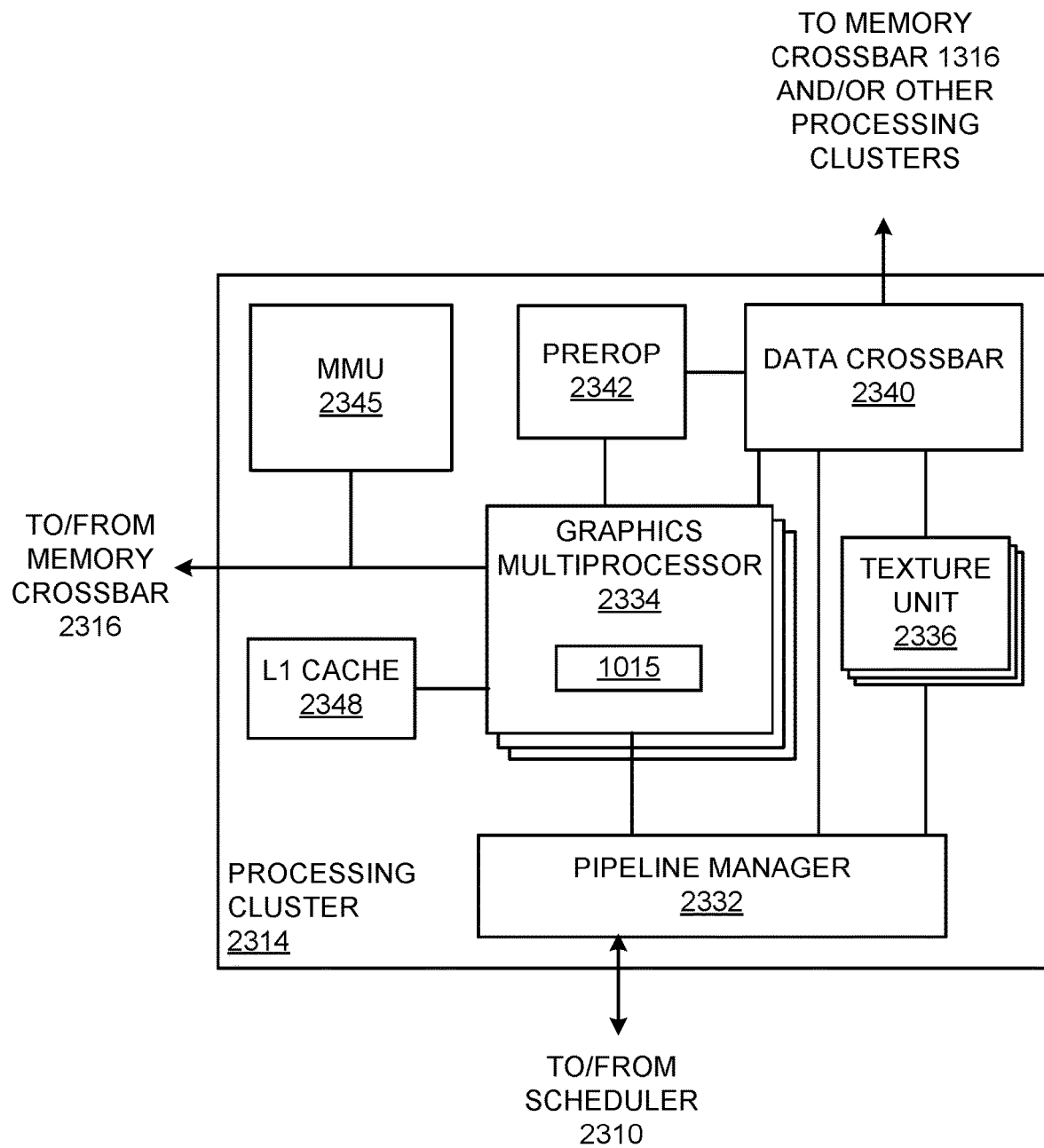
FIG. 23C illustrates a processing cluster, according to at least one embodiment.

FIG. 23C is a block diagram of a processing cluster 2314 within a parallel processing unit according to at least one embodiment. In at least one embodiment, a processing cluster is an instance of one of processing clusters 2314A-2314N of FIG. 23A. In at least one embodiment, processing cluster 2314 can be configured to execute many threads in parallel, where "thread" refers to an instance of a particular program executing on a particular set of input data. In at least one embodiment, single-instruction, multiple-data (SIMD) instruction issue techniques are used to support parallel execution of a large number of threads without providing multiple independent instruction units. In at least one embodiment, single-instruction, multiple-thread (SIMT) techniques are used to support parallel execution of a large number of generally synchronized threads, using a common instruction unit configured to issue instructions to a set of processing engines within each one of processing clusters.

In at least one embodiment, operation of processing cluster 2314 can be controlled via a pipeline manager 2332 that distributes processing tasks to SIMT parallel processors. In at least one embodiment, pipeline manager 2332 receives instructions from scheduler 2310 of FIG. 23A and manages execution of those instructions via a graphics multiprocessor 2334 and/or a texture unit 2336. In at least one embodiment, graphics multiprocessor 2334 is an exemplary instance of a SIMT parallel processor. However, in at least one embodiment, various types of SIMT parallel processors of differing architectures may be included within processing cluster 2314. In at least one embodiment, one or more instances of graphics multiprocessor 2334 can be included within a processing cluster 2314. In at least one embodiment, graphics multiprocessor 2334 can process data and a data crossbar 2340 can be used to distribute processed data to one of multiple possible destinations, including other shader units. In at least one embodiment, pipeline manager 2332 can facilitate distribution of processed data by specifying destinations for processed data to be distributed via data crossbar 2340.

In at least one embodiment, each graphics multiprocessor 2334 within processing cluster 2314 can include an identical set of functional execution logic (e.g., arithmetic logic units, load-store units, etc.). In at least one embodiment, functional execution logic can be configured in a pipelined manner in which new instructions can be issued before previous instructions are complete. In at least one embodiment, functional execution logic supports a variety of operations including integer and floating point arithmetic, comparison operations, Boolean operations, bit-shifting, and computation of various algebraic functions. In at least one embodiment, same functional-unit hardware can be leveraged to perform different operations and any combination of functional units may be present.

In at least one embodiment, instructions transmitted to processing cluster 2314 constitute a thread. In at least one embodiment, a set of threads executing across a set of parallel processing engines is a thread group. In at least one embodiment, a thread group executes a common program on different input data. In at least one embodiment, each thread within a thread group can be assigned to a different processing engine within a graphics multiprocessor 2334. In at least one embodiment, a thread group may include fewer threads than a number of processing engines within graphics multiprocessor 2334. In at least one embodiment, when a thread group includes fewer threads than a number of processing engines, one or more of processing engines may be idle during cycles in which that thread group is being processed. In at least one embodiment, a thread group may also include more threads than a number of processing engines within graphics multiprocessor 2334. In at least one embodiment, when a thread group includes more threads than number of processing engines within graphics multiprocessor 2334, processing can be performed over consecutive clock cycles. In at least one embodiment, multiple thread groups can be executed concurrently on a graphics multiprocessor 2334.

In at least one embodiment, graphics multiprocessor 2334 includes an internal cache memory to perform load and store operations. In at least one embodiment, graphics multiprocessor 2334 can forego an internal cache and use a cache memory (e.g., L1 cache 2348) within processing cluster 2314. In at least one embodiment, each graphics multiprocessor 2334 also has access to L2 caches within partition units (e.g., partition units 2320A-2320N of FIG. 23A) that are shared among all processing clusters 2314 and may be used to transfer data between threads. In at least one embodiment, graphics multiprocessor 2334 may also access off-chip global memory, which can include one or more of local parallel processor memory and/or system memory. In at least one embodiment, any memory external to parallel processing unit 2302 may be used as global memory. In at least one embodiment, processing cluster 2314 includes multiple instances of graphics multiprocessor 2334 and can share common instructions and data, which may be stored in L1 cache 2348.

In at least one embodiment, each processing cluster 2314 may include an MMU 2345 (memory management unit) that is configured to map virtual addresses into physical addresses. In at least one embodiment, one or more instances of MMU 2345 may reside within memory interface 2318 of FIG. 23A. In at least one embodiment, MMU 2345 includes a set of page table entries (PTEs) used to map a virtual address to a physical address of a tile and optionally a cache line index. In at least one embodiment, MMU 2345 may include address translation lookaside buffers (TLB) or caches that may reside within graphics multiprocessor 2334 or L1 2348 cache or processing cluster 2314. In at least one embodiment, a physical address is processed to distribute surface data access locally to allow for efficient request interleaving among partition units. In at least one embodiment, a cache line index may be used to determine whether a request for a cache line is a hit or miss.

In at least one embodiment, a processing cluster 2314 may be configured such that each graphics multiprocessor 2334 is coupled to a texture unit 2336 for performing texture mapping operations, e.g., determining texture sample positions, reading texture data, and filtering texture data. In at least one embodiment, texture data is read from an internal texture L1 cache (not shown) or from an L1 cache within graphics multiprocessor 2334 and is fetched from an L2 cache, local parallel processor memory, or system memory, as needed. In at least one embodiment, each graphics multiprocessor 2334 outputs processed tasks to data crossbar 2340 to provide processed task to another processing cluster 2314 for further processing or to store processed task in an L2 cache, local parallel processor memory, or system memory via memory crossbar 2316. In at least one embodiment, a preROP 2342 (pre-raster operations unit) is configured to receive data from graphics multiprocessor 2334, and direct data to ROP units, which may be located with partition units as described herein (e.g., partition units 2320A-2320N of FIG. 23A). In at least one embodiment, preROP 2342 unit can perform optimizations for color blending, organizing pixel color data, and performing address translations.

Inference and/or training logic 1015 are used to perform inferencing and/or training operations associated with one or more embodiments. Details regarding inference and/or training logic 1015 are provided herein in conjunction with FIGS. 10A and/or 10B. In at least one embodiment, inference and/or training logic 1015 may be used in graphics processing cluster 2314 for inferencing or predicting operations based, at least in part, on weight parameters calculated using neural network training operations, neural network functions and/or architectures, or neural network use cases described herein.

Figure 23D:
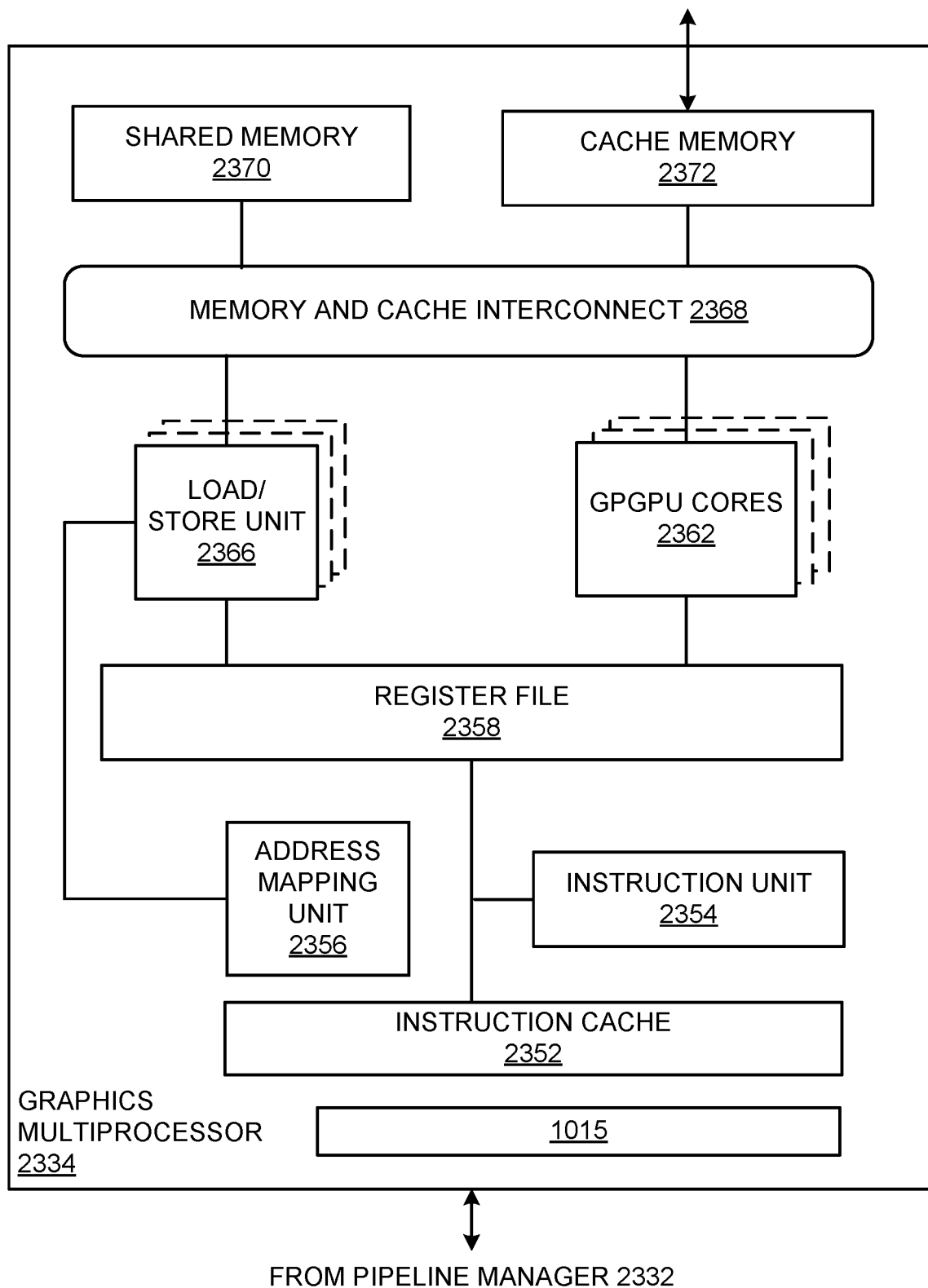
FIG. 23D illustrates a graphics multiprocessor, according to at least one embodiment.

FIG. 23D shows a graphics multiprocessor 2334 according to at least one embodiment. In at least one embodiment, graphics multiprocessor 2334 couples with pipeline manager 2332 of processing cluster 2314. In at least one embodiment, graphics multiprocessor 2334 has an execution pipeline including but not limited to an instruction cache 2352, an instruction unit 2354, an address mapping unit 2356, a register file 2358, one or more general purpose graphics processing unit (GPGPU) cores 2362, and one or more load/store units 2366. In at least one embodiment, GPGPU cores 2362 and load/store units 2366 are coupled with cache memory 2372 and shared memory 2370 via a memory and cache interconnect 2368.

In at least one embodiment, instruction cache 2352 receives a stream of instructions to execute from pipeline manager 2332. In at least one embodiment, instructions are cached in instruction cache 2352 and dispatched for execution by an instruction unit 2354. In at least one embodiment, instruction unit 2354 can dispatch instructions as thread groups (e.g., warps), with each thread of thread group assigned to a different execution unit within GPGPU cores 2362. In at least one embodiment, an instruction can access any of a local, shared, or global address space by specifying an address within a unified address space. In at least one embodiment, address mapping unit 2356 can be used to translate addresses in a unified address space into a distinct memory address that can be accessed by load/store units 2366.

In at least one embodiment, register file 2358 provides a set of registers for functional units of graphics multiprocessor 2334. In at least one embodiment, register file 2358 provides temporary storage for operands connected to data paths of functional units (e.g., GPGPU cores 2362, load/store units 2366) of graphics multiprocessor 2334. In at least one embodiment, register file 2358 is divided between each of functional units such that each functional unit is allocated a dedicated portion of register file 2358. In at least one embodiment, register file 2358 is divided between different warps being executed by graphics multiprocessor 2334.

In at least one embodiment, GPGPU cores 2362 can each include floating point units (FPUs) and/or integer arithmetic logic units (ALUs) that are used to execute instructions of graphics multiprocessor 2334. In at least one embodiment, GPGPU cores 2362 can be similar in architecture or can differ in architecture. In at least one embodiment, a first portion of GPGPU cores 2362 include a single precision FPU and an integer ALU while a second portion of GPGPU cores include a double precision FPU. In at least one embodiment, FPUs can implement IEEE 754-2008 standard floating point arithmetic or enable variable precision floating point arithmetic. In at least one embodiment, graphics multiprocessor 2334 can additionally include one or more fixed function or special function units to perform specific functions such as copy rectangle or pixel blending operations. In at least one embodiment, one or more of GPGPU cores 2362 can also include fixed or special function logic.

In at least one embodiment, GPGPU cores 2362 include SIMD logic capable of performing a single instruction on multiple sets of data. In at least one embodiment, GPGPU cores 2362 can physically execute SIMD4, SIMD8, and SIMD16 instructions and logically execute SIMD1, SIMD2, and SIMD32 instructions. In at least one embodiment, SIMD instructions for GPGPU cores can be generated at compile time by a shader compiler or automatically generated when executing programs written and compiled for single program multiple data (SPMD) or SIMT architectures. In at least one embodiment, multiple threads of a program configured for an SIMT execution model can executed via a single SIMD instruction. For example, in at least one embodiment, eight SIMT threads that perform same or similar operations can be executed in parallel via a single SIMD8 logic unit.

In at least one embodiment, memory and cache interconnect 2368 is an interconnect network that connects each functional unit of graphics multiprocessor 2334 to register file 2358 and to shared memory 2370. In at least one embodiment, memory and cache interconnect 2368 is a crossbar interconnect that allows load/store unit 2366 to implement load and store operations between shared memory 2370 and register file 2358. In at least one embodiment, register file 2358 can operate at a same frequency as GPGPU cores 2362, thus data transfer between GPGPU cores 2362 and register file 2358 can have very low latency. In at least one embodiment, shared memory 2370 can be used to enable communication between threads that execute on functional units within graphics multiprocessor 2334. In at least one embodiment, cache memory 2372 can be used as a data cache for example, to cache texture data communicated between functional units and texture unit 2336. In at least one embodiment, shared memory 2370 can also be used as a program managed cache. In at least one embodiment, threads executing on GPGPU cores 2362 can programmatically store data within shared memory in addition to automatically cached data that is stored within cache memory 2372.

In at least one embodiment, a parallel processor or GPGPU as described herein is communicatively coupled to host/processor cores to accelerate graphics operations, machine-learning operations, pattern analysis operations, and various general purpose GPU (GPGPU) functions. In at least one embodiment, a GPU may be communicatively coupled to host processor/cores over a bus or other interconnect (e.g., a high-speed interconnect such as PCIe or NVLink). In at least one embodiment, a GPU may be integrated on a package or chip as cores and communicatively coupled to cores over an internal processor bus/interconnect internal to a package or chip. In at least one embodiment, regardless a manner in which a GPU is connected, processor cores may allocate work to such GPU in a form of sequences of commands/instructions contained in a work descriptor. In at least one embodiment, that GPU then uses dedicated circuitry/logic for efficiently processing these commands/instructions.

Inference and/or training logic 1015 are used to perform inferencing and/or training operations associated with one or more embodiments. Details regarding inference and/or training logic 1015 are provided herein in conjunction with FIGS. 10A and/or 10B. In at least one embodiment, inference and/or training logic 1015 may be used in graphics multiprocessor 2334 for inferencing or predicting operations based, at least in part, on weight parameters calculated using neural network training operations, neural network functions and/or architectures, or neural network use cases described herein.

Figure 24:
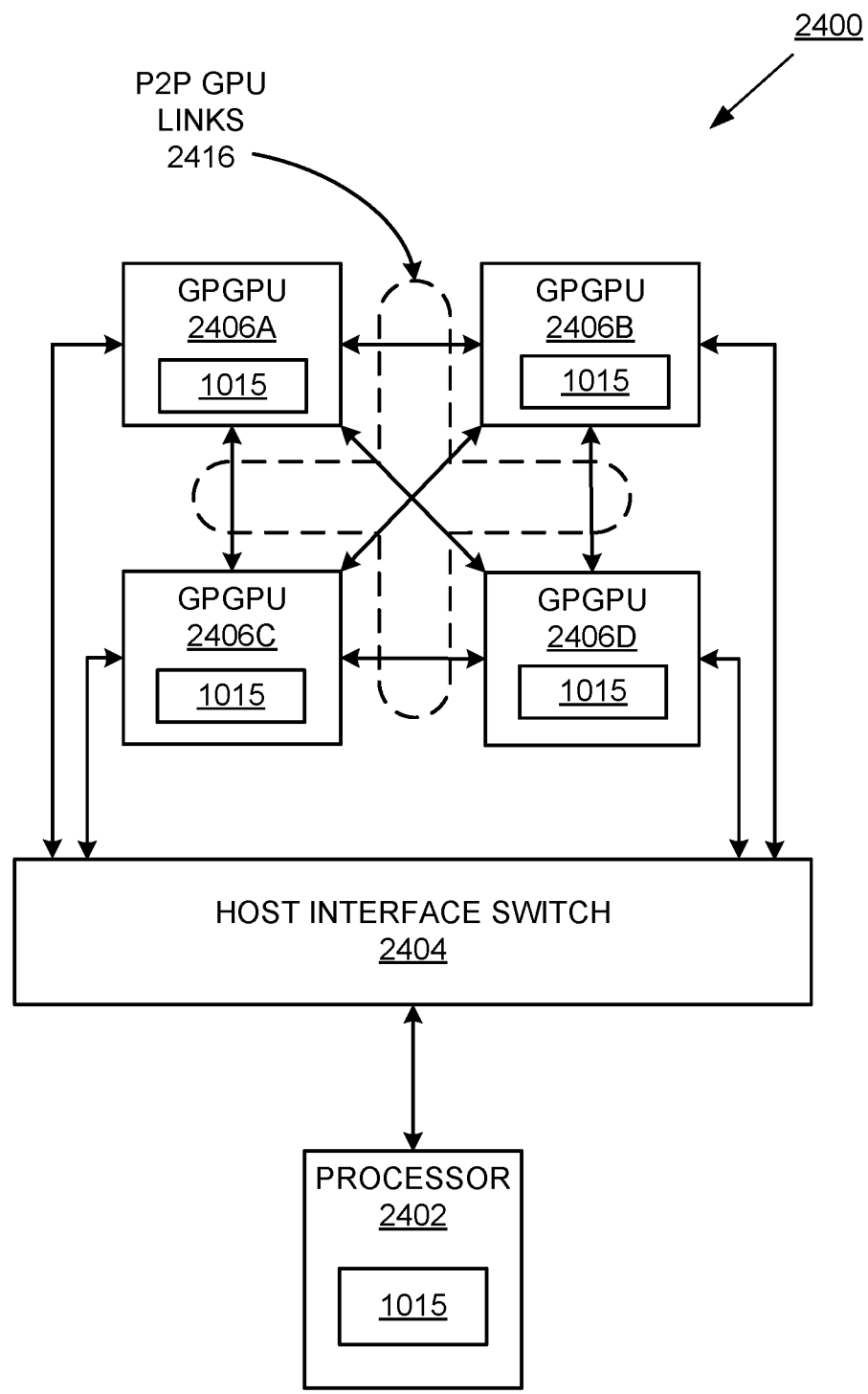
FIG. 24 illustrates a multi-graphics processing unit (GPU) system, according to at least one embodiment.

FIG. 24 illustrates a multi-GPU computing system 2400, according to at least one embodiment. In at least one embodiment, multi-GPU computing system 2400 can include a processor 2402 coupled to multiple general purpose graphics processing units (GPGPUs) 2406A-D via a host interface switch 2404. In at least one embodiment, host interface switch 2404 is a PCI express switch device that couples processor 2402 to a PCI express bus over which processor 2402 can communicate with GPGPUs 2406A-D. In at least one embodiment, GPGPUs 2406A-D can interconnect via a set of high-speed point-to-point GPU-to-GPU links 2416. In at least one embodiment, GPU-to-GPU links 2416 connect to each of GPGPUs 2406A-D via a dedicated GPU link. In at least one embodiment, P2P GPU links 2416 enable direct communication between each of GPGPUs 2406A-D without requiring communication over host interface bus 2404 to which processor 2402 is connected. In at least one embodiment, with GPU-to-GPU traffic directed to P2P GPU links 2416, host interface bus 2404 remains available for system memory access or to communicate with other instances of multi-GPU computing system 2400, for example, via one or more network devices. While in at least one embodiment GPGPUs 2406A-D connect to processor 2402 via host interface switch 2404, in at least one embodiment processor 2402 includes direct support for P2P GPU links 2416 and can connect directly to GPGPUs 2406A-D.

Inference and/or training logic 1015 are used to perform inferencing and/or training operations associated with one or more embodiments. Details regarding inference and/or training logic 1015 are provided herein in conjunction with FIGS. 10A and/or 10B. In at least one embodiment, inference and/or training logic 1015 may be used in multi-GPU computing system 2400 for inferencing or predicting operations based, at least in part, on weight parameters calculated using neural network training operations, neural network functions and/or architectures, or neural network use cases described herein.

Figure 25:
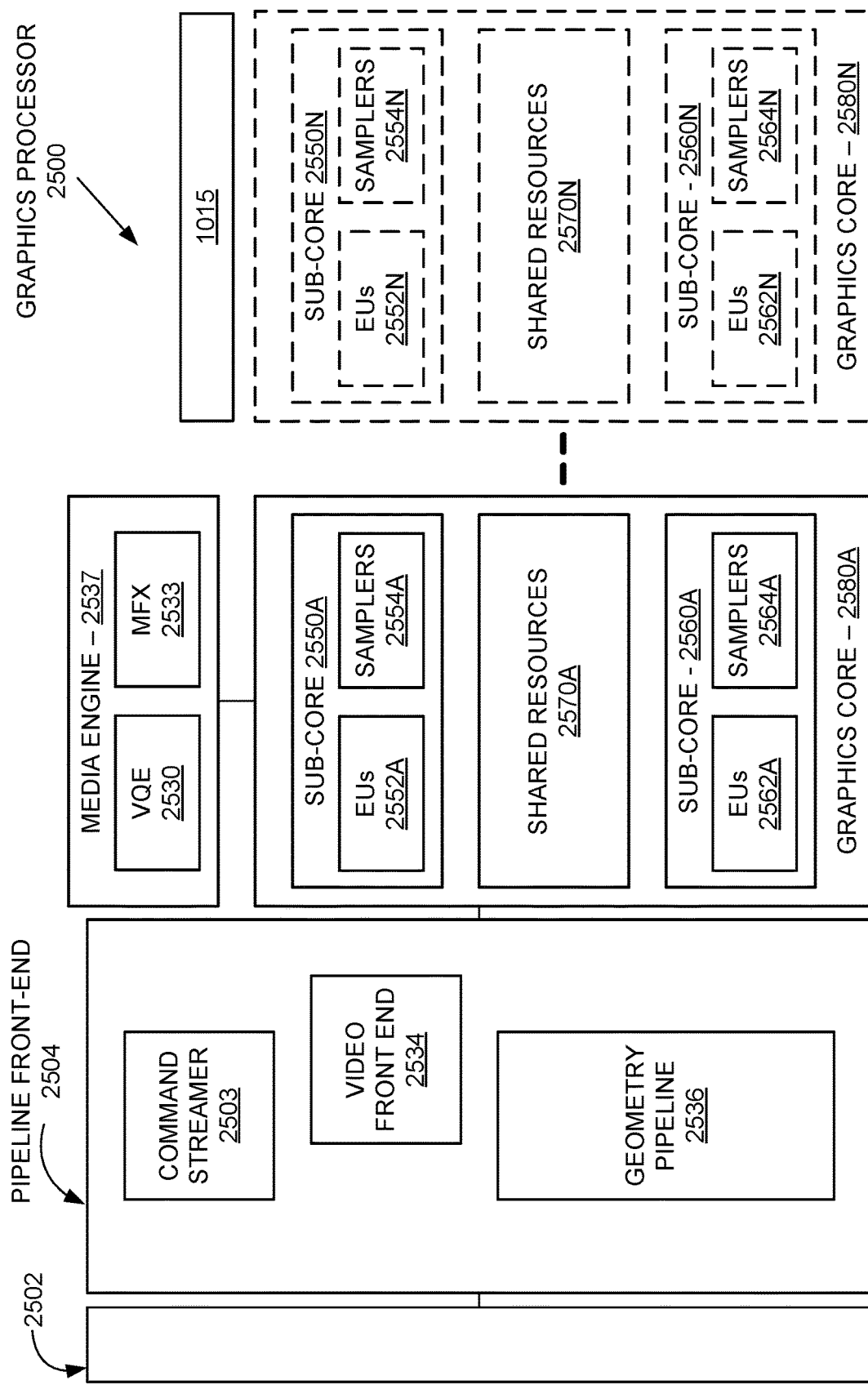
FIG. 25 illustrates a graphics processor, according to at least one embodiment.

FIG. 25 is a block diagram of a graphics processor 2500, according to at least one embodiment. In at least one embodiment, graphics processor 2500 includes a ring interconnect 2502, a pipeline front-end 2504, a media engine 2537, and graphics cores 2580A-2580N. In at least one embodiment, ring interconnect 2502 couples graphics processor 2500 to other processing units, including other graphics processors or one or more general-purpose processor cores. In at least one embodiment, graphics processor 2500 is one of many processors integrated within a multi-core processing system.

In at least one embodiment, graphics processor 2500 receives batches of commands via ring interconnect 2502. In at least one embodiment, incoming commands are interpreted by a command streamer 2503 in pipeline front-end 2504. In at least one embodiment, graphics processor 2500 includes scalable execution logic to perform 3D geometry processing and media processing via graphics core(s) 2580A-2580N. In at least one embodiment, for 3D geometry processing commands, command streamer 2503 supplies commands to geometry pipeline 2536. In at least one embodiment, for at least some media processing commands, command streamer 2503 supplies commands to a video front end 2534, which couples with media engine 2537. In at least one embodiment, media engine 2537 includes a Video Quality Engine (VQE) 2530 for video and image post-processing and a multi-format encode/decode (MFX) 2533 engine to provide hardware-accelerated media data encoding and decoding. In at least one embodiment, geometry pipeline 2536 and media engine 2537 each generate execution threads for thread execution resources provided by at least one graphics core 2580.

In at least one embodiment, graphics processor 2500 includes scalable thread execution resources featuring graphics cores 2580A-2580N (which can be modular and are sometimes referred to as core slices), each having multiple sub-cores 2550A-50N, 2560A-2560N (sometimes referred to as core sub-slices). In at least one embodiment, graphics processor 2500 can have any number of graphics cores 2580A. In at least one embodiment, graphics processor 2500 includes a graphics core 2580A having at least a first sub-core 2550A and a second sub-core 2560A. In at least one embodiment, graphics processor 2500 is a low power processor with a single sub-core (e.g., 2550A). In at least one embodiment, graphics processor 2500 includes multiple graphics cores 2580A-2580N, each including a set of first sub-cores 2550A-2550N and a set of second sub-cores 2560A-2560N. In at least one embodiment, each sub-core in first sub-cores 2550A-2550N includes at least a first set of execution units 2552A-2552N and media/texture samplers 2554A-2554N. In at least one embodiment, each sub-core in second sub-cores 2560A-2560N includes at least a second set of execution units 2562A-2562N and samplers 2564A-2564N. In at least one embodiment, each sub-core 2550A-2550N, 2560A-2560N shares a set of shared resources 2570A-2570N. In at least one embodiment, shared resources include shared cache memory and pixel operation logic.

Inference and/or training logic 1015 are used to perform inferencing and/or training operations associated with one or more embodiments. Details regarding inference and/or training logic 1015 are provided herein in conjunction with FIGS. 10A and/or 10B. In at least one embodiment, inference and/or training logic 1015 may be used in graphics processor 2500 for inferencing or predicting operations based, at least in part, on weight parameters calculated using neural network training operations, neural network functions and/or architectures, or neural network use cases described herein.

Figure 26:
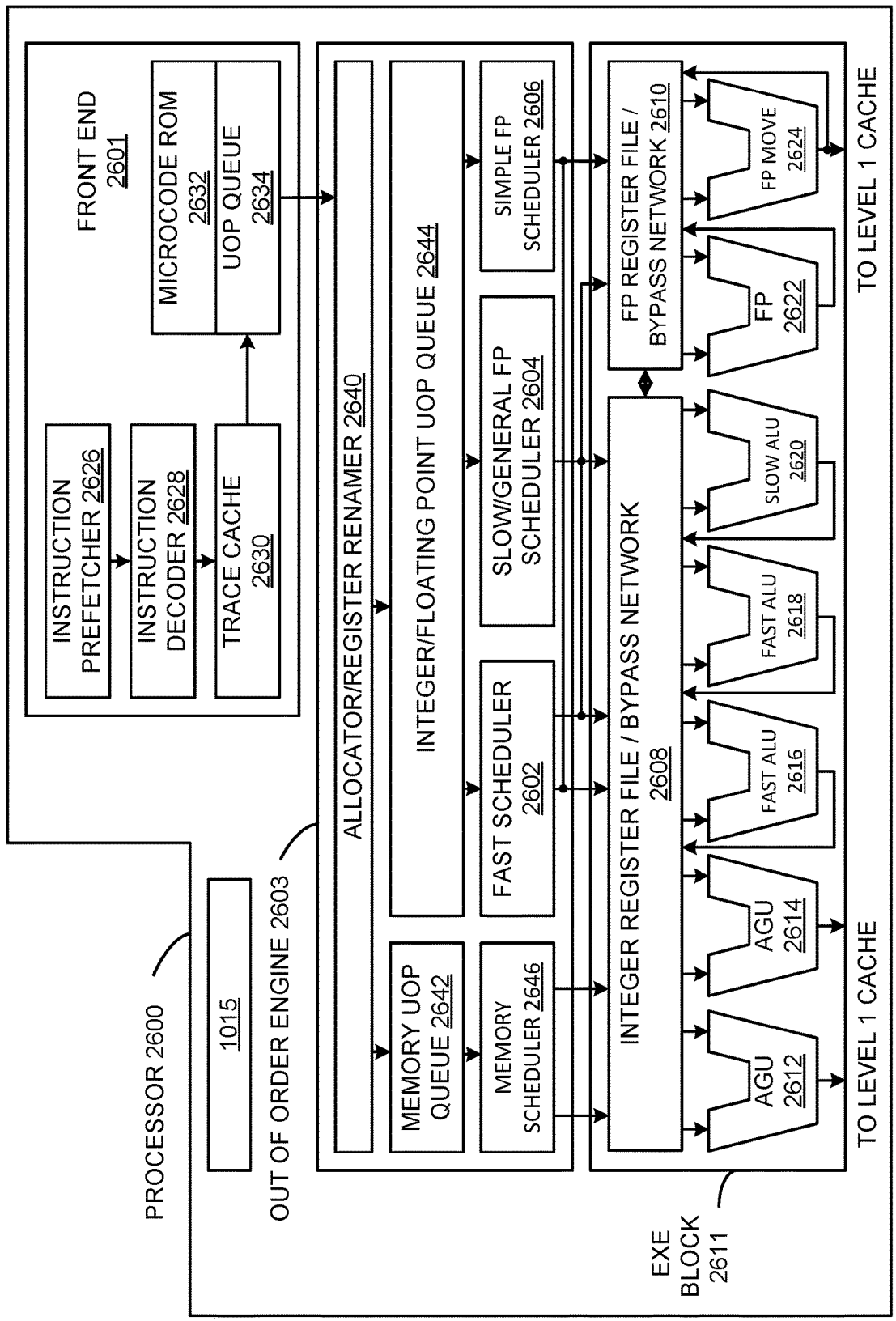
FIG. 26 is a block diagram illustrating a processor microarchitecture for a processor, according to at least one embodiment.

FIG. 26 is a block diagram illustrating micro-architecture for a processor 2600 that may include logic circuits to perform instructions, according to at least one embodiment. In at least one embodiment, processor 2600 may perform instructions, including x86 instructions, ARM instructions, specialized instructions for application-specific integrated circuits (ASICs), etc. In at least one embodiment, processor 2600 may include registers to store packed data, such as 64-bit wide MMX™ registers in microprocessors enabled with MMX technology from Intel Corporation of Santa Clara, Calif. In at least one embodiment, MMX registers, available in both integer and floating point forms, may operate with packed data elements that accompany single instruction, multiple data ("SIMD") and streaming SIMD extensions ("SSE") instructions. In at least one embodiment, 128-bit wide XMM registers relating to SSE2, SSE3, SSE4, AVX, or beyond (referred to generically as "SSEx") technology may hold such packed data operands. In at least one embodiment, processor 2600 may perform instructions to accelerate machine learning or deep learning algorithms, training, or inferencing.

In at least one embodiment, processor 2600 includes an in-order front end ("front end") 2601 to fetch instructions to be executed and prepare instructions to be used later in a processor pipeline. In at least one embodiment, front end 2601 may include several units. In at least one embodiment, an instruction prefetcher 2626 fetches instructions from memory and feeds instructions to an instruction decoder 2628 which in turn decodes or interprets instructions. For example, in at least one embodiment, instruction decoder 2628 decodes a received instruction into one or more operations called "micro-instructions" or "micro-operations" (also called "micro ops" or "uops") that a machine may execute. In at least one embodiment, instruction decoder 2628 parses an instruction into an opcode and corresponding data and control fields that may be used by micro-architecture to perform operations in accordance with at least one embodiment. In at least one embodiment, a trace cache 2630 may assemble decoded uops into program ordered sequences or traces in a uop queue 2634 for execution. In at least one embodiment, when trace cache 2630 encounters a complex instruction, a microcode ROM 2632 provides uops needed to complete an operation.

In at least one embodiment, some instructions may be converted into a single micro-op, whereas others need several micro-ops to complete full operation. In at least one embodiment, if more than four micro-ops are needed to complete an instruction, instruction decoder 2628 may access microcode ROM 2632 to perform that instruction. In at least one embodiment, an instruction may be decoded into a small number of micro-ops for processing at instruction decoder 2628. In at least one embodiment, an instruction may be stored within microcode ROM 2632 should a number of micro-ops be needed to accomplish such operation. In at least one embodiment, trace cache 2630 refers to an entry point programmable logic array ("PLA") to determine a correct micro-instruction pointer for reading microcode sequences to complete one or more instructions from microcode ROM 2632 in accordance with at least one embodiment. In at least one embodiment, after microcode ROM 2632 finishes sequencing micro-ops for an instruction, front end 2601 of a machine may resume fetching micro-ops from trace cache 2630.

In at least one embodiment, out-of-order execution engine ("out of order engine") 2603 may prepare instructions for execution. In at least one embodiment, out-of-order execution logic has a number of buffers to smooth out and re-order flow of instructions to optimize performance as they go down a pipeline and get scheduled for execution. In at least one embodiment, out-of-order execution engine 2603 includes, without limitation, an allocator/register renamer 2640, a memory uop queue 2642, an integer/floating point uop queue 2644, a memory scheduler 2646, a fast scheduler 2602, a slow/general floating point scheduler ("slow/general FP scheduler") 2604, and a simple floating point scheduler ("simple FP scheduler") 2606. In at least one embodiment, fast schedule 2602, slow/general floating point scheduler 2604, and simple floating point scheduler 2606 are also collectively referred to herein as "uop schedulers 2602, 2604, 2606." In at least one embodiment, allocator/register renamer 2640 allocates machine buffers and resources that each uop needs in order to execute. In at least one embodiment, allocator/register renamer 2640 renames logic registers onto entries in a register file. In at least one embodiment, allocator/register renamer 2640 also allocates an entry for each uop in one of two uop queues, memory uop queue 2642 for memory operations and integer/floating point uop queue 2644 for non-memory operations, in front of memory scheduler 2646 and uop schedulers 2602, 2604, 2606. In at least one embodiment, uop schedulers 2602, 2604, 2606, determine when a uop is ready to execute based on readiness of their dependent input register operand sources and availability of execution resources uops need to complete their operation. In at least one embodiment, fast scheduler 2602 may schedule on each half of a main clock cycle while slow/general floating point scheduler 2604 and simple floating point scheduler 2606 may schedule once per main processor clock cycle. In at least one embodiment, uop schedulers 2602, 2604, 2606 arbitrate for dispatch ports to schedule uops for execution.

In at least one embodiment, execution block 2611 includes, without limitation, an integer register file/bypass network 2608, a floating point register file/bypass network ("FP register file/bypass network") 2610, address generation units ("AGUs") 2612 and 2614, fast Arithmetic Logic Units (ALUs) ("fast ALUs") 2616 and 2618, a slow Arithmetic Logic Unit ("slow ALU") 2620, a floating point ALU ("FP") 2622, and a floating point move unit ("FP move") 2624. In at least one embodiment, integer register file/bypass network 2608 and floating point register file/bypass network 2610 are also referred to herein as "register files 2608, 2610." In at least one embodiment, AGUSs 2612 and 2614, fast ALUs 2616 and 2618, slow ALU 2620, floating point ALU 2622, and floating point move unit 2624 are also referred to herein as "execution units 2612, 2614, 2616, 2618, 2620, 2622, and 2624." In at least one embodiment, execution block 2611 may include, without limitation, any number (including zero) and type of register files, bypass networks, address generation units, and execution units, in any combination.

In at least one embodiment, register networks 2608, 2610 may be arranged between uop schedulers 2602, 2604, 2606, and execution units 2612, 2614, 2616, 2618, 2620, 2622, and 2624. In at least one embodiment, integer register file/bypass network 2608 performs integer operations. In at least one embodiment, floating point register file/bypass network 2610 performs floating point operations. In at least one embodiment, each of register networks 2608, 2610 may include, without limitation, a bypass network that may bypass or forward just completed results that have not yet been written into a register file to new dependent uops. In at least one embodiment, register networks 2608, 2610 may communicate data with each other. In at least one embodiment, integer register file/bypass network 2608 may include, without limitation, two separate register files, one register file for a low-order thirty-two bits of data and a second register file for a high order thirty-two bits of data. In at least one embodiment, floating point register file/bypass network 2610 may include, without limitation, 128-bit wide entries because floating point instructions typically have operands from 64 to 128 bits in width.

In at least one embodiment, execution units 2612, 2614, 2616, 2618, 2620, 2622, 2624 may execute instructions. In at least one embodiment, register networks 2608, 2610 store integer and floating point data operand values that microinstructions need to execute. In at least one embodiment, processor 2600 may include, without limitation, any number and combination of execution units 2612, 2614, 2616, 2618, 2620, 2622, 2624. In at least one embodiment, floating point ALU 2622 and floating point move unit 2624, may execute floating point, MMX, SIMD, AVX and SSE, or other operations, including specialized machine learning instructions. In at least one embodiment, floating point ALU 2622 may include, without limitation, a 64-bit by 64-bit floating point divider to execute divide, square root, and remainder micro ops. In at least one embodiment, instructions involving a floating point value may be handled with floating point hardware. In at least one embodiment, ALU operations may be passed to fast ALUs 2616, 2618. In at least one embodiment, fast ALUS 2616, 2618 may execute fast operations with an effective latency of half a clock cycle. In at least one embodiment, most complex integer operations go to slow ALU 2620 as slow ALU 2620 may include, without limitation, integer execution hardware for long-latency type of operations, such as a multiplier, shifts, flag logic, and branch processing. In at least one embodiment, memory load/store operations may be executed by AGUs 2612, 2614. In at least one embodiment, fast ALU 2616, fast ALU 2618, and slow ALU 2620 may perform integer operations on 64-bit data operands. In at least one embodiment, fast ALU 2616, fast ALU 2618, and slow ALU 2620 may be implemented to support a variety of data bit sizes including sixteen, thirty-two, 128, 256, etc. In at least one embodiment, floating point ALU 2622 and floating point move unit 2624 may be implemented to support a range of operands having bits of various widths, such as 128-bit wide packed data operands in conjunction with SIMD and multimedia instructions.

In at least one embodiment, uop schedulers 2602, 2604, 2606 dispatch dependent operations before a parent load has finished executing. In at least one embodiment, as uops may be speculatively scheduled and executed in processor 2600, processor 2600 may also include logic to handle memory misses. In at least one embodiment, if a data load misses in a data cache, there may be dependent operations in flight in a pipeline that have left a scheduler with temporarily incorrect data. In at least one embodiment, a replay mechanism tracks and re-executes instructions that use incorrect data. In at least one embodiment, dependent operations might need to be replayed and independent ones may be allowed to complete. In at least one embodiment, schedulers and a replay mechanism of at least one embodiment of a processor may also be designed to catch instruction sequences for text string comparison operations.

In at least one embodiment, "registers" may refer to on-board processor storage locations that may be used as part of instructions to identify operands. In at least one embodiment, registers may be those that may be usable from outside of a processor (from a programmer's perspective). In at least one embodiment, registers might not be limited to a particular type of circuit. Rather, in at least one embodiment, a register may store data, provide data, and perform functions described herein. In at least one embodiment, registers described herein may be implemented by circuitry within a processor using any number of different techniques, such as dedicated physical registers, dynamically allocated physical registers using register renaming, combinations of dedicated and dynamically allocated physical registers, etc. In at least one embodiment, integer registers store 32-bit integer data. A register file of at least one embodiment also contains eight multimedia SIMD registers for packed data.

Inference and/or training logic 1015 are used to perform inferencing and/or training operations associated with one or more embodiments. Details regarding inference and/or training logic 1015 are provided herein in conjunction with FIGS. 10A and/or 10B. In at least one embodiment portions or all of inference and/or training logic 1015 may be incorporated into execution block 2611 and other memory or registers shown or not shown. For example, in at least one embodiment, training and/or inferencing techniques described herein may use one or more of ALUs illustrated in execution block 2611. Moreover, weight parameters may be stored in on-chip or off-chip memory and/or registers (shown or not shown) that configure ALUs of execution block 2611 to perform one or more machine learning algorithms, neural network architectures, use cases, or training techniques described herein.

Figure 27:
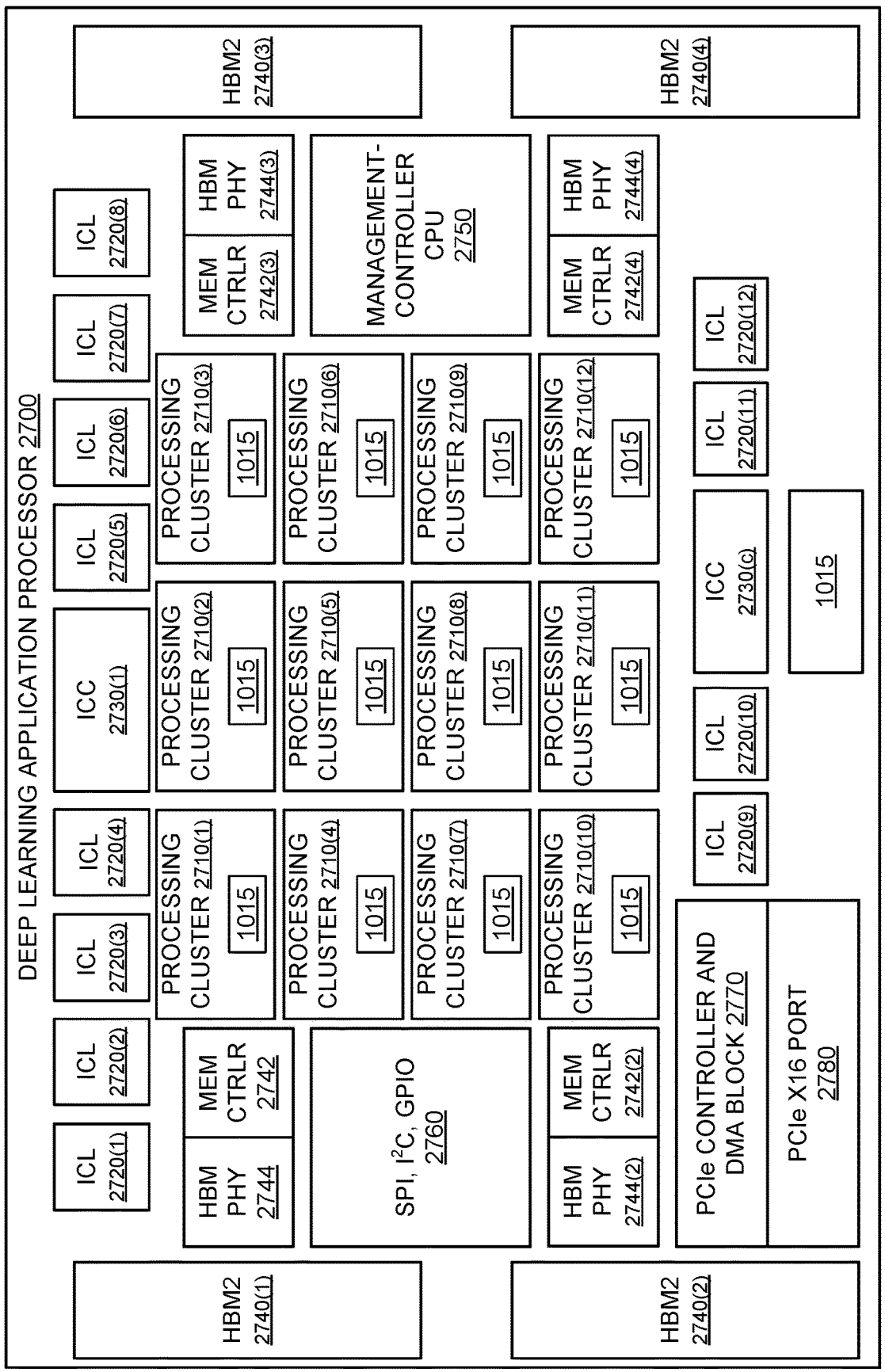
FIG. 27 illustrates a deep learning application processor, according to at least one embodiment.

FIG. 27 illustrates a deep learning application processor 2700, according to at least one embodiment. In at least one embodiment, deep learning application processor 2700 uses instructions that, if executed by deep learning application processor 2700, cause deep learning application processor 2700 to perform some or all of processes and techniques described throughout this disclosure. In at least one embodiment, deep learning application processor 2700 is an application-specific integrated circuit (ASIC). In at least one embodiment, application processor 2700 performs matrix multiply operations either "hard-wired" into hardware as a result of performing one or more instructions or both. In at least one embodiment, deep learning application processor 2700 includes, without limitation, processing clusters 2710 (1)-2710(12), Inter-Chip Links ("ICLs") 2720(1)-2720(12), Inter-Chip Controllers ("ICCs") 2730(1)-2730(2), high-bandwidth memory second generation ("HBM2") 2740(1)-2740(4), memory controllers ("Mem Ctrlrs") 2742(1)-2742(4), high bandwidth memory physical layer ("HBM PHY") 2744(1)-2744(4), a management-controller central processing unit ("management-controller CPU") 2750, a Serial Peripheral Interface, Inter-Integrated Circuit, and General Purpose Input/Output block ("SPI, I²C, GPIO") 2760, a peripheral component interconnect express controller and direct memory access block ("PCIe Controller and DMA") 2770, and a sixteen-lane peripheral component interconnect express port ("PCI Express×16") 2780.

In at least one embodiment, processing clusters 2710 may perform deep learning operations, including inference or prediction operations based on weight parameters calculated one or more training techniques, including those described herein. In at least one embodiment, each processing cluster 2710 may include, without limitation, any number and type of processors. In at least one embodiment, deep learning application processor 2700 may include any number and type of processing clusters 2700. In at least one embodiment, Inter-Chip Links 2720 are bi-directional. In at least one embodiment, Inter-Chip Links 2720 and Inter-Chip Controllers 2730 enable multiple deep learning application processors 2700 to exchange information, including activation information resulting from performing one or more machine learning algorithms embodied in one or more neural networks. In at least one embodiment, deep learning application processor 2700 may include any number (including zero) and type of ICLs 2720 and ICCs 2730.

In at least one embodiment, HBM2s 2740 provide a total of 32 Gigabytes (GB) of memory. In at least one embodiment, HBM2 2740(i) is associated with both memory controller 2742(i) and HBM PHY 2744(i) where "i" is an arbitrary integer. In at least one embodiment, any number of HBM2s 2740 may provide any type and total amount of high bandwidth memory and may be associated with any number (including zero) and type of memory controllers 2742 and HBM PHYs 2744. In at least one embodiment, SPI, I²C, GPIO 2760, PCIe Controller and DMA 2770, and/or PCIe 2780 may be replaced with any number and type of blocks that enable any number and type of communication standards in any technically feasible fashion.

Inference and/or training logic 1015 are used to perform inferencing and/or training operations associated with one or more embodiments. Details regarding inference and/or training logic 1015 are provided herein in conjunction with FIGS. 10A and/or 10B. In at least one embodiment, deep learning application processor is used to train a machine learning model, such as a neural network, to predict or infer information provided to deep learning application processor 2700. In at least one embodiment, deep learning application processor 2700 is used to infer or predict information based on a trained machine learning model (e.g., neural network) that has been trained by another processor or system or by deep learning application processor 2700. In at least one embodiment, processor 2700 may be used to perform one or more neural network use cases described herein.

Figure 28:
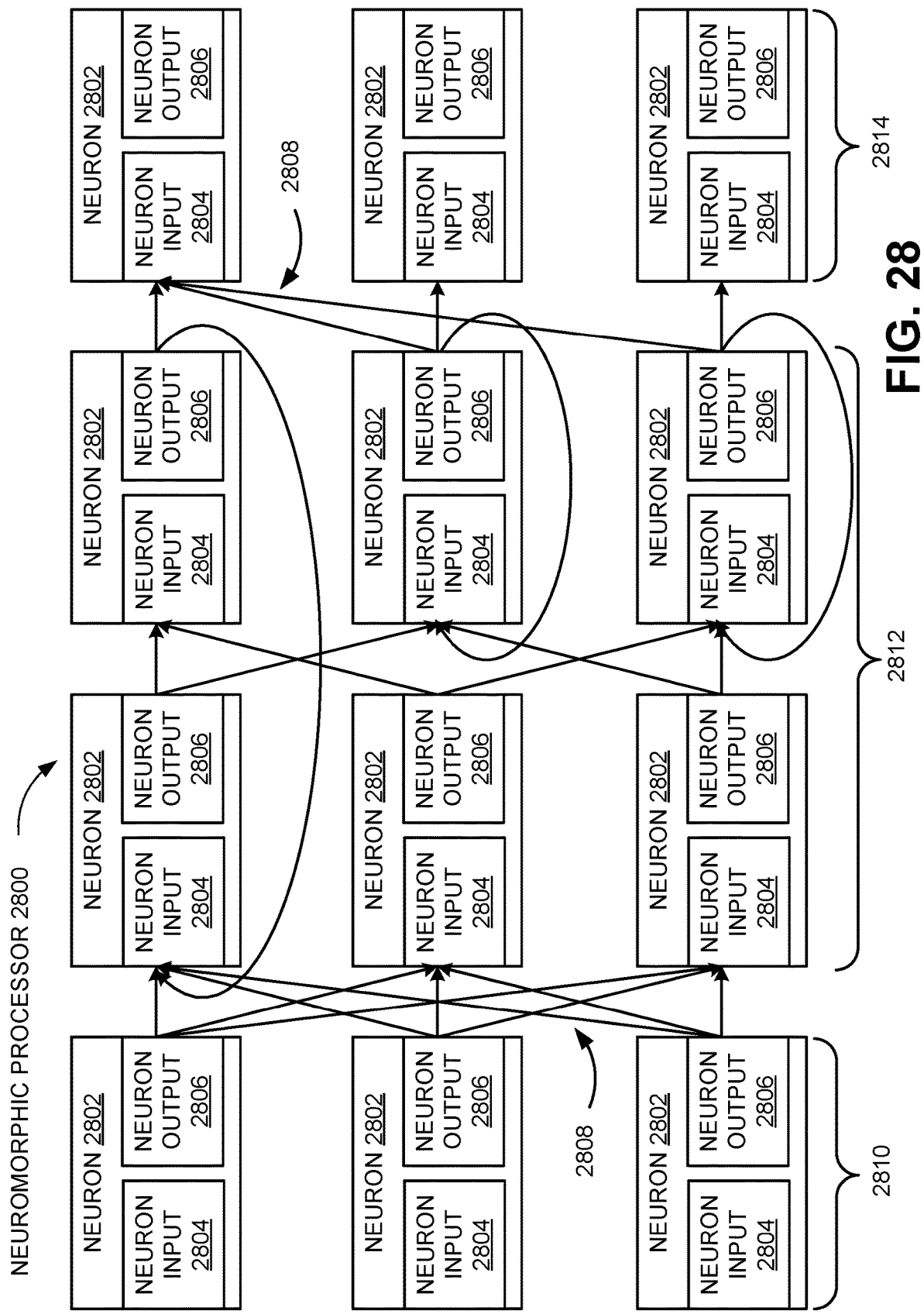
FIG. 28 is a block diagram illustrating an example neuromorphic processor, according to at least one embodiment.

FIG. 28 is a block diagram of a neuromorphic processor 2800, according to at least one embodiment. In at least one embodiment, neuromorphic processor 2800 may receive one or more inputs from sources external to neuromorphic processor 2800. In at least one embodiment, these inputs may be transmitted to one or more neurons 2802 within neuromorphic processor 2800. In at least one embodiment, neurons 2802 and components thereof may be implemented using circuitry or logic, including one or more arithmetic logic units (ALUs). In at least one embodiment, neuromorphic processor 2800 may include, without limitation, thousands or millions of instances of neurons 2802, but any suitable number of neurons 2802 may be used. In at least one embodiment, each instance of neuron 2802 may include a neuron input 2804 and a neuron output 2806. In at least one embodiment, neurons 2802 may generate outputs that may be transmitted to inputs of other instances of neurons 2802. For example, in at least one embodiment, neuron inputs 2804 and neuron outputs 2806 may be interconnected via synapses 2808.

In at least one embodiment, neurons 2802 and synapses 2808 may be interconnected such that neuromorphic processor 2800 operates to process or analyze information received by neuromorphic processor 2800. In at least one embodiment, neurons 2802 may transmit an output pulse (or "fire" or "spike") when inputs received through neuron input 2804 exceed a threshold. In at least one embodiment, neurons 2802 may sum or integrate signals received at neuron inputs 2804. For example, in at least one embodiment, neurons 2802 may be implemented as leaky integrate-and-fire neurons, wherein if a sum (referred to as a "membrane potential") exceeds a threshold value, neuron 2802 may generate an output (or "fire") using a transfer function such as a sigmoid or threshold function. In at least one embodiment, a leaky integrate-and-fire neuron may sum signals received at neuron inputs 2804 into a membrane potential and may also apply a decay factor (or leak) to reduce a membrane potential. In at least one embodiment, a leaky integrate-and-fire neuron may fire if multiple input signals are received at neuron inputs 2804 rapidly enough to exceed a threshold value (i.e., before a membrane potential decays too low to fire). In at least one embodiment, neurons 2802 may be implemented using circuits or logic that receive inputs, integrate inputs into a membrane potential, and decay a membrane potential. In at least one embodiment, inputs may be averaged, or any other suitable transfer function may be used. Furthermore, in at least one embodiment, neurons 2802 may include, without limitation, comparator circuits or logic that generate an output spike at neuron output 2806 when result of applying a transfer function to neuron input 2804 exceeds a threshold. In at least one embodiment, once neuron 2802 fires, it may disregard previously received input information by, for example, resetting a membrane potential to 0 or another suitable default value. In at least one embodiment, once membrane potential is reset to 0, neuron 2802 may resume normal operation after a suitable period of time (or refractory period).

In at least one embodiment, neurons 2802 may be interconnected through synapses 2808. In at least one embodiment, synapses 2808 may operate to transmit signals from an output of a first neuron 2802 to an input of a second neuron 2802. In at least one embodiment, neurons 2802 may transmit information over more than one instance of synapse 2808. In at least one embodiment, one or more instances of neuron output 2806 may be connected, via an instance of synapse 2808, to an instance of neuron input 2804 in same neuron 2802. In at least one embodiment, an instance of neuron 2802 generating an output to be transmitted over an instance of synapse 2808 may be referred to as a "pre-synaptic neuron" with respect to that instance of synapse 2808. In at least one embodiment, an instance of neuron 2802 receiving an input transmitted over an instance of synapse 2808 may be referred to as a "post-synaptic neuron" with respect to that instance of synapse 2808. Because an instance of neuron 2802 may receive inputs from one or more instances of synapse 2808, and may also transmit outputs over one or more instances of synapse 2808, a single instance of neuron 2802 may therefore be both a "pre-synaptic neuron" and "post-synaptic neuron," with respect to various instances of synapses 2808, in at least one embodiment.

In at least one embodiment, neurons 2802 may be organized into one or more layers. In at least one embodiment, each instance of neuron 2802 may have one neuron output 2806 that may fan out through one or more synapses 2808 to one or more neuron inputs 2804. In at least one embodiment, neuron outputs 2806 of neurons 2802 in a first layer 2810 may be connected to neuron inputs 2804 of neurons 2802 in a second layer 2812. In at least one embodiment, layer 2810 may be referred to as a "feed-forward layer." In at least one embodiment, each instance of neuron 2802 in an instance of first layer 2810 may fan out to each instance of neuron 2802 in second layer 2812. In at least one embodiment, first layer 2810 may be referred to as a "fully connected feed-forward layer." In at least one embodiment, each instance of neuron 2802 in an instance of second layer 2812 may fan out to fewer than all instances of neuron 2802 in a third layer 2814. In at least one embodiment, second layer 2812 may be referred to as a "sparsely connected feed-forward layer." In at least one embodiment, neurons 2802 in second layer 2812 may fan out to neurons 2802 in multiple other layers, including to neurons 2802 also in second layer 2812. In at least one embodiment, second layer 2812 may be referred to as a "recurrent layer." In at least one embodiment, neuromorphic processor 2800 may include, without limitation, any suitable combination of recurrent layers and feed-forward layers, including, without limitation, both sparsely connected feed-forward layers and fully connected feed-forward layers.

In at least one embodiment, neuromorphic processor 2800 may include, without limitation, a reconfigurable interconnect architecture or dedicated hard-wired interconnects to connect synapse 2808 to neurons 2802. In at least one embodiment, neuromorphic processor 2800 may include, without limitation, circuitry or logic that allows synapses to be allocated to different neurons 2802 as needed based on neural network topology and neuron fan-in/out. For example, in at least one embodiment, synapses 2808 may be connected to neurons 2802 using an interconnect fabric, such as network-on-chip, or with dedicated connections. In at least one embodiment, synapse interconnections and components thereof may be implemented using circuitry or logic.

Figure 29:
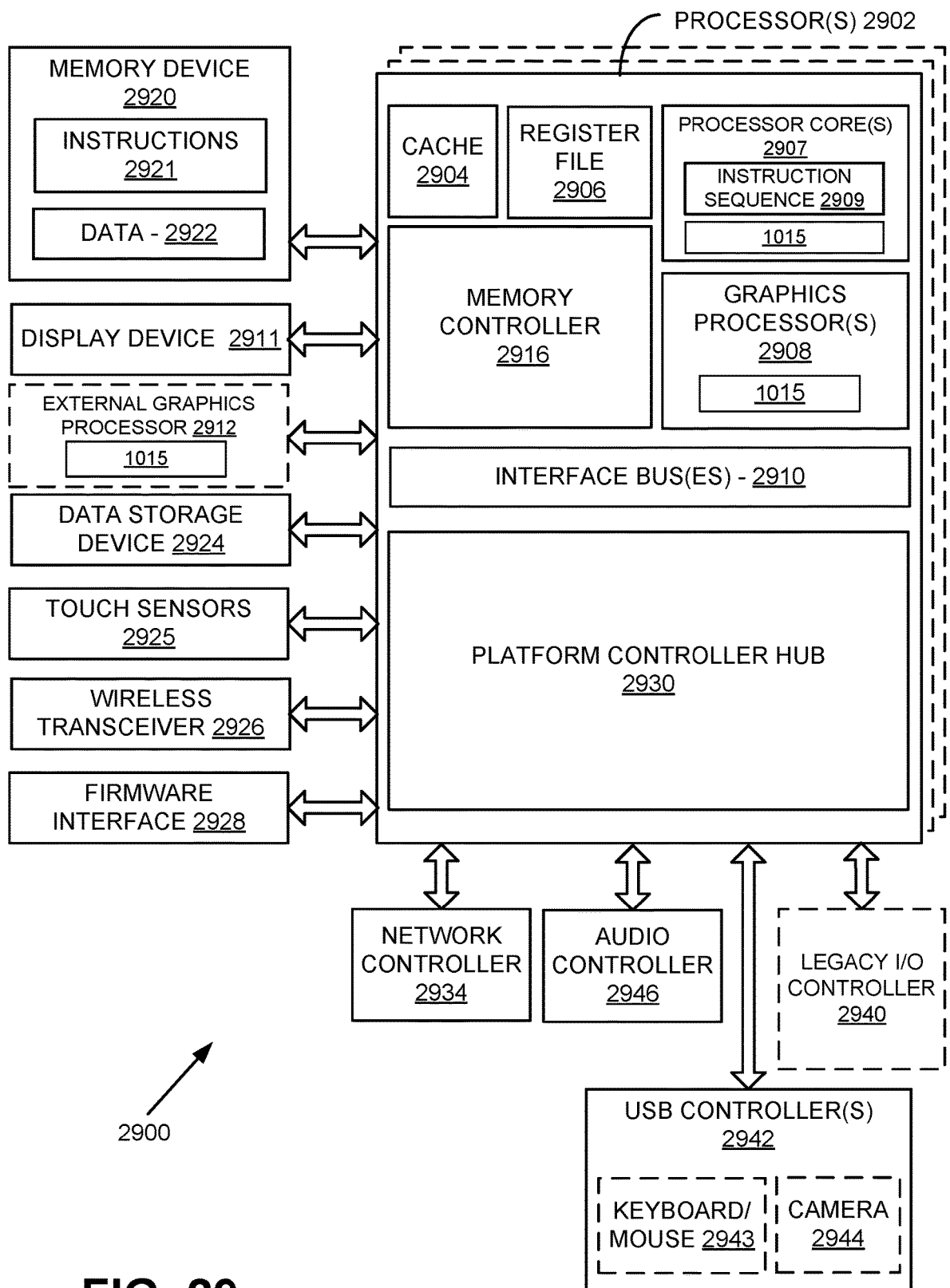
FIG. 29 illustrates at least portions of a graphics processor, according to one or more embodiments.

FIG. 29 is a block diagram of a processing system, according to at least one embodiment. In at least one embodiment, system 2900 includes one or more processors 2902 and one or more graphics processors 2908, and may be a single processor desktop system, a multiprocessor workstation system, or a server system having a large number of processors 2902 or processor cores 2907. In at least one embodiment, system 2900 is a processing platform incorporated within a system-on-a-chip (SoC) integrated circuit for use in mobile, handheld, or embedded devices.

In at least one embodiment, system 2900 can include, or be incorporated within a server-based gaming platform, a game console, including a game and media console, a mobile gaming console, a handheld game console, or an online game console. In at least one embodiment, system 2900 is a mobile phone, a smart phone, a tablet computing device or a mobile Internet device. In at least one embodiment, processing system 2900 can also include, couple with, or be integrated within a wearable device, such as a smart watch wearable device, a smart eyewear device, an augmented reality device, or a virtual reality device. In at least one embodiment, processing system 2900 is a television or set top box device having one or more processors 2902 and a graphical interface generated by one or more graphics processors 2908.

In at least one embodiment, one or more processors 2902 each include one or more processor cores 2907 to process instructions which, when executed, perform operations for system and user software. In at least one embodiment, each of one or more processor cores 2907 is configured to process a specific instruction sequence 2909. In at least one embodiment, instruction sequence 2909 may facilitate Complex Instruction Set Computing (CISC), Reduced Instruction Set Computing (RISC), or computing via a Very Long Instruction Word (VLIW). In at least one embodiment, processor cores 2907 may each process a different instruction sequence 2909, which may include instructions to facilitate emulation of other instruction sequences. In at least one embodiment, processor core 2907 may also include other processing devices, such a Digital Signal Processor (DSP).

In at least one embodiment, processor 2902 includes a cache memory 2904. In at least one embodiment, processor 2902 can have a single internal cache or multiple levels of internal cache. In at least one embodiment, cache memory is shared among various components of processor 2902. In at least one embodiment, processor 2902 also uses an external cache (e.g., a Level-3 (L3) cache or Last Level Cache (LLC)) (not shown), which may be shared among processor cores 2907 using known cache coherency techniques. In at least one embodiment, a register file 2906 is additionally included in processor 2902, which may include different types of registers for storing different types of data (e.g., integer registers, floating point registers, status registers, and an instruction pointer register). In at least one embodiment, register file 2906 may include general-purpose registers or other registers.

In at least one embodiment, one or more processor(s) 2902 are coupled with one or more interface bus(es) 2910 to transmit communication signals such as address, data, or control signals between processor 2902 and other components in system 2900. In at least one embodiment, interface bus 2910 can be a processor bus, such as a version of a Direct Media Interface (DMI) bus. In at least one embodiment, interface bus 2910 is not limited to a DMI bus, and may include one or more Peripheral Component Interconnect buses (e.g., PCI, PCI Express), memory busses, or other types of interface busses. In at least one embodiment processor(s) 2902 include an integrated memory controller 2916 and a platform controller hub 2930. In at least one embodiment, memory controller 2916 facilitates communication between a memory device and other components of system 2900, while platform controller hub (PCH) 2930 provides connections to I/O devices via a local I/O bus.

In at least one embodiment, a memory device 2920 can be a dynamic random access memory (DRAM) device, a static random access memory (SRAM) device, flash memory device, phase-change memory device, or some other memory device having suitable performance to serve as process memory. In at least one embodiment, memory device 2920 can operate as system memory for system 2900, to store data 2922 and instructions 2921 for use when one or more processors 2902 executes an application or process. In at least one embodiment, memory controller 2916 also couples with an optional external graphics processor 2912, which may communicate with one or more graphics processors 2908 in processors 2902 to perform graphics and media operations. In at least one embodiment, a display device 2911 can connect to processor(s) 2902. In at least one embodiment, display device 2911 can include one or more of an internal display device, as in a mobile electronic device or a laptop device, or an external display device attached via a display interface (e.g., DisplayPort, etc.). In at least one embodiment, display device 2911 can include a head mounted display (HMD) such as a stereoscopic display device for use in virtual reality (VR) applications or augmented reality (AR) applications.

In at least one embodiment, platform controller hub 2930 enables peripherals to connect to memory device 2920 and processor 2902 via a high-speed I/O bus. In at least one embodiment, I/O peripherals include, but are not limited to, an audio controller 2946, a network controller 2934, a firmware interface 2928, a wireless transceiver 2926, touch sensors 2925, a data storage device 2924 (e.g., hard disk drive, flash memory, etc.). In at least one embodiment, data storage device 2924 can connect via a storage interface (e.g., SATA) or via a peripheral bus, such as a Peripheral Component Interconnect bus (e.g., PCI, PCI Express). In at least one embodiment, touch sensors 2925 can include touch screen sensors, pressure sensors, or fingerprint sensors. In at least one embodiment, wireless transceiver 2926 can be a Wi-Fi transceiver, a Bluetooth transceiver, or a mobile network transceiver such as a 3G, 4G, or Long Term Evolution (LTE) transceiver. In at least one embodiment, firmware interface 2928 enables communication with system firmware, and can be, for example, a unified extensible firmware interface (UEFI). In at least one embodiment, network controller 2934 can enable a network connection to a wired network. In at least one embodiment, a high-performance network controller (not shown) couples with interface bus 2910. In at least one embodiment, audio controller 2946 is a multi-channel high definition audio controller. In at least one embodiment, system 2900 includes an optional legacy I/O controller 2940 for coupling legacy (e.g., Personal System 2 (PS/2)) devices to system 2900. In at least one embodiment, platform controller hub 2930 can also connect to one or more Universal Serial Bus (USB) controllers 2942 connect input devices, such as keyboard and mouse 2943 combinations, a camera 2944, or other USB input devices.

In at least one embodiment, an instance of memory controller 2916 and platform controller hub 2930 may be integrated into a discreet external graphics processor, such as external graphics processor 2912. In at least one embodiment, platform controller hub 2930 and/or memory controller 2916 may be external to one or more processor(s) 2902. For example, in at least one embodiment, system 2900 can include an external memory controller 2916 and platform controller hub 2930, which may be configured as a memory controller hub and peripheral controller hub within a system chipset that is in communication with processor(s) 2902.

Inference and/or training logic 1015 are used to perform inferencing and/or training operations associated with one or more embodiments. Details regarding inference and/or training logic 1015 are provided herein in conjunction with FIGS. 10A and/or 10B. In at least one embodiment portions or all of inference and/or training logic 1015 may be incorporated into graphics processor 2908. For example, in at least one embodiment, training and/or inferencing techniques described herein may use one or more of ALUs embodied in a 3D pipeline. Moreover, in at least one embodiment, inferencing and/or training operations described herein may be done using logic other than logic illustrated in FIG. 10A or 10B. In at least one embodiment, weight parameters may be stored in on-chip or off-chip memory and/or registers (shown or not shown) that configure ALUs of graphics processor 2908 to perform one or more machine learning algorithms, neural network architectures, use cases, or training techniques described herein.

Figure 30:
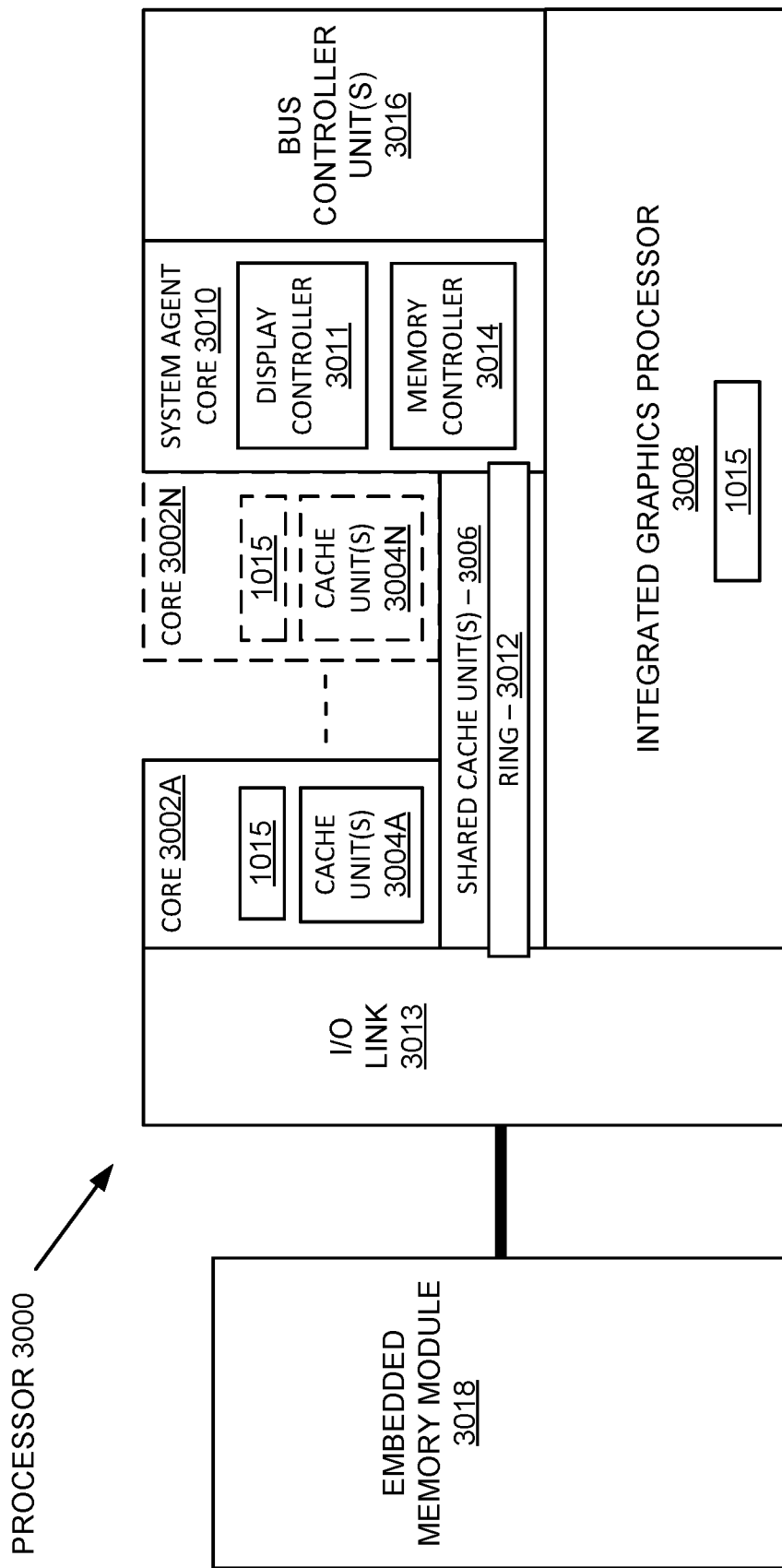
FIG. 30 illustrates at least portions of a graphics processor, according to one or more embodiments.

FIG. 30 is a block diagram of a processor 3000 having one or more processor cores 3002A-3002N, an integrated memory controller 3014, and an integrated graphics processor 3008, according to at least one embodiment. In at least one embodiment, processor 3000 can include additional cores up to and including additional core 3002N represented by dashed lined boxes. In at least one embodiment, each of processor cores 3002A-3002N includes one or more internal cache units 3004A-3004N. In at least one embodiment, each processor core also has access to one or more shared cached units 3006.

In at least one embodiment, internal cache units 3004A-3004N and shared cache units 3006 represent a cache memory hierarchy within processor 3000. In at least one embodiment, cache memory units 3004A-3004N may include at least one level of instruction and data cache within each processor core and one or more levels of shared mid-level cache, such as a Level 2 (L2), Level 3 (L3), Level 4 (L4), or other levels of cache, where a highest level of cache before external memory is classified as an LLC. In at least one embodiment, cache coherency logic maintains coherency between various cache units 3006 and 3004A-3004N.

In at least one embodiment, processor 3000 may also include a set of one or more bus controller units 3016 and a system agent core 3010. In at least one embodiment, bus controller units 3016 manage a set of peripheral buses, such as one or more PCI or PCI express busses. In at least one embodiment, system agent core 3010 provides management functionality for various processor components. In at least one embodiment, system agent core 3010 includes one or more integrated memory controllers 3014 to manage access to various external memory devices (not shown).

In at least one embodiment, one or more of processor cores 3002A-3002N include support for simultaneous multi-threading. In at least one embodiment, system agent core 3010 includes components for coordinating and operating cores 3002A-3002N during multi-threaded processing. In at least one embodiment, system agent core 3010 may additionally include a power control unit (PCU), which includes logic and components to regulate one or more power states of processor cores 3002A-3002N and graphics processor 3008.

In at least one embodiment, processor 3000 additionally includes graphics processor 3008 to execute graphics processing operations. In at least one embodiment, graphics processor 3008 couples with shared cache units 3006, and system agent core 3010, including one or more integrated memory controllers 3014. In at least one embodiment, system agent core 3010 also includes a display controller 3011 to drive graphics processor output to one or more coupled displays. In at least one embodiment, display controller 3011 may also be a separate module coupled with graphics processor 3008 via at least one interconnect, or may be integrated within graphics processor 3008.

In at least one embodiment, a ring-based interconnect unit 3012 is used to couple internal components of processor 3000. In at least one embodiment, an alternative interconnect unit may be used, such as a point-to-point interconnect, a switched interconnect, or other techniques. In at least one embodiment, graphics processor 3008 couples with ring interconnect 3012 via an I/O link 3013.

In at least one embodiment, I/O link 3013 represents at least one of multiple varieties of I/O interconnects, including an on package I/O interconnect which facilitates communication between various processor components and a high-performance embedded memory module 3018, such as an eDRAM module. In at least one embodiment, each of processor cores 3002A-3002N and graphics processor 3008 use embedded memory module 3018 as a shared Last Level Cache.

In at least one embodiment, processor cores 3002A-3002N are homogeneous cores executing a common instruction set architecture. In at least one embodiment, processor cores 3002A-3002N are heterogeneous in terms of instruction set architecture (ISA), where one or more of processor cores 3002A-3002N execute a common instruction set, while one or more other cores of processor cores 3002A-3002N executes a subset of a common instruction set or a different instruction set. In at least one embodiment, processor cores 3002A-3002N are heterogeneous in terms of microarchitecture, where one or more cores having a relatively higher power consumption couple with one or more power cores having a lower power consumption. In at least one embodiment, processor 3000 can be implemented on one or more chips or as an SoC integrated circuit.

Inference and/or training logic 1015 are used to perform inferencing and/or training operations associated with one or more embodiments. Details regarding inference and/or training logic 1015 are provided herein in conjunction with FIGS. 10A and/or 10B. In at least one embodiment portions or all of inference and/or training logic 1015 may be incorporated into graphics processor 3008. For example, in at least one embodiment, training and/or inferencing techniques described herein may use one or more of ALUs embodied in a 3D pipeline, graphics core(s) 3002, shared function logic, or other logic in FIG. 30. Moreover, in at least one embodiment, inferencing and/or training operations described herein may be done using logic other than logic illustrated in FIG. 10A or 10B. In at least one embodiment, weight parameters may be stored in on-chip or off-chip memory and/or registers (shown or not shown) that configure ALUs of processor 3000 to perform one or more machine learning algorithms, neural network architectures, use cases, or training techniques described herein.

Figure 31:
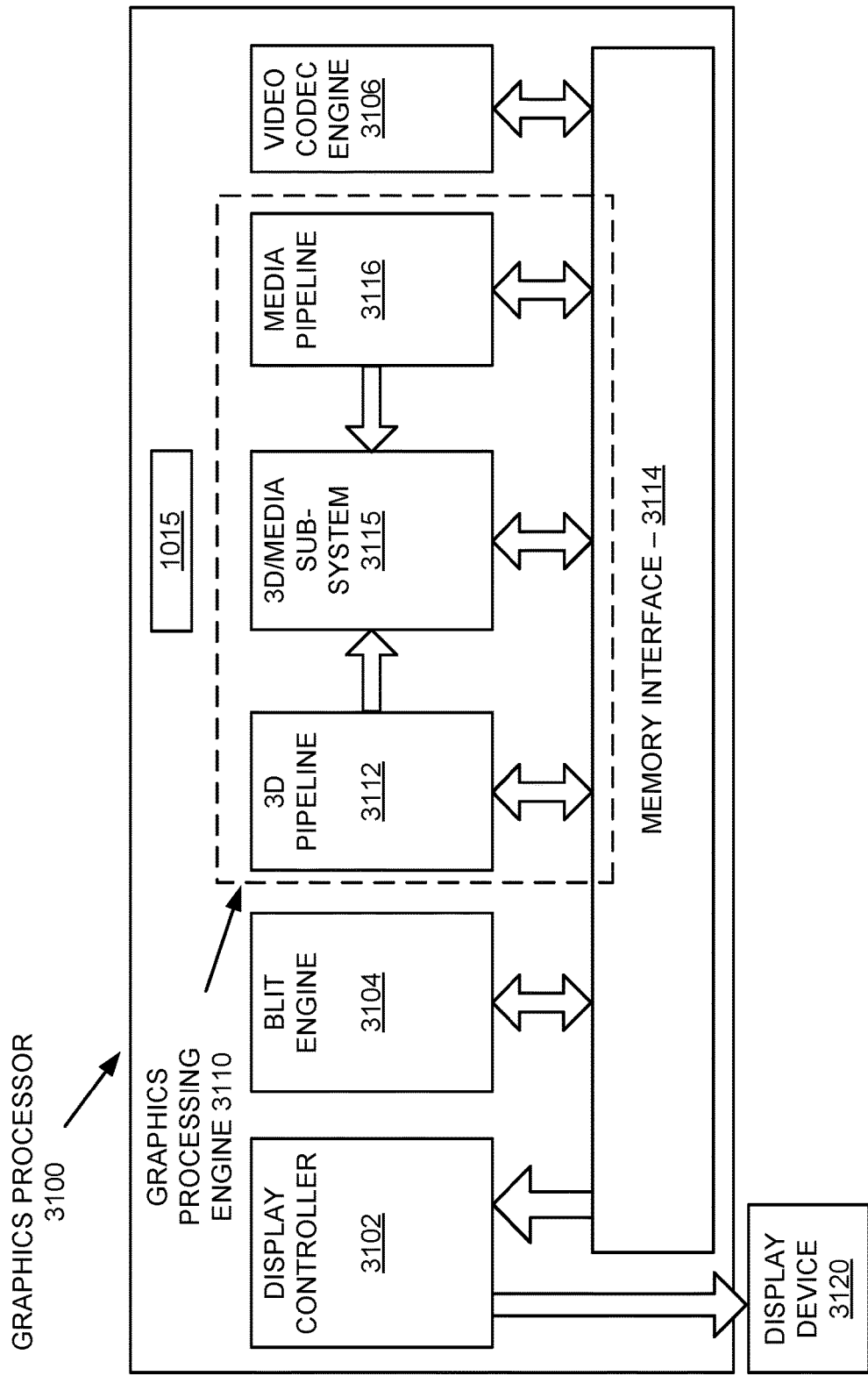
FIG. 31 illustrates at least portions of a graphics processor, according to one or more embodiments.

FIG. 31 is a block diagram of a graphics processor 3100, which may be a discrete graphics processing unit, or may be a graphics processor integrated with a plurality of processing cores. In at least one embodiment, graphics processor 3100 communicates via a memory mapped I/O interface to registers on graphics processor 3100 and with commands placed into memory. In at least one embodiment, graphics processor 3100 includes a memory interface 3114 to access memory. In at least one embodiment, memory interface 3114 is an interface to local memory, one or more internal caches, one or more shared external caches, and/or to system memory.

In at least one embodiment, graphics processor 3100 also includes a display controller 3102 to drive display output data to a display device 3120. In at least one embodiment, display controller 3102 includes hardware for one or more overlay planes for display device 3120 and composition of multiple layers of video or user interface elements. In at least one embodiment, display device 3120 can be an internal or external display device. In at least one embodiment, display device 3120 is a head mounted display device, such as a virtual reality (VR) display device or an augmented reality (AR) display device. In at least one embodiment, graphics processor 3100 includes a video codec engine 3106 to encode, decode, or transcode media to, from, or between one or more media encoding formats, including, but not limited to Moving Picture Experts Group (MPEG) formats such as MPEG-2, Advanced Video Coding (AVC) formats such as H.264/MPEG-4 AVC, as well as the Society of Motion Picture & Television Engineers (SMPTE) 421M/VC-1, and Joint Photographic Experts Group (JPEG) formats such as JPEG, and Motion JPEG (MJPEG) formats.

In at least one embodiment, graphics processor 3100 includes a block image transfer (BLIT) engine 3104 to perform two-dimensional (2D) rasterizer operations including, for example, bit-boundary block transfers. However, in at least one embodiment, 2D graphics operations are performed using one or more components of a graphics processing engine (GPE) 3110. In at least one embodiment, GPE 3110 is a compute engine for performing graphics operations, including three-dimensional (3D) graphics operations and media operations.

In at least one embodiment, GPE 3110 includes a 3D pipeline 3112 for performing 3D operations, such as rendering three-dimensional images and scenes using processing functions that act upon 3D primitive shapes (e.g., rectangle, triangle, etc.). In at least one embodiment, 3D pipeline 3112 includes programmable and fixed function elements that perform various tasks and/or spawn execution threads to a 3D/Media sub-system 3115. While 3D pipeline 3112 can be used to perform media operations, in at least one embodiment, GPE 3110 also includes a media pipeline 3116 that is used to perform media operations, such as video post-processing and image enhancement.

In at least one embodiment, media pipeline 3116 includes fixed function or programmable logic units to perform one or more specialized media operations, such as video decode acceleration, video de-interlacing, and video encode acceleration in place of, or on behalf of, video codec engine 3106. In at least one embodiment, media pipeline 3116 additionally includes a thread spawning unit to spawn threads for execution on 3D/Media sub-system 3115. In at least one embodiment, spawned threads perform computations for media operations on one or more graphics execution units included in 3D/Media sub-system 3115.

In at least one embodiment, 3D/Media subsystem 3115 includes logic for executing threads spawned by 3D pipeline 3112 and media pipeline 3116. In at least one embodiment, 3D pipeline 3112 and media pipeline 3116 send thread execution requests to 3D/Media subsystem 3115, which includes thread dispatch logic for arbitrating and dispatching various requests to available thread execution resources. In at least one embodiment, execution resources include an array of graphics execution units to process 3D and media threads. In at least one embodiment, 3D/Media subsystem 3115 includes one or more internal caches for thread instructions and data. In at least one embodiment, subsystem 3115 also includes shared memory, including registers and addressable memory, to share data between threads and to store output data.

Inference and/or training logic 1015 are used to perform inferencing and/or training operations associated with one or more embodiments. Details regarding inference and/or training logic 1015 are provided herein in conjunction with FIGS. 10A and/or 10B. In at least one embodiment portions or all of inference and/or training logic 1015 may be incorporated into graphics processor 3100. For example, in at least one embodiment, training and/or inferencing techniques described herein may use one or more of ALUs embodied in 3D pipeline 3112. Moreover, in at least one embodiment, inferencing and/or training operations described herein may be done using logic other than logic illustrated in FIG. 10A or 10B. In at least one embodiment, weight parameters may be stored in on-chip or off-chip memory and/or registers (shown or not shown) that configure ALUs of graphics processor 3100 to perform one or more machine learning algorithms, neural network architectures, use cases, or training techniques described herein.

Figure 32:
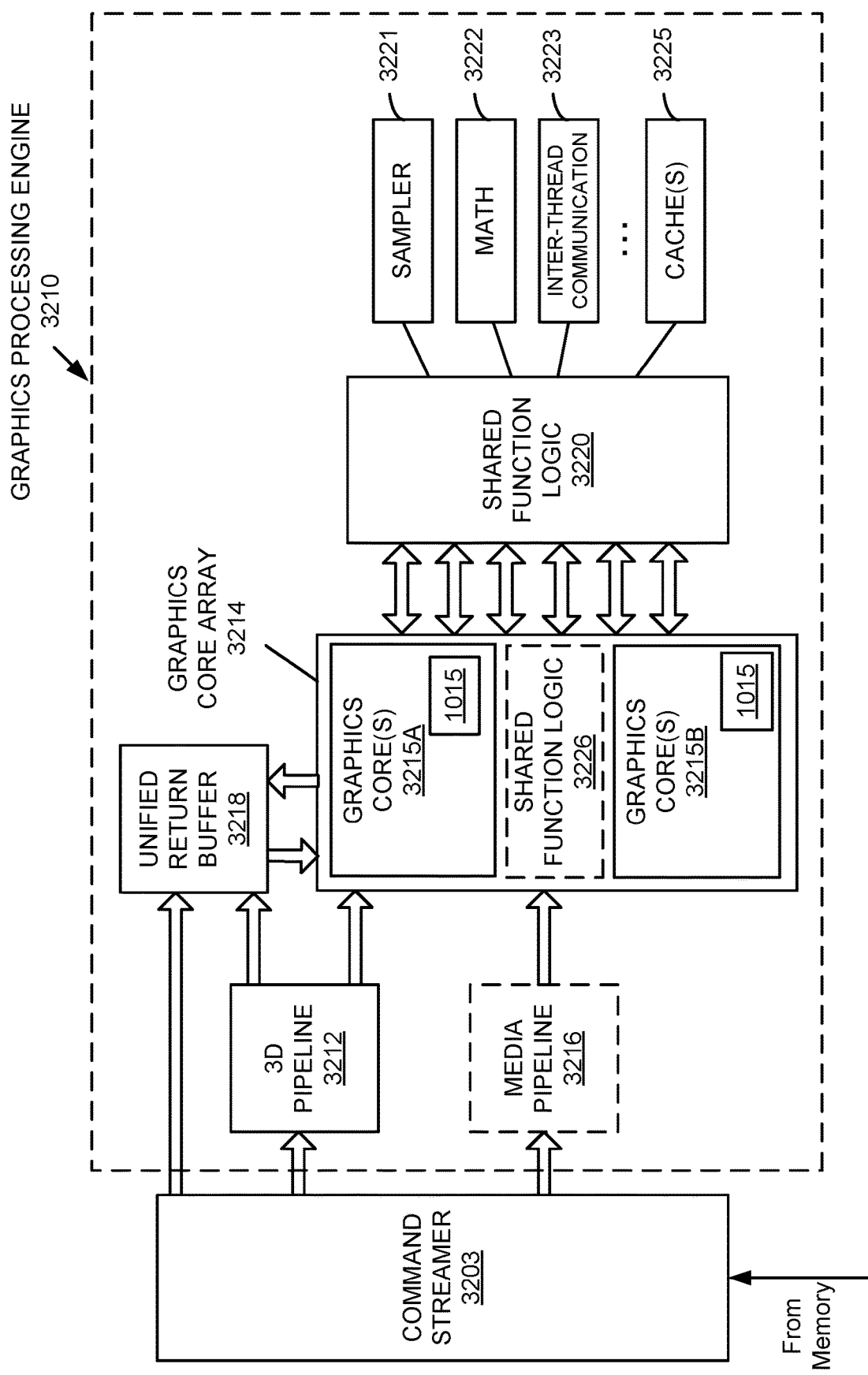
FIG. 32 is a block diagram of a graphics processing engine of a graphics processor in accordance with at least one embodiment.

FIG. 32 is a block diagram of a graphics processing engine 3210 of a graphics processor in accordance with at least one embodiment. In at least one embodiment, graphics processing engine (GPE) 3210 is a version of GPE 3110 shown in FIG. 31. In at least one embodiment, a media pipeline 3216 is optional and may not be explicitly included within GPE 3210. In at least one embodiment, a separate media and/or image processor is coupled to GPE 3210.

In at least one embodiment, GPE 3210 is coupled to or includes a command streamer 3203, which provides a command stream to a 3D pipeline 3212 and/or media pipeline 3216. In at least one embodiment, command streamer 3203 is coupled to memory, which can be system memory, or one or more of internal cache memory and shared cache memory. In at least one embodiment, command streamer 3203 receives commands from memory and sends commands to 3D pipeline 3212 and/or media pipeline 3216. In at least one embodiment, commands are instructions, primitives, or micro-operations fetched from a ring buffer, which stores commands for 3D pipeline 3212 and media pipeline 3216. In at least one embodiment, a ring buffer can additionally include batch command buffers storing batches of multiple commands. In at least one embodiment, commands for 3D pipeline 3212 can also include references to data stored in memory, such as, but not limited to, vertex and geometry data for 3D pipeline 3212 and/or image data and memory objects for media pipeline 3216. In at least one embodiment, 3D pipeline 3212 and media pipeline 3216 process commands and data by performing operations or by dispatching one or more execution threads to a graphics core array 3214. In at least one embodiment, graphics core array 3214 includes one or more blocks of graphics cores (e.g., graphics core(s) 3215A, graphics core(s) 3215B), each block including one or more graphics cores. In at least one embodiment, each graphics core includes a set of graphics execution resources that includes general-purpose and graphics specific execution logic to perform graphics and compute operations, as well as fixed function texture processing and/or machine learning and artificial intelligence acceleration logic, including inference and/or training logic 1015 in FIG. 10A and FIG. 10B.

In at least one embodiment, 3D pipeline 3212 includes fixed function and programmable logic to process one or more shader programs, such as vertex shaders, geometry shaders, pixel shaders, fragment shaders, compute shaders, or other shader programs, by processing instructions and dispatching execution threads to graphics core array 3214. In at least one embodiment, graphics core array 3214 provides a unified block of execution resources for use in processing shader programs. In at least one embodiment, a multi-purpose execution logic (e.g., execution units) within graphics core(s) 3215A-3215B of graphic core array 3214 includes support for various 3D API shader languages and can execute multiple simultaneous execution threads associated with multiple shaders.

In at least one embodiment, graphics core array 3214 also includes execution logic to perform media functions, such as video and/or image processing. In at least one embodiment, execution units additionally include general-purpose logic that is programmable to perform parallel general-purpose computational operations, in addition to graphics processing operations.

In at least one embodiment, output data generated by threads executing on graphics core array 3214 can output data to memory in a unified return buffer (URB) 3218. In at least one embodiment, URB 3218 can store data for multiple threads. In at least one embodiment, URB 3218 may be used to send data between different threads executing on graphics core array 3214. In at least one embodiment, URB 3218 may additionally be used for synchronization between threads on graphics core array 3214 and fixed function logic within shared function logic 3220.

In at least one embodiment, graphics core array 3214 is scalable, such that graphics core array 3214 includes a variable number of graphics cores, each having a variable number of execution units based on a target power and performance level of GPE 3210. In at least one embodiment, execution resources are dynamically scalable, such that execution resources may be enabled or disabled as needed.

In at least one embodiment, graphics core array 3214 is coupled to shared function logic 3220 that includes multiple resources that are shared between graphics cores in graphics core array 3214. In at least one embodiment, shared functions performed by shared function logic 3220 are embodied in hardware logic units that provide specialized supplemental functionality to graphics core array 3214. In at least one embodiment, shared function logic 3220 includes but is not limited to a sampler unit 3221, a math unit 3222, and inter-thread communication (ITC) logic 3223. In at least one embodiment, one or more cache(s) 3225 are included in, or coupled to, shared function logic 3220.

In at least one embodiment, a shared function is used if demand for a specialized function is insufficient for inclusion within graphics core array 3214. In at least one embodiment, a single instantiation of a specialized function is used in shared function logic 3220 and shared among other execution resources within graphics core array 3214. In at least one embodiment, specific shared functions within shared function logic 3220 that are used extensively by graphics core array 3214 may be included within shared function logic 3226 within graphics core array 3214. In at least one embodiment, shared function logic 3226 within graphics core array 3214 can include some or all logic within shared function logic 3220. In at least one embodiment, all logic elements within shared function logic 3220 may be duplicated within shared function logic 3226 of graphics core array 3214. In at least one embodiment, shared function logic 3220 is excluded in favor of shared function logic 3226 within graphics core array 3214.

Inference and/or training logic 1015 are used to perform inferencing and/or training operations associated with one or more embodiments. Details regarding inference and/or training logic 1015 are provided herein in conjunction with FIGS. 10A and/or 10B. In at least one embodiment portions or all of inference and/or training logic 1015 may be incorporated into graphics processor 3210. For example, in at least one embodiment, training and/or inferencing techniques described herein may use one or more of ALUs embodied in 3D pipeline 3212, graphics core(s) 3215, shared function logic 3226, shared function logic 3220, or other logic in FIG. 32. Moreover, in at least one embodiment, inferencing and/or training operations described herein may be done using logic other than logic illustrated in FIG. 10A or 10B. In at least one embodiment, weight parameters may be stored in on-chip or off-chip memory and/or registers (shown or not shown) that configure ALUs of graphics processor 3210 to perform one or more machine learning algorithms, neural network architectures, use cases, or training techniques described herein.

Figure 33:
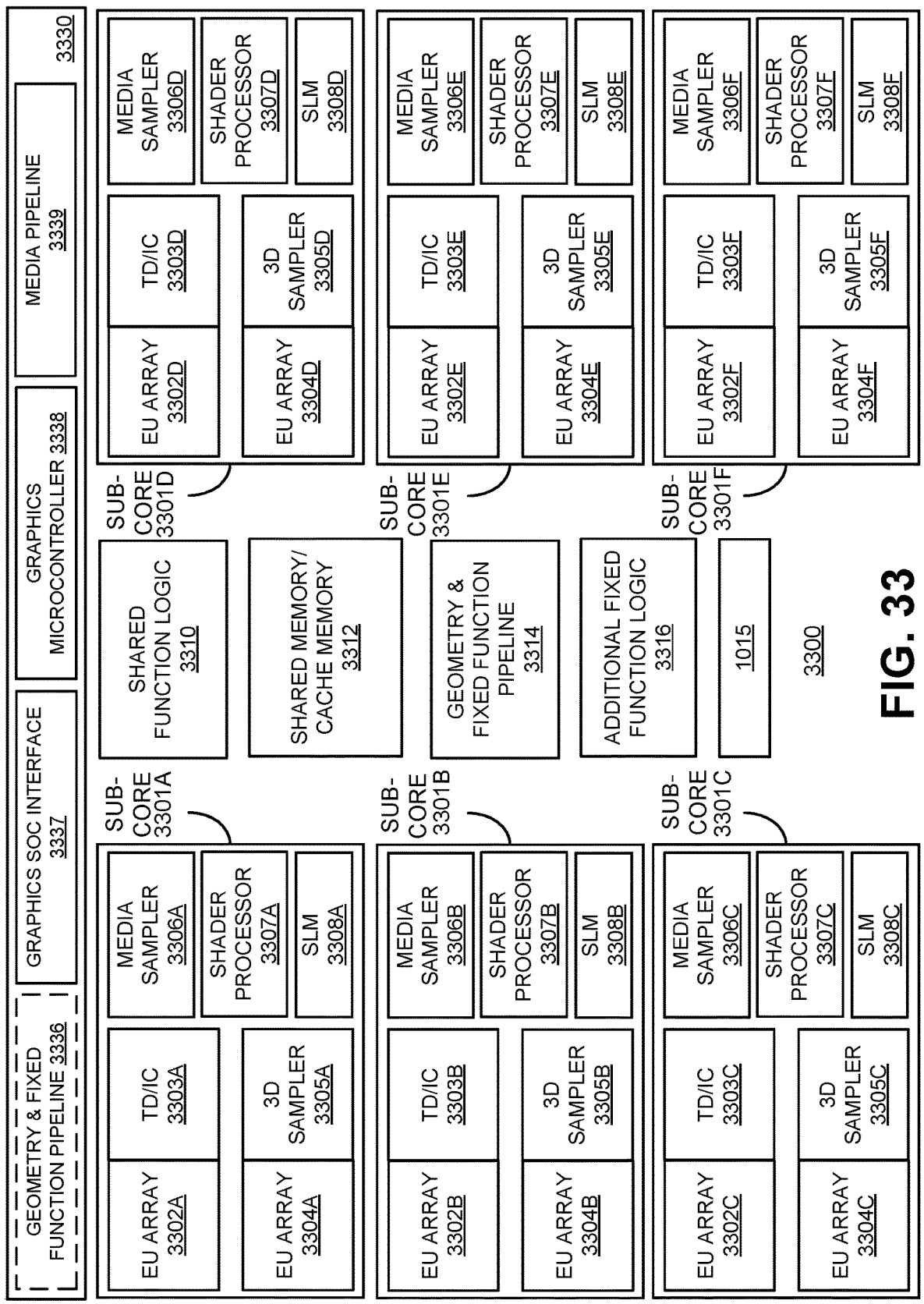
FIG. 33 is a block diagram of at least portions of a graphics processor core, according to at least one embodiment.

FIG. 33 is a block diagram of hardware logic of a graphics processor core 3300, according to at least one embodiment described herein. In at least one embodiment, graphics processor core 3300 is included within a graphics core array. In at least one embodiment, graphics processor core 3300, sometimes referred to as a core slice, can be one or multiple graphics cores within a modular graphics processor. In at least one embodiment, graphics processor core 3300 is exemplary of one graphics core slice, and a graphics processor as described herein may include multiple graphics core slices based on target power and performance envelopes. In at least one embodiment, each graphics core 3300 can include a fixed function block 3330 coupled with multiple sub-cores 3301A-3301F, also referred to as sub-slices, that include modular blocks of general-purpose and fixed function logic.

In at least one embodiment, fixed function block 3330 includes a geometry and fixed function pipeline 3336 that can be shared by all sub-cores in graphics processor 3300, for example, in lower performance and/or lower power graphics processor implementations. In at least one embodiment, geometry and fixed function pipeline 3336 includes a 3D fixed function pipeline, a video front-end unit, a thread spawner and thread dispatcher, and a unified return buffer manager, which manages unified return buffers.

In at least one embodiment, fixed function block 3330 also includes a graphics SoC interface 3337, a graphics microcontroller 3338, and a media pipeline 3339. In at least one embodiment, graphics SoC interface 3337 provides an interface between graphics core 3300 and other processor cores within a system on a chip integrated circuit. In at least one embodiment, graphics microcontroller 3338 is a programmable sub-processor that is configurable to manage various functions of graphics processor 3300, including thread dispatch, scheduling, and preemption. In at least one embodiment, media pipeline 3339 includes logic to facilitate decoding, encoding, pre-processing, and/or post-processing of multimedia data, including image and video data. In at least one embodiment, media pipeline 3339 implements media operations via requests to compute or sampling logic within sub-cores 3301A-3301F.

In at least one embodiment, SoC interface 3337 enables graphics core 3300 to communicate with general-purpose application processor cores (e.g., CPUs) and/or other components within an SoC, including memory hierarchy elements such as a shared last level cache memory, system RAM, and/or embedded on-chip or on-package DRAM. In at least one embodiment, SoC interface 3337 can also enable communication with fixed function devices within an SoC, such as camera imaging pipelines, and enables use of and/or implements global memory atomics that may be shared between graphics core 3300 and CPUs within an SoC. In at least one embodiment, graphics SoC interface 3337 can also implement power management controls for graphics processor core 3300 and enable an interface between a clock domain of graphics processor core 3300 and other clock domains within an SoC. In at least one embodiment, SoC interface 3337 enables receipt of command buffers from a command streamer and global thread dispatcher that are configured to provide commands and instructions to each of one or more graphics cores within a graphics processor. In at least one embodiment, commands and instructions can be dispatched to media pipeline 3339, when media operations are to be performed, or a geometry and fixed function pipeline (e.g., geometry and fixed function pipeline 3336, and/or a geometry and fixed function pipeline 3314) when graphics processing operations are to be performed.

In at least one embodiment, graphics microcontroller 3338 can be configured to perform various scheduling and management tasks for graphics core 3300. In at least one embodiment, graphics microcontroller 3338 can perform graphics and/or compute workload scheduling on various graphics parallel engines within execution unit (EU) arrays 3302A-3302F, 3304A-3304F within sub-cores 3301A-3301F. In at least one embodiment, host software executing on a CPU core of an SoC including graphics core 3300 can submit workloads to one of multiple graphic processor paths, which invokes a scheduling operation on an appropriate graphics engine. In at least one embodiment, scheduling operations include determining which workload to run next, submitting a workload to a command streamer, pre-empting existing workloads running on an engine, monitoring progress of a workload, and notifying host software when a workload is complete. In at least one embodiment, graphics microcontroller 3338 can also facilitate low-power or idle states for graphics core 3300, providing graphics core 3300 with an ability to save and restore registers within graphics core 3300 across low-power state transitions independently from an operating system and/or graphics driver software on a system.

In at least one embodiment, graphics core 3300 may have greater than or fewer than illustrated sub-cores 3301A-3301F, up to N modular sub-cores. For each set of N sub-cores, in at least one embodiment, graphics core 3300 can also include shared function logic 3310, shared and/or cache memory 3312, geometry/fixed function pipeline 3314, as well as additional fixed function logic 3316 to accelerate various graphics and compute processing operations. In at least one embodiment, shared function logic 3310 can include logic units (e.g., sampler, math, and/or inter-thread communication logic) that can be shared by each N sub-cores within graphics core 3300. In at least one embodiment, shared and/or cache memory 3312 can be a last-level cache for N sub-cores 3301A-3301F within graphics core 3300 and can also serve as shared memory that is accessible by multiple sub-cores. In at least one embodiment, geometry/fixed function pipeline 3314 can be included instead of geometry/fixed function pipeline 3336 within fixed function block 3330 and can include similar logic units.

In at least one embodiment, graphics core 3300 includes additional fixed function logic 3316 that can include various fixed function acceleration logic for use by graphics core 3300. In at least one embodiment, additional fixed function logic 3316 includes an additional geometry pipeline for use in position-only shading. In position-only shading, at least two geometry pipelines exist, whereas in a full geometry pipeline within geometry and fixed function pipelines 3314, 3336, and a cull pipeline, which is an additional geometry pipeline that may be included within additional fixed function logic 3316. In at least one embodiment, a cull pipeline is a trimmed down version of a full geometry pipeline. In at least one embodiment, a full pipeline and a cull pipeline can execute different instances of an application, each instance having a separate context. In at least one embodiment, position only shading can hide long cull runs of discarded triangles, enabling shading to be completed earlier in some instances. For example, in at least one embodiment, cull pipeline logic within additional fixed function logic 3316 can execute position shaders in parallel with a main application and generally generates critical results faster than a full pipeline, as a cull pipeline fetches and shades position attributes of vertices, without performing rasterization and rendering of pixels to a frame buffer. In at least one embodiment, a cull pipeline can use generated critical results to compute visibility information for all triangles without regard to whether those triangles are culled. In at least one embodiment, a full pipeline (which in this instance may be referred to as a replay pipeline) can consume visibility information to skip culled triangles to shade only visible triangles that are finally passed to a rasterization phase.

In at least one embodiment, additional fixed function logic 3316 can also include machine-learning acceleration logic, such as fixed function matrix multiplication logic, for implementations including optimizations for machine learning training or inferencing.

In at least one embodiment, within each graphics sub-core 3301A-3301F includes a set of execution resources that may be used to perform graphics, media, and compute operations in response to requests by graphics pipeline, media pipeline, or shader programs. In at least one embodiment, graphics sub-cores 3301A-3301F include multiple EU arrays 3302A-3302F, 3304A-3304F, thread dispatch and inter-thread communication (TD/IC) logic 3303A-3303F, a 3D (e.g., texture) sampler 3305A-3305F, a media sampler 3306A-3306F, a shader processor 3307A-3307F, and shared local memory (SLM) 3308A-3308F. In at least one embodiment, EU arrays 3302A-3302F, 3304A-3304F each include multiple execution units, which are general-purpose graphics processing units capable of performing floating-point and integer/fixed-point logic operations in service of a graphics, media, or compute operation, including graphics, media, or compute shader programs. In at least one embodiment, TD/IC logic 3303A-3303F performs local thread dispatch and thread control operations for execution units within a sub-core and facilitates communication between threads executing on execution units of a sub-core. In at least one embodiment, 3D samplers 3305A-3305F can read texture or other 3D graphics related data into memory. In at least one embodiment, 3D samplers can read texture data differently based on a configured sample state and texture format associated with a given texture. In at least one embodiment, media samplers 3306A-3306F can perform similar read operations based on a type and format associated with media data. In at least one embodiment, each graphics sub-core 3301A-3301F can alternately include a unified 3D and media sampler. In at least one embodiment, threads executing on execution units within each of sub-cores 3301A-3301F can make use of shared local memory 3308A-3308F within each sub-core, to enable threads executing within a thread group to execute using a common pool of on-chip memory.

Inference and/or training logic 1015 are used to perform inferencing and/or training operations associated with one or more embodiments. Details regarding inference and/or training logic 1015 are provided herein in conjunction with FIGS. 10A and/or 10B. In at least one embodiment, portions or all of inference and/or training logic 1015 may be incorporated into graphics processor 3300. For example, in at least one embodiment, training and/or inferencing techniques described herein may use one or more of ALUs embodied in a 3D pipeline, graphics microcontroller 3338, geometry and fixed function pipeline 3314 and 3336, or other logic in FIG. 33. Moreover, in at least one embodiment, inferencing and/or training operations described herein may be done using logic other than logic illustrated in FIG. 10A or 10B. In at least one embodiment, weight parameters may be stored in on-chip or off-chip memory and/or registers (shown or not shown) that configure ALUs of graphics processor 3300 to perform one or more machine learning algorithms, neural network architectures, use cases, or training techniques described herein.

Figure 34A:
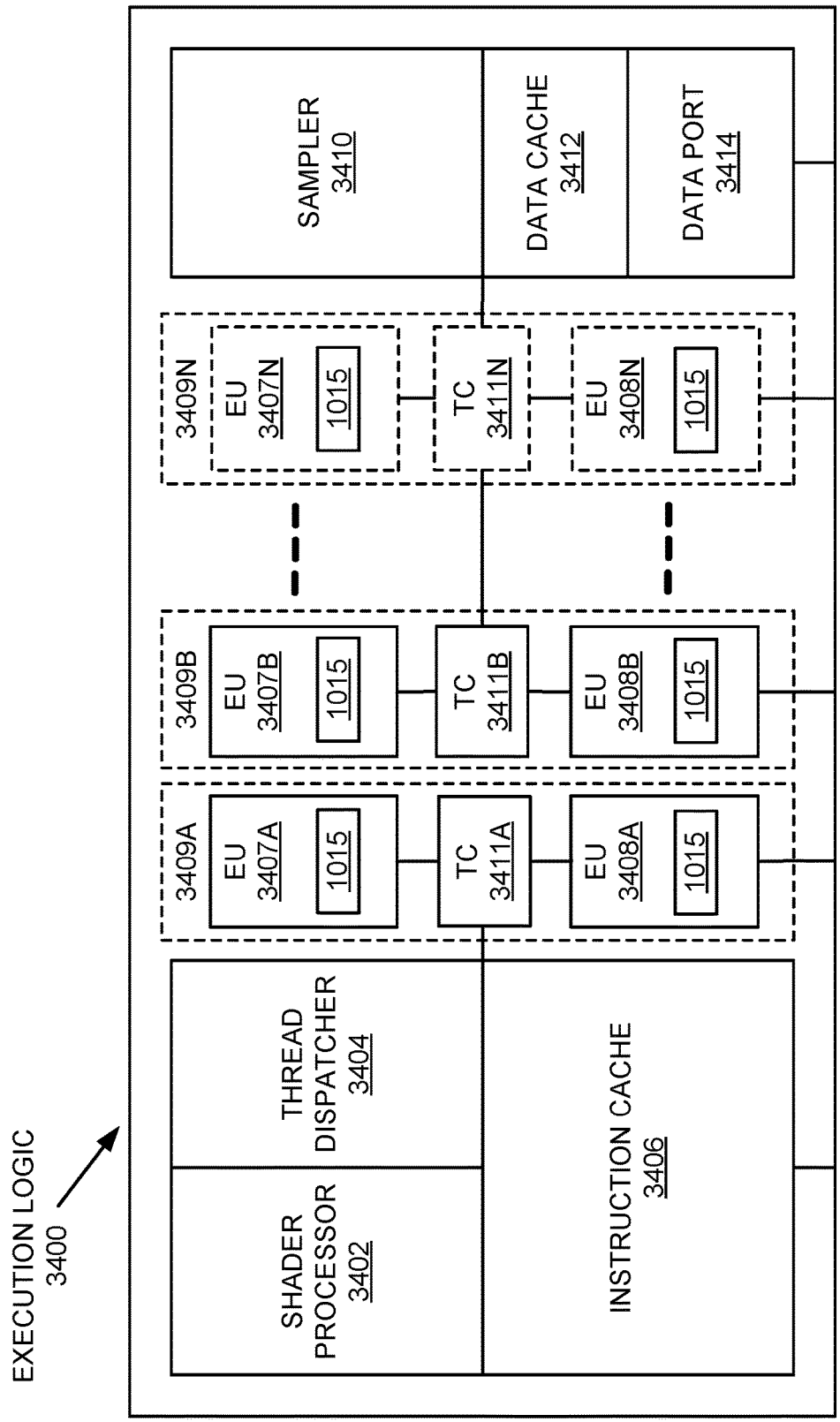
FIGS. 34A-34B illustrate thread execution logic including an array of processing elements of a graphics processor core according to at least one embodiment.
Figure 34B:
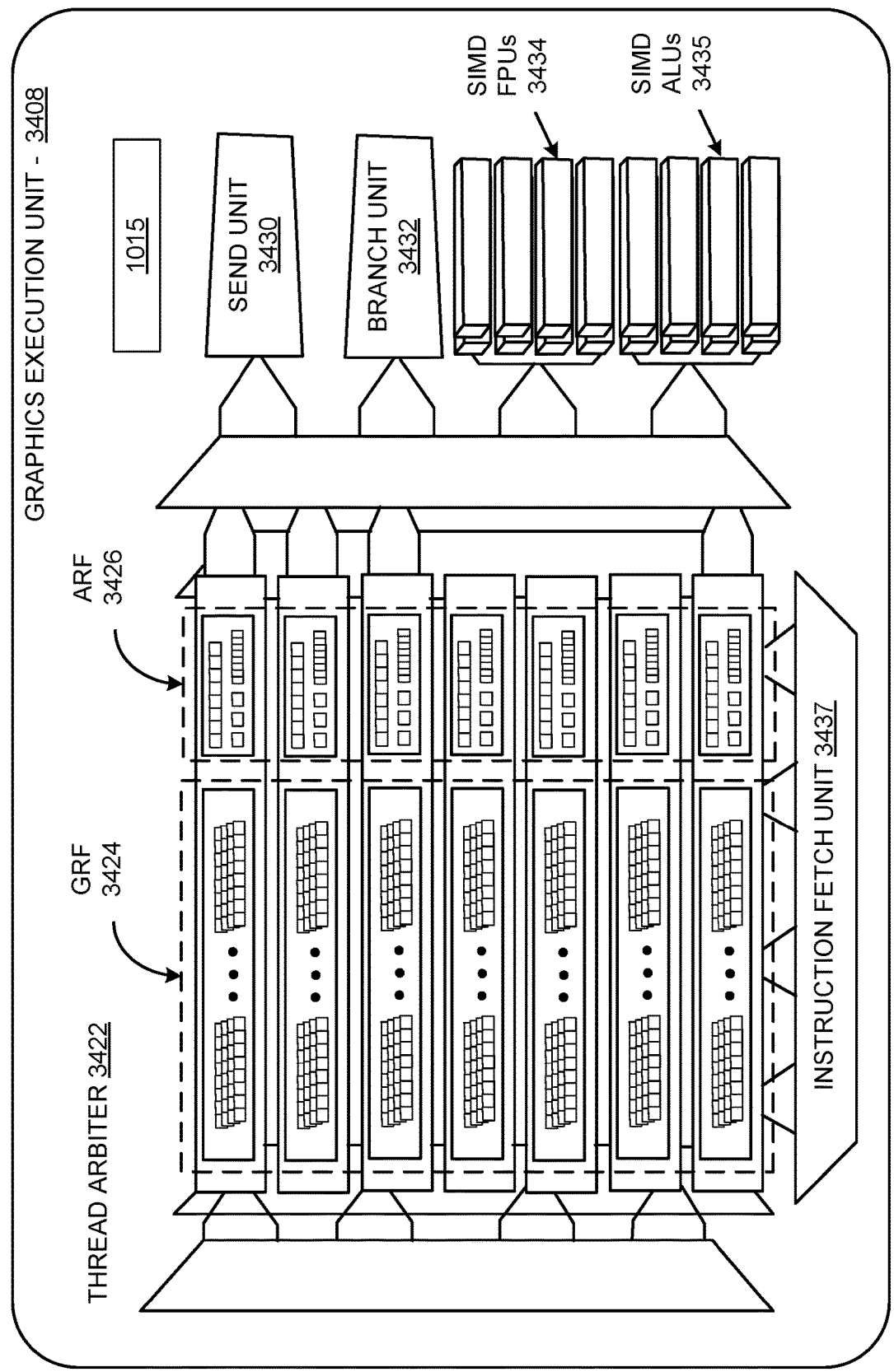

FIGS. 34A-34B illustrate thread execution logic 3400 including an array of processing elements of a graphics processor core according to at least one embodiment. FIG. 34A illustrates at least one embodiment, in which thread execution logic 3400 is used. FIG. 34B illustrates exemplary internal details of a graphics execution unit 3408, according to at least one embodiment.

As illustrated in FIG. 34A, in at least one embodiment, thread execution logic 3400 includes a shader processor 3402, a thread dispatcher 3404, an instruction cache 3406, a scalable execution unit array including a plurality of execution units 3407A-3407N and 3408A-3408N, a sampler 3410, a data cache 3412, and a data port 3414. In at least one embodiment, a scalable execution unit array can dynamically scale by enabling or disabling one or more execution units (e.g., any of execution unit 3408A-N or 3407A-N) based on computational requirements of a workload, for example. In at least one embodiment, scalable execution units are interconnected via an interconnect fabric that links to each execution unit. In at least one embodiment, thread execution logic 3400 includes one or more connections to memory, such as system memory or cache memory, through one or more of instruction cache 3406, data port 3414, sampler 3410, and execution units 3407 or 3408. In at least one embodiment, each execution unit (e.g., 3407A) is a stand-alone programmable general-purpose computational unit that is capable of executing multiple simultaneous hardware threads while processing multiple data elements in parallel for each thread. In at least one embodiment, array of execution units 3407 and/or 3408 is scalable to include any number individual execution units.

In at least one embodiment, execution units 3407 and/or 3408 are primarily used to execute shader programs. In at least one embodiment, shader processor 3402 can process various shader programs and dispatch execution threads associated with shader programs via a thread dispatcher 3404. In at least one embodiment, thread dispatcher 3404 includes logic to arbitrate thread initiation requests from graphics and media pipelines and instantiate requested threads on one or more execution units in execution units 3407 and/or 3408. For example, in at least one embodiment, a geometry pipeline can dispatch vertex, tessellation, or geometry shaders to thread execution logic for processing. In at least one embodiment, thread dispatcher 3404 can also process runtime thread spawning requests from executing shader programs.

In at least one embodiment, execution units 3407 and/or 3408 support an instruction set that includes native support for many standard 3D graphics shader instructions, such that shader programs from graphics libraries (e.g., Direct 3D and OpenGL) are executed with a minimal translation. In at least one embodiment, execution units support vertex and geometry processing (e.g., vertex programs, geometry programs, and/or vertex shaders), pixel processing (e.g., pixel shaders, fragment shaders) and general-purpose processing (e.g., compute and media shaders). In at least one embodiment, each of execution units 3407 and/or 3408, which include one or more arithmetic logic units (ALUs), is capable of multi-issue single instruction multiple data (SIMD) execution and multi-threaded operation enables an efficient execution environment despite higher latency memory accesses. In at least one embodiment, each hardware thread within each execution unit has a dedicated high-bandwidth register file and associated independent thread-state. In at least one embodiment, execution is multi-issue per clock to pipelines capable of integer, single and double precision floating point operations, SIMD branch capability, logical operations, transcendental operations, and other miscellaneous operations. In at least one embodiment, while waiting for data from memory or one of shared functions, dependency logic within execution units 3407 and/or 3408 causes a waiting thread to sleep until requested data has been returned. In at least one embodiment, while an awaiting thread is sleeping, hardware resources may be devoted to processing other threads. For example, in at least one embodiment, during a delay associated with a vertex shader operation, an execution unit can perform operations for a pixel shader, fragment shader, or another type of shader program, including a different vertex shader.

In at least one embodiment, each execution unit in execution units 3407 and/or 3408 operates on arrays of data elements. In at least one embodiment, a number of data elements is an "execution size," or number of channels for an instruction. In at least one embodiment, an execution channel is a logical unit of execution for data element access, masking, and flow control within instructions. In at least one embodiment, a number of channels may be independent of a number of physical arithmetic logic units (ALUs) or floating point units (FPUs) for a particular graphics processor. In at least one embodiment, execution units 3407 and/or 3408 support integer and floating-point data types.

In at least one embodiment, an execution unit instruction set includes SIMD instructions. In at least one embodiment, various data elements can be stored as a packed data type in a register and execution unit will process various elements based on data size of elements. For example, in at least one embodiment, when operating on a 256-bit wide vector, 256 bits of a vector are stored in a register and an execution unit operates on a vector as four separate 64-bit packed data elements (Quad-Word (QW) size data elements), eight separate 32-bit packed data elements (Double Word (DW) size data elements), sixteen separate 16-bit packed data elements (Word (W) size data elements), or thirty-two separate 8-bit data elements (byte (B) size data elements). However, in at least one embodiment, different vector widths and register sizes are possible.

In at least one embodiment, one or more execution units can be combined into a fused execution unit 3409A-3409N having thread control logic (3411A-3411N) that is common to fused EUs such as execution unit 3407A fused with execution unit 3408A into fused execution unit 3409A. In at least one embodiment, multiple EUs can be fused into an EU group. In at least one embodiment, each EU in a fused EU group can be configured to execute a separate SIMD hardware thread, with a number of EUs in a fused EU group possibly varying according to various embodiments. In at least one embodiment, various SIMD widths can be performed per-EU, including but not limited to SIMD8, SIMD16, and SIMD32. In at least one embodiment, each fused graphics execution unit 3409A-3409N includes at least two execution units. For example, in at least one embodiment, fused execution unit 3409A includes a first EU 3407A, second EU 3408A, and thread control logic 3411A that is common to first EU 3407A and second EU 3408A. In at least one embodiment, thread control logic 3411A controls threads executed on fused graphics execution unit 3409A, allowing each EU within fused execution units 3409A-3409N to execute using a common instruction pointer register.

In at least one embodiment, one or more internal instruction caches (e.g., 3406) are included in thread execution logic 3400 to cache thread instructions for execution units. In at least one embodiment, one or more data caches (e.g., 3412) are included to cache thread data during thread execution. In at least one embodiment, sampler 3410 is included to provide texture sampling for 3D operations and media sampling for media operations. In at least one embodiment, sampler 3410 includes specialized texture or media sampling functionality to process texture or media data during sampling process before providing sampled data to an execution unit.

During execution, in at least one embodiment, graphics and media pipelines send thread initiation requests to thread execution logic 3400 via thread spawning and dispatch logic. In at least one embodiment, once a group of geometric objects has been processed and rasterized into pixel data, pixel processor logic (e.g., pixel shader logic, fragment shader logic, etc.) within shader processor 3402 is invoked to further compute output information and cause results to be written to output surfaces (e.g., color buffers, depth buffers, stencil buffers, etc.). In at least one embodiment, a pixel shader or a fragment shader calculates values of various vertex attributes that are to be interpolated across a rasterized object. In at least one embodiment, pixel processor logic within shader processor 3402 then executes an application programming interface (API)-supplied pixel or fragment shader program. In at least one embodiment, to execute a shader program, shader processor 3402 dispatches threads to an execution unit (e.g., 3408A) via thread dispatcher 3404. In at least one embodiment, shader processor 3402 uses texture sampling logic in sampler 3410 to access texture data in texture maps stored in memory. In at least one embodiment, arithmetic operations on texture data and input geometry data compute pixel color data for each geometric fragment, or discards one or more pixels from further processing.

In at least one embodiment, data port 3414 provides a memory access mechanism for thread execution logic 3400 to output processed data to memory for further processing on a graphics processor output pipeline. In at least one embodiment, data port 3414 includes or couples to one or more cache memories (e.g., data cache 3412) to cache data for memory access via a data port.

As illustrated in FIG. 34B, in at least one embodiment, a graphics execution unit 3408 can include an instruction fetch unit 3437, a general register file array (GRF) 3424, an architectural register file array (ARF) 3426, a thread arbiter 3422, a send unit 3430, a branch unit 3432, a set of SIMD floating point units (FPUs) 3434, and a set of dedicated integer SIMD ALUs 3435. In at least one embodiment, GRF 3424 and ARF 3426 includes a set of general register files and architecture register files associated with each simultaneous hardware thread that may be active in graphics execution unit 3408. In at least one embodiment, per thread architectural state is maintained in ARF 3426, while data used during thread execution is stored in GRF 3424. In at least one embodiment, execution state of each thread, including instruction pointers for each thread, can be held in thread-specific registers in ARF 3426.

In at least one embodiment, graphics execution unit 3408 has an architecture that is a combination of Simultaneous Multi-Threading (SMT) and fine-grained Interleaved Multi-Threading (IMT). In at least one embodiment, architecture has a modular configuration that can be fine-tuned at design time based on a target number of simultaneous threads and number of registers per execution unit, where execution unit resources are divided across logic used to execute multiple simultaneous threads.

In at least one embodiment, graphics execution unit 3408 can co-issue multiple instructions, which may each be different instructions. In at least one embodiment, thread arbiter 3422 of graphics execution unit thread 3408 can dispatch instructions to one of send unit 3430, branch unit 3432, or SIMD FPU(s) 3434 for execution. In at least one embodiment, each execution thread can access 128 general-purpose registers within GRF 3424, where each register can store 32 bytes, accessible as a SIMD 8-element vector of 32-bit data elements. In at least one embodiment, each execution unit thread has access to 4 kilobytes within GRF 3424, although embodiments are not so limited, and greater or fewer register resources may be provided in other embodiments. In at least one embodiment, up to seven threads can execute simultaneously, although a number of threads per execution unit can also vary according to embodiments. In at least one embodiment, in which seven threads may access 4 kilobytes, GRF 3424 can store a total of 28 kilobytes. In at least one embodiment, flexible addressing modes can permit registers to be addressed together to build effectively wider registers or to represent strided rectangular block data structures.

In at least one embodiment, memory operations, sampler operations, and other longer-latency system communications are dispatched via "send" instructions that are executed by message passing to send unit 3430. In at least one embodiment, branch instructions are dispatched to branch unit 3432 to facilitate SIMD divergence and eventual convergence.

In at least one embodiment, graphics execution unit 3408 includes one or more SIMD floating point units (FPU(s)) 3434 to perform floating-point operations. In at least one embodiment, FPU(s) 3434 also support integer computation. In at least one embodiment, FPU(s) 3434 can SIMD execute up to M number of 32-bit floating-point (or integer) operations, or SIMD execute up to 2M 16-bit integer or 16-bit floating-point operations. In at least one embodiment, at least one FPU provides extended math capability to support high-throughput transcendental math functions and double precision 64-bit floating-point. In at least one embodiment, a set of 8-bit integer SIMD ALUs 3435 are also present, and may be specifically optimized to perform operations associated with machine learning computations.

In at least one embodiment, arrays of multiple instances of graphics execution unit 3408 can be instantiated in a graphics sub-core grouping (e.g., a sub-slice). In at least one embodiment, execution unit 3408 can execute instructions across a plurality of execution channels. In at least one embodiment, each thread executed on graphics execution unit 3408 is executed on a different channel.

Inference and/or training logic 1015 are used to perform inferencing and/or training operations associated with one or more embodiments. Details regarding inference and/or training logic 1015 are provided herein in conjunction with FIGS. 10A and/or 10B. In at least one embodiment, portions or all of inference and/or training logic 1015 may be incorporated into thread execution logic 3400. Moreover, in at least one embodiment, inferencing and/or training operations described herein may be done using logic other than logic illustrated in FIG. 10A or 10B. In at least one embodiment, weight parameters may be stored in on-chip or off-chip memory and/or registers (shown or not shown) that configure ALUs thread of execution logic 3400 to perform one or more machine learning algorithms, neural network architectures, use cases, or training techniques described herein.

Figure 35:
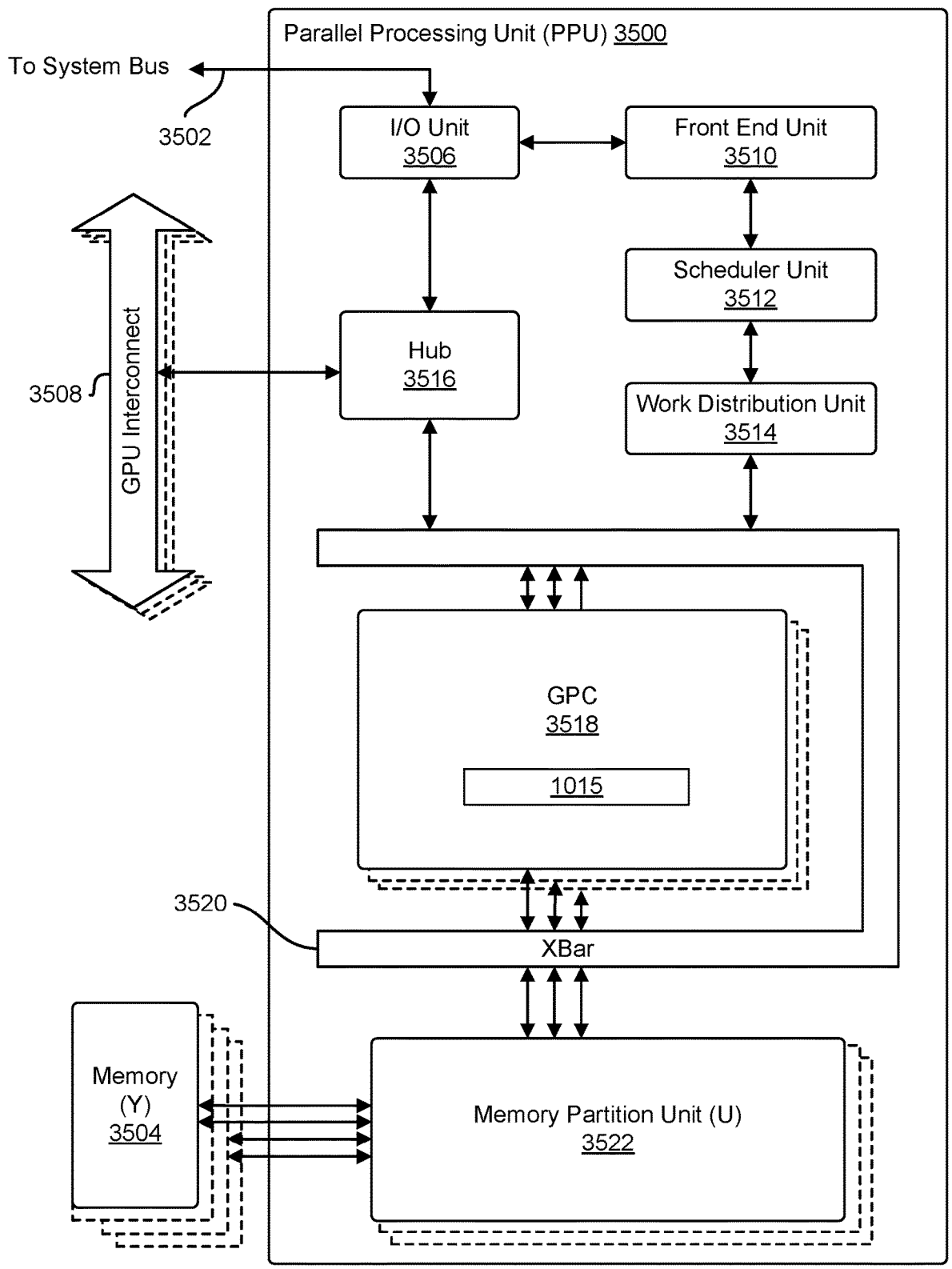
FIG. 35 illustrates a parallel processing unit ("PPU"), according to at least one embodiment.

FIG. 35 illustrates a parallel processing unit ("PPU") 3500, according to at least one embodiment. In at least one embodiment, PPU 3500 is configured with machine-readable code that, if executed by PPU 3500, causes PPU 3500 to perform some or all of processes and techniques described throughout this disclosure. In at least one embodiment, PPU 3500 is a multi-threaded processor that is implemented on one or more integrated circuit devices and that utilizes multithreading as a latency-hiding technique designed to process computer-readable instructions (also referred to as machine-readable instructions or simply instructions) on multiple threads in parallel. In at least one embodiment, a thread refers to a thread of execution and is an instantiation of a set of instructions configured to be executed by PPU 3500. In at least one embodiment, PPU 3500 is a graphics processing unit ("GPU") configured to implement a graphics rendering pipeline for processing three-dimensional ("3D") graphics data in order to generate two-dimensional ("2D") image data for display on a display device such as a liquid crystal display ("LCD") device. In at least one embodiment, PPU 3500 is utilized to perform computations such as linear algebra operations and machine-learning operations. FIG. 35 illustrates an example parallel processor for illustrative purposes only and should be construed as a non-limiting example of processor architectures contemplated within scope of this disclosure and that any suitable processor may be employed to supplement and/or substitute for same.

In at least one embodiment, one or more PPUs 3500 are configured to accelerate High Performance Computing ("HPC"), data center, and machine learning applications. In at least one embodiment, PPU 3500 is configured to accelerate deep learning systems and applications including following non-limiting examples: autonomous vehicle platforms, deep learning, high-accuracy speech, image, text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations, and more.

In at least one embodiment, PPU 3500 includes, without limitation, an Input/Output ("I/O") unit 3506, a front-end unit 3510, a scheduler unit 3512, a work distribution unit 3514, a hub 3516, a crossbar ("XBar") 3520, one or more general processing clusters ("GPCs") 3518, and one or more partition units ("memory partition units") 3522. In at least one embodiment, PPU 3500 is connected to a host processor or other PPUs 3500 via one or more high-speed GPU interconnects ("GPU interconnects") 3508. In at least one embodiment, PPU 3500 is connected to a host processor or other peripheral devices via a system bus 3502. In at least one embodiment, PPU 3500 is connected to a local memory comprising one or more memory devices ("memory") 3504. In at least one embodiment, memory devices 3504 include, without limitation, one or more dynamic random access memory ("DRAM") devices. In at least one embodiment, one or more DRAM devices are configured and/or configurable as high-bandwidth memory ("HBM") subsystems, with multiple DRAM dies stacked within each device.

In at least one embodiment, high-speed GPU interconnect 3508 may refer to a wire-based multi-lane communications link that is used by systems to scale and include one or more PPUs 3500 combined with one or more central processing units ("CPUs"), supports cache coherence between PPUs 3500 and CPUs, and CPU mastering. In at least one embodiment, data and/or commands are transmitted by high-speed GPU interconnect 3508 through hub 3516 to/from other units of PPU 3500 such as one or more copy engines, video encoders, video decoders, power management units, and other components which may not be explicitly illustrated in FIG. 35.

In at least one embodiment, I/O unit 3506 is configured to transmit and receive communications (e.g., commands, data) from a host processor (not illustrated in FIG. 35) over system bus 3502. In at least one embodiment, I/O unit 3506 communicates with host processor directly via system bus 3502 or through one or more intermediate devices such as a memory bridge. In at least one embodiment, I/O unit 3506 may communicate with one or more other processors, such as one or more of PPUs 3500 via system bus 3502. In at least one embodiment, I/O unit 3506 implements a Peripheral Component Interconnect Express ("PCIe") interface for communications over a PCIe bus. In at least one embodiment, I/O unit 3506 implements interfaces for communicating with external devices.

In at least one embodiment, I/O unit 3506 decodes packets received via system bus 3502. In at least one embodiment, at least some packets represent commands configured to cause PPU 3500 to perform various operations. In at least one embodiment, I/O unit 3506 transmits decoded commands to various other units of PPU 3500 as specified by commands. In at least one embodiment, commands are transmitted to front-end unit 3510 and/or transmitted to hub 3516 or other units of PPU 3500 such as one or more copy engines, a video encoder, a video decoder, a power management unit, etc. (not explicitly illustrated in FIG. 35). In at least one embodiment, I/O unit 3506 is configured to route communications between and among various logical units of PPU 3500.

In at least one embodiment, a program executed by host processor encodes a command stream in a buffer that provides workloads to PPU 3500 for processing. In at least one embodiment, a workload comprises instructions and data to be processed by those instructions. In at least one embodiment, a buffer is a region in a memory that is accessible (e.g., read/write) by both a host processor and PPU 3500—a host interface unit may be configured to access that buffer in a system memory connected to system bus 3502 via memory requests transmitted over system bus 3502 by I/O unit 3506. In at least one embodiment, a host processor writes a command stream to a buffer and then transmits a pointer to a start of a command stream to PPU 3500 such that front-end unit 3510 receives pointers to one or more command streams and manages one or more command streams, reading commands from command streams and forwarding commands to various units of PPU 3500.

In at least one embodiment, front-end unit 3510 is coupled to scheduler unit 3512 that configures various GPCs 3518 to process tasks defined by one or more command streams. In at least one embodiment, scheduler unit 3512 is configured to track state information related to various tasks managed by scheduler unit 3512 where state information may indicate which of GPCs 3518 a task is assigned to, whether task is active or inactive, a priority level associated with task, and so forth. In at least one embodiment, scheduler unit 3512 manages execution of a plurality of tasks on one or more of GPCs 3518.

In at least one embodiment, scheduler unit 3512 is coupled to work distribution unit 3514 that is configured to dispatch tasks for execution on GPCs 3518. In at least one embodiment, work distribution unit 3514 tracks a number of scheduled tasks received from scheduler unit 3512 and work distribution unit 3514 manages a pending task pool and an active task pool for each of GPCs 3518. In at least one embodiment, pending task pool comprises a number of slots (e.g., 32 slots) that contain tasks assigned to be processed by a particular GPC 3518; an active task pool may comprise a number of slots (e.g., 4 slots) for tasks that are actively being processed by GPCs 3518 such that as one of GPCs 3518 completes execution of a task, that task is evicted from that active task pool for GPC 3518 and another task from a pending task pool is selected and scheduled for execution on GPC 3518. In at least one embodiment, if an active task is idle on GPC 3518, such as while waiting for a data dependency to be resolved, then that active task is evicted from GPC 3518 and returned to that pending task pool while another task in that pending task pool is selected and scheduled for execution on GPC 3518.

In at least one embodiment, work distribution unit 3514 communicates with one or more GPCs 3518 via XBar 3520. In at least one embodiment, XBar 3520 is an interconnect network that couples many of units of PPU 3500 to other units of PPU 3500 and can be configured to couple work distribution unit 3514 to a particular GPC 3518. In at least one embodiment, one or more other units of PPU 3500 may also be connected to XBar 3520 via hub 3516.

In at least one embodiment, tasks are managed by scheduler unit 3512 and dispatched to one of GPCs 3518 by work distribution unit 3514. In at least one embodiment, GPC 3518 is configured to process task and generate results. In at least one embodiment, results may be consumed by other tasks within GPC 3518, routed to a different GPC 3518 via XBar 3520, or stored in memory 3504. In at least one embodiment, results can be written to memory 3504 via partition units 3522, which implement a memory interface for reading and writing data to/from memory 3504. In at least one embodiment, results can be transmitted to another PPU or CPU via high-speed GPU interconnect 3508. In at least one embodiment, PPU 3500 includes, without limitation, a number U of partition units 3522 that is equal to a number of separate and distinct memory devices 3504 coupled to PPU 3500, as described in more detail herein in conjunction with FIG. 37.

In at least one embodiment, a host processor executes a driver kernel that implements an application programming interface ("API") that enables one or more applications executing on a host processor to schedule operations for execution on PPU 3500. In at least one embodiment, multiple compute applications are simultaneously executed by PPU 3500 and PPU 3500 provides isolation, quality of service ("QoS"), and independent address spaces for multiple compute applications. In at least one embodiment, an application generates instructions (e.g., in form of API calls) that cause a driver kernel to generate one or more tasks for execution by PPU 3500 and that driver kernel outputs tasks to one or more streams being processed by PPU 3500. In at least one embodiment, each task comprises one or more groups of related threads, which may be referred to as a warp. In at least one embodiment, a warp comprises a plurality of related threads (e.g., 32 threads) that can be executed in parallel. In at least one embodiment, cooperating threads can refer to a plurality of threads including instructions to perform task and that exchange data through shared memory. In at least one embodiment, threads and cooperating threads are described in more detail in conjunction with FIG. 37.

Inference and/or training logic 1015 are used to perform inferencing and/or training operations associated with one or more embodiments. Details regarding inference and/or training logic 1015 are provided herein in conjunction with FIGS. 10A and/or 10B. In at least one embodiment, deep learning application processor is used to train a machine learning model, such as a neural network, to predict or infer information provided to PPU 3500. In at least one embodiment, deep learning application processor is used to infer or predict information based on a trained machine learning model (e.g., neural network) that has been trained by another processor or system or by PPU 3500. In at least one embodiment, PPU 3500 may be used to perform one or more neural network use cases described herein.

Figure 36:
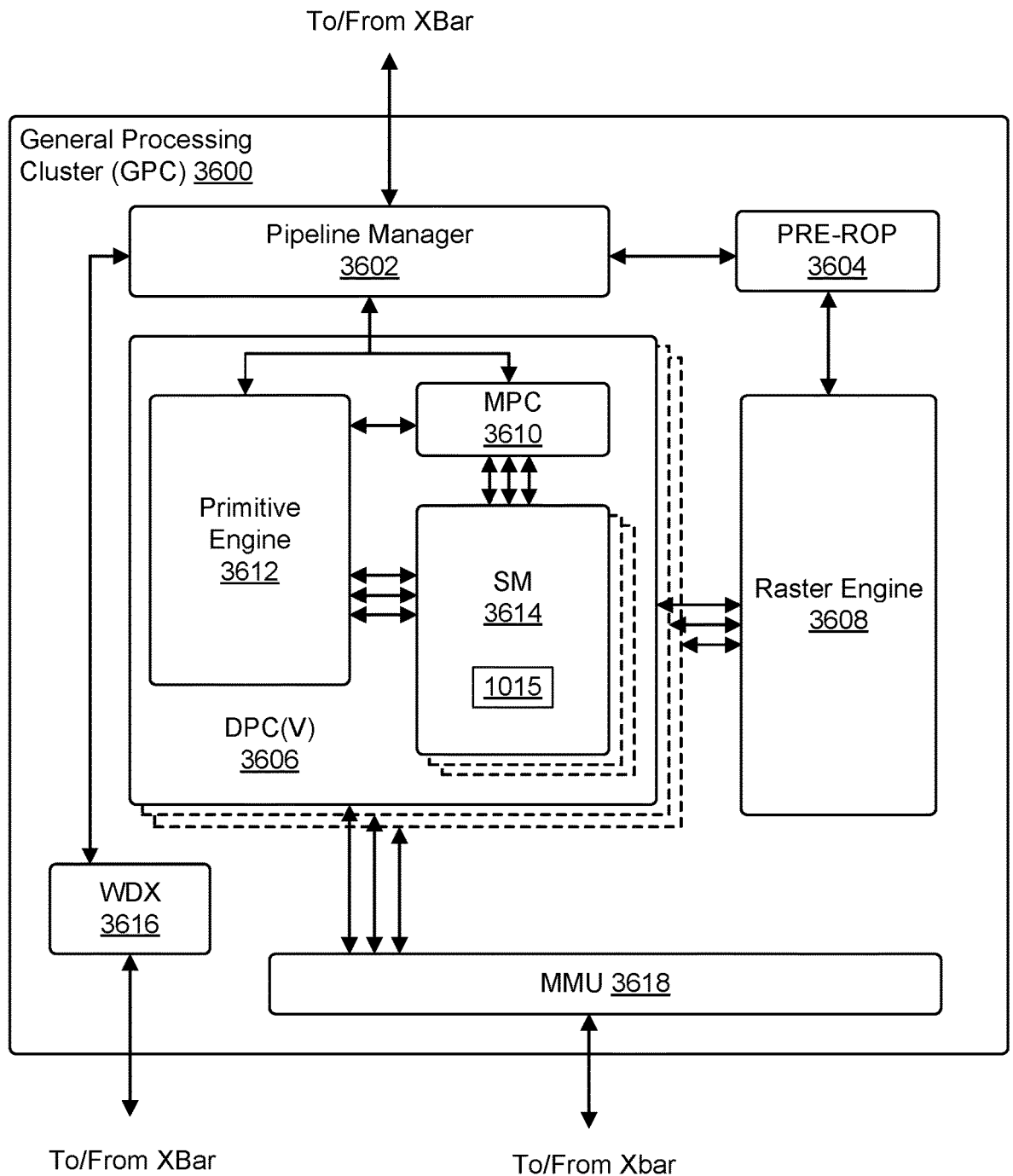
FIG. 36 illustrates a general processing cluster ("GPC"), according to at least one embodiment.

FIG. 36 illustrates a general processing cluster ("GPC") 3600, according to at least one embodiment. In at least one embodiment, GPC 3600 is GPC 3518 of FIG. 35. In at least one embodiment, each GPC 3600 includes, without limitation, a number of hardware units for processing tasks and each GPC 3600 includes, without limitation, a pipeline manager 3602, a pre-raster operations unit ("preROP") 3604, a raster engine 3608, a work distribution crossbar ("WDX") 3616, a memory management unit ("MMU") 3618, one or more Data Processing Clusters ("DPCs") 3606, and any suitable combination of parts.

In at least one embodiment, operation of GPC 3600 is controlled by pipeline manager 3602. In at least one embodiment, pipeline manager 3602 manages configuration of one or more DPCs 3606 for processing tasks allocated to GPC 3600. In at least one embodiment, pipeline manager 3602 configures at least one of one or more DPCs 3606 to implement at least a portion of a graphics rendering pipeline. In at least one embodiment, DPC 3606 is configured to execute a vertex shader program on a programmable streaming multi-processor ("SM") 3614. In at least one embodiment, pipeline manager 3602 is configured to route packets received from a work distribution unit to appropriate logical units within GPC 3600, in at least one embodiment, and some packets may be routed to fixed function hardware units in preROP 3604 and/or raster engine 3608 while other packets may be routed to DPCs 3606 for processing by a primitive engine 3612 or SM 3614. In at least one embodiment, pipeline manager 3602 configures at least one of DPCs 3606 to implement a neural network model and/or a computing pipeline.

In at least one embodiment, preROP unit 3604 is configured, in at least one embodiment, to route data generated by raster engine 3608 and DPCs 3606 to a Raster Operations ("ROP") unit in partition unit 3522, described in more detail above in conjunction with FIG. 35. In at least one embodiment, preROP unit 3604 is configured to perform optimizations for color blending, organize pixel data, perform address translations, and more. In at least one embodiment, raster engine 3608 includes, without limitation, a number of fixed function hardware units configured to perform various raster operations, in at least one embodiment, and raster engine 3608 includes, without limitation, a setup engine, a coarse raster engine, a culling engine, a clipping engine, a fine raster engine, a tile coalescing engine, and any suitable combination thereof. In at least one embodiment, setup engine receives transformed vertices and generates plane equations associated with geometric primitive defined by vertices; plane equations are transmitted to a coarse raster engine to generate coverage information (e.g., an x, y coverage mask for a tile) for primitive; output of a coarse raster engine is transmitted to a culling engine where fragments associated with a primitive that fail a z-test are culled, and transmitted to a clipping engine where fragments lying outside a viewing frustum are clipped. In at least one embodiment, fragments that survive clipping and culling are passed to a fine raster engine to generate attributes for pixel fragments based on plane equations generated by a setup engine. In at least one embodiment, an output of raster engine 3608 comprises fragments to be processed by any suitable entity, such as by a fragment shader implemented within DPC 3606.

In at least one embodiment, each DPC 3606 included in GPC 3600 comprises, without limitation, an M-Pipe Controller ("MPC") 3610; primitive engine 3612; one or more SMs 3614; and any suitable combination thereof. In at least one embodiment, MPC 3610 controls operation of DPC 3606, routing packets received from pipeline manager 3602 to appropriate units in DPC 3606. In at least one embodiment, packets associated with a vertex are routed to primitive engine 3612, which is configured to fetch vertex attributes associated with a vertex from memory; in contrast, packets associated with a shader program may be transmitted to SM 3614.

In at least one embodiment, SM 3614 comprises, without limitation, a programmable streaming processor that is configured to process tasks represented by a number of threads. In at least one embodiment, SM 3614 is multi-threaded and configured to execute a plurality of threads (e.g., 32 threads) from a particular group of threads concurrently and implements a Single-Instruction, Multiple-Data ("SIMD") architecture where each thread in a group of threads (e.g., a warp) is configured to process a different set of data based on same set of instructions. In at least one embodiment, all threads in group of threads execute a common set of instructions. In at least one embodiment, SM 3614 implements a Single-Instruction, Multiple Thread ("SIMT") architecture wherein each thread in a group of threads is configured to process a different set of data based on that common set of instructions, but where individual threads in a group of threads are allowed to diverge during execution. In at least one embodiment, a program counter, call stack, and execution state is maintained for each warp, enabling concurrency between warps and serial execution within warps when threads within a warp diverge. In another embodiment, a program counter, call stack, and execution state is maintained for each individual thread, enabling equal concurrency between all threads, within and between warps. In at least one embodiment, execution state is maintained for each individual thread and threads executing common instructions may be converged and executed in parallel for better efficiency. At least one embodiment of SM 3614 is described in more detail herein.

In at least one embodiment, MMU 3618 provides an interface between GPC 3600 and a memory partition unit (e.g., partition unit 3522 of FIG. 35) and MMU 3618 provides translation of virtual addresses into physical addresses, memory protection, and arbitration of memory requests. In at least one embodiment, MMU 3618 provides one or more translation lookaside buffers ("TLBs") for performing translation of virtual addresses into physical addresses in memory.

Inference and/or training logic 1015 are used to perform inferencing and/or training operations associated with one or more embodiments. Details regarding inference and/or training logic 1015 are provided herein in conjunction with FIGS. 10A and/or 10B. In at least one embodiment, deep learning application processor is used to train a machine learning model, such as a neural network, to predict or infer information provided to GPC 3600. In at least one embodiment, GPC 3600 is used to infer or predict information based on a trained machine learning model (e.g., neural network) that has been trained by another processor or system or by GPC 3600. In at least one embodiment, GPC 3600 may be used to perform one or more neural network use cases described herein.

Figure 37:
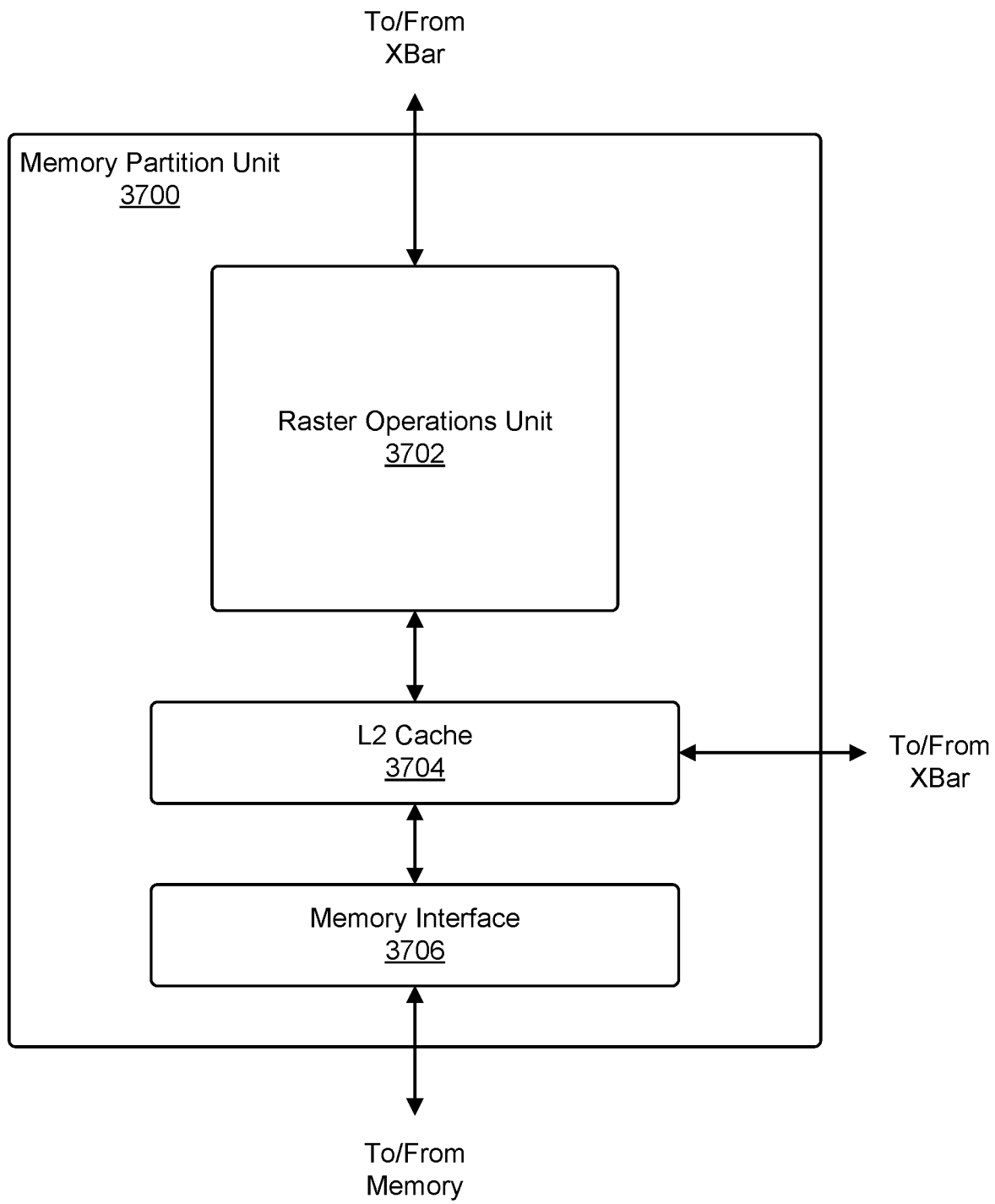
FIG. 37 illustrates a memory partition unit of a parallel processing unit ("PPU"), according to at least one embodiment.

FIG. 37 illustrates a memory partition unit 3700 of a parallel processing unit ("PPU"), in accordance with at least one embodiment. In at least one embodiment, memory partition unit 3700 includes, without limitation, a Raster Operations ("ROP") unit 3702, a level two ("L2") cache 3704, a memory interface 3706, and any suitable combination thereof. In at least one embodiment, memory interface 3706 is coupled to memory. In at least one embodiment, memory interface 3706 may implement 32, 64, 128, 1024-bit data buses, or like, for high-speed data transfer. In at least one embodiment, PPU incorporates U memory interfaces 3706 where U is a positive integer, with one memory interface 3706 per pair of partition units 3700, where each pair of partition units 3700 is connected to a corresponding memory device. For example, in at least one embodiment, PPU may be connected to up to Y memory devices, such as high bandwidth memory stacks or graphics double-data-rate, version 5, synchronous dynamic random access memory ("GDDR5 SDRAM").

In at least one embodiment, memory interface 3706 implements a high bandwidth memory second generation ("HBM2") memory interface and Y equals half of U. In at least one embodiment, HBM2 memory stacks are located on a physical package with a PPU, providing substantial power and area savings compared with conventional GDDR5 SDRAM systems. In at least one embodiment, each HBM2 stack includes, without limitation, four memory dies with Y=4, with each HBM2 stack including two 128-bit channels per die for a total of 8 channels and a data bus width of 1024 bits. In at least one embodiment, that memory supports Single-Error Correcting Double-Error Detecting ("SECDED") Error Correction Code ("ECC") to protect data. In at least one embodiment, ECC can provide higher reliability for compute applications that are sensitive to data corruption.

In at least one embodiment, PPU implements a multi-level memory hierarchy. In at least one embodiment, memory partition unit 3700 supports a unified memory to provide a single unified virtual address space for central processing unit ("CPU") and PPU memory, enabling data sharing between virtual memory systems. In at least one embodiment frequency of accesses by a PPU to a memory located on other processors is traced to ensure that memory pages are moved to physical memory of PPU that is accessing pages more frequently. In at least one embodiment, high-speed GPU interconnect 3508 supports address translation services allowing PPU to directly access a CPU's page tables and providing full access to CPU memory by a PPU.

In at least one embodiment, copy engines transfer data between multiple PPUs or between PPUs and CPUs. In at least one embodiment, copy engines can generate page faults for addresses that are not mapped into page tables and memory partition unit 3700 then services page faults, mapping addresses into page table, after which copy engine performs a transfer. In at least one embodiment, memory is pinned (i.e., non-pageable) for multiple copy engine operations between multiple processors, substantially reducing available memory. In at least one embodiment, with hardware page faulting, addresses can be passed to copy engines without regard as to whether memory pages are resident, and a copy process is transparent.

Data from memory 3504 of FIG. 35 or other system memory is fetched by memory partition unit 3700 and stored in L2 cache 3704, which is located on-chip and is shared between various GPCs, in accordance with at least one embodiment. Each memory partition unit 3700, in at least one embodiment, includes, without limitation, at least a portion of L2 cache associated with a corresponding memory device. In at least one embodiment, lower level caches are implemented in various units within GPCs. In at least one embodiment, each of SMs 3614 in FIG. 36 may implement a Level 1 ("L1") cache wherein that L1 cache is private memory that is dedicated to a particular SM 3614 and data from L2 cache 3704 is fetched and stored in each L1 cache for processing in functional units of SMs 3614. In at least one embodiment, L2 cache 3704 is coupled to memory interface 3706 and XBar 3520 shown in FIG. 35.

ROP unit 3702 performs graphics raster operations related to pixel color, such as color compression, pixel blending, and more, in at least one embodiment. ROP unit 3702, in at least one embodiment, implements depth testing in conjunction with raster engine 3608, receiving a depth for a sample location associated with a pixel fragment from a culling engine of raster engine 3608. In at least one embodiment, depth is tested against a corresponding depth in a depth buffer for a sample location associated with a fragment. In at least one embodiment, if that fragment passes that depth test for that sample location, then ROP unit 3702 updates depth buffer and transmits a result of that depth test to raster engine 3608. It will be appreciated that a number of partition units 3700 may be different than a number of GPCs and, therefore, each ROP unit 3702 can, in at least one embodiment, be coupled to each GPC. In at least one embodiment, ROP unit 3702 tracks packets received from different GPCs and determines whether a result generated by ROP unit 3702 is to be routed to through XBar 3520.

Figure 38:
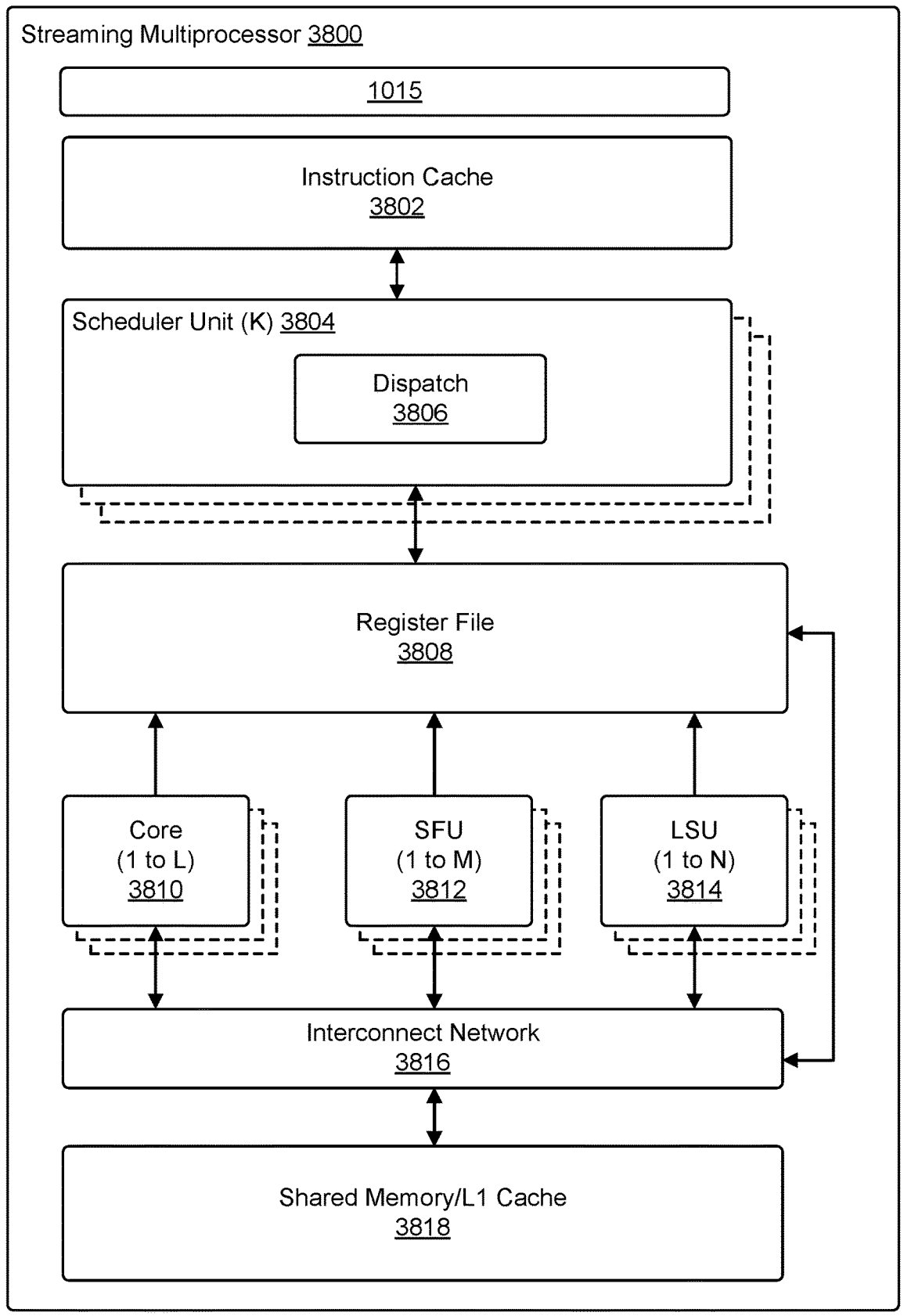
FIG. 38 illustrates a streaming multi-processor, according to at least one embodiment.

FIG. 38 illustrates a streaming multi-processor ("SM") 3800, according to at least one embodiment. In at least one embodiment, SM 3800 is SM of FIG. 36. In at least one embodiment, SM 3800 includes, without limitation, an instruction cache 3802, one or more scheduler units 3804, a register file 3808, one or more processing cores ("cores") 3810, one or more special function units ("SFUs") 3812, one or more load/store units ("LSUs") 3814, an interconnect network 3816, a shared memory/level one ("L1") cache 3818, and/or any suitable combination thereof.

In at least one embodiment, a work distribution unit dispatches tasks for execution on general processing clusters ("GPCs") of parallel processing units ("PPUs") and each task is allocated to a particular Data Processing Cluster ("DPC") within a GPC and, if a task is associated with a shader program, that task is allocated to one of SMs 3800. In at least one embodiment, scheduler unit 3804 receives tasks from a work distribution unit and manages instruction scheduling for one or more thread blocks assigned to SM 3800. In at least one embodiment, scheduler unit 3804 schedules thread blocks for execution as warps of parallel threads, wherein each thread block is allocated at least one warp. In at least one embodiment, each warp executes threads. In at least one embodiment, scheduler unit 3804 manages a plurality of different thread blocks, allocating warps to different thread blocks and then dispatching instructions from plurality of different cooperative groups to various functional units (e.g., processing cores 3810, SFUs 3812, and LSUs 3814) during each clock cycle.

In at least one embodiment, Cooperative Groups may refer to a programming model for organizing groups of communicating threads that allows developers to express granularity at which threads are communicating, enabling expression of richer, more efficient parallel decompositions. In at least one embodiment, cooperative launch APIs support synchronization amongst thread blocks for execution of parallel algorithms. In at least one embodiment, applications of conventional programming models provide a single, simple construct for synchronizing cooperating threads: a barrier across all threads of a thread block (e.g., syncthreads ( ) function). However, in at least one embodiment, programmers may define groups of threads at smaller than thread block granularities and synchronize within defined groups to enable greater performance, design flexibility, and software reuse in form of collective group-wide function interfaces. In at least one embodiment, Cooperative Groups enables programmers to define groups of threads explicitly at sub-block (i.e., as small as a single thread) and multi-block granularities, and to perform collective operations such as synchronization on threads in a cooperative group. In at least one embodiment, that programming model supports clean composition across software boundaries, so that libraries and utility functions can synchronize safely within their local context without having to make assumptions about convergence. In at least one embodiment, Cooperative Groups primitives enable new patterns of cooperative parallelism, including, without limitation, producer-consumer parallelism, opportunistic parallelism, and global synchronization across an entire grid of thread blocks.

In at least one embodiment, a dispatch unit 3806 is configured to transmit instructions to one or more functional units and scheduler unit 3804 and includes, without limitation, two dispatch units 3806 that enable two different instructions from a common warp to be dispatched during each clock cycle. In at least one embodiment, each scheduler unit 3804 includes a single dispatch unit 3806 or additional dispatch units 3806.

In at least one embodiment, each SM 3800, in at least one embodiment, includes, without limitation, register file 3808 that provides a set of registers for functional units of SM 3800. In at least one embodiment, register file 3808 is divided between each functional unit such that each functional unit is allocated a dedicated portion of register file 3808. In at least one embodiment, register file 3808 is divided between different warps being executed by SM 3800 and register file 3808 provides temporary storage for operands connected to data paths of functional units. In at least one embodiment, each SM 3800 comprises, without limitation, a plurality of L processing cores 3810, where L is a positive integer. In at least one embodiment, SM 3800 includes, without limitation, a large number (e.g., 128 or more) of distinct processing cores 3810. In at least one embodiment, each processing core 3810 includes, without limitation, a fully-pipelined, single-precision, double-precision, and/or mixed precision processing unit that includes, without limitation, a floating point arithmetic logic unit and an integer arithmetic logic unit. In at least one embodiment, floating point arithmetic logic units implement IEEE 754-2008 standard for floating point arithmetic. In at least one embodiment, processing cores 3810 include, without limitation, 64 single-precision (32-bit) floating point cores, 64 integer cores, 32 double-precision (64-bit) floating point cores, and 8 tensor cores.

Tensor cores are configured to perform matrix operations in accordance with at least one embodiment. In at least one embodiment, one or more tensor cores are included in processing cores 3810. In at least one embodiment, tensor cores are configured to perform deep learning matrix arithmetic, such as convolution operations for neural network training and inferencing. In at least one embodiment, each tensor core operates on a 4×4 matrix and performs a matrix multiply and accumulate operation, D=A×B+C, where A, B, C, and D are 4×4 matrices.

In at least one embodiment, matrix multiply inputs A and B are 16-bit floating point matrices and accumulation matrices C and D are 16-bit floating point or 32-bit floating point matrices. In at least one embodiment, tensor cores operate on 16-bit floating point input data with 32-bit floating point accumulation. In at least one embodiment, 16-bit floating point multiply uses 64 operations and results in a full precision product that is then accumulated using 32-bit floating point addition with other intermediate products for a 4×4×4 matrix multiply. Tensor cores are used to perform much larger two-dimensional or higher dimensional matrix operations, built up from these smaller elements, in at least one embodiment. In at least one embodiment, an API, such as a CUDA 9 C++ API, exposes specialized matrix load, matrix multiply and accumulate, and matrix store operations to efficiently use tensor cores from a CUDA-C++ program. In at least one embodiment, at a CUDA level, a warp-level interface assumes 16×16 size matrices spanning all 32 threads of warp.

In at least one embodiment, each SM 3800 comprises, without limitation, M SFUs 3812 that perform special functions (e.g., attribute evaluation, reciprocal square root, and like). In at least one embodiment, SFUs 3812 include, without limitation, a tree traversal unit configured to traverse a hierarchical tree data structure. In at least one embodiment, SFUs 3812 include, without limitation, a texture unit configured to perform texture map filtering operations. In at least one embodiment, texture units are configured to load texture maps (e.g., a 2D array of texels) from memory and sample texture maps to produce sampled texture values for use in shader programs executed by SM 3800. In at least one embodiment, texture maps are stored in shared memory/L1 cache 3818. In at least one embodiment, texture units implement texture operations such as filtering operations using mip-maps (e.g., texture maps of varying levels of detail), in accordance with at least one embodiment. In at least one embodiment, each SM 3800 includes, without limitation, two texture units.

Each SM 3800 comprises, without limitation, N LSUs 3814 that implement load and store operations between shared memory/L1 cache 3818 and register file 3808, in at least one embodiment. Interconnect network 3816 connects each functional unit to register file 3808 and LSU 3814 to register file 3808 and shared memory/L1 cache 3818 in at least one embodiment. In at least one embodiment, interconnect network 3816 is a crossbar that can be configured to connect any functional units to any registers in register file 3808 and connect LSUs 3814 to register file 3808 and memory locations in shared memory/L1 cache 3818.

In at least one embodiment, shared memory/L1 cache 3818 is an array of on-chip memory that allows for data storage and communication between SM 3800 and primitive engine and between threads in SM 3800, in at least one embodiment. In at least one embodiment, shared memory/L1 cache 3818 comprises, without limitation, 128 KB of storage capacity and is in a path from SM 3800 to a partition unit. In at least one embodiment, shared memory/L1 cache 3818, in at least one embodiment, is used to cache reads and writes. In at least one embodiment, one or more of shared memory/L1 cache 3818, L2 cache, and memory are backing stores.

Combining data cache and shared memory functionality into a single memory block provides improved performance for both types of memory accesses, in at least one embodiment. In at least one embodiment, capacity is used or is usable as a cache by programs that do not use shared memory, such as if shared memory is configured to use half of a capacity, and texture and load/store operations can use remaining capacity. Integration within shared memory/L1 cache 3818 enables shared memory/L1 cache 3818 to function as a high-throughput conduit for streaming data while simultaneously providing high-bandwidth and low-latency access to frequently reused data, in accordance with at least one embodiment. In at least one embodiment, when configured for general purpose parallel computation, a simpler configuration can be used compared with graphics processing. In at least one embodiment, fixed function graphics processing units are bypassed, creating a much simpler programming model. In a general purpose parallel computation configuration, a work distribution unit assigns and distributes blocks of threads directly to DPCs, in at least one embodiment. In at least one embodiment, threads in a block execute a common program, using a unique thread ID in calculation to ensure each thread generates unique results, using SM 3800 to execute program and perform calculations, shared memory/L1 cache 3818 to communicate between threads, and LSU 3814 to read and write global memory through shared memory/L1 cache 3818 and memory partition unit. In at least one embodiment, when configured for general purpose parallel computation, SM 3800 writes commands that scheduler unit 3804 can use to launch new work on DPCs.

In at least one embodiment, a PPU is included in or coupled to a desktop computer, a laptop computer, a tablet computer, servers, supercomputers, a smart-phone (e.g., a wireless, hand-held device), personal digital assistant ("PDA"), a digital camera, a vehicle, a head mounted display, a hand-held electronic device, and more. In at least one embodiment, a PPU is embodied on a single semiconductor substrate. In at least one embodiment, a PPU is included in a system-on-a-chip ("SoC") along with one or more other devices such as additional PPUs, memory, a reduced instruction set computer ("RISC") CPU, a memory management unit ("MMU"), a digital-to-analog converter ("DAC"), and like.

In at least one embodiment, a PPU may be included on a graphics card that includes one or more memory devices. In at least one embodiment, that graphics card may be configured to interface with a PCIe slot on a motherboard of a desktop computer. In at least one embodiment, that PPU may be an integrated graphics processing unit ("iGPU") included in chipset of a motherboard.

Inference and/or training logic 1015 are used to perform inferencing and/or training operations associated with one or more embodiments. Details regarding inference and/or training logic 1015 are provided herein in conjunction with FIGS. 10A and/or 10B. In at least one embodiment, deep learning application processor is used to train a machine learning model, such as a neural network, to predict or infer information provided to SM 3800. In at least one embodiment, SM 3800 is used to infer or predict information based on a trained machine learning model (e.g., neural network) that has been trained by another processor or system or by SM 3800. In at least one embodiment, SM 3800 may be used to perform one or more neural network use cases described herein.

Embodiments are disclosed related a virtualized computing platform for advanced computing, such as image inferencing and image processing in medical applications. Without limitation, embodiments may include radiography, magnetic resonance imaging (MRI), nuclear medicine, ultrasound, sonography, elastography, photoacoustic imaging, tomography, echocardiography, functional near-infrared spectroscopy, and magnetic particle imaging, or a combination thereof. In at least one embodiment, a virtualized computing platform and associated processes described herein may additionally or alternatively be used, without limitation, in forensic science analysis, sub-surface detection and imaging (e.g., oil exploration, archaeology, paleontology, etc.), topography, oceanography, geology, osteology, meteorology, intelligent area or object tracking and monitoring, sensor data processing (e.g., RADAR, SONAR, LIDAR, etc.), and/or genomics and gene sequencing.

Figure 39:
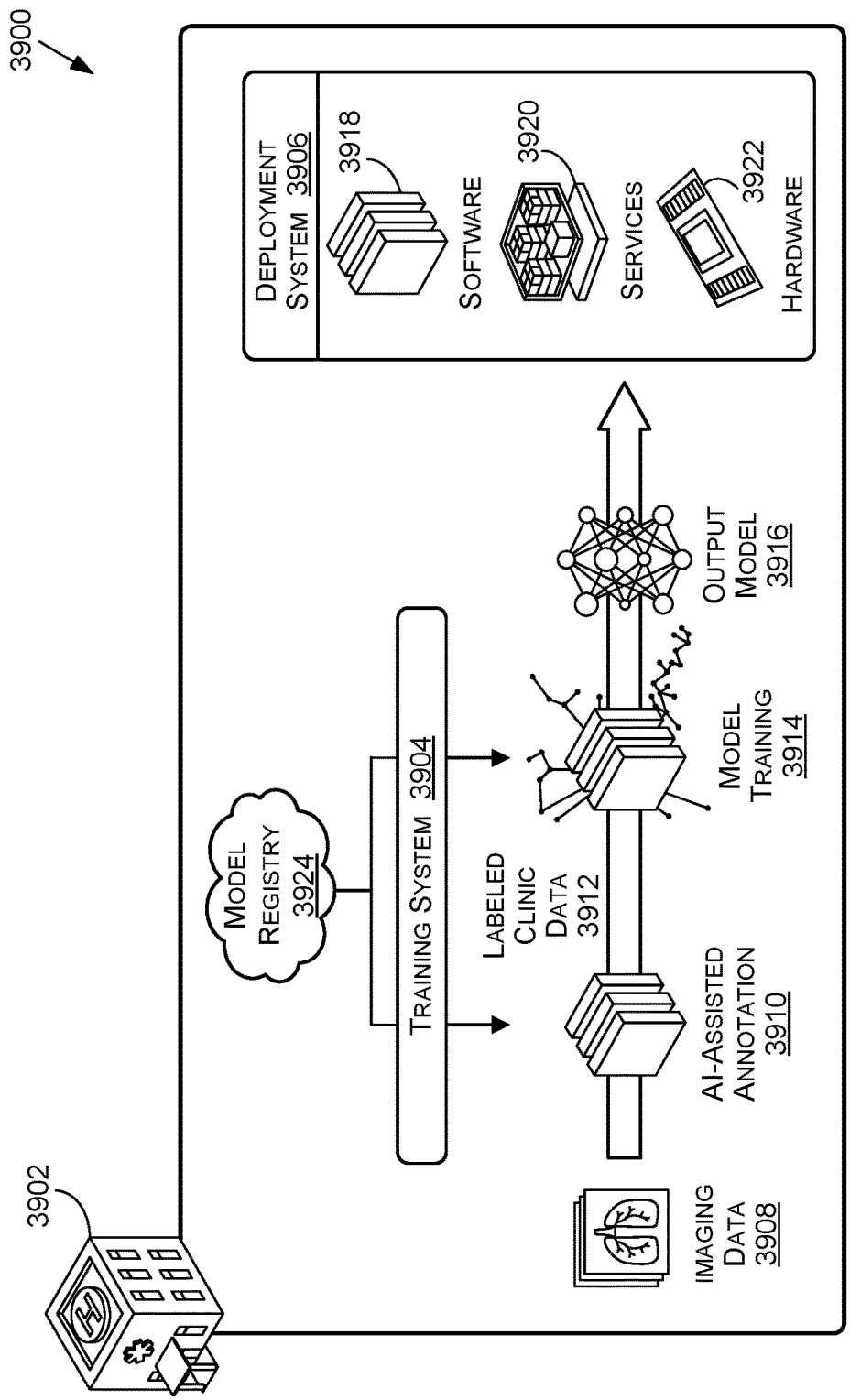
FIG. 39 is an example data flow diagram for an advanced computing pipeline, in accordance with at least one embodiment.

With reference to FIG. 39, FIG. 39 is an example data flow diagram for a process 3900 of generating and deploying an image processing and inferencing pipeline, in accordance with at least one embodiment. In at least one embodiment, process 3900 may be deployed for use with imaging devices, processing devices, genomics devices, gene sequencing devices, radiology devices, and/or other device types at one or more facilities 3902, such as medical facilities, hospitals, healthcare institutes, clinics, research or diagnostic labs, etc. In at least one embodiment, process 3900 may be deployed to perform genomics analysis and inferencing on sequencing data. Examples of genomic analyses that may be performed using systems and processes described herein include, without limitation, variant calling, mutation detection, and gene expression quantification.

In at least one embodiment, process 3900 may be executed within a training system 3904 and/or a deployment system 3906. In at least one embodiment, training system 3904 may be used to perform training, deployment, and implementation of machine learning models (e.g., neural networks, object detection algorithms, computer vision algorithms, etc.) for use in deployment system 3906. In at least one embodiment, deployment system 3906 may be configured to offload processing and compute resources among a distributed computing environment to reduce infrastructure requirements at facility 3902. In at least one embodiment, deployment system 3906 may provide a streamlined platform for selecting, customizing, and implementing virtual instruments for use with imaging devices (e.g., MRI, CT Scan, X-Ray, Ultrasound, etc.) or sequencing devices at facility 3902. In at least one embodiment, virtual instruments may include software-defined applications for performing one or more processing operations with respect to imaging data generated by imaging devices, sequencing devices, radiology devices, and/or other device types. In at least one embodiment, one or more applications in a pipeline may use or call upon services (e.g., inference, visualization, compute, AI, etc.) of deployment system 3906 during execution of applications.

In at least one embodiment, some of applications used in advanced processing and inferencing pipelines may use machine learning models or other AI to perform one or more processing steps. In at least one embodiment, machine learning models may be trained at facility 3902 using data 3908 (such as imaging data) generated at facility 3902 (and stored on one or more picture archiving and communication system (PACS) servers at facility 3902), may be trained using imaging or sequencing data 3908 from another facility or facilities (e.g., a different hospital, lab, clinic, etc.), or a combination thereof. In at least one embodiment, training system 3904 may be used to provide applications, services, and/or other resources for generating working, deployable machine learning models for deployment system 3906.

In at least one embodiment, a model registry 3924 may be backed by object storage that may support versioning and object metadata. In at least one embodiment, object storage may be accessible through, for example, a cloud storage (e.g., a cloud 4026 of FIG. 40) compatible application programming interface (API) from within a cloud platform. In at least one embodiment, machine learning models within model registry 3924 may uploaded, listed, modified, or deleted by developers or partners of a system interacting with an API. In at least one embodiment, an API may provide access to methods that allow users with appropriate credentials to associate models with applications, such that models may be executed as part of execution of containerized instantiations of applications.

In at least one embodiment, a training pipeline 4004 (FIG. 40) may include a scenario where facility 3902 is training their own machine learning model, or has an existing machine learning model that needs to be optimized or updated. In at least one embodiment, imaging data 3908 generated by imaging device(s), sequencing devices, and/or other device types may be received. In at least one embodiment, once imaging data 3908 is received, AI-assisted annotation 3910 may be used to aid in generating annotations corresponding to imaging data 3908 to be used as ground truth data for a machine learning model. In at least one embodiment, AI-assisted annotation 3910 may include one or more machine learning models (e.g., convolutional neural networks (CNNs)) that may be trained to generate annotations corresponding to certain types of imaging data 3908 (e.g., from certain devices) and/or certain types of anomalies in imaging data 3908. In at least one embodiment, AI-assisted annotations 3910 may then be used directly, or may be adjusted or fine-tuned using an annotation tool (e.g., by a researcher, a clinician, a doctor, a scientist, etc.), to generate ground truth data. In at least one embodiment, in some examples, labeled clinic data 3912 (e.g., annotations provided by a clinician, doctor, scientist, technician, etc.) may be used as ground truth data for training a machine learning model. In at least one embodiment, AI-assisted annotations 3910, labeled clinic data 3912, or a combination thereof may be used as ground truth data for training a machine learning model. In at least one embodiment, a trained machine learning model may be referred to as an output model 3916, and may be used by deployment system 3906, as described herein.

In at least one embodiment, training pipeline 4004 (FIG. 40) may include a scenario where facility 3902 needs a machine learning model for use in performing one or more processing tasks for one or more applications in deployment system 3906, but facility 3902 may not currently have such a machine learning model (or may not have a model that is optimized, efficient, or effective for such purposes). In at least one embodiment, an existing machine learning model may be selected from model registry 3924. In at least one embodiment, model registry 3924 may include machine learning models trained to perform a variety of different inference tasks on imaging data. In at least one embodiment, machine learning models in model registry 3924 may have been trained on imaging data from different facilities than facility 3902 (e.g., facilities remotely located). In at least one embodiment, machine learning models may have been trained on imaging data from one location, two locations, or any number of locations. In at least one embodiment, when being trained on imaging data from a specific location, training may take place at that location, or at least in a manner that protects confidentiality of imaging data or restricts imaging data from being transferred off-premises (e.g., to comply with HIPAA regulations, privacy regulations, etc.). In at least one embodiment, once a model is trained—or partially trained—at one location, a machine learning model may be added to model registry 3924. In at least one embodiment, a machine learning model may then be retrained, or updated, at any number of other facilities, and a retrained or updated model may be made available in model registry 3924. In at least one embodiment, a machine learning model may then be selected from model registry 3924—and referred to as output model 3916—and may be used in deployment system 3906 to perform one or more processing tasks for one or more applications of a deployment system.

In at least one embodiment, training pipeline 4004 (FIG. 40) may be used in a scenario that includes facility 3902 requiring a machine learning model for use in performing one or more processing tasks for one or more applications in deployment system 3906, but facility 3902 may not currently have such a machine learning model (or may not have a model that is optimized, efficient, or effective for such purposes). In at least one embodiment, a machine learning model selected from model registry 3924 might not be fine-tuned or optimized for imaging data 3908 generated at facility 3902 because of differences in populations, genetic variations, robustness of training data used to train a machine learning model, diversity in anomalies of training data, and/or other issues with training data. In at least one embodiment, AI-assisted annotation 3910 may be used to aid in generating annotations corresponding to imaging data 3908 to be used as ground truth data for retraining or updating a machine learning model. In at least one embodiment, labeled clinic data 3912 (e.g., annotations provided by a clinician, doctor, scientist, etc.) may be used as ground truth data for training a machine learning model. In at least one embodiment, retraining or updating a machine learning model may be referred to as model training 3914. In at least one embodiment, model training 3914—e.g., AI-assisted annotations 3910, labeled clinic data 3912, or a combination thereof—may be used as ground truth data for retraining or updating a machine learning model.

In at least one embodiment, deployment system 3906 may include software 3918, services 3920, hardware 3922, and/or other components, features, and functionality. In at least one embodiment, deployment system 3906 may include a software "stack," such that software 3918 may be built on top of services 3920 and may use services 3920 to perform some or all of processing tasks, and services 3920 and software 3918 may be built on top of hardware 3922 and use hardware 3922 to execute processing, storage, and/or other compute tasks of deployment system 3906.

In at least one embodiment, software 3918 may include any number of different containers, where each container may execute an instantiation of an application. In at least one embodiment, each application may perform one or more processing tasks in an advanced processing and inferencing pipeline (e.g., inferencing, object detection, feature detection, segmentation, image enhancement, calibration, etc.). In at least one embodiment, for each type of imaging device (e.g., CT, Mill, X-Ray, ultrasound, sonography, echocardiography, etc.), sequencing device, radiology device, genomics device, etc., there may be any number of containers that may perform a data processing task with respect to imaging data 3908 (or other data types, such as those described herein) generated by a device. In at least one embodiment, an advanced processing and inferencing pipeline may be defined based on selections of different containers that are desired or required for processing imaging data 3908, in addition to containers that receive and configure imaging data for use by each container and/or for use by facility 3902 after processing through a pipeline (e.g., to convert outputs back to a usable data type, such as digital imaging and communications in medicine (DICOM) data, radiology information system (RIS) data, clinical information system (CIS) data, remote procedure call (RPC) data, data substantially compliant with a representation state transfer (REST) interface, data substantially compliant with a file-based interface, and/or raw data, for storage and display at facility 3902). In at least one embodiment, a combination of containers within software 3918 (e.g., that make up a pipeline) may be referred to as a virtual instrument (as described in more detail herein), and a virtual instrument may leverage services 3920 and hardware 3922 to execute some or all processing tasks of applications instantiated in containers.

In at least one embodiment, a data processing pipeline may receive input data (e.g., imaging data 3908) in a DICOM, RIS, CIS, REST compliant, RPC, raw, and/or other format in response to an inference request (e.g., a request from a user of deployment system 3906, such as a clinician, a doctor, a radiologist, etc.). In at least one embodiment, input data may be representative of one or more images, video, and/or other data representations generated by one or more imaging devices, sequencing devices, radiology devices, genomics devices, and/or other device types. In at least one embodiment, data may undergo pre-processing as part of data processing pipeline to prepare data for processing by one or more applications. In at least one embodiment, post-processing may be performed on an output of one or more inferencing tasks or other processing tasks of a pipeline to prepare an output data for a next application and/or to prepare output data for transmission and/or use by a user (e.g., as a response to an inference request). In at least one embodiment, inferencing tasks may be performed by one or more machine learning models, such as trained or deployed neural networks, which may include output models 3916 of training system 3904.

In at least one embodiment, tasks of data processing pipeline may be encapsulated in a container(s) that each represent a discrete, fully functional instantiation of an application and virtualized computing environment that is able to reference machine learning models. In at least one embodiment, containers or applications may be published into a private (e.g., limited access) area of a container registry (described in more detail herein), and trained or deployed models may be stored in model registry 3924 and associated with one or more applications. In at least one embodiment, images of applications (e.g., container images)

may be available in a container registry, and once selected by a user from a container registry for deployment in a pipeline, an image may be used to generate a container for an instantiation of an application for use by a user's system.

In at least one embodiment, developers (e.g., software developers, clinicians, doctors, etc.) may develop, publish, and store applications (e.g., as containers) for performing image processing and/or inferencing on supplied data. In at least one embodiment, development, publishing, and/or storing may be performed using a software development kit (SDK) associated with a system (e.g., to ensure that an application and/or container developed is compliant with or compatible with a system). In at least one embodiment, an application that is developed may be tested locally (e.g., at a first facility, on data from a first facility) with an SDK which may support at least some of services 3920 as a system (e.g., system 4000 of FIG. 40). In at least one embodiment, because DICOM objects may contain anywhere from one to hundreds of images or other data types, and due to a variation in data, a developer may be responsible for managing (e.g., setting constructs for, building pre-processing into an application, etc.) extraction and preparation of incoming DICOM data. In at least one embodiment, once validated by system 4000 (e.g., for accuracy, safety, patient privacy, etc.), an application may be available in a container registry for selection and/or implementation by a user (e.g., a hospital, clinic, lab, healthcare provider, etc.) to perform one or more processing tasks with respect to data at a facility (e.g., a second facility) of a user.

Figure 40:
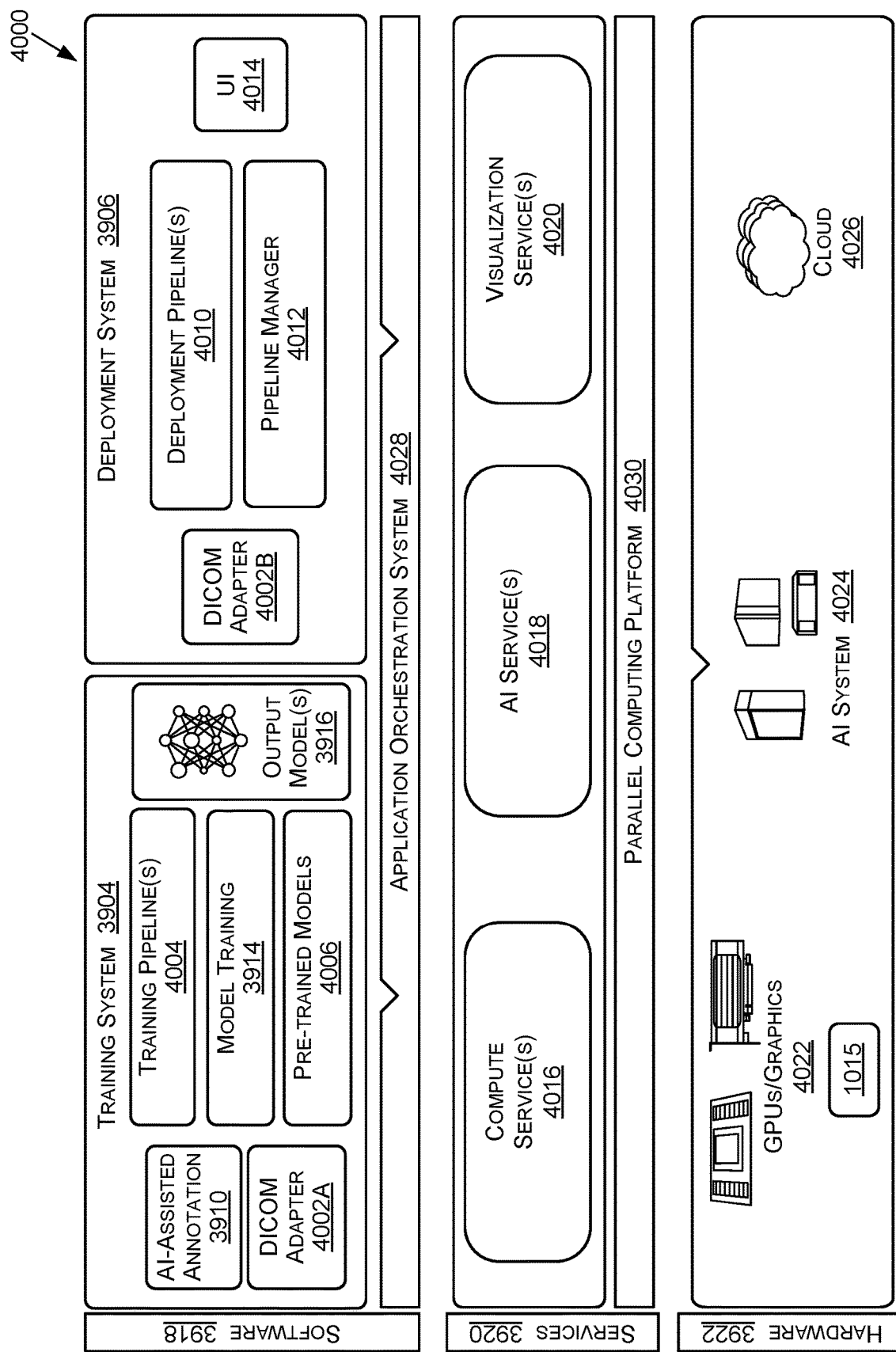
FIG. 40 is a system diagram for an example system for training, adapting, instantiating and deploying machine learning models in an advanced computing pipeline, in accordance with at least one embodiment.

In at least one embodiment, developers may then share applications or containers through a network for access and use by users of a system (e.g., system 4000 of FIG. 40). In at least one embodiment, completed and validated applications or containers may be stored in a container registry and associated machine learning models may be stored in model registry 3924. In at least one embodiment, a requesting entity (e.g., a user at a medical facility)—who provides an inference or image processing request—may browse a container registry and/or model registry 3924 for an application, container, dataset, machine learning model, etc., select a desired combination of elements for inclusion in data processing pipeline, and submit an imaging processing request. In at least one embodiment, a request may include input data (and associated patient data, in some examples) that is necessary to perform a request, and/or may include a selection of application(s) and/or machine learning models to be executed in processing a request. In at least one embodiment, a request may then be passed to one or more components of deployment system 3906 (e.g., a cloud) to perform processing of data processing pipeline. In at least one embodiment, processing by deployment system 3906 may include referencing selected elements (e.g., applications, containers, models, etc.) from a container registry and/or model registry 3924. In at least one embodiment, once results are generated by a pipeline, results may be returned to a user for reference (e.g., for viewing in a viewing application suite executing on a local, on-premises workstation or terminal). In at least one embodiment, a radiologist may receive results from an data processing pipeline including any number of application and/or containers, where results may include anomaly detection in X-rays, CT scans, MRIs, etc.

In at least one embodiment, to aid in processing or execution of applications or containers in pipelines, services 3920 may be leveraged. In at least one embodiment, services 3920 may include compute services, artificial intelligence (AI) services, visualization services, and/or other service types. In at least one embodiment, services 3920 may provide functionality that is common to one or more applications in software 3918, so functionality may be abstracted to a service that may be called upon or leveraged by applications. In at least one embodiment, functionality provided by services 3920 may run dynamically and more efficiently, while also scaling well by allowing applications to process data in parallel (e.g., using a parallel computing platform 4030 (FIG. 40)). In at least one embodiment, rather than each application that shares a same functionality offered by a service 3920 being required to have a respective instance of service 3920, service 3920 may be shared between and among various applications. In at least one embodiment, services may include an inference server or engine that may be used for executing detection or segmentation tasks, as non-limiting examples. In at least one embodiment, a model training service may be included that may provide machine learning model training and/or retraining capabilities. In at least one embodiment, a data augmentation service may further be included that may provide GPU accelerated data (e.g., DICOM, RIS, CIS, REST compliant, RPC, raw, etc.) extraction, resizing, scaling, and/or other augmentation. In at least one embodiment, a visualization service may be used that may add image rendering effects—such as ray-tracing, rasterization, denoising, sharpening, etc.—to add realism to two-dimensional (2D) and/or three-dimensional (3D) models. In at least one embodiment, virtual instrument services may be included that provide for beam-forming, segmentation, inferencing, imaging, and/or support for other applications within pipelines of virtual instruments.

In at least one embodiment, where a service 3920 includes an AI service (e.g., an inference service), one or more machine learning models associated with an application for anomaly detection (e.g., tumors, growth abnormalities, scarring, etc.) may be executed by calling upon (e.g., as an API call) an inference service (e.g., an inference server) to execute machine learning model(s), or processing thereof, as part of application execution. In at least one embodiment, where another application includes one or more machine learning models for segmentation tasks, an application may call upon an inference service to execute machine learning models for performing one or more of processing operations associated with segmentation tasks. In at least one embodiment, software 3918 implementing advanced processing and inferencing pipeline that includes segmentation application and anomaly detection application may be streamlined because each application may call upon a same inference service to perform one or more inferencing tasks.

In at least one embodiment, hardware 3922 may include GPUs, CPUs, graphics cards, an AI/deep learning system (e.g., an AI supercomputer, such as NVIDIA's DGX supercomputer system), a cloud platform, or a combination thereof. In at least one embodiment, different types of hardware 3922 may be used to provide efficient, purpose-built support for software 3918 and services 3920 in deployment system 3906. In at least one embodiment, use of GPU processing may be implemented for processing locally (e.g., at facility 3902), within an AI/deep learning system, in a cloud system, and/or in other processing components of deployment system 3906 to improve efficiency, accuracy, and efficacy of image processing, image reconstruction, segmentation, MIl exams, stroke or heart attack detection (e.g., in real-time), image quality in rendering, etc. In at least one embodiment, a facility may include imaging devices, genomics devices, sequencing devices, and/or other device types on-premises that may leverage GPUs to generate imaging data representative of a subject's anatomy.

In at least one embodiment, software 3918 and/or services 3920 may be optimized for GPU processing with respect to deep learning, machine learning, and/or high-performance computing, as non-limiting examples. In at least one embodiment, at least some of computing environment of deployment system 3906 and/or training system 3904 may be executed in a datacenter one or more supercomputers or high performance computing systems, with GPU optimized software (e.g., hardware and software combination of NVIDIA's DGX system). In at least one embodiment, datacenters may be compliant with provisions of HIPAA, such that receipt, processing, and transmission of imaging data and/or other patient data is securely handled with respect to privacy of patient data. In at least one embodiment, hardware 3922 may include any number of GPUs that may be called upon to perform processing of data in parallel, as described herein. In at least one embodiment, cloud platform may further include GPU processing for GPU-optimized execution of deep learning tasks, machine learning tasks, or other computing tasks. In at least one embodiment, cloud platform (e.g., NVIDIA's NGC) may be executed using an AI/deep learning supercomputer(s) and/or GPU-optimized software (e.g., as provided on NVIDIA's DGX systems) as a hardware abstraction and scaling platform. In at least one embodiment, cloud platform may integrate an application container clustering system or orchestration system (e.g., KUBERNETES) on multiple GPUs to enable seamless scaling and load balancing.

FIG. 40 is a system diagram for an example system 4000 for generating and deploying an imaging deployment pipeline, in accordance with at least one embodiment. In at least one embodiment, system 4000 may be used to implement process 3900 of FIG. 39 and/or other processes including advanced processing and inferencing pipelines. In at least one embodiment, system 4000 may include training system 3904 and deployment system 3906. In at least one embodiment, training system 3904 and deployment system 3906 may be implemented using software 3918, services 3920, and/or hardware 3922, as described herein.

In at least one embodiment, system 4000 (e.g., training system 3904 and/or deployment system 3906) may implemented in a cloud computing environment (e.g., using cloud 4026). In at least one embodiment, system 4000 may be implemented locally with respect to a healthcare services facility, or as a combination of both cloud and local computing resources. In at least one embodiment, in embodiments where cloud computing is implemented, patient data may be separated from, or unprocessed by, by one or more components of system 4000 that would render processing non-compliant with HIPAA and/or other data handling and privacy regulations or laws. In at least one embodiment, access to APIs in cloud 4026 may be restricted to authorized users through enacted security measures or protocols. In at least one embodiment, a security protocol may include web tokens that may be signed by an authentication (e.g., AuthN, AuthZ, Gluecon, etc.) service and may carry appropriate authorization. In at least one embodiment, APIs of virtual instruments (described herein), or other instantiations of system 4000, may be restricted to a set of public IPs that have been vetted or authorized for interaction.

In at least one embodiment, various components of system 4000 may communicate between and among one another using any of a variety of different network types, including but not limited to local area networks (LANs) and/or wide area networks (WANs) via wired and/or wireless communication protocols. In at least one embodiment, communication between facilities and components of system 4000 (e.g., for transmitting inference requests, for receiving results of inference requests, etc.) may be communicated over a data bus or data busses, wireless data protocols (Wi-Fi), wired data protocols (e.g., Ethernet), etc.

In at least one embodiment, training system 3904 may execute training pipelines 4004, similar to those described herein with respect to FIG. 39. In at least one embodiment, where one or more machine learning models are to be used in deployment pipelines 4010 by deployment system 3906, training pipelines 4004 may be used to train or retrain one or more (e.g., pre-trained) models, and/or implement one or more of pre-trained models 4006 (e.g., without a need for retraining or updating). In at least one embodiment, as a result of training pipelines 4004, output model(s) 3916 may be generated. In at least one embodiment, training pipelines 4004 may include any number of processing steps, such as but not limited to imaging data (or other input data) conversion or adaption (e.g., using DICOM adapter 4002A to convert DICOM images to another format suitable for processing by respective machine learning models, such as Neuroimaging Informatics Technology Initiative (NIfTI) format), AI-assisted annotation 3910, labeling or annotating of imaging data 3908 to generate labeled clinic data 3912, model selection from a model registry, model training 3914, training, retraining, or updating models, and/or other processing steps. In at least one embodiment, for different machine learning models used by deployment system 3906, different training pipelines 4004 may be used. In at least one embodiment, training pipeline 4004 similar to a first example described with respect to FIG. 39 may be used for a first machine learning model, training pipeline 4004 similar to a second example described with respect to FIG. 39 may be used for a second machine learning model, and training pipeline 4004 similar to a third example described with respect to FIG. 39 may be used for a third machine learning model. In at least one embodiment, any combination of tasks within training system 3904 may be used depending on what is required for each respective machine learning model. In at least one embodiment, one or more of machine learning models may already be trained and ready for deployment so machine learning models may not undergo any processing by training system 3904, and may be implemented by deployment system 3906.

In at least one embodiment, output model(s) 3916 and/or pre-trained model(s) 4006 may include any types of machine learning models depending on implementation or embodiment. In at least one embodiment, and without limitation, machine learning models used by system 4000 may include machine learning model(s) using linear regression, logistic regression, decision trees, support vector machines (SVM), Naïve Bayes, k-nearest neighbor (Knn), K means clustering, random forest, dimensionality reduction algorithms, gradient boosting algorithms, neural networks (e.g., auto-encoders, convolutional, recurrent, perceptrons, Long/Short Term Memory (LSTM), Hopfield, Boltzmann, deep belief, deconvolutional, generative adversarial, liquid state machine, etc.), and/or other types of machine learning models.

Figure 43A:
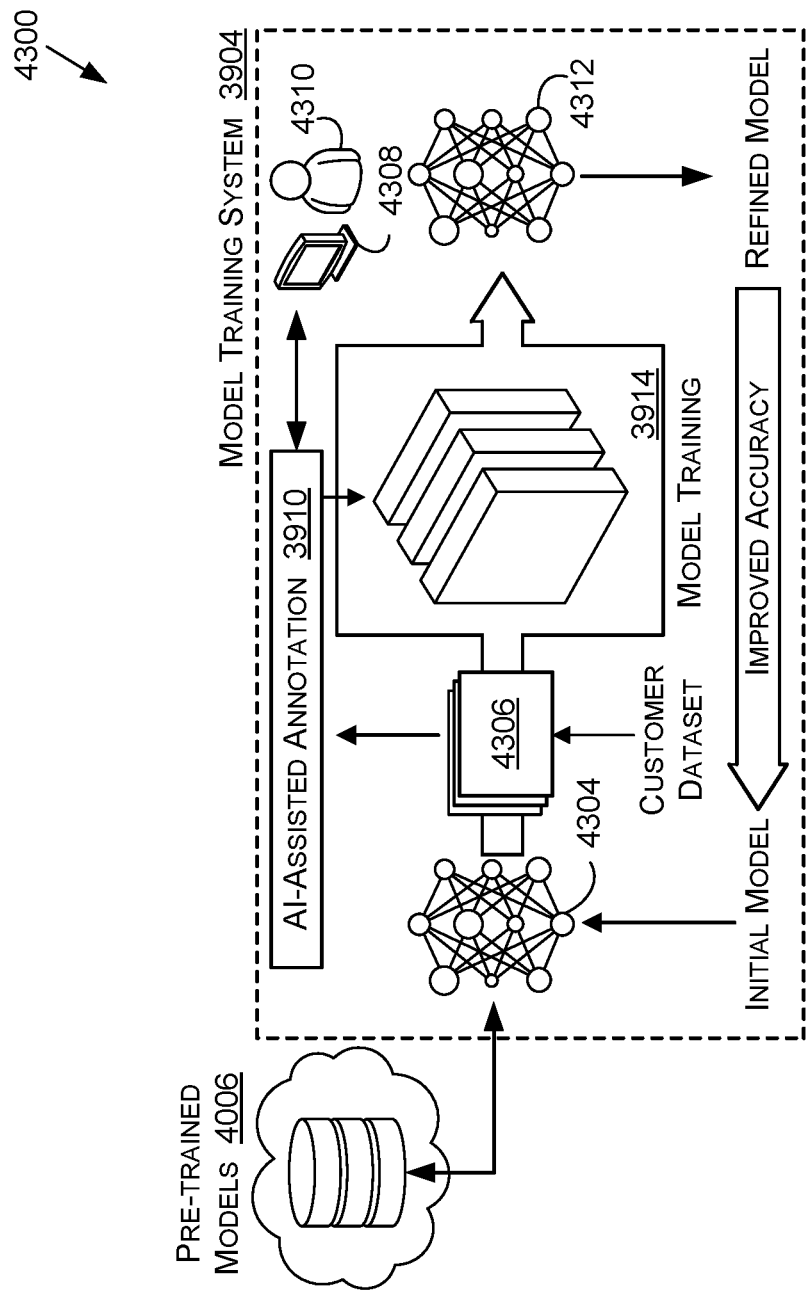
FIG. 43A illustrates a data flow diagram for a process to train a machine learning model, in accordance with at least one embodiment.
Figure 43B:
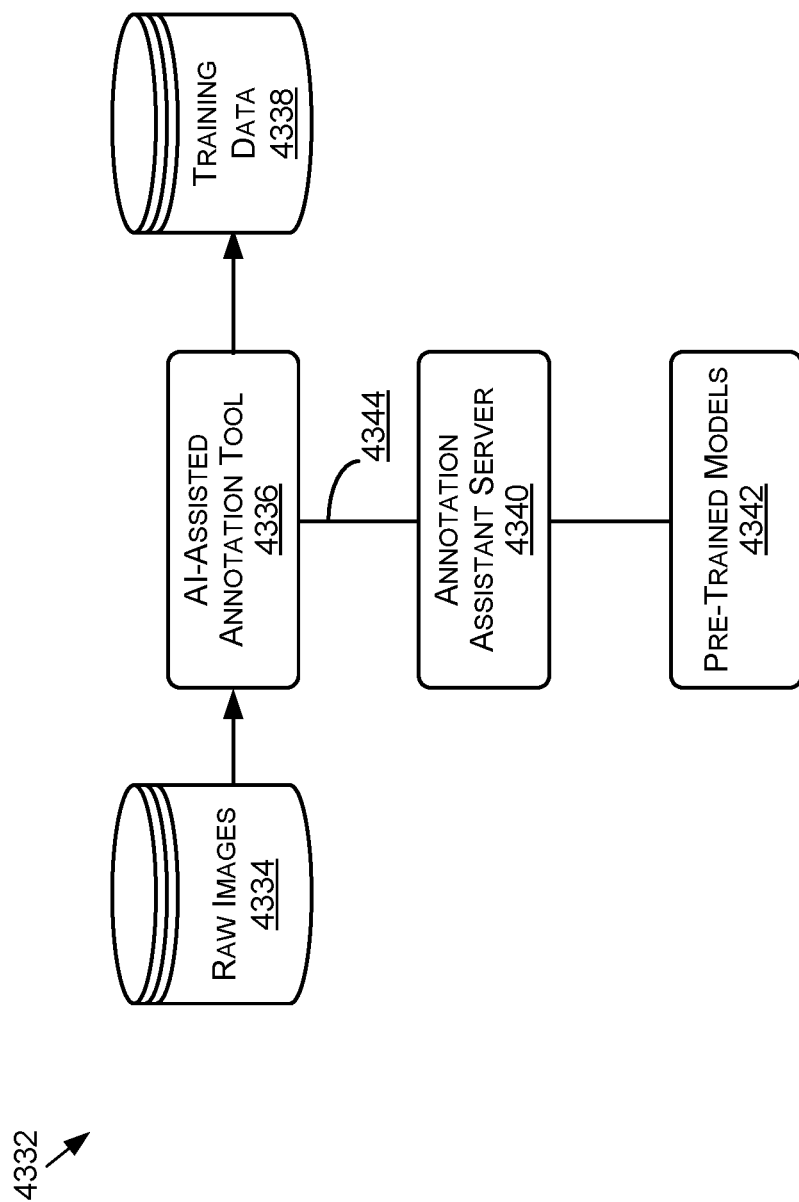
FIG. 43B is an example illustration of a client-server architecture to enhance annotation tools with pre-trained annotation models, in accordance with at least one embodiment.

In at least one embodiment, training pipelines 4004 may include AI-assisted annotation, as described in more detail herein with respect to at least FIG. 43B. In at least one embodiment, labeled clinic data 3912 (e.g., traditional annotation) may be generated by any number of techniques. In at least one embodiment, labels or other annotations may be generated within a drawing program (e.g., an annotation program), a computer aided design (CAD) program, a labeling program, another type of program suitable for generating annotations or labels for ground truth, and/or may be hand drawn, in some examples. In at least one embodiment, ground truth data may be synthetically produced (e.g., generated from computer models or renderings), real produced (e.g., designed and produced from real-world data), machine-automated (e.g., using feature analysis and learning to extract features from data and then generate labels), human annotated (e.g., labeler, or annotation expert, defines location of labels), and/or a combination thereof. In at least one embodiment, for each instance of imaging data 3908 (or other data type used by machine learning models), there may be corresponding ground truth data generated by training system 3904. In at least one embodiment, AI-assisted annotation may be performed as part of deployment pipelines 4010; either in addition to, or in lieu of AI-assisted annotation included in training pipelines 4004. In at least one embodiment, system 4000 may include a multi-layer platform that may include a software layer (e.g., software 3918) of diagnostic applications (or other application types) that may perform one or more medical imaging and diagnostic functions. In at least one embodiment, system 4000 may be communicatively coupled to (e.g., via encrypted links) PACS server networks of one or more facilities. In at least one embodiment, system 4000 may be configured to access and referenced data (e.g., DICOM data, RIS data, raw data, CIS data, REST compliant data, RPC data, raw data, etc.) from PACS servers (e.g., via a DICOM adapter 4002, or another data type adapter such as RIS, CIS, REST compliant, RPC, raw, etc.) to perform operations, such as training machine learning models, deploying machine learning models, image processing, inferencing, and/or other operations.

In at least one embodiment, a software layer may be implemented as a secure, encrypted, and/or authenticated API through which applications or containers may be invoked (e.g., called) from an external environment(s) (e.g., facility 3902). In at least one embodiment, applications may then call or execute one or more services 3920 for performing compute, AI, or visualization tasks associated with respective applications, and software 3918 and/or services 3920 may leverage hardware 3922 to perform processing tasks in an effective and efficient manner.

In at least one embodiment, deployment system 3906 may execute deployment pipelines 4010. In at least one embodiment, deployment pipelines 4010 may include any number of applications that may be sequentially, non-sequentially, or otherwise applied to imaging data (and/or other data types) generated by imaging devices, sequencing devices, genomics devices, etc.—including AI-assisted annotation, as described above. In at least one embodiment, as described herein, a deployment pipeline 4010 for an individual device may be referred to as a virtual instrument for a device (e.g., a virtual ultrasound instrument, a virtual CT scan instrument, a virtual sequencing instrument, etc.). In at least one embodiment, for a single device, there may be more than one deployment pipeline 4010 depending on information desired from data generated by a device. In at least one embodiment, where detections of anomalies are desired from an MRI machine, there may be a first deployment pipeline 4010, and where image enhancement is desired from output of an Mill machine, there may be a second deployment pipeline 4010.

In at least one embodiment, applications available for deployment pipelines 4010 may include any application that may be used for performing processing tasks on imaging data or other data from devices. In at least one embodiment, different applications may be responsible for image enhancement, segmentation, reconstruction, anomaly detection, object detection, feature detection, treatment planning, dosimetry, beam planning (or other radiation treatment procedures), and/or other analysis, image processing, or inferencing tasks. In at least one embodiment, deployment system 3906 may define constructs for each of applications, such that users of deployment system 3906 (e.g., medical facilities, labs, clinics, etc.) may understand constructs and adapt applications for implementation within their respective facility. In at least one embodiment, an application for image reconstruction may be selected for inclusion in deployment pipeline 4010, but data type generated by an imaging device may be different from a data type used within an application. In at least one embodiment, DICOM adapter 4002B (and/or a DICOM reader) or another data type adapter or reader (e.g., RIS, CIS, REST compliant, RPC, raw, etc.) may be used within deployment pipeline 4010 to convert data to a form useable by an application within deployment system 3906. In at least one embodiment, access to DICOM, RIS, CIS, REST compliant, RPC, raw, and/or other data type libraries may be accumulated and pre-processed, including decoding, extracting, and/or performing any convolutions, color corrections, sharpness, gamma, and/or other augmentations to data. In at least one embodiment, DICOM, RIS, CIS, REST compliant, RPC, and/or raw data may be unordered and a pre-pass may be executed to organize or sort collected data. In at least one embodiment, because various applications may share common image operations, in some embodiments, a data augmentation library (e.g., as one of services 3920) may be used to accelerate these operations. In at least one embodiment, to avoid bottlenecks of conventional processing approaches that rely on CPU processing, parallel computing platform 4030 may be used for GPU acceleration of these processing tasks.

In at least one embodiment, an image reconstruction application may include a processing task that includes use of a machine learning model. In at least one embodiment, a user may desire to use their own machine learning model, or to select a machine learning model from model registry 3924. In at least one embodiment, a user may implement their own machine learning model or select a machine learning model for inclusion in an application for performing a processing task. In at least one embodiment, applications may be selectable and customizable, and by defining constructs of applications, deployment and implementation of applications for a particular user are presented as a more seamless user experience. In at least one embodiment, by leveraging other features of system 4000—such as services 3920 and hardware 3922—deployment pipelines 4010 may be even more user friendly, provide for easier integration, and produce more accurate, efficient, and timely results.

In at least one embodiment, deployment system 3906 may include a user interface 4014 (e.g., a graphical user interface, a web interface, etc.) that may be used to select applications for inclusion in deployment pipeline(s) 4010, arrange applications, modify or change applications or parameters or constructs thereof, use and interact with deployment pipeline(s) 4010 during set-up and/or deployment, and/or to otherwise interact with deployment system 3906. In at least one embodiment, although not illustrated with respect to training system 3904, user interface 4014 (or a different user interface) may be used for selecting models for use in deployment system 3906, for selecting models for training, or retraining, in training system 3904, and/or for otherwise interacting with training system 3904.

Figure 41:
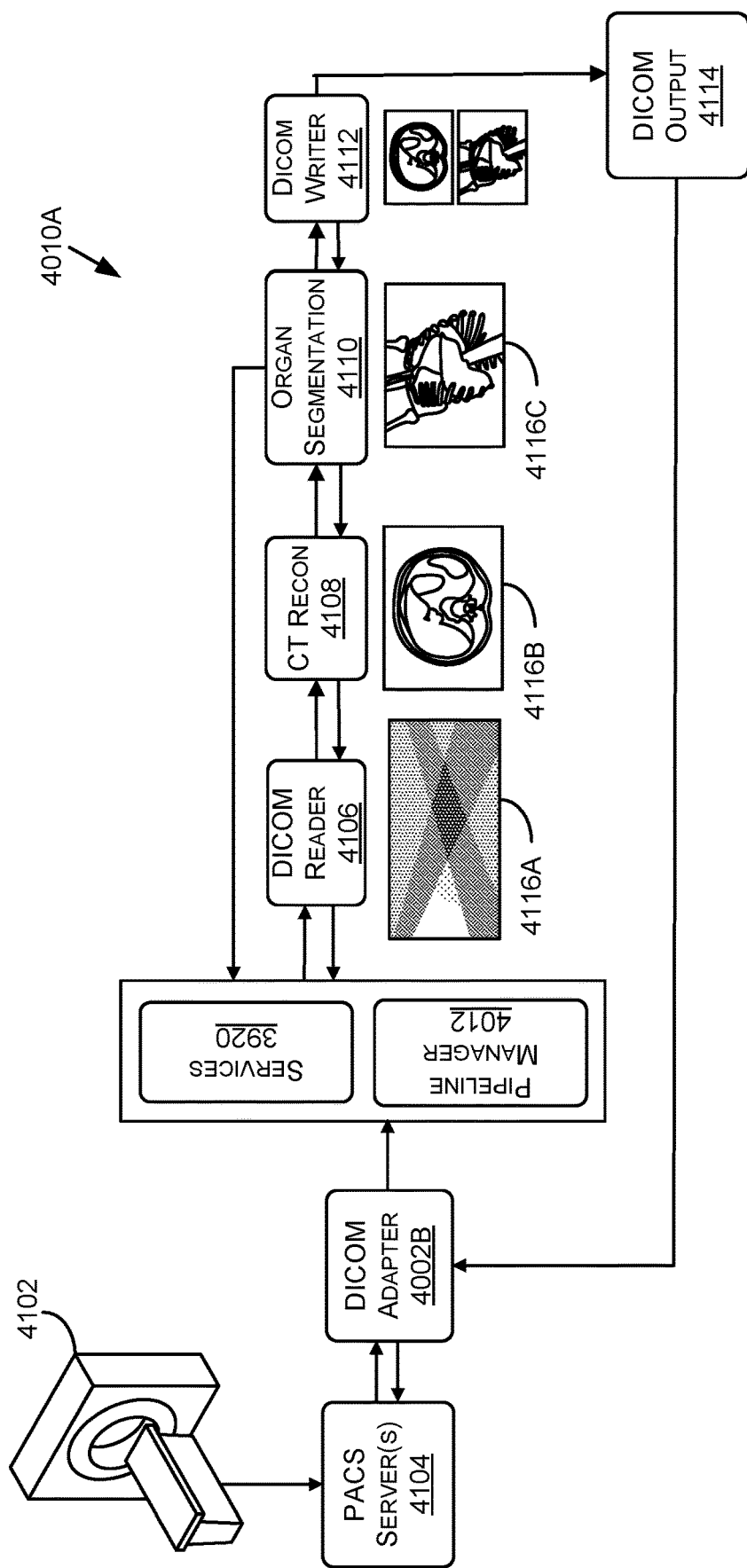
FIG. 41 includes an example illustration of an advanced computing pipeline 4010A for processing imaging data, in accordance with at least one embodiment.

In at least one embodiment, pipeline manager 4012 may be used, in addition to an application orchestration system 4028, to manage interaction between applications or containers of deployment pipeline(s) 4010 and services 3920 and/or hardware 3922. In at least one embodiment, pipeline manager 4012 may be configured to facilitate interactions from application to application, from application to service 3920, and/or from application or service to hardware 3922. In at least one embodiment, although illustrated as included in software 3918, this is not intended to be limiting, and in some examples (e.g., as illustrated in FIG. 41) pipeline manager 4012 may be included in services 3920. In at least one embodiment, application orchestration system 4028 (e.g., Kubernetes, DOCKER, etc.) may include a container orchestration system that may group applications into containers as logical units for coordination, management, scaling, and deployment. In at least one embodiment, by associating applications from deployment pipeline(s) 4010 (e.g., a reconstruction application, a segmentation application, etc.) with individual containers, each application may execute in a self-contained environment (e.g., at a kernel level) to increase speed and efficiency.

In at least one embodiment, each application and/or container (or image thereof) may be individually developed, modified, and deployed (e.g., a first user or developer may develop, modify, and deploy a first application and a second user or developer may develop, modify, and deploy a second application separate from a first user or developer), which may allow for focus on, and attention to, a task of a single application and/or container(s) without being hindered by tasks of another application(s) or container(s). In at least one embodiment, communication, and cooperation between different containers or applications may be aided by pipeline manager 4012 and application orchestration system 4028. In at least one embodiment, so long as an expected input and/or output of each container or application is known by a system (e.g., based on constructs of applications or containers), application orchestration system 4028 and/or pipeline manager 4012 may facilitate communication among and between, and sharing of resources among and between, each of applications or containers. In at least one embodiment, because one or more of applications or containers in deployment pipeline(s) 4010 may share same services and resources, application orchestration system 4028 may orchestrate, load balance, and determine sharing of services or resources between and among various applications or containers. In at least one embodiment, a scheduler may be used to track resource requirements of applications or containers, current usage or planned usage of these resources, and resource availability. In at least one embodiment, a scheduler may thus allocate resources to different applications and distribute resources between and among applications in view of requirements and availability of a system. In some examples, a scheduler (and/or other component of application orchestration system 4028) may determine resource availability and distribution based on constraints imposed on a system (e.g., user constraints), such as quality of service (QoS), urgency of need for data outputs (e.g., to determine whether to execute real-time processing or delayed processing), etc.

In at least one embodiment, services 3920 leveraged by and shared by applications or containers in deployment system 3906 may include compute services 4016, AI services 4018, visualization services 4020, and/or other service types. In at least one embodiment, applications may call (e.g., execute) one or more of services 3920 to perform processing operations for an application. In at least one embodiment, compute services 4016 may be leveraged by applications to perform super-computing or other high-performance computing (HPC) tasks. In at least one embodiment, compute service(s) 4016 may be leveraged to perform parallel processing (e.g., using a parallel computing platform 4030) for processing data through one or more of applications and/or one or more tasks of a single application, substantially simultaneously. In at least one embodiment, parallel computing platform 4030 (e.g., NVIDIA's CUDA) may enable general purpose computing on GPUs (GPGPU) (e.g., GPUs 4022). In at least one embodiment, a software layer of parallel computing platform 4030 may provide access to virtual instruction sets and parallel computational elements of GPUs, for execution of compute kernels. In at least one embodiment, parallel computing platform 4030 may include memory and, in some embodiments, a memory may be shared between and among multiple containers, and/or between and among different processing tasks within a single container. In at least one embodiment, inter-process communication (IPC) calls may be generated for multiple containers and/or for multiple processes within a container to use same data from a shared segment of memory of parallel computing platform 4030 (e.g., where multiple different stages of an application or multiple applications are processing same information). In at least one embodiment, rather than making a copy of data and moving data to different locations in memory (e.g., a read/write operation), same data in same location of a memory may be used for any number of processing tasks (e.g., at a same time, at different times, etc.). In at least one embodiment, as data is used to generate new data as a result of processing, this information of a new location of data may be stored and shared between various applications. In at least one embodiment, location of data and a location of updated or modified data may be part of a definition of how a payload is understood within containers.

In at least one embodiment, AI services 4018 may be leveraged to perform inferencing services for executing machine learning model(s) associated with applications (e.g., tasked with performing one or more processing tasks of an application). In at least one embodiment, AI services 4018 may leverage AI system 4024 to execute machine learning model(s) (e.g., neural networks, such as CNNs) for segmentation, reconstruction, object detection, feature detection, classification, and/or other inferencing tasks. In at least one embodiment, applications of deployment pipeline(s) 4010 may use one or more of output models 3916 from training system 3904 and/or other models of applications to perform inference on imaging data (e.g., DICOM data, RIS data, CIS data, REST compliant data, RPC data, raw data, etc.). In at least one embodiment, two or more examples of inferencing using application orchestration system 4028 (e.g., a scheduler) may be available. In at least one embodiment, a first category may include a high priority/low latency path that may achieve higher service level agreements, such as for performing inference on urgent requests during an emergency, or for a radiologist during diagnosis. In at least one embodiment, a second category may include a standard priority path that may be used for requests that may be non-urgent or where analysis may be performed at a later time. In at least one embodiment, application orchestration system 4028 may distribute resources (e.g., services 3920 and/or hardware 3922) based on priority paths for different inferencing tasks of AI services 4018.

In at least one embodiment, shared storage may be mounted to AI services 4018 within system 4000. In at least one embodiment, shared storage may operate as a cache (or other storage device type) and may be used to process inference requests from applications. In at least one embodiment, when an inference request is submitted, a request may be received by a set of API instances of deployment system 3906, and one or more instances may be selected (e.g., for best fit, for load balancing, etc.) to process a request. In at least one embodiment, to process a request, a request may be entered into a database, a machine learning model may be located from model registry 3924 if not already in a cache, a validation step may ensure appropriate machine learning model is loaded into a cache (e.g., shared storage), and/or a copy of a model may be saved to a cache. In at least one embodiment, a scheduler (e.g., of pipeline manager 4012) may be used to launch an application that is referenced in a request if an application is not already running or if there are not enough instances of an application. In at least one embodiment, if an inference server is not already launched to execute a model, an inference server may be launched. In at least one embodiment, any number of inference servers may be launched per model. In at least one embodiment, in a pull model, in which inference servers are clustered, models may be cached whenever load balancing is advantageous. In at least one embodiment, inference servers may be statically loaded in corresponding, distributed servers.

In at least one embodiment, inferencing may be performed using an inference server that runs in a container. In at least one embodiment, an instance of an inference server may be associated with a model (and optionally a plurality of versions of a model). In at least one embodiment, if an instance of an inference server does not exist when a request to perform inference on a model is received, a new instance may be loaded. In at least one embodiment, when starting an inference server, a model may be passed to an inference server such that a same container may be used to serve different models so long as inference server is running as a different instance.

In at least one embodiment, during application execution, an inference request for a given application may be received, and a container (e.g., hosting an instance of an inference server) may be loaded (if not already), and a start procedure may be called. In at least one embodiment, pre-processing logic in a container may load, decode, and/or perform any additional pre-processing on incoming data (e.g., using a CPU(s) and/or GPU(s)). In at least one embodiment, once data is prepared for inference, a container may perform inference as necessary on data. In at least one embodiment, this may include a single inference call on one image (e.g., a hand X-ray), or may require inference on hundreds of images (e.g., a chest CT). In at least one embodiment, an application may summarize results before completing, which may include, without limitation, a single confidence score, pixel level-segmentation, voxel-level segmentation, generating a visualization, or generating text to summarize findings. In at least one embodiment, different models or applications may be assigned different priorities. For example, some models may have a real-time (TAT less than one minute) priority while others may have lower priority (e.g., TAT less than 10 minutes). In at least one embodiment, model execution times may be measured from requesting institution or entity and may include partner network traversal time, as well as execution on an inference service.

In at least one embodiment, transfer of requests between services 3920 and inference applications may be hidden behind a software development kit (SDK), and robust transport may be provide through a queue. In at least one embodiment, a request will be placed in a queue via an API for an individual application/tenant ID combination and an SDK will pull a request from a queue and give a request to an application. In at least one embodiment, a name of a queue may be provided in an environment from where an SDK will pick it up. In at least one embodiment, asynchronous communication through a queue may be useful as it may allow any instance of an application to pick up work as it becomes available. In at least one embodiment, results may be transferred back through a queue, to ensure no data is lost. In at least one embodiment, queues may also provide an ability to segment work, as highest priority work may go to a queue with most instances of an application connected to it, while lowest priority work may go to a queue with a single instance connected to it that processes tasks in an order received. In at least one embodiment, an application may run on a GPU-accelerated instance generated in cloud 4026, and an inference service may perform inferencing on a GPU.

In at least one embodiment, visualization services 4020 may be leveraged to generate visualizations for viewing outputs of applications and/or deployment pipeline(s) 4010. In at least one embodiment, GPUs 4022 may be leveraged by visualization services 4020 to generate visualizations. In at least one embodiment, rendering effects, such as ray-tracing, may be implemented by visualization services 4020 to generate higher quality visualizations. In at least one embodiment, visualizations may include, without limitation, 2D image renderings, 3D volume renderings, 3D volume reconstruction, 2D tomographic slices, virtual reality displays, augmented reality displays, etc. In at least one embodiment, virtualized environments may be used to generate a virtual interactive display or environment (e.g., a virtual environment) for interaction by users of a system (e.g., doctors, nurses, radiologists, etc.). In at least one embodiment, visualization services 4020 may include an internal visualizer, cinematics, and/or other rendering or image processing capabilities or functionality (e.g., ray tracing, rasterization, internal optics, etc.).

In at least one embodiment, hardware 3922 may include GPUs 4022, AI system 4024, cloud 4026, and/or any other hardware used for executing training system 3904 and/or deployment system 3906. In at least one embodiment, GPUs 4022 (e.g., s TESLA and/or QUADRO GPUs) may include any number of GPUs that may be used for executing processing tasks of compute services 4016, AI services 4018, visualization services 4020, other services, and/or any of features or functionality of software 3918. For example, with respect to AI services 4018, GPUs 4022 may be used to perform pre-processing on imaging data (or other data types used by machine learning models), post-processing on outputs of machine learning models, and/or to perform inferencing (e.g., to execute machine learning models). In at least one embodiment, cloud 4026, AI system 4024, and/or other components of system 4000 may use GPUs 4022. In at least one embodiment, cloud 4026 may include a GPU-optimized platform for deep learning tasks. In at least one embodiment, AI system 4024 may use GPUs, and cloud 4026—or at least a portion tasked with deep learning or inferencing—may be executed using one or more AI systems 4024. As such, although hardware 3922 is illustrated as discrete components, this is not intended to be limiting, and any components of hardware 3922 may be combined with, or leveraged by, any other components of hardware 3922.

In at least one embodiment, AI system 4024 may include a purpose-built computing system (e.g., a super-computer or an HPC) configured for inferencing, deep learning, machine learning, and/or other artificial intelligence tasks. In at least one embodiment, AI system 4024 (e.g., NVIDIA's DGX)

may include GPU-optimized software (e.g., a software stack) that may be executed using a plurality of GPUs 4022, in addition to CPUs, RAM, storage, and/or other components, features, or functionality. In at least one embodiment, one or more AI systems 4024 may be implemented in cloud 4026 (e.g., in a data center) for performing some or all of AI-based processing tasks of system 4000.

In at least one embodiment, cloud 4026 may include a GPU-accelerated infrastructure (e.g., NVIDIA's NGC) that may provide a GPU-optimized platform for executing processing tasks of system 4000. In at least one embodiment, cloud 4026 may include an AI system(s) 4024 for performing one or more of AI-based tasks of system 4000 (e.g., as a hardware abstraction and scaling platform). In at least one embodiment, cloud 4026 may integrate with application orchestration system 4028 leveraging multiple GPUs to enable seamless scaling and load balancing between and among applications and services 3920. In at least one embodiment, cloud 4026 may tasked with executing at least some of services 3920 of system 4000, including compute services 4016, AI services 4018, and/or visualization services 4020, as described herein. In at least one embodiment, cloud 4026 may perform small and large batch inference (e.g., executing NVIDIA's TENSOR RT), provide an accelerated parallel computing API and platform 4030 (e.g., NVIDIA's CUDA), execute application orchestration system 4028 (e.g., KUBERNETES), provide a graphics rendering API and platform (e.g., for ray-tracing, 2D graphics, 3D graphics, and/or other rendering techniques to produce higher quality cinematics), and/or may provide other functionality for system 4000.

In at least one embodiment, in an effort to preserve patient confidentiality (e.g., where patient data or records are to be used off-premises), cloud 4026 may include a registry—such as a deep learning container registry. In at least one embodiment, a registry may store containers for instantiations of applications that may perform pre-processing, post-processing, or other processing tasks on patient data. In at least one embodiment, cloud 4026 may receive data that includes patient data as well as sensor data in containers, perform requested processing for just sensor data in those containers, and then forward a resultant output and/or visualizations to appropriate parties and/or devices (e.g., on-premises medical devices used for visualization or diagnoses), all without having to extract, store, or otherwise access patient data. In at least one embodiment, confidentiality of patient data is preserved in compliance with HIPAA and/or other data regulations.

FIG. 41 includes an example illustration of a deployment pipeline 4010A for processing imaging data, in accordance with at least one embodiment. In at least one embodiment, system 4000—and specifically deployment system 3906—may be used to customize, update, and/or integrate deployment pipeline(s) 4010A into one or more production environments. In at least one embodiment, deployment pipeline 4010A of FIG. 41 includes a non-limiting example of a deployment pipeline 4010A that may be custom defined by a particular user (or team of users) at a facility (e.g., at a hospital, clinic, lab, research environment, etc.). In at least one embodiment, to define deployment pipelines 4010A for a CT scanner 4102, a user may select—from a container registry, for example—one or more applications that perform specific functions or tasks with respect to imaging data generated by CT scanner 4102. In at least one embodiment, applications may be applied to deployment pipeline 4010A as containers that may leverage services 3920 and/or hardware 3922 of system 4000. In addition, deployment pipeline 4010A may include additional processing tasks or applications that may be implemented to prepare data for use by applications (e.g., DICOM adapter 4002B and DICOM reader 4106 may be used in deployment pipeline 4010A to prepare data for use by CT reconstruction 4108, organ segmentation 4110, etc.). In at least one embodiment, deployment pipeline 4010A may be customized or selected for consistent deployment, one time use, or for another frequency or interval. In at least one embodiment, a user may desire to have CT reconstruction 4108 and organ segmentation 4110 for several subjects over a specific interval, and thus may deploy pipeline 4010A for that period of time. In at least one embodiment, a user may select, for each request from system 4000, applications that a user wants to perform processing on that data for that request. In at least one embodiment, deployment pipeline 4010A may be adjusted at any interval and, because of adaptability and scalability of a container structure within system 4000, this may be a seamless process.

In at least one embodiment, deployment pipeline 4010A of FIG. 41 may include CT scanner 4102 generating imaging data of a patient or subject. In at least one embodiment, imaging data from CT scanner 4102 may be stored on a PACS server(s) 4104 associated with a facility housing CT scanner 4102. In at least one embodiment, PACS server(s) 4104 may include software and/or hardware components that may directly interface with imaging modalities (e.g., CT scanner 4102) at a facility. In at least one embodiment, DICOM adapter 4002B may enable sending and receipt of DICOM objects using DICOM protocols. In at least one embodiment, DICOM adapter 4002B may aid in preparation or configuration of DICOM data from PACS server(s) 4104 for use by deployment pipeline 4010A. In at least one embodiment, once DICOM data is processed through DICOM adapter 4002B, pipeline manager 4012 may route data through to deployment pipeline 4010A. In at least one embodiment, DICOM reader 4106 may extract image files and any associated metadata from DICOM data (e.g., raw sinogram data, as illustrated in visualization 4116A). In at least one embodiment, working files that are extracted may be stored in a cache for faster processing by other applications in deployment pipeline 4010A. In at least one embodiment, once DICOM reader 4106 has finished extracting and/or storing data, a signal of completion may be communicated to pipeline manager 4012. In at least one embodiment, pipeline manager 4012 may then initiate or call upon one or more other applications or containers in deployment pipeline 4010A.

In at least one embodiment, CT reconstruction 4108 application and/or container may be executed once data (e.g., raw sinogram data) is available for processing by CT reconstruction 4108 application. In at least one embodiment, CT reconstruction 4108 may read raw sinogram data from a cache, reconstruct an image file out of raw sinogram data (e.g., as illustrated in visualization 4116B), and store resulting image file in a cache. In at least one embodiment, at completion of reconstruction, pipeline manager 4012 may be signaled that reconstruction task is complete. In at least one embodiment, once reconstruction is complete, and a reconstructed image file may be stored in a cache (or other storage device), organ segmentation 4110 application and/or container may be triggered by pipeline manager 4012. In at least one embodiment, organ segmentation 4110 application and/or container may read an image file from a cache, normalize or convert an image file to format suitable for inference (e.g., convert an image file to an input resolution of a machine learning model), and run inference against a normalized image. In at least one embodiment, to run inference on a normalized image, organ segmentation 4110 application and/or container may rely on services 3920, and pipeline manager 4012 and/or application orchestration system 4028 may facilitate use of services 3920 by organ segmentation 4110 application and/or container. In at least one embodiment, for example, organ segmentation 4110 application and/or container may leverage AI services 4018 to perform inference on a normalized image, and AI services 4018 may leverage hardware 3922 (e.g., AI system 4024) to execute AI services 4018. In at least one embodiment, a result of an inference may be a mask file (e.g., as illustrated in visualization 4116C) that may be stored in a cache (or other storage device).

In at least one embodiment, once applications that process DICOM data and/or data extracted from DICOM data have completed processing, a signal may be generated for pipeline manager 4012. In at least one embodiment, pipeline manager 4012 may then execute DICOM writer 4112 to read results from a cache (or other storage device), package results into a DICOM format (e.g., as DICOM output 4114) for use by users at a facility who generated a request. In at least one embodiment, DICOM output 4114 may then be transmitted to DICOM adapter 4002B to prepare DICOM output 4114 for storage on PACS server(s) 4104 (e.g., for viewing by a DICOM viewer at a facility). In at least one embodiment, in response to a request for reconstruction and segmentation, visualizations 4116B and 4116C may be generated and available to a user for diagnoses, research, and/or for other purposes.

Although illustrated as consecutive application in deployment pipeline 4010A, CT reconstruction 4108 and organ segmentation 4110 applications may be processed in parallel in at least one embodiment. In at least one embodiment, where applications do not have dependencies on one another, and data is available for each application (e.g., after DICOM reader 4106 extracts data), applications may be executed at a same time, substantially at a same time, or with some overlap. In at least one embodiment, where two or more applications require similar services 3920, a scheduler of system 4000 may be used to load balance and distribute compute or processing resources between and among various applications. In at least one embodiment, in some embodiments, parallel computing platform 4030 may be used to perform parallel processing for applications to decrease run-time of deployment pipeline 4010A to provide real-time results.

Figure 42A:
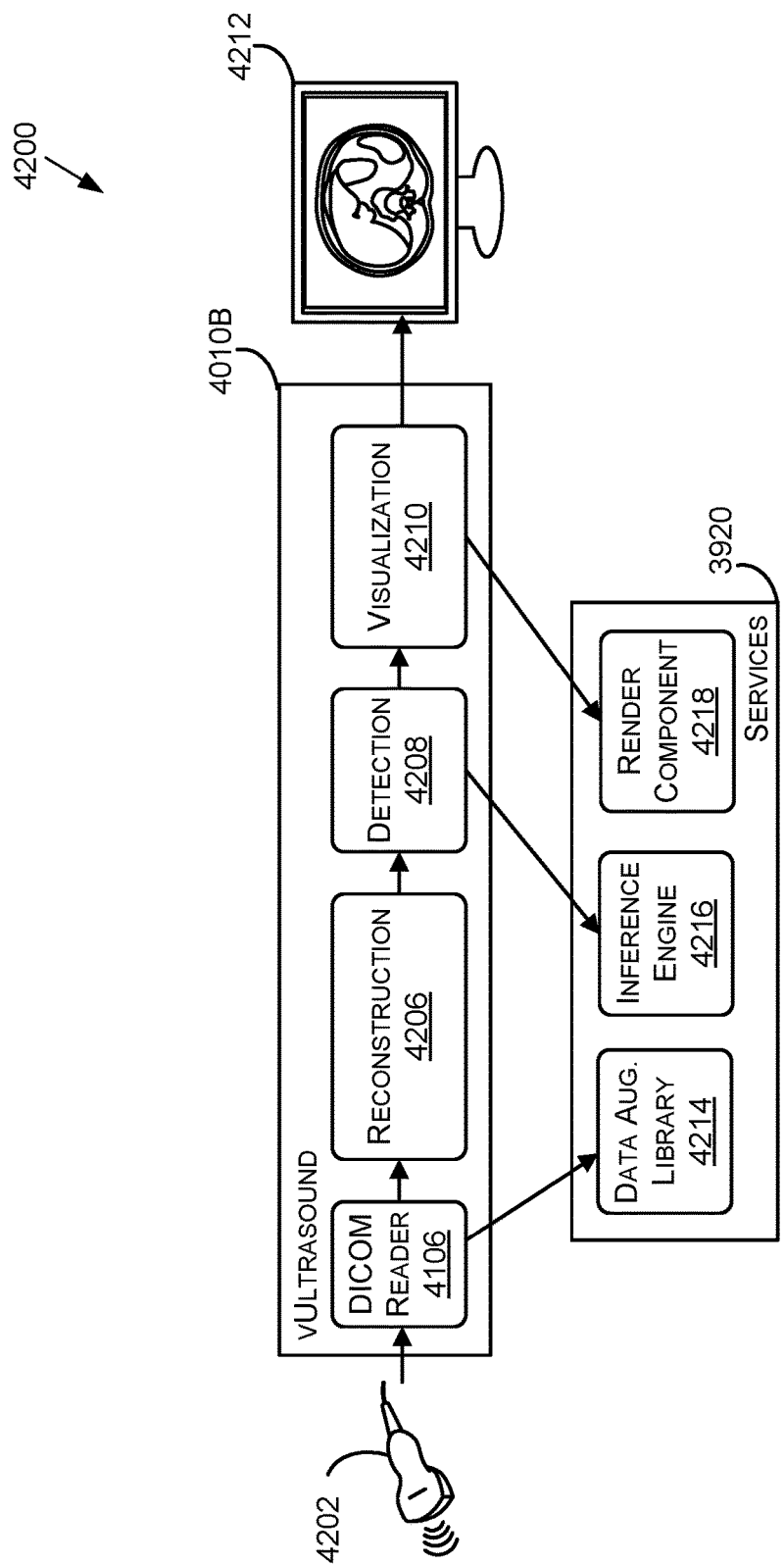
FIG. 42A includes an example data flow diagram of a virtual instrument supporting an ultrasound device, in accordance with at least one embodiment.
Figure 42B:
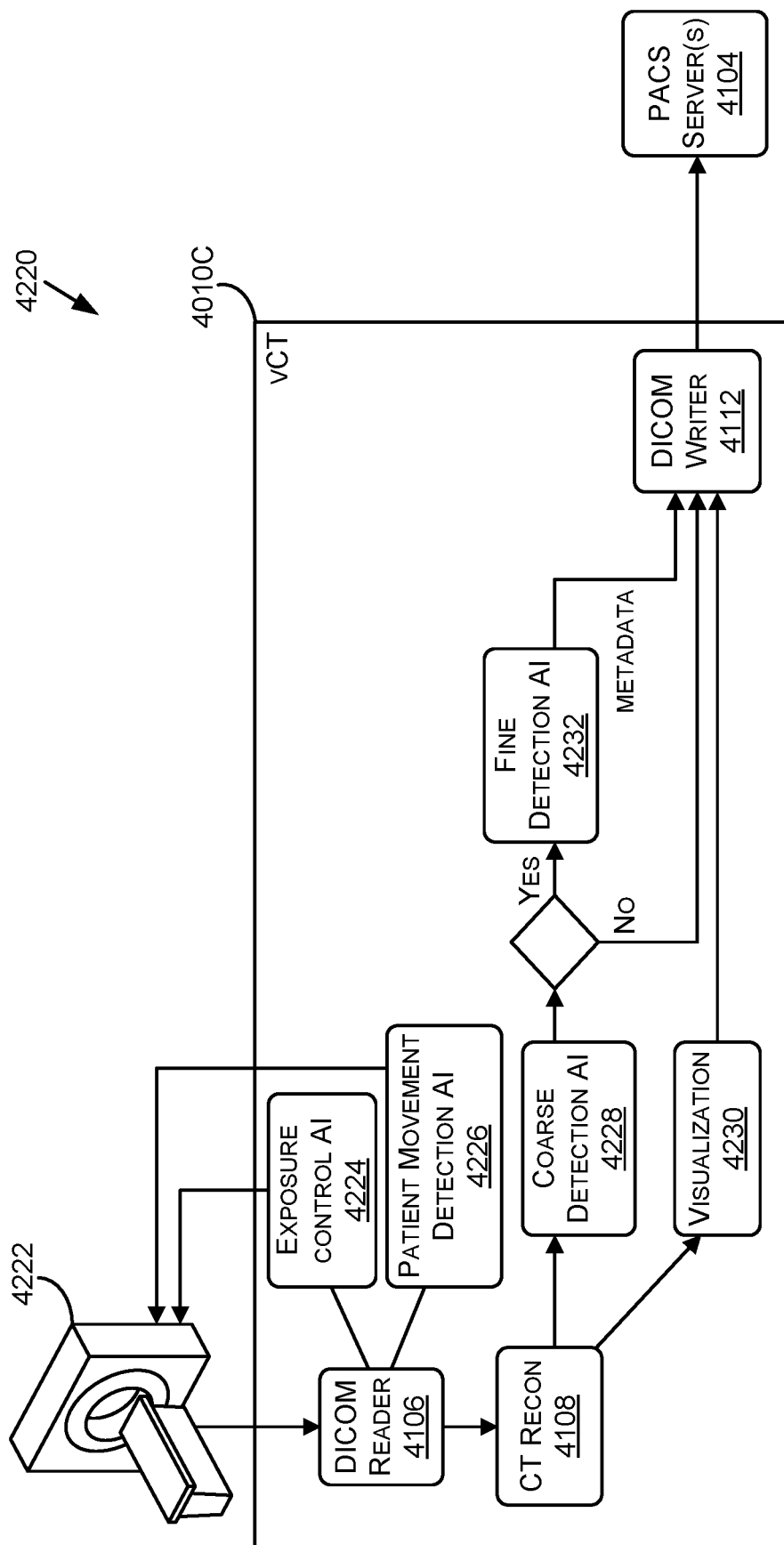
FIG. 42B includes an example data flow diagram of a virtual instrument supporting an CT scanner, in accordance with at least one embodiment.

In at least one embodiment, and with reference to FIGS. 42A-42B, deployment system 3906 may be implemented as one or more virtual instruments to perform different functionalities—such as image processing, segmentation, enhancement, AI, visualization, and inferencing—with imaging devices (e.g., CT scanners, X-ray machines, Mill machines, etc.), sequencing devices, genomics devices, and/ or other device types. In at least one embodiment, system 4000 may allow for creation and provision of virtual instruments that may include a software-defined deployment pipeline 4010 that may receive raw/unprocessed input data generated by a device(s) and output processed/reconstructed data. In at least one embodiment, deployment pipelines 4010 (e.g., 4010A and 4010B) that represent virtual instruments may implement intelligence into a pipeline, such as by leveraging machine learning models, to provide containerized inference support to a system. In at least one embodiment, virtual instruments may execute any number of containers each including instantiations of applications. In at least one embodiment, such as where real-time processing is desired, deployment pipelines 4010 representing virtual instruments may be static (e.g., containers and/or applications may be set), while in other examples, container and/or applications for virtual instruments may be selected (e.g., on a per-request basis) from a pool of applications or resources (e.g., within a container registry).

In at least one embodiment, system 4000 may be instantiated or executed as one or more virtual instruments on-premise at a facility in, for example, a computing system deployed next to or otherwise in communication with a radiology machine, an imaging device, and/or another device type at a facility. In at least one embodiment, however, an on-premise installation may be instantiated or executed within a computing system of a device itself (e.g., a computing system integral to an imaging device), in a local datacenter (e.g., a datacenter on-premise), and/or in a cloud-environment (e.g., in cloud 4026). In at least one embodiment, deployment system 3906, operating as a virtual instrument, may be instantiated by a supercomputer or other HPC system in some examples. In at least one embodiment, on-premise installation may allow for high-bandwidth uses (via, for example, higher throughput local communication interfaces, such as RF over Ethernet) for real-time processing. In at least one embodiment, real-time or near real-time processing may be particularly useful where a virtual instrument supports an ultrasound device or other imaging modality where immediate visualizations are expected or required for accurate diagnoses and analyses. In at least one embodiment, a cloud-computing architecture may be capable of dynamic bursting to a cloud computing service provider, or other compute cluster, when local demand exceeds on-premise capacity or capability. In at least one embodiment, a cloud architecture, when implemented, may be tuned for training neural networks or other machine learning models, as described herein with respect to training system 3904. In at least one embodiment, with training pipelines in place, machine learning models may be continuously learn and improve as they process additional data from devices they support. In at least one embodiment, virtual instruments may be continually improved using additional data, new data, existing machine learning models, and/or new or updated machine learning models.

In at least one embodiment, a computing system may include some or all of hardware 3922 described herein, and hardware 3922 may be distributed in any of a number of ways including within a device, as part of a computing device coupled to and located proximate a device, in a local datacenter at a facility, and/or in cloud 4026. In at least one embodiment, because deployment system 3906 and associated applications or containers are created in software (e.g., as discrete containerized instantiations of applications), behavior, operation, and configuration of virtual instruments, as well as outputs generated by virtual instruments, may be modified or customized as desired, without having to change or alter raw output of a device that a virtual instrument supports.

FIG. 42A includes an example data flow diagram of a virtual instrument supporting an ultrasound device, in accordance with at least one embodiment. In at least one embodiment, deployment pipeline 4010B may leverage one or more of services 3920 of system 4000. In at least one embodiment, deployment pipeline 4010B and services 3920 may leverage hardware 3922 of a system either locally or in cloud 4026. In at least one embodiment, although not illustrated, process 4200 may be facilitated by pipeline manager 4012, application orchestration system 4028, and/or parallel computing platform 4030.

In at least one embodiment, process 4200 may include receipt of imaging data from an ultrasound device 4202. In at least one embodiment, imaging data may be stored on PACS server(s) in a DICOM format (or other format, such as RIS, CIS, REST compliant, RPC, raw, etc.), and may be received by system 4000 for processing through deployment pipeline 4010 selected or customized as a virtual instrument (e.g., a virtual ultrasound) for ultrasound device 4202. In at least one embodiment, imaging data may be received directly from an imaging device (e.g., ultrasound device 4202) and processed by a virtual instrument. In at least one embodiment, a transducer or other signal converter communicatively coupled between an imaging device and a virtual instrument may convert signal data generated by an imaging device to image data that may be processed by a virtual instrument. In at least one embodiment, raw data and/or image data may be applied to DICOM reader 4106 to extract data for use by applications or containers of deployment pipeline 4010B. In at least one embodiment, DICOM reader 4106 may leverage data augmentation library 4214 (e.g., s DALI) as a service 3920 (e.g., as one of compute service(s) 4016) for extracting, resizing, rescaling, and/or otherwise preparing data for use by applications or containers.

In at least one embodiment, once data is prepared, a reconstruction 4206 application and/or container may be executed to reconstruct data from ultrasound device 4202 into an image file. In at least one embodiment, after reconstruction 4206, or at a same time as reconstruction 4206, a detection 4208 application and/or container may be executed for anomaly detection, object detection, feature detection, and/or other detection tasks related to data. In at least one embodiment, an image file generated during reconstruction 4206 may be used during detection 4208 to identify anomalies, objects, features, etc. In at least one embodiment, detection 4208 application may leverage an inference engine 4216 (e.g., as one of AI service(s) 4018) to perform inference on data to generate detections. In at least one embodiment, one or more machine learning models (e.g., from training system 3904) may be executed or called by detection 4208 application.

In at least one embodiment, once reconstruction 4206 and/or detection 4208 is/are complete, data output from these application and/or containers may be used to generate visualizations 4210, such as visualization 4212 (e.g., a grayscale output) displayed on a workstation or display terminal. In at least one embodiment, visualization may allow a technician or other user to visualize results of deployment pipeline 4010B with respect to ultrasound device 4202. In at least one embodiment, visualization 4210 may be executed by leveraging a render component 4218 of system 4000 (e.g., one of visualization service(s) 4020). In at least one embodiment, render component 4218 may execute a 2D, OpenGL, or ray-tracing service to generate visualization 4212.

FIG. 42B includes an example data flow diagram of a virtual instrument supporting a CT scanner, in accordance with at least one embodiment. In at least one embodiment, deployment pipeline 4010C may leverage one or more of services 3920 of system 4000. In at least one embodiment, deployment pipeline 4010C and services 3920 may leverage hardware 3922 of a system either locally or in cloud 4026. In at least one embodiment, although not illustrated, process 4220 may be facilitated by pipeline manager 4012, application orchestration system 4028, and/or parallel computing platform 4030.

In at least one embodiment, process 4220 may include CT scanner 4222 generating raw data that may be received by DICOM reader 4106 (e.g., directly, via a PACS server 4104, after processing, etc.). In at least one embodiment, a Virtual CT (instantiated by deployment pipeline 4010C) may include a first, real-time pipeline for monitoring a patient (e.g., patient movement detection AI 4226) and/or for adjusting or optimizing exposure of CT scanner 4222 (e.g., using exposure control AI 4224). In at least one embodiment, one or more of applications (e.g., 4224 and 4226) may leverage a service 3920, such as AI service(s) 4018. In at least one embodiment, outputs of exposure control AI 4224 application (or container) and/or patient movement detection AI 4226 application (or container) may be used as feedback to CT scanner 4222 and/or a technician for adjusting exposure (or other settings of CT scanner 4222) and/or informing a patient to move less.

In at least one embodiment, deployment pipeline 4010C may include a non-real-time pipeline for analyzing data generated by CT scanner 4222. In at least one embodiment, a second pipeline may include CT reconstruction 4108 application and/or container, a coarse detection AI 4228 application and/or container, a fine detection AI 4232 application and/or container (e.g., where certain results are detected by coarse detection AI 4228), a visualization 4230 application and/or container, and a DICOM writer 4112 (and/or other data type writer, such as RIS, CIS, REST compliant, RPC, raw, etc.) application and/or container. In at least one embodiment, raw data generated by CT scanner 4222 may be passed through pipelines of deployment pipeline 4010C (instantiated as a virtual CT instrument) to generate results. In at least one embodiment, results from DICOM writer 4112 may be transmitted for display and/or may be stored on PACS server(s) 4104 for later retrieval, analysis, or display by a technician, practitioner, or other user.

FIG. 43A illustrates a data flow diagram for a process 4300 to train, retrain, or update a machine learning model, in accordance with at least one embodiment. In at least one embodiment, process 4300 may be executed using, as a non-limiting example, system 4000 of FIG. 40. In at least one embodiment, process 4300 may leverage services 3920 and/or hardware 3922 of system 4000, as described herein. In at least one embodiment, refined models 4312 generated by process 4300 may be executed by deployment system 3906 for one or more containerized applications in deployment pipelines 4010.

In at least one embodiment, model training 3914 may include retraining or updating an initial model 4304 (e.g., a pre-trained model) using new training data (e.g., new input data, such as customer dataset 4306, and/or new ground truth data associated with input data). In at least one embodiment, to retrain, or update, initial model 4304, output or loss layer(s) of initial model 4304 may be reset, or deleted, and/or replaced with an updated or new output or loss layer(s). In at least one embodiment, initial model 4304 may have previously fine-tuned parameters (e.g., weights and/or biases) that remain from prior training, so training or retraining 3914 may not take as long or require as much processing as training a model from scratch. In at least one embodiment, during model training 3914, by having reset or replaced output or loss layer(s) of initial model 4304, parameters may be updated and re-tuned for a new dataset based on loss calculations associated with accuracy of output or loss layer(s) at generating predictions on new, customer dataset 4306 (e.g., image data 3908 of FIG. 39).

In at least one embodiment, pre-trained models 4006 may be stored in a data store, or registry (e.g., model registry 3924 of FIG. 39). In at least one embodiment, pre-trained models 4006 may have been trained, at least in part, at one or more facilities other than a facility executing process 4300. In at least one embodiment, to protect privacy and rights of patients, subjects, or clients of different facilities, pre-trained models 4006 may have been trained, on-premise, using customer or patient data generated on-premise. In at least one embodiment, pre-trained models 4006 may be trained using cloud 4026 and/or other hardware 3922, but confidential, privacy protected patient data may not be transferred to, used by, or accessible to any components of cloud 4026 (or other off premise hardware). In at least one embodiment, where a pre-trained model 4006 is trained at using patient data from more than one facility, pre-trained model 4006 may have been individually trained for each facility prior to being trained on patient or customer data from another facility. In at least one embodiment, such as where a customer or patient data has been released of privacy concerns (e.g., by waiver, for experimental use, etc.), or where a customer or patient data is included in a public dataset, a customer or patient data from any number of facilities may be used to train pre-trained model 4006 on-premise and/or off premise, such as in a datacenter or other cloud computing infrastructure.

In at least one embodiment, when selecting applications for use in deployment pipelines 4010, a user may also select machine learning models to be used for specific applications. In at least one embodiment, a user may not have a model for use, so a user may select a pre-trained model 4006 to use with an application. In at least one embodiment, pre-trained model 4006 may not be optimized for generating accurate results on customer dataset 4306 of a facility of a user (e.g., based on patient diversity, demographics, types of medical imaging devices used, etc.). In at least one embodiment, prior to deploying pre-trained model 4006 into deployment pipeline 4010 for use with an application(s), pre-trained model 4006 may be updated, retrained, and/or fine-tuned for use at a respective facility.

In at least one embodiment, a user may select pre-trained model 4006 that is to be updated, retrained, and/or fine-tuned, and pre-trained model 4006 may be referred to as initial model 4304 for training system 3904 within process 4300. In at least one embodiment, customer dataset 4306 (e.g., imaging data, genomics data, sequencing data, or other data types generated by devices at a facility) may be used to perform model training 3914 (which may include, without limitation, transfer learning) on initial model 4304 to generate refined model 4312. In at least one embodiment, ground truth data corresponding to customer dataset 4306 may be generated by training system 3904. In at least one embodiment, ground truth data may be generated, at least in part, by clinicians, scientists, doctors, practitioners, at a facility (e.g., as labeled clinic data 3912 of FIG. 39).

In at least one embodiment, AI-assisted annotation 3910 may be used in some examples to generate ground truth data. In at least one embodiment, AI-assisted annotation 3910 (e.g., implemented using an AI-assisted annotation SDK) may leverage machine learning models (e.g., neural networks) to generate suggested or predicted ground truth data for a customer dataset. In at least one embodiment, user 4310 may use annotation tools within a user interface (a graphical user interface (GUI)) on computing device 4308.

In at least one embodiment, user 4310 may interact with a GUI via computing device 4308 to edit or fine-tune annotations or auto-annotations. In at least one embodiment, a polygon editing feature may be used to move vertices of a polygon to more accurate or fine-tuned locations.

In at least one embodiment, once customer dataset 4306 has associated ground truth data, ground truth data (e.g., from AI-assisted annotation, manual labeling, etc.) may be used by during model training 3914 to generate refined model 4312. In at least one embodiment, customer dataset 4306 may be applied to initial model 4304 any number of times, and ground truth data may be used to update parameters of initial model 4304 until an acceptable level of accuracy is attained for refined model 4312. In at least one embodiment, once refined model 4312 is generated, refined model 4312 may be deployed within one or more deployment pipelines 4010 at a facility for performing one or more processing tasks with respect to medical imaging data.

In at least one embodiment, refined model 4312 may be uploaded to pre-trained models 4006 in model registry 3924 to be selected by another facility. In at least one embodiment, his process may be completed at any number of facilities such that refined model 4312 may be further refined on new datasets any number of times to generate a more universal model.

FIG. 43B is an example illustration of a client-server architecture 4332 to enhance annotation tools with pre-trained annotation models, in accordance with at least one embodiment. In at least one embodiment, AI-assisted annotation tools 4336 may be instantiated based on a client-server architecture 4332. In at least one embodiment, annotation tools 4336 in imaging applications may aid radiologists, for example, identify organs and abnormalities. In at least one embodiment, imaging applications may include software tools that help user 4310 to identify, as a non-limiting example, a few extreme points on a particular organ of interest in raw images 4334 (e.g., in a 3D MRI or CT scan) and receive auto-annotated results for all 2D slices of a particular organ. In at least one embodiment, results may be stored in a data store as training data 4338 and used as (for example and without limitation) ground truth data for training. In at least one embodiment, when computing device 4308 sends extreme points for AI-assisted annotation 3910, a deep learning model, for example, may receive this data as input and return inference results of a segmented organ or abnormality. In at least one embodiment, pre-instantiated annotation tools, such as AI-Assisted Annotation Tool 4336B in FIG. 43B, may be enhanced by making API calls (e.g., API Call 4344) to a server, such as an Annotation Assistant Server 4340 that may include a set of pre-trained models 4342 stored in an annotation model registry, for example. In at least one embodiment, an annotation model registry may store pre-trained models 4342 (e.g., machine learning models, such as deep learning models) that are pre-trained to perform AI-assisted annotation on a particular organ or abnormality. In at least one embodiment, these models may be further updated by using training pipelines 4004. In at least one embodiment, pre-installed annotation tools may be improved over time as new labeled clinic data 3912 is added.

Inference and/or training logic 1015 are used to perform inferencing and/or training operations associated with one or more embodiments. Details regarding inference and/or training logic 1015 are provided herein in conjunction with FIGS. 10A and/or 10B.

At least one embodiment of the disclosure can be described in view of the following clauses:

1. A method comprising: obtaining an image including an object depicted in the image; performing labeling of areas of the image to distinguish areas depicting respective parts of the object from areas depicting respective parts of the image different from the object; performing a set of transformations on the image to generate a set of transformed images; and generating, based at least in part on the performed labeling, a set of boundaries of the object for the set of transformed images.

2. The method of clause 1, wherein performing the set of transformations further comprises rotating the image by a set of values.

3. The method of clauses 1 or 2, wherein the set of boundaries comprises bounding boxes of the object in the set of transformed images.

4. The method of clauses 1 to 3, wherein the method further comprises training a neural network based at least in part on the set of transformed images and the set of boundaries of the object.

5. The method of clauses 1 to 4, wherein the neural network is trained to perform object detection.

6. The method of clauses 1 to 5, wherein: the image has a first bounding box for the object; the set of transformations comprises a rotation of the image to result in a rotated image; and the set of boundaries comprises a second bounding box of the object that has sides parallel to the first bounding box for the object and that has area smaller than a box of minimal perimeter that would completely encompass the first bounding box after the rotation has been applied to the first bounding box.

7. The method of clauses 1 to 6, wherein performing the set of transformations further comprises modifying a scale value of the image.

8. The method of clauses 1 to 7, wherein performing the set of transformations further comprises modifying a luminance value of a set of images of the second dataset.

9. The method of clauses 1 to 8, wherein performing the set of transformations further comprises modifying a contrast value for a set of images of the second dataset.

10. The method of clauses 1 to 9, wherein the labeling is a segmentation of the image generated by a neural network trained to perform segmentations.

11. The method of clauses 1 to 10, wherein the neural network comprises a Mask Region-based Convolutional Neural Network.

12. The method of clauses 1 to 11, further comprising associating the set of boundaries with a label of the object in a training dataset.

13. The method of clauses 1 to 12, wherein the image further comprises a frame of a set of frames comprising a video.

14. The method of clauses 1 to 13, wherein a first boundary of the set of boundaries further comprises a rectangular region encompassing the object.

15. A system comprising: one or more processors; and memory storing instructions that, as a result of being executed by the one or more processors, cause the system to: obtain an image depicting an object; use a first model to obtain a segmentation of the of the image to distinguish pixels of the object from other pixels; use the segmentation to determine boundaries of the object in a set of modified versions of the image; and associate the object with the boundaries in a training dataset.

16. The system of clauses 1 to 15, wherein the first model further comprises a Convolutional Neural Network trained, based at least in part on, a curated dataset.

17. The system of clauses 1 to 16, wherein the memory further includes instructions that, as a result of being executed by the one or more processors, cause the system to use the training dataset to train a second model to perform object detection.

18. The system of clauses 1 to 17, wherein the second model includes a Convolutional Neural Network.

19. The system of clauses 1 to 18, wherein the boundaries comprise a set of bounding boxes of the object.

20. The system of clauses 1 to 19, wherein the set of modified images comprises an image generated based, at least in part, on rotating the obtained image.

21. A machine-readable medium having stored thereon a set of instructions, which if performed by one or more processors, cause the one or more processors to at least: generate a pre-labeling tool based at least in part on labels associated with objects within a first set of images of a first dataset and a first set of mask annotations; modify a second set of images of a second dataset to generate a set of modified images; and train a neural network based at least part on the set of modified images and a second set of mask annotations, generated by the pre-labeling tool, corresponding to objects within the set of modified images.

22. The machine-readable medium of clauses 1 to 21, wherein the first set of mask annotations are generated by a convolutional neural network based at least in part on the first set of images.

23. The machine-readable medium of clauses 1 to 22, wherein the set of bounding boxes are included in the first dataset.

24. The machine-readable medium of clauses 1 to 23, wherein the set of instructions that cause the one or more processors to modify the second set of images to generate the set of modified images further comprises instructions, which if performed by the one or more processors, cause the one or more processors to rotate images of the second set of images different amounts about a rotational axis.

25. The machine-readable medium of clauses 1 to 24, wherein the set of instructions that cause the one or more processors to modify the second set of images to generate the set of modified images further comprises instructions, which if performed by the one or more processors, cause the one or more processors to modify color values associated with images of the second set of images.

26. The machine-readable medium of clauses 1 to 25, wherein the set of instructions that cause the one or more processors to modify the second set of images to generate the set of modified images further comprise instructions, which if performed by the one or more processors, cause the one or more processors to modify luminance values associated with images of the second set of images.

27. The machine-readable medium of clauses 1 to 26, wherein the set of instructions that cause the one or more processors to modify the second set of images to generate the set of modified images further comprise instructions, which if performed by the one or more processors, cause the one or more processors to modify scale values associated with images of the second set of images.

28. A method comprising: obtaining a segmentation of an image; performing a transformation of the image to obtain a transformed image; and generating a boundary of an object depicted in the transformed image based at least in part on the segmentation.

29. The method of clauses 1 to 28, wherein obtaining the segmentation further comprises using a neural network to generate the segmentation of the image.

30. The method of clauses 1 to 29, wherein performing the transformation of the image further comprises rotating the image.

31. The method of clauses 1 to 30, wherein the boundary of the object depicted in the transformed image further comprises a bounding box.

32. The method of clauses 1 to 31, wherein the method further comprises training a neural network based at least in part on the boundary of the object depicted in the transformed image.

33. The method of clauses 1 to 32, wherein the image further comprises a first boundary of the object and the generated boundary is different from another boundary generated by a transformation applied to the first boundary.

In at least one embodiment, a single semiconductor platform may refer to a sole unitary semiconductor-based integrated circuit or chip. In at least one embodiment, multi-chip modules may be used with increased connectivity which simulate on-chip operation, and make substantial improvements over utilizing a conventional central processing unit ("CPU") and bus implementation. In at least one embodiment, various modules may also be situated separately or in various combinations of semiconductor platforms per desires of user.

In at least one embodiment, referring back to FIG. 16, computer programs in form of machine-readable executable code or computer control logic algorithms are stored in main memory 1604 and/or secondary storage. Computer programs, if executed by one or more processors, enable system 1600 to perform various functions in accordance with at least one embodiment. In at least one embodiment, memory 1604, storage, and/or any other storage are possible examples of computer-readable media. In at least one embodiment, secondary storage may refer to any suitable storage device or system such as a hard disk drive and/or a removable storage drive, representing a floppy disk drive, a magnetic tape drive, a compact disk drive, digital versatile disk ("DVD") drive, recording device, universal serial bus ("USB") flash memory, etc. In at least one embodiment, architecture and/or functionality of various previous figures are implemented in context of CPU 1602, parallel processing system 1612, an integrated circuit capable of at least a portion of capabilities of both CPU 1602, parallel processing system 1612, a chipset (e.g., a group of integrated circuits designed to work and sold as a unit for performing related functions, etc.), and/or any suitable combination of integrated circuit(s).

In at least one embodiment, architecture and/or functionality of various previous figures are implemented in context of a general computer system, a circuit board system, a game console system dedicated for entertainment purposes, an application-specific system, and more. In at least one embodiment, computer system 1600 may take form of a desktop computer, a laptop computer, a tablet computer, servers, supercomputers, a smart-phone (e.g., a wireless, hand-held device), personal digital assistant ("PDA"), a digital camera, a vehicle, a head mounted display, a hand-held electronic device, a mobile phone device, a television, workstation, game consoles, embedded system, and/or any other type of logic.

In at least one embodiment, parallel processing system 1612 includes, without limitation, a plurality of parallel processing units ("PPUs") 1614 and associated memories 1616. In at least one embodiment, PPUs 1614 are connected to a host processor or other peripheral devices via an interconnect 1618 and a switch 1620 or multiplexer. In at least one embodiment, parallel processing system 1612 distributes computational tasks across PPUs 1614 which can be parallelizable—for example, as part of distribution of computational tasks across multiple graphics processing unit ("GPU") thread blocks. In at least one embodiment, memory is shared and accessible (e.g., for read and/or write access) across some or all of PPUs 1614, although such shared memory may incur performance penalties relative to use of local memory and registers resident to a PPU 1614. In at least one embodiment, operation of PPUs 1614 is synchronized through use of a command such as _syncthreads( ), wherein all threads in a block (e.g., executed across multiple PPUs 1614) to reach a certain point of execution of code before proceeding.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. "Connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. In at least one embodiment, use of term "set" (e.g., "a set of items") or "subset" unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, term "plurality" indicates a state of being plural (e.g., "a plurality of items" indicates multiple items). In at least one embodiment, number of items in a plurality is at least two, but can be more when so indicated either explicitly or by context. Further, unless stated otherwise or otherwise clear from context, phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof)

is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause computer system to perform operations described herein. In at least one embodiment, set of non-transitory computer-readable storage media comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors—for example, a non-transitory computer-readable storage medium store instructions and a main central processing unit ("CPU") executes some of instructions while a graphics processing unit ("GPU") executes other instructions. In at least one embodiment, different components of a computer system have separate processors and different processors execute different subsets of instructions.

Accordingly, in at least one embodiment, computer systems are configured to implement one or more services that singly or collectively perform operations of processes described herein and such computer systems are configured with applicable hardware and/or software that enable performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. In at least one embodiment, terms "system" and "method" are used herein interchangeably insofar as system may embody one or more methods and methods may be considered a system.

In present document, references may be made to obtaining, acquiring, receiving, or inputting analog or digital data into a subsystem, computer system, or computer-implemented machine. In at least one embodiment, process of obtaining, acquiring, receiving, or inputting analog and digital data can be accomplished in a variety of ways such as by receiving data as a parameter of a function call or a call to an application programming interface. In at least one embodiment, processes of obtaining, acquiring, receiving, or inputting analog or digital data can be accomplished by transferring data via a serial or parallel interface. In at least one embodiment, processes of obtaining, acquiring, receiving, or inputting analog or digital data can be accomplished by transferring data via a computer network from providing entity to acquiring entity. In at least one embodiment, references may also be made to providing, outputting, transmitting, sending, or presenting analog or digital data. In various examples, processes of providing, outputting, transmitting, sending, or presenting analog or digital data can be accomplished by transferring data as an input or output parameter of a function call, a parameter of an application programming interface or interprocess communication mechanism.

Although descriptions herein set forth example implementations of described techniques, other architectures may be used to implement described functionality, and are intended to be within scope of this disclosure. Furthermore, although specific distributions of responsibilities may be defined above for purposes of description, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A method comprising:
obtaining an image including an object depicted in the image, wherein the object is associated with a first set of boundaries;
generating, based at least in part on the first set of boundaries, one or more labels corresponding to one or more areas of the image to distinguish areas depicting respective parts of the object from areas depicting respective parts of the image different from the object;
performing a set of transformations on the image to generate a set of transformed images; and
generating, based at least in part on the one or more generated labels, a second set of boundaries of the object for the set of transformed images, wherein the second set of boundaries enclose a smaller portion of the image than the first set of boundaries.

2. The method of claim 1, wherein performing the set of transformations further comprises rotating the image by a set of values.

3. The method of claim 1, wherein the second set of boundaries comprises bounding boxes of the object in the set of transformed images.

4. The method of claim 1, further comprising:
training a neural network based at least in part on the set of transformed images and the second set of boundaries of the object.

5. The method of claim 4, wherein the neural network is to perform object detection.

6. The method of claim 1, wherein:
the first set of boundaries comprises a first bounding box for the object;
the set of transformations comprises a rotation of the image to result in a rotated image; and
the second set of boundaries comprises a second bounding box of the object that has sides parallel to the first bounding box for the object and that has area smaller than a box of minimal perimeter that would completely encompass the first bounding box after the rotation has been applied to the first bounding box.

7. The method of claim 1, wherein performing the set of transformations further comprises modifying a scale value of the image.

8. The method of claim 1, wherein performing the set of transformations further comprises modifying a luminance value of the image.

9. The method of claim 1, wherein performing the set of transformations further comprises modifying a contrast value for the image.

10. The method of claim 1, wherein the one or more generated labels are from one or more segmentations of the image generated by a neural network.

11. The method of claim 10, wherein the neural network comprises a Mask Region-based Convolutional Neural Network.

12. The method of claim 1, further comprising associating the second set of boundaries with a label of the one or more generated labels to train a neural network.

13. The method of claim 1, wherein the image further comprises a frame of a set of frames comprising a video.

14. The method of claim 1, wherein a boundary of the first set of boundaries further comprises a rectangular region encompassing the object.

15. A system comprising:
one or more processors; and
memory storing instructions that, as a result of being executed by the one or more processors, cause the system to:
obtain an image depicting an object that is associated with first boundaries;
use a first model to obtain a segmentation of the image to distinguish pixels of the object from other pixels based at least in part on the first boundaries;
use the segmentation to determine second boundaries of the object in a set of modified versions of the image, wherein the second boundaries enclose a region that encompasses the object and is smaller than at least one region enclosed by the first boundaries; and
associate the object with the second boundaries of the object in a dataset to update a second model.

16. The system of claim 15, wherein the first model further comprises a Convolutional Neural Network trained, based at least in part on, a curated dataset.

17. The system of claim 15, wherein the memory further includes instructions that, as a result of being executed by the one or more processors, cause the system to use the dataset to train the second model to perform object detection.

18. The system of claim 17, wherein the second model includes a Convolutional Neural Network.

19. The system of claim 15, wherein the second boundaries comprise a set of bounding boxes of the object.

20. The system of claim 15, wherein the set of modified versions of the image comprises an image generated based, at least in part, on rotating the image.

21. A system comprising:
one or more processors to perform one or more operations, the one or more operations comprising at least:
instantiating a pre-labeling tool based at least in part on labels associated with objects within a first set of images of a first dataset and a first set of mask annotations;
modifying a second set of images of a second dataset to generate a set of modified images; and
updating a neural network based at least part on the set of modified images and a second set of mask annotations, generated by the pre-labeling tool, corresponding to objects within the set of modified images, wherein the second set of mask annotations enclose a smaller area that encompasses the objects compared to the first set of mask annotations.

22. The system of claim 21, wherein the one or more operations include instantiating a convolutional neural network to generate the first set of mask annotations based at least in part on the first set of images.

23. The system of claim 21, wherein a set of bounding boxes is included in the first dataset.

24. The system of claim 21, wherein modifying the second set of images to generate the set of modified images further comprises rotating one or more images of the second set of images different amounts about a rotational axis.

25. The system claim 21, wherein modifying the second set of images to generate the set of modified images further comprises modifying one or more color values associated with images of the second set of images.

26. The system of claim 21, wherein modifying the second set of images to generate the set of modified images further comprises modifying luminance values associated with images of the second set of images.

27. The system of claim 21, wherein modifying the second set of images to generate the set of modified images further comprises modifying one or more scale values associated with images of the second set of images.

28. A method comprising:
- obtaining a segmentation of an image that is associated with a first boundary;
- performing a transformation of the image to obtain two or more transformed images; and
- generating a second boundary of an object depicted in the two or more transformed images based at least in part on the segmentation, wherein the second boundary encloses the object within a smaller region compared to a region enclosed by the first boundary.

29. The method of claim 28, wherein obtaining the segmentation further comprises using a neural network to generate the segmentation of the image.

30. The method of claim 28, wherein performing the transformation of the image further comprises rotating the image.

31. The method of claim 28, wherein the second boundary of the object depicted in the two or more transformed images further comprises a bounding box.

32. The method of claim 28, wherein the method further comprises training a neural network based at least in part on the second boundary of the object depicted in the two or more transformed images.

33. The method of claim 28, wherein the second boundary includes a smaller number of pixels compared to the first boundary.

* * * * *